United States Patent
Bui et al.

(10) Patent No.: US 11,755,997 B2
(45) Date of Patent: Sep. 12, 2023

(54) COMPACT PRESENTATION OF AUTOMATICALLY SUMMARIZED INFORMATION ACCORDING TO RULE-BASED GRAPHICALLY REPRESENTED INFORMATION

(71) Applicant: Anduin Transactions, Inc., Redwood City, CA (US)

(72) Inventors: Alin Bui, Signal Hill, CA (US); Andrew Pope, Ho Chi Minh (VN); Ben Tortorelli, Ho Chi Minh (VN); Binh Nguyen, Ho Chi Minh (VN); Chau Nguyen, Ho Chi Minh (VN); Cuong Manh Pham, Ho Chi Minh (VN); Cuong Tran, Hanoi (VN); Hiep Nguyen, Ho Chi Minh (VN); Julien Houbin, Ho Chi Minh (VN); Quang Xuan Do, Ho Chi Minh (VN); Tam Nguyen, Hanoi (VN); Duc Tam Nguyen, Hanoi (VN); Thu Tran, Ho Chi Minh (VN); Tri Nguyen, Dalat (VN)

(73) Assignee: Anduin Transactions, Inc., Los Altos, CA (US)

(*) Notice: Subject to any disclaimer, the term of this patent is extended or adjusted under 35 U.S.C. 154(b) by 33 days.

(21) Appl. No.: 15/903,644

(22) Filed: Feb. 23, 2018

(65) Prior Publication Data
US 2018/0239507 A1    Aug. 23, 2018

Related U.S. Application Data

(63) Continuation of application No. PCT/US2018/019253, filed on Feb. 22, 2018.
(Continued)

(51) Int. Cl.
*G06F 3/0484* (2022.01)
*G06Q 10/10* (2023.01)
(Continued)

(52) U.S. Cl.
CPC ......... *G06Q 10/103* (2013.01); *G06F 3/0482* (2013.01); *G06F 3/0484* (2013.01);
(Continued)

(58) Field of Classification Search
CPC ...... G06F 3/0484; G06F 16/93; G06F 40/103; G06F 3/0482; G06F 40/205; G06Q 10/10; G06Q 10/103; G06V 30/40
See application file for complete search history.

(56) References Cited

U.S. PATENT DOCUMENTS 6,643,642 B1 * 11/2003 Habegger ............. G06F 16/284
7,555,441 B2    6/2009 Crow et al.
(Continued)

FOREIGN PATENT DOCUMENTS

WO    WO 2018/156781    8/2018
WO    WO 2019/165371    8/2019

OTHER PUBLICATIONS

International Searh Report and Written Opinion for International Application No. PCT/US2019/019424 dated May 10, 2019, 11 pages.
(Continued)

*Primary Examiner* — Kyle R Stork
(74) *Attorney, Agent, or Firm* — Knobbe, Martens, Olson & Bear, LLP

(57) ABSTRACT

Methods and systems for compact presentation of automatically summarized information according to rule-based graphically represented information. One of the methods includes obtaining, via a user accessible user interface, a request for uploaded textual information to be analyzed.
(Continued)

Ontology information is accessed based on an indicated type associated with the textual information, and ontology information for the type. The ontology information specifies nodes, with the nodes causing the server system to extract values for textual expressions defined by the nodes, and relational information between the nodes, with the relational information indicating links between textual expressions. The textual information is parsed based on the ontology information. The parsing causes traversal of the nodes and extraction of values from associated textual expressions based on the textual information. Values are obtained based on the parsing, with the values being utilized as summary information. The obtained values are presented on a user device.

29 Claims, 96 Drawing Sheets

Related U.S. Application Data

(60) Provisional application No. 62/462,023, filed on Feb. 22, 2017, provisional application No. 62/462,010, filed on Feb. 22, 2017.

(51) Int. Cl.

| | | |
|---|---|---|
| *G06F 3/0482* | (2013.01) | |
| *G06F 16/93* | (2019.01) | |
| *G06F 40/103* | (2020.01) | |
| *G06F 40/205* | (2020.01) | |
| *G06V 30/40* | (2022.01) | |

(52) U.S. Cl.
CPC ............ *G06F 16/93* (2019.01); *G06F 40/103* (2020.01); *G06Q 10/10* (2013.01); *G06F 40/205* (2020.01); *G06V 30/40* (2022.01)

(56) References Cited

U.S. PATENT DOCUMENTS

| | | | |
|---|---|---|---|
| 2003/0060910 A1 | 3/2003 | Williams et al. | |
| 2003/0069747 A1* | 4/2003 | Strothmann | G06Q 10/06393 705/7.39 |
| 2003/0225462 A1* | 12/2003 | Bachman | G05B 19/41885 700/1 |
| 2004/0024739 A1 | 2/2004 | Copperman et al. | |
| 2004/0181518 A1* | 9/2004 | Mayo | G06F 16/283 |
| 2004/0205082 A1* | 10/2004 | Fontoura | G06F 16/83 |
| 2005/0080656 A1* | 4/2005 | Crow | G06Q 10/0631 705/7.14 |
| 2005/0091587 A1* | 4/2005 | Ramarao | G06F 40/154 715/248 |
| 2005/0289134 A1* | 12/2005 | Noguchi | G06F 16/367 |
| 2006/0074714 A1 | 4/2006 | Aziz et al. | |
| 2006/0155726 A1* | 7/2006 | Krasun | G06F 16/81 |
| 2006/0173812 A1* | 8/2006 | Bahl | G06F 16/283 |
| 2006/0178890 A1 | 8/2006 | Marechal et al. | |
| 2007/0276715 A1 | 11/2007 | Beringer et al. | |
| 2007/0300295 A1 | 12/2007 | Kwok et al. | |
| 2008/0154672 A1 | 6/2008 | Skedsvold | |
| 2008/0320031 A1* | 12/2008 | Denoual | G06F 40/14 |
| 2009/0259513 A1 | 10/2009 | Tung et al. | |
| 2010/0074524 A1* | 3/2010 | Stollman | G06F 16/972 382/175 |
| 2010/0145902 A1* | 6/2010 | Boyan | G06F 16/958 706/54 |
| 2010/0185477 A1 | 7/2010 | Soga | |
| 2011/0087629 A1* | 4/2011 | B'Far | G06F 16/254 706/46 |
| 2011/0314060 A1* | 12/2011 | Sinha | G06F 16/86 707/779 |
| 2012/0095798 A1 | 4/2012 | Mabari | |
| 2012/0110087 A1 | 5/2012 | Culver et al. | |
| 2012/0123863 A1* | 5/2012 | Kaul | G06Q 30/02 705/14.52 |
| 2012/0233160 A1* | 9/2012 | Koomullil | G06F 16/367 707/E17.014 |
| 2013/0006968 A1* | 1/2013 | Gusmini | G06F 16/25 707/722 |
| 2013/0238312 A1* | 9/2013 | Waibel | G10L 15/1815 704/8 |
| 2013/0253977 A1 | 9/2013 | Vibhor et al. | |
| 2013/0262169 A1 | 10/2013 | Van Der Vyver et al. | |
| 2014/0335497 A1 | 11/2014 | Gal et al. | |
| 2015/0039696 A1 | 2/2015 | Appelman et al. | |
| 2015/0052203 A1 | 2/2015 | Karnin et al. | |
| 2015/0067476 A1* | 3/2015 | Song | G06F 16/9577 715/234 |
| 2015/0113422 A1 | 4/2015 | Pfeiffer et al. | |
| 2015/0254369 A1* | 9/2015 | Hou | G06F 3/0486 707/798 |
| 2015/0294377 A1 | 10/2015 | Chow | |
| 2015/0339278 A1* | 11/2015 | Bao | G06F 17/2288 715/229 |
| 2016/0026953 A1 | 1/2016 | Gore et al. | |
| 2016/0035053 A1 | 2/2016 | Gerhardt | |
| 2016/0048758 A1* | 2/2016 | Campbell | G06F 17/2775 706/46 |
| 2016/0117360 A1* | 4/2016 | Kune | G06F 16/24573 707/730 |
| 2017/0048285 A1 | 2/2017 | Pearl et al. | |
| 2017/0189814 A1 | 7/2017 | Ventrice et al. | |
| 2017/0310546 A1 | 10/2017 | Nair et al. | |
| 2018/0018723 A1 | 1/2018 | Nagla et al. | |
| 2018/0060790 A1 | 3/2018 | Stefik et al. | |
| 2018/0239959 A1 | 8/2018 | Bui et al. | |
| 2018/0321935 A1 | 11/2018 | Bansai et al. | |
| 2018/0357333 A1* | 12/2018 | Isherwood | G06F 16/901 |

OTHER PUBLICATIONS

DocuSign, "How does DocuSign Work?" http://web.archive.org/web/20160213203213/https://www.docusign.com/products/electronic-signature/how-docusign-works, archived Feb. 13, 2016, 5 pages.

International Search Report and Written Opinion for International Application No. PCT/US2018/019253 dated Aug. 16, 2018.

Official Communication from International Application No. PCT/US2018/019253 dated Apr. 13, 2018.

\* cited by examiner

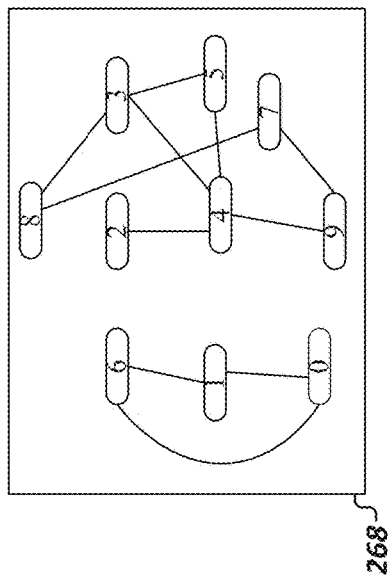

Example Simple Undirected Graph Data Structure — 262

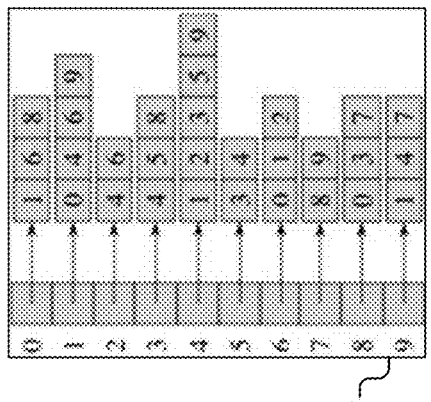

Example Adjacency List — 266

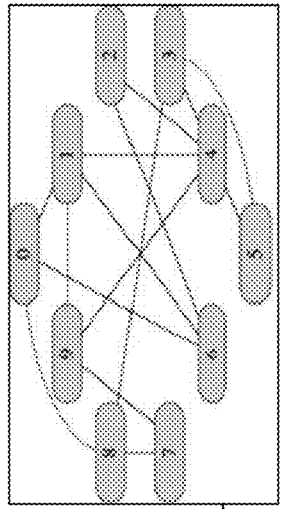

Example Clusters — 268

Example Adjacency Matrix — 264

Graph data structure is purposefully built to handle high volume, highly connected data:
- More efficient in computing relationship queries than traditional databases, either using
  - Adjacency matrices, or
  - Adjacency list
- Can easily add to the existing structure without endangering current functionality
- Structure and schema of a graph model can easily flex
- New data type and its relationship
- Evolve in step with the rest of the application and any changing business data requirements.
- Can easily add weights to edges
- Use Optimal amount of computer memory

Deal type —950 [Convertible Note ✓] [Priced Round]

CONVERTIBLE NOTE
An instrument that an investor receives from the company for providing a loan to the company, which will later convert to equity in the company. The company's valuation will be determined at a later date

| Field | Value |
|---|---|
| Amount of financing | $0 |
| Amount permitted from Investors acceptable to Investor GP 1 | $0 |
| Anticipated initial closing date (the "Initial Closing") | 16 Dec 2016 |
| Term Sheet expiration date | 16 Dec 2016 |
| Cap | $0 — $60,000,000 — $0 |
| | ○ Pre-money  ⊙ Post-money |
| Discount | 0% — 25% — 0% |
| Price per Share | $0 |
| | ☐ Preferred price at last priced round |
| Increase interest rate after default | ○ Yes  ⊙ No |
| Additional Indebtedness | ○ Yes  ⊙ No |
| Other approvals | ○ Yes  ⊙ No |
| Board seat | ○ Yes  ⊙ No |
| Right of first offer | ○ Yes  ⊙ No |
| Maturity Date (time from Initial Closing date) | 0 years — 15 years — 1 year |

952 — [Review Terms]

FIG. 9E

| Deal Summary 960 | Convertible Note 962 | |
|---|---|---|
| Deal type<br>Convertible Note | Cap | $ 15,844,797 post-money |
| Amount of financing<br>$10,000 | Discount | 0% |
| Amount permitted from Investors acceptable to Investor GP 1<br>$100 | Percentage | 0% |
| | Price per share | $1 |
| Anticipated initial closing date<br>16 Dec 2016 | Preferred price at last priced round | x ⟵ 968 |
| Term Sheet expiration date<br>16 Dec 2016 | Increase interest rate after default | x |
| | Additional Indebtedness | x |
| Preview term sheet document ⟵ 964 | Other approvals | x |
| Generate and add term sheet to staging area ⟵ 966 | Board seat | x |
| | Right of first offer | x |
| | Maturity Date (from Initial Closing) | 1 year |

VC1 🚀 Company 1 ☰ Seed [Demo Mode]    Collaborating as Company 1 Counsel

| ⓘ Term Sheet | Due Diligence | Core Financing | Ancillary | Signatures | Settlement |

CHAPTERS: ● Create checklist > ○ Prepare documents > ○ Data Room > ○ Summary 🔒 VC 1 - Restricted channel to members of VC 1

WORKSPACES
🔒 VC 1
🔒 Counsel's Shared 💬¹

TEAM CHANNELS
👥 Counsel Team

DIRECT MESSAGES ✎
💬
You have not started any direct message

📑 Edit and share due diligence checklist 1102

Below is a due diligence checklist that will be shared to Comapny 1. You can create, organize it if needed. Once done, click the Shear button below to share the checklist.

Due Diligence Checklist
▶ 📁 Business Plan and Financials
   📁 Current Business Plan and any financial projections
▶ 📁 Contracts
   📁 Contractor
   📁 Full-time Contracts
   📁 Part-time Contracts
▶ 📁 Corporate Records and Charter Documents
   📁 Certificate of Incorporation, Certificates of Designation, Rights, etc., and Bylaws
   📁 Information Regarding Disputes and Potential Litigation
   📁 Intellectual Property
   📁 Material Agreements
   📁 Others
   📁 Security Insurances and Agreements Concerning Securities
   📁 Subsidiaries

TASK OWNERS | (P1) 👤 👤

01 DEC, 2016

[ Share to Company 1 ]

🔔 Notified collaborators about the start of the Due Diligence stage    1:48PM

User has accepted your request to join this stage.

You shared checklist with Company Side.

Due Dilligence Checklist
Click on folder you want to upload document to.

📁 Corporate Records and Charter Documents  >
10 items

📁 Material Agreements  ⊖
10 items

📁 Intellectual Property          Doesn't apply  ⊖
10 items

📁 Subsidiaries  >
10 items

📁 Security Issuances and Agreements Concerning S...  >
10 items

📁 Information Regrading Disputes and Potential Liti...  >
10 items

📁 Other  >
10 items

💬 Discussion                                    [ SUBMIT ]

Write your discussion here...                         0

*(Screenshot of a collaboration interface, reference numeral 1240)*

VC1 — Company 1 — Seed — Demo Mode — Collaborating as Company 1 Counsel

Tabs: Term Sheet | Due Diligence | ● Core Financing | Ancillary | Signatures | Settlement | Closing CHAPTERS: ⊙ Negotiate › ⊙ Sign › ● Summary Counsel's Shared—Restricted Channel to Members of Counterparty Counsels  (P1) (P2)

WORKSPACES
- Company 1
- Counsel's Shared

TEAM CHANNELS
- Counsel Team

DIRECT MESSAGES
You have not started any direct message.

STAGE 3 of 7
Core Financing

Draft, negotiate, track and sign the core financing documents.

This stage is now complete

TIME SPENT ON STAGE
Actual time ——— 0 days
Est. time ——————— 30 days

FINALIZED DOCUMENTS
| Core financing | VC 1's signed versions | View documents
Unsigned documents | Company 1's signed versions | View documents Chapters
⊙ Negotiate › ⊙ Sign › ● Summary
Collaborators
VC 1
(P1) Person 1
(P2) Person 2

Company 1
(P) Person 1 Company Counsel
   CEO
   CFO

NEXT STAGE
Due diligence      [Go to this stage]

(P) Write your discussion here
01 DEC, 2016
Person 1 shared the investor-signed Core financing documents to Company 1 Counsel.
Show document list

Form System - Agreement Page www.example.com/SignatureAgreement.php

TransGalactic Investment Fund

○ SIGNATURE PACKAGE  ○ SUBMIT DOCUMENTS

Signature Package

Admission Agreement — 1430b

Name of Limited Partner

[Max Master] — 1430n

Name of L.P. as it should appear in the books of the Fund — 1430d

Capital Commitment — 1430c

[$328,000]

The undersigned acknowledges that its Capital Commitment will be the lesser of the amount indicated of the amount accepted by the General Partner

Signer's Name

[Max T. Master]

Signer's Title — 1430e

[Esq.]

The Limited Partner Represents as follows:

1. Is the Limited Partner (a) an employee benefit plan subject to Part 4 of Subtitle B of Title 1 of the Employee Retirement Income Security Act of 1974, as amended ("ERISA") or (b) a plan described in Section 4975(e)(1) of the Internal Revenue Code of 1986, as amended (the "Code")?
   ○ Yes  ● No  } 1430f 2. Is the Limited Partner (a) an entity whose underlying assets are considered "plan assets" of an employee benefit plan that is subject to Part 4 of Subtitle B of Title 1 of ERISA and that invested in such entity or (b) an entity whose underlying assets are considered "plan assets" of a plan that is described in Section 4975(e)(1) of the Code and that invested in such entity?
   ○ Yes  ● No  } 1430g

[PDF Preview] — 1430m

Limited User — 1430l

Investor Questionnaire — 1430i

≡ TABLE OF CONTENT
- Admission Agreement
- Investor Questionnaire
  - I. General Information
    - Principle Contact Information
    - Additional Contact Information
    - Wire Transfer Instructors
  - II. Questionnaire
    - A. General Inventor Representations
    - B. Identification of Special Entities
    - C. Aggredited Inventor Representations
    - D. Qualified Purchaser Representations
    - E. Qualified Client Representations
    - F. Miscellaneous
- Signature Page to Investor Questionnaire
- Exhibit A – "Bad Actor" Disqualification
- Privacy Notice
- Statement of Investment Considerations
- Completion ⊙ All changes are saved!    [👥 Invite Collaborator] — 1430o 1430j 1430k

FIG. 14G

File Edit View History Bookmarks Tools Help

Form System - Login
www.example.com/SignatureAgreement.php

TransGalactic Investment Fund

F. Miscellaneous
Signature Page to Investor Questionnaire
Exhibit A - "Bad Actor" Disqualification
Privacy Notice
Statement of Investment Considerations
Completion Max T. Master    Esq.

The Limited Partner represents as follows:

1. Is the Limited Partner (a) an employee benefit plan subject to Part 4 of subtitle B of Title I of the Employee Retirement Income Security Act of 1974, as amended ("ERISA") or (b) a plan described in Section 4975(e)(1) of the Internal Revenue Code of 1986, as amended (the "Code")?
   ○ Yes   ● No 2. Is the Limited Partner (a) an entity whose underlying assets are considered "plan assets" of an employee benefit plan that is subject to Part 4 of Subtitle B of Title I of ERISA and that invested in such entity or (b) an entity whose underlying assets are considered "plan assets" of a plan that is described in Section 4975(e)(1) of the Code and that invested in such entity?
   ● Yes   ○ No What percentage of the Limited Partner's underlying assets is considered "plan assets"?
[ 80 ] %  — 1432

Limited User

Investor Questionnaire

ⓘ All changes are saved!
🔒 Invite Collaborator
— 1433

[Browser window showing Form System - Agreement Page]

www.example.com/SignatureAgreement.php

TransGalactic Investment Fund

○ SIGNATURE PACKAGE — ○ SUBMIT DOCUMENTS

Submit Document steps

① SIGN THE PACKAGE

Completed Signature Package

E-SIGN DOCUMENT
[E-Sign] —1454

◈ PDF Preview | ⊕ Download | ✎ Edit —1452

UPLOAD SIGNED DOCUMENT

+ Add file

② ATTACH APPLICABLE TAX FORMS
W-8BEN-E(Download blank form)
+ Add file
W-8BEN(Download blank form)
+ Add file
W-8IMY(Download blank form)
+ Add file
W-8ECI(Download blank form)
+ Add file
W-9(Download blank form)
+ Add file
W-8EXP(Download blank form)
+ Add file

⎬ 1456

③ SUBMIT SIGNATURE PACKAGE TO GALACTIC
[Submit] —1458

Form System - Signature Page www.example.com/SignatureAgreement.php

Completed Signature Package — TransGalactic Investment Fund — Limited User

All changes are saved!

Your signatures — Edit

Drag & drop your signature to the place you want on the document.

1464

*Required locations for signatures

Page 2 (Jump to page) [Sign]

Page 10 (Jump to page) [Sign]

1468

---

Lorem ipsum dolor sit amet, consectetuer adipiscing elit. Aenean commodo ligula eget dolor. Aenean massa. Cum sociis natoque penatibus et magnis dis parturient montes nascetur ridiculus mus. Donec quam felis, ultricies nec, pellentesque eu, pretium quis, sem. Nulla consequat massa quis enim. Donec pede justo, fringilla vel, aliquet nec, vulputate eget, arcu. In enim justo, rhoncus ut, imperdiet a, venenatis vitae, justo. Nullam dictum felis eu pede mollis pretium. Integer tincidunt. Cras dapibus. Vivamus elementum semper nisi. Aenean vulputate eleifend tellus. Aenean leo ligula, porttitor eu, consequat vitae, eleifend ac, enim. Aliquam lorem ante, dapibus in, viverra quis, feugiat a, tellus. Phasellus viverra nulla ut metus varius laoreet. Quisque rutrum. Aenean imperdiet. Etiam ultricies nisi vel augue. Curabitur ullamcorper ultricies nisi. Nam eget dui. Etiam rhoncus. Maecenas tempus, tellus eget condimentum rhoncus, sem quam semper libero, sit amet adipiscing sem neque sed ipsum.

1462 IN WITNESS WHEREOF, this Admission Agreement is made and entered into as of _____, 2016.

LIMITED PARTNER: _____

TransGalactic Investment Fund
By: TransGalactic Capital LLP
By: _____
Joe Galactic, Managing Partner Capital Commitment Accepted:
$ _____

(Print name of additional Limited Partner) 1469

[Click to Sign]

Name: _____
Title: _____
Capital Commitment: _____

Limited Partner to complete the information required below:

The above-signed hereby executes this Agreement on behalf of the additional Limited Partner and represents as follows:

(i) Is such Limited Partner (a) an employee benefit plan subject to Part 4 of Subtitle B of Title I of the Employee Retirement Income Security Act of 1974, as amended ("ERISA") or (b) a plan described in Section 4975(e)(1) of the Internal Revenue Code of 1986, as amended (the "Code")?
__X__ Yes _____ No (ii) Is such Limited Partner (a) an entity whose underlying assets are considered "plan assets" of an employee benefit plan that is subject to Part 4 of Subtitle B of Title I of ERISA and that invested in such entity or (b) an entity whose underlying assets are considered "plan assets" of a plan that is described in Section 4975(e)(1) of the Code and that invested in such entity?
__X__ Yes _____ No
If "Yes," what percentage of such Limited Partner's underlying assets is considered "plan assets"?
____%

By its signature above, the Limited Partner agrees and acknowledges that its Capital Commitment shall be the lesser of the amount indicated or the amount accepted by the General Partner.

Form System - Signature Page www.example.com/SignatureAgreement.php

Completed Signature Package

Your signatures    Edit

Drag & drop your signature to the place you want on the document.

```
M.M.
```

```
Max Master
```

*Required locations for signatures

Page 2 (Jump to page) ⊘Signed

[Done Signing]

---

By: _____
Name: Joe Galactic
Title: Managing Member

1486 — [Print name of additional Limited Partner]
By: _____ M.M. _____
Name: _____
Title: _____
Capital Commitment: __1490__ $
Limited Partner to complete the information require below:
The above-signed hereby executes this Agreement on behalf of the additional Limited Partner and represents as follows:

1494 — (i) Is such Limited Partner (a) an employee benefit plan subject to Part 4 of Subtitle B of Title I of the Employee Retirement Income Security Act of 1974, as amended ("ERISA") or (b) a plan described in Section 4975 (e)(I) of the Internal Revenue Code of 1986, as amended (the "Code")?
     x Yes __ No 1496 — (ii) Is such Limited Partners (a) an entity whose underlying assets are considered "plan assets" of an employee benefit plan that is subject to part 4 of Subtitle B of Title I of ERISA and that invested in such entity or (b) an entity whose underlying assets are considered "plan assets" of a plan that is described in Section 4975 (e)(1) of the Code and that invested in such entity?
     Yes __ x __ No If "Yes" what percentage of such Limited Partner's underlying assets is considered "plan assets"?
     ____ %

By its signature above, the Limited Partner agrees and acknowledges that its Capital Commitment shall be the lesser of the amount indicated or the amount accepted by the General Partner.

CONFIDENTIAL      CONFIDENTIAL

TransGalactic Investment Fund

INVESTOR QUESTIONNAIRE

NAME OF THE INVESTOR:

Chris Clerk (as it should appear in the books of the Fund)

INSTRUCTIONS: IN ORDER TO INVEST IN THE TRANSGALACTIC INVESTMENT FUND, LLP YOU MUST CAREFULLY COMPLETE THIS INVESTOR QUESTIONNAIRE BY COMPLETING THE GENERAL INFORMATION REQUIRED UNDER PART I, CHECKING THE APPROPRIATE BOXES IN PART II AND COMPLETING THE INFORMATION ON THE SIGNATURE PAGE. PLEASE RETURN THE COMPLETED QUESTIONNAIRE TO:

THE LIMITED PARTNERSHIP INTERESTS REFERRED TO IN THIS INVESTOR QUESTIONNAIRE

Form System - Agreement Page

TransGalactic Investment Fund — oe Galactic — Administrative User: J

Dashboard

CAPITAL COMMITMENT

| Current | Target |
|---|---|
| $700,000,000 | $500,000,000 |
| BVC accepted | Submitted |
| $300,000,000 | $400,000,000 |

Exceed Current
122 % Target

CLOSE DATE

Target
📅 Nov 24, 2016

Days to Target
50

LIMITED PARTNERS

Invite Limited Partner and monitor Signature Package status.

| STATUS | LIMITED PARTNERS |
|---|---|

There's currently no LP undergoing the Signature Package at the moment. Click '+ Add LP' to invite.

[+ Add LP]

FUND COUNSEL AND ADMINISTRATORS

Each administrator will have full access to view status and submitted Signature Packages.

| NAME | EMAIL | DATE INVITED |
|---|---|---|

None. Click '+ Add Counsel' to Invite.

[+ Add Counsel]

Questions? Please contact us.

Terms of service   Privacy Policy
Powered by example.com

Form System - Agreement Page

Trans Galactic Investment Fund

CAPITAL COMMITMENT

| | | CLOSE DATE |
|---|---|---|
| Current | Target | Target |
| $700,000,000 | $500,000,000 | Nov 24, 2016 |
| BVC accepted | Submitted | Days to Target |
| $300,000,000 | $400,000,000 | 50 |
| Exceeded | | |
| 122% Current / Target | | |

LIMITED PARTNERS
Invite Limited Partner and monitor Signature Package status.

INVITE PEOPLE    + Add LP

| Limited Partner #1 | Thomas Jefferson | thomas.jefferson@investwithme.com | × Close |

+ Add More Rows

Send Invitation

An invitation email will be sent to all listed individuals.

LIMITED PARTNERS

STATUS

There's currently no LP undergoing the Signature Package at the moment. Click '+ Add LP' to invite.

FUND COUNSEL AND ADMINISTRATORS
Each administrator will have full access to view status and submitted Signature Packages.

INVITE PEOPLE    + Add Counsel

| Fund Counsel #1 | Harrison Key | harrison.key@harrisonllp.com | × Close |

+ Add More Rows

Send Invitation

An invitation email will be sent to all listed individuals.

| NAME | EMAIL | DATE INVITED |
|---|---|---|
| Ron Rivest, Esq. | ron.rivest@legalshin | 11/24/2016 |

FIG. 14Q2

LIMITED PARTNERS
Invite Limited Partner and monitor Signature Package status.

LIMITED PARTNERS

| STATUS | |
|---|---|
| Rob Baker | Joined |
| Ted Nelson | Invitation sent |
| Patrick B. George | Joined |
| Theodore Thompson | In Progress |

FUND COUNSEL AND ADMINISTRATORS
Each administrator will have full access to view status and submitted Signature Packages.

| NAME | EMAIL | DATE INVITED |
|---|---|---|
| Joe Galactic | joe.galactic@transgalactic-investments.com | 1/1/2012 |

+ Add LP

+ Add Counsel

| Term Sheet | Due Diligence | Core Financing | Ancillary | Signatures | Settlement | Closing |

- Workspace
- Collaborators
- Documents
- Progress

DISCUSSIONS
- 8VC
- Counsel's Shared

TEAM [2]
- Finnance Team
- Counsel's Shared

① Finalize Core Financing Documents  1702

Fusce Vehicula dolor arcu,sit amet blandit dolor mollis nec. Donec viverra eleifend lacus,vitae ullamcoper metus. sed sollicitudin ipsum quis nunc sollicitudin ultrices. Donec euismod scelerisque ligula.Maecenas eu varius risus.eu aliquet arcu.

STAGING — Private only 8VC

CUUNTERPARTY  1704
Negotiation & signing area between 8VC & poenGov

Bulk action:  [Upload]  [Download]  [Ready to sign]

8VC  OpenGov          02    02    01  1706
1710  1712        Negotiating  Ready to sign  Signed Investor Right Agreement  [CLEAN] [REDLINE]     • Negotiating        [Ready to sign]    + Add new version
  Version1
  2days ago-Person A                                                                      1708

Restated Certificate of Incorporation  [CLEAN] [REDLINE]   ○ 8VC not signed      [E-sign]   + Add new version
  Version2                                                 ○ OpenGov not signed            × Not ready to sign
  2days ago-Person A ROFR Co-Sale Agreement  [CLEAN] [REDLINE]   ○ 8VC not signed       [E-sign]   + Add new version
  Version2                                   ○ OpenGov not signed              × Not ready to sign
  2days ago-Person A Schedule of Exceptions  [CLEAN] [REDLINE]   • Negotiating           [Ready to sign]   + Add new version
  Version2
  2days ago-Person A Voting Agreement  [CLEAN] [REDLINE]   ✓ 8VC signed         [Edit E-sign]
  Version2                             ○ OpenGov not signed
  2days ago-Person A ② Summary    Summary of this Stage

| Rofr Co-Sale Agreement ~1720 | Overview ~1726 | |
|---|---|---|
| ⊙ Version 10<br>2 days ago - Person A | Law firm | Law Firm A ⊚ ~1728 |
| ⊙ Version .9<br>3 days ago - Person B | Round of Financing | Series A ⊚ |
| ⊙ Version 08<br>July 6 - Person A | Agreement Date | February 14th, 2015 ⊚ |
| ⊙ Version 07<br>Jun 2 - Person B | Rights of Refusal<br>Notice day for proposed transfer | 30 days |
| ⊙ Version 06<br>May 19 - Person A | Transfer Notice | "Such Proposed Transfer Notice shall (a) certify that such Key Holder has received a firm offer from...." ~1730<br>View full paragraph \| ⊚ ⊕ |
| ⊙ Version 05<br>May 19 - Person A | Days for company to elect to purchase Offered Shares | 10 days ⊚ ⊕ |
| ⊙ Version 04<br>May 19 - Person A | Days for Company to make payment for Offered Shares | 45 days ⊚ ⊕ |
| | Days to give Additional Transfer Notice | 10 days ⊚ ⊕ |
| ⊙ Version 03<br>May 19 - Person A | Days for Holder to elect to purchase Remaining Shares | 10 days ⊚ ⊕ |
| ⊙ Version 02<br>May 19 - Person A | Days for Participating Holder to make payment | 30 days ⊚ ⊕ |
| ⊙ Version 01<br>May 19 - Person A | Rights of Co-Sale<br>Days to notify for right of Co-sale | 10 days ⊚ ⊕ |
| | Non-exercise of Rights | |
| | Days to sell Shares to third-party transferees | 60 days ⊚ ⊕ |
| | Address<br>Company Address | 'Address A', |
| | Copies to | 'Full Address A' |
| | Agreement Date | N/A |
| | Pro rata calculation for ROFR | "Pro rata Share" means, with respect to a Investor, a number obtained by multiplying the number of..."<br>View full paragraph \| ⊚ |
| | Pro rata calculation for Co-sale right | "Each Investor who timely exercises such Investor's Right of Co-Sale in an Investor Notice may includ..."<br>View full paragraph \| ⊚ |
| | Exempted Transfers<br>Stockholders, member, partners of selling key holder | "(a) in the case of a Key Holder that is entity, upon a transfer by such Key Holder to its stockho..."<br>View full paragraph \| ⊚ |

Header buttons: Export to PDF | Compare terms ~1724 | Download document

| ROFR Co-Sale Agreement | 8VC [ SERIES A] OpenGov | | |
|---|---|---|---|
| 07 changes between 2 versions | | | ✕ |
| Overview 1756 1750 | Version 1 ▼ 1752 | Version 2 ▼ 1754 | |
| | 3 days ago - Person B | 2 hours ago - Person A | |
| Law firm | 'Law firm A' | Identical | |
| Round of Financing | Series A | Identical | 1760 |
| Agreement Date | February 13th, 2015 | February 14th, 2015 1758 | |
| Rights of Refusal | | | |
| Notice day for proposed transfer Transfer Notice | 30 days " Such proposed Transfer Notice shall (a) certify that such Key Holder has received a firm offer from... View full paragraph | Identical Identical | |
| Days for Company to elect to purchase Offered Shares | 10 days | Identical | |
| Days for Company to make payment for Offered Shares | 30 days | 45 days | |
| Days to give Additional Transfer Notice | 10 days | 5 days | |
| Days for Holder to elect to purchase Remaining Shares | 10 days | 15 days | |
| Days for Participating Holders to make payment | 10 days | 60 days | |
| Rights of Co-Sale | | | |
| Days to Notify for Right of Co-sale | 10 days | Identical | |
| Non-exercise of Rights | | | |
| Days to sell Shares to third-party transferees | 60 days | | |
| Address | | | |
| Company Address | Address A | Address A | |
| Copies to | Full Address A | N/A | |
| Agreement Date | | | |
| Pro rata calculation for ROFR | "'Pro Rata Share" means, with respect to an investor a number obtained by multiplying the number of...." View full paragraph | Identical | |
| Pro rata calculation for Co-sale right | " Each Investor who timely exercise such investor's Right of Co-Sale an Investor Notice may includ..." View full paragraph | Identical | |
| Exempted Transfers | | | |
| Stockholders, member, partners of selling key holder | "(a) in the case of a key Holder that is an entity, upon a Transfer by such Key Holder to its stockho..." | Identical | |

1780
Term Summary
Transaction sample document

VC1 SERIES A

| TERM | VALUE & OPTION | STANDARD | FAVORABILITY | ANALYTICS 121 Transactions Data set: All 1785A |
|---|---|---|---|---|
| Section 1 1781 | | | | |
| Number of days for Investors to exercise | 30 days | ✓ STANDARD 1783 | - | 23% |
| Continuity of Right of First Refusal and Co-Sale Rights | ROFR and Co-Sale Rights will continue | ✓ STANDARD | Investor | 43% |
| Permitted Transfers | "(I) Permitted transfer includes Registration (Qualified Public Offering), (ii) Permitted transfer includes Estate/Tax planning purposes/Will or intestate succession, ..." View full paragraph | △ NON-STANDARD 1784 | Company | 77% DETAIL |
| Section 2 1782 | | | | |
| Rights of Board of Directors to freely assign the Company's ROFR in whole or in part | Company's Board of Directors can determine | △ NON-STANDARD | Investor | 46% DETAIL |
| Minimum number of shares to qualify as an eligible or major investor | 104,332 | - | Company | 70% DETAIL |

FIG. 17G

1780 Term Summary
Transaction sample document

| TERM | VALUE & OPTION | STANDARD | FAVORABILITY | ANALYTICS 121 Transactions Data set: All |
|---|---|---|---|---|
| Section 1 1781 | | | | |
| Number of days for Investors to exercise | 30 days | ✓ STANDARD 1783 | | 23% ⟋ DETAIL 1785A |
| Continuity of Right of First Refusal and Co-Sale Rights | ROFR and Co-Sale Rights will continue | ✓ STANDARD | 🏢 Investor | 43% ⟋ DETAIL [Value: 30 days appears in 23% of the filtered transaction] 1785B |
| Permitted Transfers | "(I) Permitted transfer includes Registration (Qualified Public Offering), (ii)Permitted transfer includes Estate/Tax planning purposes/Will or intestate succession, ..." View full paragraph | △ NON-STANDARD 1784 | 🏢 Company | 77% ⟋ DETAIL |
| Section 2 1782 | | | | |
| Rights of Board of Directors to freely assign the Company's ROFR in whole or in part | Company's Board of Directors can determine | △ NON-STANDARD | 🏢 Investor | 46% ⟋ DETAIL |
| Minimum number of shares to qualify as an eligible or major investor | 104,332 | | 🏢 Company | 70% ⟋ DETAIL |

VC1 SERIES A

Term Summary
Transaction sample document

| TERM | | |
|---|---|---|
| Section 1 | | |
| Number of days for Investors to exercise | | 23% |
| Continuity of Right of First Refusal and Co-Sale Rights | | 43% |
| Permitted Transfers | | 77% |
| Section 2 | | |
| Rights of Board of Directors to freely assign the Company's ROFR in whole or in part | 104,332 | 46% |
| Minimum number of shares to qualify as an eligible or major investor | | 70% |

VC1 SERIES A

ANALYTICS
121 Transactions
Data set: All

∨ DETAIL
∨ DETAIL
∨ DETAIL
∨ DETAIL
∨ DETAIL

Select data set

Firm 1

Couterpart 1792
1793

Selected data set:
1794A

▶ ☐ User A's Team
  ☒ User A <User_A@Firm1.com>
  ☐ User B <User_B@Firm1.com>
  ☒ User C <User_C@Firm1.com>
▲ ☒ User D's team (your team)
▲ ☐ User E's team
  ☒ User D (you)

- Firm 1
  You ✕   5 members of User D's Team ✕
  2 members of User A's team ✕

- Counterpart:
  None

Close   Apply selection

Company

Term Summary > Term Analytics 1796A
Notice day for proposal transfer: 30days

| VC1 | SERIES A | |
|---|---|---|

Choose your desired data set according to the law firm teams involved:

Firm1: : you, 5 members\ Team A \, + 2 teams
-Couterpart: Firm 2's User E Team, Firm 2's User G Team, + 2 teams 112 transactions selected

Overall | Over time

Term value distribution
- 10 days - 8%
- 20 days - 25%
- 30 days - 17%
- 40 days - 6%
- 60 days - 44%

← 1797A

Transaction Data 1798
Add columns and set filters to customize the data set and get more insight

| TRANSACTION ▽ | COUNTERPARTY ▽ | NOTICE DAY FOR PROPOSAL TRANSFER ▽ | SERIES ▽ | INDUSTRY ▽ |
|---|---|---|---|---|
| VC1 & Company 1 | Firm 2 | 20 | Seed | Mobile |
| VC1 & Company 2 | Firm 2 | 10 | Pre-series A | Entertainment |
| VC1 & Company 3 | Firm 3 | 20 | A | Fintech |
| VC1 & Company 4 | Firm 3 | 60 | B | Hardware |
| VC1 & Company 5 | Firm 5 | 40 | C | Transportation |
| VC1 & Company 6 | Firm 4 | 60 | B | Hardware |
| VC1 & Company 7 | Firm 4 | 40 | C | Transportation |
| VC1 & Company 8 | Firm 3 | 60 | B | Hardware |

Add columns & filters

Term Summary > Term Analytics  1796C
Permitted transfer

| VC1 | SERIES A | |

Choose your desired data set according  1799A
to the law firm teams involved:

Firm1: : you, 5 members\ User A's Team\, + 2 teams
-Couterpart: Firm 2's User E Team, Firm 2's User G Team + 2 teams  112 transactions selected 1799B  1799C

| OPTION | OCCURRENCE FREQUENCY | APPEAR IN CURRENT TRANSACTION |
|---|---|---|
| None | 19% | |
| Registration (Qualified public offering) | 34% | yes |
| Estate/Tax planning purpose/Will or intestate succession | 67% | yes |
| Repurchase by Company | 71% | yes |
| Charitable Giving | 12% | |
| Drag Along (in Voting Agreement) | 13% | |
| Mere security Interest | 21% | |
| Immediate Family Member or a trust | 67% | |

Transaction Data
Add columns and set filters to customize the data set and get more insight Add columns & filters

| TRANSACTION | COUNTERPARTY | NOTICE DAY FOR PROPOSAL TRANSFER | SERIES | INDUSTRY |
|---|---|---|---|---|
| VC1 & Company 1 | Firm 2 | $450,000 | Seed | Mobile |
| VC1 & Company 2 | Firm 2 | $1,20,000 | Pre-series A | Entertainment |
| VC1 & Company 3 | Firm 3 | $4,100,000 | A | Fintech |
| VC1 & Company 4 | Firm 3 | $12,000,000 | B | Hardware |
| VC1 & Company 5 | Firm 4 | $52,000,000 | C | Transportation |
| VC1 & Company 6 | Firm 5 | $8,000,000 | B | Hardware |
| VC1 & Company 7 | Firm 4 | $21,000,000 | C | Transportation |
| VC1 & Company 8 | Firm 3 | $37,000,000 | B | Hardware |

| Signatories | % Owned | Scenario 1 | Scenario 2 | Scenario 3 |
|---|---|---|---|---|
| Joseph M | 39% | ✓ |  | ✓ |
| Dan C | 26% | ✓ | ✓ |  |
| Arnold K | 14% |  | ✓ | ✓ |
| Britney M | 9% |  | ✓ |  |
| Candy S | 9% |  | ✓ | ✓ |
| Theodore A | 3% |  | ✓ | ✓ |

2108 — Signatories
2112 — % Owned
2116a — Scenario 1
2116b — Scenario 2
2116c — Scenario 3

FIG. 21

Signatures ⓘ

| Upload packages | Add demo packages |
|---|---|

⬇ Download all signed packages

TURN ⓘ  💲 release the signed documents to Company+ 1 action   👥 send signature requests (2 remaining) + 1 action — 2352

Draft

| PACKAGE | SIGNER (Optional) | | |
|---|---|---|---|
| 📄 Company package 1_final.pdf ⬇ | (DC) Dan Cooper | | ⋯ |
| 📄 Board member package_final.pdf ⬇ | Assign to... | | ⋯ |

Sent/Pending requests

| PACKAGE | STATUS | SIGNER | | |
|---|---|---|---|---|
| 📄 Investor package 1_final.pdf ⬇ | NEEDS SIGNER | Assign to... | | ⋯ |
| 📄 Company package 1_final.pdf ⬇ | SIGNED, IN ESCROW | (JS) Candy S | Send signature request | ⋯ |
| 📄 Board member package_final.pdf ⬇ | SIGNATURE CRITERIA NOT MET | (AK) Arnold K | Send signature request | ⋯ |
| 📄 Investor package 1_final.pdf ⬇ | RELEASED | (LF) Lisa F | 📤 Release to counterparty | ⋯ |
| 📄 NDA Package 1_final.pdf ⬇ | SIGNATURE CRITERIA NOT MET — 2354 | (LF) Lisa F | | ⋯ |

— 2356

🔒 Candy S, Dan C, and Dan C's law firm can see this workspace

🔔 Stage Activites

| | | 2402c | 2402d |
|---|---|---|---|
| ID | Label | Data Type | Input Type |
| D1 | Name of Limited Partner | String | String |
| D2 | Name of Signer | String | String |
| D3 | Title of Signer | String | String |
| D4 | Capital Commitment | Money | Money |
| D5 | Is the Limited Partner (a) an Employee Benefit Plan Subject to Part 4 of Subtitle B of Title I of the Employee Retirement Income Security Act of 1974, as Amended ("ERISA") or (b) a Plan Described in Section 4975(e)(1) of the Internal Revenue Code of 1986, as Amended (the "Code") ? | Boolean | Radio |
| D6 | Is the Limited Partner (a) an Entity Whose Underlying Assets are Considered "Plan Assets" of an Employee Benefit Plan that is Subject to Part 4 of Subtitle B of Title of ERISA and that Invested in such Entity or (b) an Entity Whose Underlying Assets are Considered "Plane Assets" of a Plan that is Described in Section 4975(e)(1) of the Code and that Invested in Such Entity? | Boolean | Radio |
| D7 | What Percentage of the Limited Partner's Underlying Assets is Considered "Plan Assets" ? | Percentage | Percentage |
| D8 | Is the Limited Partner a U.S. Person, as Defined in Rule 902(k) of Securities Act ? | Boolean | Radio |
| D9 | Name of Investor | String | String |
| D10 | Name of Joint Investor or other Person Whose Signature is Required | String | String |
| ... | ... | ... | ... |

(columns 2402a above ID, 2402b above Label)

| ID | Title | Input Type | Data |
|---|---|---|---|
| S1 | Signature Page to the Amended and Restated Limited Partnership Agreement | Section | ["D1","D2","D3","D4","S1.1"] |
| S1.1 | The Limited Partner Represents as Follows: | Section | ["D5","S1.1.1","D6","D7"] |
| S1.1.1 | Is the Limited Partner(a) an Entity Whose Underlying Assets are Considerable "Plan Assets" of an Employee Benefit Plan that is Subject to Part 4 of Subtitle B of Title 1 of Erisa and that Invested in Such Entity or (b) an Entity Whose Underlying Assets are Considered"Plan Assets"of a Plan that is Described in Section 4975(e)(1) of the Code and that Invested in Such Entity? | Branch | {"values":{"D6":"No"}, "destination":"D8"}, {"values":{"D6":"Yes"}, "destination":"D7"} |
| S2 | Investor Questionnaire Signature Page | Section | ["S2.1","S2.2"] |
| S2.1 | If the Investor is a Natural Person | Section | ["D9","D10"] |
| S2.2 | If the Investor is an Entity | Section | ["D13","D14"] |

FIG.24B

⌂ Deal Memo Inv>Deal Memo Inv-Seed　（Demo Mode）　2500　　　⊘ John Doe ⒿⅮ ▾ ～2501

Progress

Contacts
Inbox　　　　　　　ⓘ Transaction Reports ⊕
Work Space　2502
　○ Team Sheet 〈Your Turn〉　Overall Progress Summary　General Info and Terms　Deal Documents Summary　Stakeholder Actions
　○ Due Diligence 〈Your Turn〉
　● Deal Docs　　　　　Stage Progress | Full Details
　● Signatures
　○ Wiring
　○ Closing Book

| STAGE | STATUS | ASSESSMENT ⊕ | WHOSE TURN IS IT? | PENDING | TURN POSSESSION | | |
|---|---|---|---|---|---|---|---|
| Team Sheet | ○ Okay to start | - | - | - | - | Remind | Take Action |
| Due Diligence | ○ Okay to start | - | - | - | - | Remind | Take Action |
| Deal Docs | ● In Progress | ON TRACK | Deal Memo Inv/ Deal Memo Inv's law Firm | <1 Day | Deal Memo Inv 0% Deal Memo Inv 100% | Remind | Go to Stage |
| Signatures | ● In Progress | RUNNING LATE | Deal Memo Inv/ Deal Memo Inv's law Firm | 2 Days | Deal Memo Inv 7% Deal Memo Inv 93% | Remind | Go to Stage |
| Wiring | ○ Okay to start | - | - | - | - | Remind | Go to Stage |
| Closing Book | Not Yet started | - | - | - | - | | Go to Stage |

～2504

ToolKit
　✒ Sign Docs

Timeline

FIG. 25A

Action Pending in Term Sheet  User A - Note for User B   | Inbox x | | Action Pending x |   2600 to PMT, me  6:00 PM (3 hours ago)

Email Address
2602

It's been User A turn to sign term sheet for 1 day 2604
2606 Click here to move Term Sheet forward.
Manage email notifications Click here to reply, reply to all, or Forward User C   Email Address   4:25 PM (4 hours ago)
to me
Company A approved term sheet version 2 as final. It is ready to be signed.
TURN It is now company A's turn to sign term sheet.
Click here to move Term Sheet forward.
Manage email notifications

FIG. 26A

Email Address

2612 Weekly Digest: January 18, 2018
Demo Memo Inv-led Series A for Company A

Deal Memo Inv-led series A for Company A moving forward with Term Sheet. You can expect this deal to close by Febuary 14, 2018  2614

| STAGE | ASSESSMENT | ESTIMATED END DATE |
|---|---|---|
| Term Sheet | ON TRACK | January 24, 2018 |
| Due Diligence | - | - |
| Deal Docs | - | - |
| Signature | - | - |
| Wiring | - | - |
| Closing Book | - | - |

2616

It is Company A's turn to
  o Review and approve term sheet as final. View Term Sheet. Pending from today

COMPACT PRESENTATION OF AUTOMATICALLY SUMMARIZED INFORMATION ACCORDING TO RULE-BASED GRAPHICALLY REPRESENTED INFORMATION

CROSS-REFERENCE TO RELATED APPLICATIONS

This application is a continuation of PCT International Application No. PCT/US2018/019253, filed Feb. 22, 2018, and titled "COMPACT PRESENTATION OF AUTOMATICALLY SUMMARIZED INFORMATION ACCORDING TO RULE-BASED GRAPHICALLY REPRESENTED INFORMATION", which application claims benefit of U.S. Provisional Patent Application No. 62/462,010, filed Feb. 22, 2017, and titled "SYSTEMS AND METHODS FOR PROCESSING FORM AND TRANSACTION DATA", and further claims benefit of U.S. Provisional Patent Application No. 62/462,023, filed Feb. 22, 2017, and titled "DIRECTED GRAPH BASED USER ACTION CONSTRAINTS FOR EFFICIENT PROGRESSION OF ELECTRONIC TASK BASED GOALS". The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to systems and techniques for accessing one or more databases and providing user interfaces for dynamic interactions with various data items. Systems and techniques are disclosed, according to certain embodiments, for data integration, analysis, visualization and processing. Further, embodiments of the present disclosure relate to a user security model in which user roles and action on a computer network may be defined by graphs (e.g., directed graphs, for instance loop-digraphs).

BACKGROUND

User security models can constrain implementation of actions associated with particular user roles, for instance a user account associated with a first user role may be allowed to perform an action on a network while a user account associated with a second user role may be blocked. Users can be assigned disparate roles, and through enforcing of actions available to be performed by each disparate role, complex networks can be tightly controlled and constrained. Furthermore, constraints with respect to available actions can be associated with rules, such as a rule that predicates access to particular data, use of system resources (e.g., virtualized central processing units, computer systems), and so on, on one or more complex conditions being satisfied. In this way, constraints on actions can be determined such that a user account assigned a particular user role may be limited to performing particular tasks.

Many fields in business and academia utilize documents that need to be signed, reviewed, distributed to, and collected from multiple parties. In some instances, the number of signatories and other interested parties to any given document may make the processes involved in handling the document complex, tedious and error-prone. Electronic documents are increasingly being used in transactions.

SUMMARY

The systems, methods, and devices described herein each have several embodiments and aspects, no single one of which is solely responsible for its desirable attributes and advantages. Without limiting the scope of this disclosure, several non-limiting features and implementations will now be discussed briefly.

A system, which as will be described below, can access and utilize one or more graphs (e.g., directed graphs, for instance loop-digraphs) that enable users of disparate roles to perform goals through constraints on actions each user can perform. The system may monitor progression towards the goal, with the goal demarcated into a series of steps each including one or more tasks to be completed, and based on constraints of user actions (e.g., constraints on modifying data, uploading data, communications, and so on as will be described) the system can limit an extent to which users are free to progress in a direction not towards the goal. As an example, a goal may include a complex electronic transaction, with the electronic transaction separated into steps (e.g., a first step may indicate obtaining a transaction record, such as a blockchain based electronic ledger including a series of records connected via electronic hashes, a second step may indicate processing of the transaction record to extract particular information, a third step may indicate providing extracted information for review and approval, and so on).

The graphs can therefore describe an overall progression from an initial location to completion of an electronic goal, and each task associated with completion of the goal can be represented as a node within a graph connected via one or more edges to one or more other nodes. For instance, a first task associated with accessing a network can be connected with a subsequent task to obtain information from the network according to a particular communication scheme. This connection can be represented via an edge between these two tasks, and the system can utilize, for example, maintained information associated with adjacency matrices to describe edges. However, the graph may also indicate that, based on one or more user actions, the first task can also be connected with a task distinct from the task associated with obtaining information. That is, subsequent to the first task, the distinct task may be associated with accessing a different network, obtaining information (e.g., authentication information, information describing the particular communication scheme, and so on), and subsequently be connected to the task associated with obtaining information from the network according to the particular communication scheme. In this way, the graph can allow for variability in progression towards a goal, and as will be described, can nudge (e.g., generate notifications, prompt users, and so on) to continue on an optimal path of edges connecting nodes.

In this way, through role-based constraints on user actions that can be performed, for instance based on permissions, access rights, and so on, defined and described based on particular steps or tasks, the system can ensure progression towards complex goals and provide daylight into daunting electronic transactions.

The benefits of using electronic documents may be maximized by automating processes to create, process, sign, and/or review and analyze such documents and/or the information contained therein. As such, there remains a need for novel systems and methods that allow for more efficient use, management, and processing of electronic documents in a convenient and safe manner.

Various forms of transactions may require cooperation or mutual information exchange between different interested parties. These different parties may fulfil different roles in the transaction and may thus have different levels of access to information. A user with higher level of access to information shall be deemed an "administrative user", whereas a user with lower level of access shall be deemed a "limited user". It will be appreciated that there may be any number of different roles and privilege levels in addition to or within these categories. For example, a business enterprise, such as an investment fund, may assign different roles to different actors in the transaction; for example, each fund investor may be referred to as a "limited user," whereas the managing entities may be referred to "administrative users."

Due to the nature and complexity of the relationships between the different participants in a business transaction and/or other interested parties, such as, for example, regulatory authorities, the communication and information sharing between administrative users and limited users may become complex and difficult. Advantageously, electronic form and transaction systems may be used to automate recurring tasks so as to reduce this complexity and shift it from human operators to automated machines.

Electronic form and transaction systems may also reduce the burden and increase the effectiveness of regulatory compliance measures. For example, in some jurisdictions, certain entities, such as managing partners of an investment fund, may be required to receive and document certain representations from a limited user before entering into a business relationship with an investor. In the United States, for example, certain federal securities laws may require a managing partner of an investment fund to only accept investment from prospective limited users having a certain amount of net worth or investment experience. Non-compliance with such laws, as well as the mere inability to document compliance, may expose the administrative user to adverse consequences. For example, the managing partner of an investment fund may incur significant liability or other adverse action by regulators when unable to document that it has received the appropriate representations from investors.

It is thus of paramount importance that the administrative user not only have access to all the information from electronic forms required for compliance with all applicable regulations, but also that compliance is documented and accessible in a way that makes it easy for all interested partners to verify that compliance is indeed taking place.

Because of the large amount of data to be processed and verified to establish compliance in many applications, relying on human vigilance to document and establish compliance may not be adequate because of the high cost, and the continued possibility of oversights. In this context, it may be advantageous if the appropriate checks and verifications for compliance, such as, for example, whether, for an investment fund, a prospective investor's represented net worth does indeed meet a legally required minimum, be done by an automated process integrated into an electronic system to collect the information. This may not only increase the reliability and cost-effectiveness of the documentation process, but also facilitate subsequent auditing. Advantageously, in some embodiments, subsequent auditing may not require the audit of each individual check and verification by the automated system, but may only require auditing that the checking and verification logic of the electronic system itself is implemented properly.

In some contexts, aggregates of quantities calculated from input to one or more electronic forms from multiple users, such as multiple limited users, as well as forecasts and extrapolations of such quantities may be useful. For example, in the context of business transactions, averages, minima, maxima, rates of change, and other aggregate quantities may be informative to the user. The system may utilize a database to automatically retrieve the quantities, and calculate the desired aggregates.

In some circumstances, information from electronic forms may need to be presented or rendered in certain predetermined, or externally mandated, formats. For example, various regulations, audit requirements, or other legal or contractual rules may necessitate the administrative user to generate reports and other aggregate statements of certain aspects of a business transaction, such as certain interactions between the administrative user and the limited users, in a given format. For example, taxing authorities may require that financial distributions from an investment fund to its investor's users be reported on a certain type of form or statement. It may be advantageous to provide a unified system and a central data repository for the creation of such reports, so as to ensure that the reports are accurate and consistent and to minimize the time spent on preparing the reports manually.

To assist the administrative user in making decisions related to the management of the investment fund, such as whether to seek out new limited users or whether to draw on committed capital, it may be advantageous to provide the administrative user with information compiled through a system having access to semantically linked information about the fund, the administrative user, and the limited users.

To reduce the burden of gathering information from the limited users and to facilitate storage in a format that is readily accessible for further electronic processing, the administrative user may utilize electronic forms. Such electronic forms may be presented in the form of a website, interactive user interface, or an electronic document that can be filled out and submitted through a computer with an internet/network connection. Advantageously, this may allow the administrative user to present electronic forms in a format that facilitates including the received responses from the limited users into a semantically structured database. For example, the administrative user may provide an electronic form that allows the limited user to put in the amount of capital the limited user wishes to contribute. When the administrative user receives the signed and submitted form back, it may be able to include the received amount in its database automatically, so as to update a total amount of the committed capital with the new information immediately. This presents a distinct advantage over using traditional forms, for example ink and paper-based forms, which may require processing by for example a data entry clerk so as to make the semantic information contained in the form accessible to computer processing.

The use of such semantic information may also permit the detection of data entry errors and inconsistencies when the user is filling out the form. Advantageously, this may allow the user to be immediately presented with a warning message, allowing the user to correct the error before submitting the form and thus provide the correct information immediately. For example, a limited user may be presented with a question about the minimum amount of capital it wishes to contribute. If the prospective limited user enters an amount that is less than the minimum amount of capital required by the administrative user, the electronic form may present the prospective limited user with a warning message, stating that the amount entered is not acceptable and why this is the case. This may allow the limited user to immediately correct the entry before submitting the form and thus save both the limited and the administrative user time and maximizes the likelihood that erroneous input data is detected before any party relies upon it.

In some circumstances, both limited and administrative users may be burdened by requests for disclosure of the same, or substantially the same information in different contexts or by different authorities. For example, certain legal requirements may require the disclosure of substantially the same information to both state and federal authorities. In such contexts, it may be desirable to both minimize the time spent on providing the information, and reduce the chance that inconsistent or false statements are being made. It may facilitate the expeditious and accurate creation of such disclosure if the administrative user can comply in a way that avoids redundant administrative effort for the administrative user, and also prevents or at least detects conflicting representations made to the authorities. This can be facilitated by utilizing a database storing information about the business relationship in a semantic manner, as described herein.

Some sections or questions on a form that the administrative user provides to a limited user may apply to some limited users but not others. For example, certain data collection may be required from a foreign national, but not required for a U.S. national. As such, it may be unnecessary and a needless expense of time for a limited user who is a U.S. national to be presented with the questions not applicable to them. Advantageously, using a semantic form may allow for elements or sections of the form to be hidden based upon information that was previously entered into the form or other information known about the person filling out the form or other context. For example, if the limited user states that it is a U.S. national, the form may automatically hide sections that are not applicable to a U.S. national; as a foreign national filling out the same form would be presented with these sections. Advantageously, this may limit time and effort required to complete the forms and reduces inconsistency and the chance of error.

In some embodiments, electronic forms may incorporate interactive elements that allow the user to choose from a list of possible or suggested options. For example, when entering wire transfer routing information, the limited user may be presented with a drop-down menu containing the name and routing information of some common financial institutions to choose from, so as to avoid manual entry of the data and thus save time and prevent error.

The semantic information used to suggest possible entries, verify entries, and hide inapplicable sections of the form may come from a variety of sources, including the current form, other forms, public records, and internal measurements and calculations, and may be dynamically updated as the user provides new or updates existing information.

In some instances, information that was entered or provided in the past might need to be verified or updated in the future. For example, a party in a business transaction may desire to periodically verify the continued validity of certain information. In these situations, it may be advantageous to provide for electronic forms that default to values that have previously been given. Advantageously, such forms may require only verification by the person filling out the form if the data has not changed and only require the entry of new data when data has, in fact, changed. In an embodiment, this functionality may be provided by storing, all information that is received, in a semantic database, and, when a new form is to be presented, pre-populating the fields with all values for which the information has already been given in the past. For example, if a limited user has previously declared that he is not a foreign national, the form asking this question will default to an answer of no.

As discussed, interactive forms, such as forms comprising auto-completing text boxes or dynamic validation, can allow for more efficient data entry and review; non-interactive forms may in some instances be easier to print and archive. In some instances, it may thus be advantageous to use an interactive form for the data entry and review phase in a workflow, and then render the contents into a form that does not have interactive components and thus can be more easily printed, stored, and otherwise displayed. In some embodiments, the electronic forms may be rendered into a non-interactive representation by flattening, or removing the interactivity from, the interactive elements, and rasterizing the text. The result of such rendering into a non-interactive representation may be a file in Portable Document Format (PDF) format. In some embodiments, several documents may be included in one PDF file so as to allow for efficient review of a batch of documents at once.

In some embodiments, the administrative user, the limited users, and other interested parties may communicate via electronic messages, such as email. In some embodiments, the systems of the present disclosure facilitates such communication via electronic messages by automatically generating messages, sending messages, and receiving responses to messages. In an example embodiment, the limited users may receive an automatically generated email when new documents are available for their review and signature. By clicking a reference, such as a hyperlink, contained in the message, the limited user may be directed to an online system where the form will be presented. Once the limited user has signed the form, the systems of the present disclosure may automatically generate an electronic message to the administrative user, indicating that the form has been signed.

In an embodiment, a user interface, such as a web-based user interface, may be provided to the administrative user and the limited users. The user interface may allow the limited users to retrieve forms and documents they are requested to sign, review those documents, and electronically sign them. Alternatively, the limited users may be able to print a paper version of documents they are requested to sign.

The administrative user may be presented with an interface that allows the administrative user to keep track of various aspects of the business relationship between the administrative user and the limited users. For example, the administrative user may be presented with information as to regarding the limited users, the amount of committed capital, whether there are outstanding signatures on documents, and other matters. Advantageously, the interface for the administrative user and the limited users may be provided by the same system, thus allowing for data to be efficiently shared and distributed between the interfaces designed for the administrative user and for the limited users.

In an embodiment, the administrative user, the limited users, or other interested parties having access to the interface may request that other parties, such as collaborators, advisers, or, for example, for signing documents, signers and reviews, be granted access to all or part of their interface. In an embodiment, this is accomplished by providing an option in the interface that allows for a personalized electronic message to be sent at the request of the user of the interface, which grants the recipient the right to access the interface.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for both general and limited users using the system.

In some embodiments, information may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g., forecast, future developments. For example, in an embodiment, the system may calculate the number of days remaining for an investment fund to reach a pre-determined funding goal based on the current funding and the time elapsed.

In some embodiments, the systems of the present disclosure may assist in managing successive steps, or assist with managing a logical flow, between multiple participants in a transaction. These steps may be described by, e.g., a directed graph, wherein the nodes of the graph represent the individual tasks, and the edges of the graphs represent possible transitions. The graph may have special designated tasks designated as the beginning and the end of the respective workflow.

According to an embodiment, a computer-implemented method is disclosed comprising: by one or more processors executing program instructions: accessing a graph data structure, wherein the graph data structure indicates at least: one or more tasks or goals, one or more user roles, and one or more paths among the one or more tasks and associated with the one or more user roles; receiving an input from a user; determining a task associated with the input; determining a user role associated with the user; determining, by reference to the graph data structure and at least one path associated with the task and the user role, a next task for the user; and providing an indication of the next task to the user.

According to an aspect, the indication of the next task is provided via at least one of an interactive user interface or an electronic notification.

According to another aspect, the input is received via at least one of an interactive user interface or an electronic notification.

According to yet another aspect, computer-implemented method further comprises: preventing an action of the user based on restrictions indicated by the graph data structure.

According to another embodiment, a computer-implemented method is disclosed comprising: by one or more processors executing program instructions: receiving a document, and, in needed, converting the document into an electronic document; analyzing the electronic document to determine one or more sections (e.g., terms) of the document; comparing the one or more sections to a plurality of data items in a database (e.g., an ontology database); and identifying, from the ontology database and based on the comparing, one or more data items associated with at least some of the respective sections.

According to an aspect, analyzing the electronic document comprises parsing terms from the electronic document.

According to another aspect, computer-implemented method further comprises: adding the sections to the database as new data items, wherein the new data items are placed within an ontology according to an analysis of content of the sections.

According to yet another aspect, computer-implemented method further comprises: generating in interactive user interface including a summary of the sections.

According to another aspect, computer-implemented method further comprises: generating in interactive user interface including a comparison of values associated with the sections to historical or average values associated with similar sections (e.g., identified data items) from the database.

According to yet another embodiment, a computer-implemented method is disclosed comprising: by one or more processors executing program instructions: accessing a template of a form, comprising one or more of form fields; receiving one or more data items, corresponding to the one or more form fields, from a user, via an interactive user interface, wherein at least one of the one or more form fields is represented by one or more interactive user interface elements; rendering a non-interactive, visual representation of the form and the one or more data items; and presenting the visual representation to the user.

According to an aspect, computer-implemented method further comprises: receiving a signature from the user; receiving one or more locations in the visual representation from the user; and rendering the signature into the one or more locations in the visual representation.

According to another aspect, the signature comprises at least one of: a user's handwritten signature, a user's initials, or a user's typewritten signature.

According to yet another aspect, computer-implemented method further comprises: matching the one or more data items received from the user against one or more validation rules; and in response to the one or more validation rules not being satisfied, alerting the user.

According to another aspect, the one or more validation rules comprise a rule matching a first item of the one or more data items against a second item of the one or more data items.

According to yet another aspect, the one or more validation rules comprise a rule matching a third item of the one or more data items against information not included in the one or more data items.

According to another aspect, computer-implemented method further comprises: hiding or revealing one or more form fields in the interactive user interface in response to the one or more data items received from the user.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2E illustrates examples of graphs and processes associated with storing graph information, according to various embodiments of the present disclosure.

FIG. 9A is an example interactive user interface illustrating inviting users for the first example step, according to an embodiment of the present disclosure.

FIG. 9B is an example interactive user interface for requesting a person join an electronic goal, according to an embodiment of the present disclosure.

FIG. 9E is an example interactive user interface illustrating a term sheet, according to an embodiment of the present disclosure.

FIG. 9F is an example user interface illustrating a summary of selected terms, according to an embodiment of the present disclosure.

FIGS. 11A-11B are example interactive user interfaces associated with a first task included in the second example step, according to an embodiment of the present disclosure.

FIG. 12B is an example interactive user interface for presenting state information associated with an electronic goal, according to an embodiment of the present disclosure.

FIG. 12C is an example interactive user interface illustrating a user role shared channel, according to an embodiment of the present disclosure.

FIG. 12D is an example interactive user interface illustrating completion of the third example step, according to an embodiment of the present disclosure.

FIGS. 14F-14I illustrate example interactive user interfaces of the system, according to various embodiments of the present disclosure.

FIG. 14J illustrates an example subscription user interface of the system displaying multiple forms combined into a signature package, as might be presented to a limited user.

FIGS. 14K-14O illustrate example interactive user interfaces of the system, according to various embodiments of the present disclosure.

FIGS. 14Q1-14Q2 and 14R illustrate example interactive user interfaces of the system, according to various embodiments of the present disclosure.

FIG. 17A is an example interactive user interface illustrating documents in a third example step of an electronic goal, according to an embodiment of the present disclosure.

FIG. 17B is an example interactive user interface illustrating summary information of a parsed document, according to an embodiment of the present disclosure.

FIGS. 17C-17D are example interactive user interfaces illustrating parsed terms from a document and associated portions of the document, according to an embodiment of the present disclosure.

FIG. 17E is an example interactive user interface illustrating comparisons between two documents, according to an embodiment of the present disclosure.

FIG. 17F is an example interactive user interface presenting statistical information associated with terms, according to an embodiment of the present disclosure.

FIGS. 17G-17H illustrate other interactive user interfaces presenting statistical information associated with terms.

FIG. 17I-17J are example interactive user interfaces for selecting datasets to be utilized in determining statistical information.

FIG. 17K-17O are example interactive user interfaces presenting statistical information associated with terms based on selected datasets.

FIG. 21 illustrates a table showing example completion criteria.

FIGS. 23A-23H illustrate example user interfaces, as may be presented by a user creating a signature request for a document.

FIGS. 24A-24B illustrate representations of data describing a smart form.

FIGS. 25A-25B illustrate example user interfaces specifying user turns.

FIGS. 26A-26B illustrate example notification emails.

DETAILED DESCRIPTION

Figure 1:
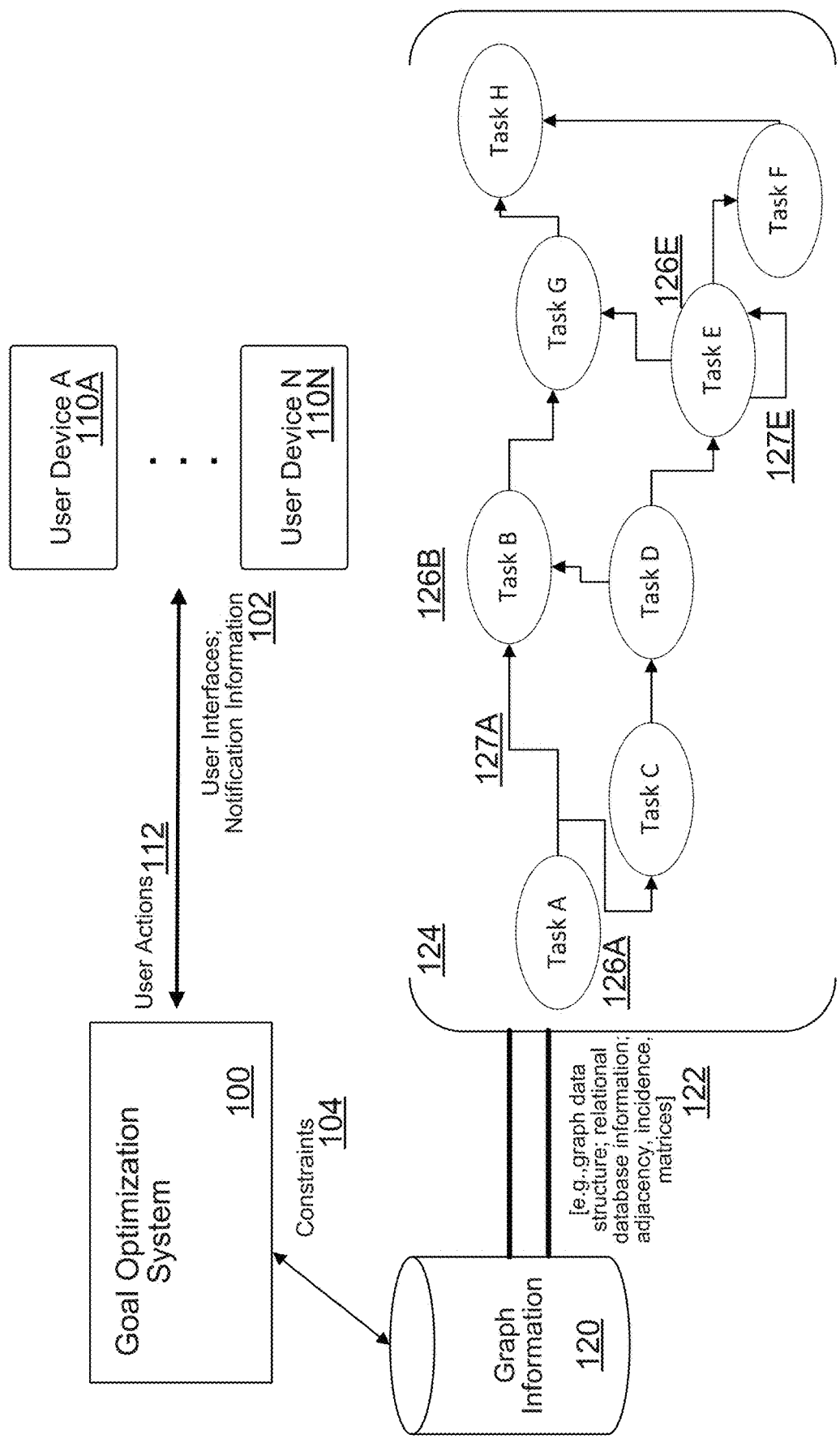
FIG. 1 illustrates an example implantation of a goal optimization system (also referred to herein as "the system") in communication with user devices, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

User Input (also referred to as "Input"): Any interaction, data, indication, etc., received by the system from a user, a representative of a user, an entity associated with a user, and/or any other entity. Inputs may include any interactions that are intended to be received and/or stored by the system; to cause the system to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). Accordingly to certain implementations of the present disclosure, data stores may be encrypted, e.g., end-to-end-encrypted, to prevent unauthorized access or modification of data stored therein.

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Goal: A step or intermediate state towards an outcome in a computer-assisted transaction. For example, a transaction involving obtaining signatures from multiple individuals may comprise multiple goals, wherein obtaining each signature is one goal. One goal may comprise multiple sub-goals or tasks, which may be sub-forms, form sections or other action items.

Term: A portion (e.g., a provision) forming part of a document (e.g., a contract). For example, a term may be represented as a textual portion of a document. Each term may be represented in different formats, for example different documents may have distinct wordings of a term. Some terms may have specific numerical or textual values associated with the terms. For example, a term may relate to a number of days for a contracting party to perform an action, and a value for the term may specify the number of days. As another example, a term may relate to an identification of a person required to perform an action, and a value for the term may specify the person's identifying information. As another example, a term may relate a condition for a company to delay filing of a particular form, and a value for the term can include receipt of a certificate prepared by a CEO or a receipt of a certificate prepared by a President. Thus, a term can be utilized to refer to a particular portion of a document, and one or more values may be specified as forming part of the term.

Example Systems and Methods

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

According to various embodiments, disclosed herein is a system (e.g., the goal optimization system 100 described below) that can monitor an overall state associated with completion of an electronic goal, and can enforce constraints on user actions of users according to information associated with each user, such as a user role assigned to the user. As will be described in more detail, and according to various implementations, user roles can be created, with each user role being associated with particular permissions, security rights, access rights, and so on, and based on these associations, the system can enforce constraints on available actions that each user can perform. For example, an electronic goal can include two entities performing a complex series of tasks to complete a contract, a venture financing round, stock transfer, and so on, and particular user roles (e.g., counsel, executive/partner roles, information technology roles, and so on) may have distinct actions that can be performed based on a state of the progression of the goal. For instance, a counsel for a first entity (e.g., a venture capital firm) may prepare an initial term sheet or contract (e.g., as will be described herein, the system can analyze a provided contract/term sheet, and utilizing one or more ontology models and/or machine learning models, extract terms for presentation), while executives for the first entity may be required to negotiate and ultimately sign the term sheet/contract before the goal can progress. Similarly, a second entity (e.g., a company requesting funding from the venture capital firm) may review, negotiate, and ultimately sign, the term sheet/contract. As will be described, an example step (e.g., a step can represent one or more grouped tasks) can be associated with executing a term sheet or contract, and upon the first and the second entities execution of the term sheet or contract, subsequent steps can be accessible, such as agreement with respect to core financing, closing of the transaction, and so on. For simplicity, the present disclosure may refer interchangeably to contracts, term sheets, and documents as illustrative examples when describing the functionality of the system. However, any types of suitable documents or groups of documents may be used in the system.

As used herein, a graph may describe relationships between nodes, such as edges connecting each node to itself or one or more other nodes, and can be stored as a graph data structure, stored in relational databases along with information describing the relationships (e.g., adjacency lists, matrices; incidence lists, matrices; and so on). As will be described below, each node of the graph can be associated with a particular task to be performed, and upon completion of the particular task, the system can traverse to a subsequent task via an edge. Each task can optionally be completed based on particular actions performed by one or more users, for instance a task to negotiate documents can include actions of (1) uploading a particular document and providing it to a negotiating user, (2) indicating approval, by all negotiating users, to the particular document, and optionally uploading other documents for discussion, messaging users, and so on. As described above, the graph can be associated with completing an electronic goal, and the nodes can be arranged such that one or more paths (e.g., a path can represent a traversal of edges along a same direction towards completion of the goal) can cause completion of the goal. Linkages between nodes in the graph may represent possible (e.g., logically valid) transitions between goals, or various tasks within a goal. Advantageously, this may allow the user to interact with the system sequentially, in a way that may be considered an implementation of a wizard, assistant or expert system.

The system can monitor progression through the graph (e.g., completion of tasks), and can determine a present state associated with the progression. In this specification, a state describes one or more of, a present task that is to be completed (e.g., by a user or user role), or optionally one or more tasks that are to be completed (e.g., by different users or user roles), an elapsed time since the goal was initiated, an estimated time remaining (e.g., as will be described, the system can monitor progression of multitudes of goals till completion, and determine estimates of remaining times along with other information, such as preferred paths through graphs, and so on), and other information indicative of a progress associated with completion of the electronic goal. Through monitoring progression and determining present states, the system can present useful information to users indicating (1) whether they have a particular task to complete, (2) a particular user role or user that is to complete a particular task, (3) a recommended path to traverse based on the state (e.g., the system can determine a particular task to subsequently complete based on a present), and so on. For example, and as illustrated in FIG. 12B described further below, the system can present information identifying "a current task," "a task owner" (e.g., as described below tasks can be assigned to particular users or user roles), and so on, ensuring that users are aware of any actions they need to take.

User roles can be created and assigned to users of the system (e.g., users can create user accounts and indicate their role with respect to completion of the goal), for instance a first user role may be associated with an attorney, while a second user role may be associated with an executive; other example user roles are described in detail herein, and in general a user role can be any definable role. Each task may optionally be assigned to a particular user role, a particular user assigned the particular user role, and so on. In this way, each task may have one or more owners, and these owners can ultimately trigger the completion of the task. As an example, and as is further described below with respect to FIGS. 9A-9H, an example task can include executing a term sheet, document, or group of documents. For this example task, a user role associated with an executive can be assigned the example task, such that only a user assigned as an executive can cause the completion of the task (e.g., the user can upload an executed term sheet or document). As will be further described, particular tasks can be delegated to other users of other user roles, while the system may disallow delegation of other tasks (e.g., with respect to the example of an executed term sheet or document, the system can disallow delegation to a user role that wouldn't normally bind a company, such as an outside counsel, employee, manager, information technology employee, and so on).

In an embodiment, users may be assigned the roles of primary and secondary owners of a goal, wherein the primary owners can either take an action related to the goal themselves, or delegate such action to a secondary owner. The secondary owners may then take actions that were delegated to them by a primary owner. Additionally, the secondary owners can affirmatively request the primary owners to have an action delegated to them. Advantageously, this allows the primary owners to efficiently delegate aspects of a goal as desired, while still remaining in control of the entire process. The system may comprise various default configurations comprising pre-assigned roles of primary and secondary owners for certain types of transaction, which may then be customized by the primary owners to reflect their preferences.

Optionally, the graph can indicate a particular user role that is to be assigned each task, for instance the system can store information describing assignments. With respect to the above example of venture capital funding and/or completing a contract, the system can store information indicating tasks to be completed by attorneys, executives, members of a board, shareholders, and so on. In this way, when a new task is traversed to via an edge from a completed task, the system can determine users that are to complete the new task. As will be described, the system can present information to the determined users indicating the assignment (e.g., ownership of the task), and the system, or other users, can provide notifications to the determined users regarding completion of respective tasks. Additionally, and as described above, to limit confusion with respect to complex goals, the system can present (e.g., in one or more user interfaces, such as in a web page being rendered on user devices of users) information identifying a current task that is to be completed along with one or more users assigned the current task. In this way, each user can rapidly determine (1) a present task to be completed (e.g., a task, according to the graph, that causes progression towards the goal), (2) one or more users assigned the present task, and (3) the ability to provide notifications to the assigned users.

Optionally, the system can determine a user or user role that is to be assigned each task upon traversing to the task, or traversing to within a threshold distance (e.g., according to one or more paths through nodes) of the task. For example, the system can monitor an average elapsed time that a particular user takes to complete actions or tasks, and can prefer assignment of the task to a user who more quickly completes actions or tasks. While the system may prefer a particular user who more quickly completes actions or tasks, the system can ensure that the particular user is assigned a user role that can complete the assigned task. For example, a particular user may complete tasks quickly, but be unable to generate contracts, execute contracts, and so on, and the system can select from among users assigned user roles that can complete the assigned task. The system can further base the task assignment determination on a number of tasks presently assigned to users (e.g., the system can prefer a user that is not overly burdened with assigned tasks, such as a user with less than a mean number of assigned tasks, thus performing load balancing), a frequency with which the user checks information indicating a progression of the goal (e.g., the system can prefer assignment to a user that appears to be interested in progression), or the system can receive an identification of a particular user (e.g., a particular user role, such as a chief executive officer, can provide specific assignments of tasks to particular users).

Thus, the system can traverse through the graph towards completion of the goal according to completion of tasks assigned to users, and upon completion of a task, the system can assign subsequent tasks to users. Optionally, upon completion of a task, the system can traverse to a subsequent task according to user actions implemented during completion of the task, or subsequent to completion. With respect to the example of venture financing and/or completing a contract described above, and as is described below with respect to FIGS. 9A-9H, one or more tasks can be associated with executing a negotiated term sheet/contract between two entities. Subsequent to completion of the one or more tasks, a user of the system can select the subsequent task to be completed. For instance, and as described below with respect to FIG. 10, the user can interact with a user interface and indicate that one or more subsequent tasks are to be associated with performing a due diligence process. Alternatively, and as will be described below with respect to FIGS. 12A-12D, the user can interact with the user interface and indicate that one or more subsequent tasks are to be associated with executing core financing documents. In this way, users can have a level of autonomy with respect to traversing the graph and completing the goal. For instance, the users may prefer to execute the core financing documents first, while the due diligence process is temporarily put on hold, or while the due diligence process is ongoing. However, the system can ensure that tasks not appropriate for assignment at particular states cannot be inappropriately traversed to (e.g., the users may not be allowed to execute final contracts for the venture funding or other deal absent determination of core financing documents or other types of documents). Further description related to users selecting subsequent tasks is included below, with respect to FIG. 2C.

As described above, the system can constrain user actions available to be performed according to a state associated with completion of the goal. For example, while users are negotiating a document, users (1) that are not associated with the negotiation may be constrained in one or more actions until the document is negotiated (e.g., the users may not be able to provide revisions to the document, comment on the document, and so on), or (2) that are associated with the negotiation may be allowed to perform actions associated with completion of the negotiation (e.g., sign the document, generate revisions, and so on). As will be described below with respect to FIG. 3B, the system can enforce constraints on user actions based on limiting user interface interactivity with respect to user interfaces presented on user devices of particular users, or the system can receive user actions and reject the received user actions according to the constraints. As an example further described below with respect to FIG. 9A, the system can modify user interfaces, such as hiding, 'greying' out, or otherwise limiting interactivity with particular portions of user interfaces, such that constraints on user actions can be enforced. Optionally, a user interface presented to a first user can be simplified according to enforced constraints (e.g., the system can modify or update a particular user interface, such as a template, according to the constraints), while a user interface presented to a second user may have expanded functionality (e.g., the second user may be assigned a current task, or be otherwise able to perform particular actions). In this way, the system can enforce a role-based security model with respect to user actions of users, thus ensuring that actions for completing complex goals remain sharply in focus to users. For example, a particular user can determine that he/she is assigned a task (e.g., as described above, the system can present information identifying assignments of tasks), and similarly constraints on the user actions he/she can perform can be enforced, thus increasing a likelihood that the task is quickly completed (e.g., the particular user can determine that he/she is to obtain signatures on a document, and his/her user actions can be limited to contacting users, providing the document to them, uploading the executed document to the system, and so on).

While the description above generally described a single graph being associated with completion of a goal, additionally the system can maintain, access, and so on, graphs associated with disparate user roles. For instance, a graph for a user role associated with an attorney may indicate tasks that attorneys are to complete, with the tasks being connected via one or more edges to other tasks. Similarly, a graph for a user role associated with an executive may indicate tasks that the executives are to complete. In this way, each user role can traverse through respective graphs, and upon completion of the tasks, the overall goal can be completed. Optionally, completion of a task in a graph for a first user role may affect a different task in a graph for a second user role, and the system can update the different task according to the affectation. For instance, the system can constrain, or enable additional, user actions for the different task based on the completion of the task associated with the first user role. As an example, a task associated with the first user role can include negotiation of particular terms and/or clauses to include in one or more contracts. Upon completion of the negotiation, the negotiated terms and/or clauses can affect one or more different tasks associated with the second user rule. For instance, based on the selected terms and/or clauses, particular documents may need to be executed, drafted, and so on, by users assigned the second user role. As will be described below, and illustrated in FIG. 11B, the system can modify user interfaces to limit user actions associated with terms and/or clauses not selected (e.g., as illustrated in FIG. 11B, a particular class of documents is indicated as not applying).

Since multiple graphs can be utilized by the system according to respective user role, optionally each node can indicate tasks, actions, and so on, which are required to be completed for the system to traverse to the node. For instance, users assigned a first user role can complete a particular task, and the subsequent task may indicate that users assigned a second user role complete a different task before the subsequent task can be assigned to the first user role. In this way, the system can ensure that tasks are assigned when it is logically appropriate, and each node can be associated with information describing necessary tasks, actions, and so on (e.g., the system can store information with each node, such as logical condition information maintained with a graphical structure, or the system can store information with each edge connecting nodes, and the system can ensure that the logical conditions are satisfied prior to traversing the edge to a node).

Based on stored information associated with a graph (e.g., information indicating, nodes, edges, and so on), for instance a graph associated with completion of a goal or a graph associated with a particular user role, the system can monitor progress associated with completion of the goal. At any state within the graph, a user of the system can request that the system provide a current task to be completed and optionally a subsequent task to complete. That is, the system can determine an optimal path that will move progress towards the goal, for instance a path with the least action (e.g., least complexity, least number of tasks, a path determined to result in a least amount of time based on the system monitoring historical completions of similar goals, and so on). The optimal path can be based on progress information associated with the goal, optionally in combination with historical information. For example, the system can determine that tasks involving particular actions (e.g., negotiation of terms or specific terms; gathering of complex information, for instance while performing due diligence tasks; and so on) have taken longer than a threshold (e.g., longer than a median time with respect to completion of other tasks, longer than a median time for historical completions of the determined tasks, and so on), and can prefer a path that limits the extent to which tasks involving the particular actions are to be assigned. The system can utilize historical information (e.g., monitored progress information associated with other users that previously completed goals) to determine paths that resulted in a fastest completion time, least number of actions, and so on, and can compare the historical information with a presently occurring goal. Optionally, the system can utilize machine learning models (e.g., trained using historical information associated with previously completed goals) to determine an optimal path through the graph, for instance based on features of the presently occurring goal (e.g., information describing the goal, types of user roles required, statistical information such as completion times for particular tasks, and so on). In this way, the system can ensure that goals are completed efficiently, and can further update and refine paths over time through monitoring multitudes of goals. In all situations in which historical information, private information, and so on, is utilized by the system, the system can enforce privacy restrictions specified by users, or can anonymize data, or require that users 'opt-in' to use of their data.

In addition to efficiently guiding users towards completion of complex electronic goals, for instance through (1) constraining user actions, (2) traversing to specific tasks towards the electronic goal, and so on, the system can perform complex analyses on documents, information, and so on, provided by users to democratize complex electronic goals through simplifying the documents, information. For example, contracts can utilize complex terminology, be written in specific manners that non-attorneys may not understand or be able to modify. As will be described, for instance with respect to FIGS. 16A-16G, 17A-17F, and 18, the system can analyze documents, contracts (e.g., contracts under negotiation), and utilizing generated and maintained ontologies, can parse specific terms from the analyzed documents, contracts, and present simplified summarizing information to users. For instance, and as illustrated in FIG. 17C, the system can analyze a provided contract and determine values for specific terms. The system can generate user interfaces depicting values of particular terms (e.g., terms determined to be important for a particular user viewing the contract, any negotiated term, any term which based on historical information is determined to be contentious or important, and so on), and users can rapidly gain an understanding of the contracts. Additionally, the system can generate contracts according to preferred formats, and users can merely provide values for particular terms, and receive fully generated contracts with the values included. In this way, negotiating contracts, maintaining electronic versions of contracts, and so on, can be simplified, with users merely reviewing values for particular terms, and not being required to peruse legally complex documents.

FIG. 1 illustrates an example goal optimization system 100 in communication with user devices (e.g., user devices 110A-110N). As described above, the goal optimization system 100 can enable users of user devices 110A-110N to complete an electronic goal, for instance through constraining 104 user actions 112 of the users and traversing a graph 124 associated with the electronic goal. The goal optimization system 100 can be a system of one or more computers, or a system of one or more virtual machines executing on a system of one or more computers, and can be in communication with user devices 110A-110N via one or more networks (e.g., the Internet). The user devices 110A-110N can include laptops, mobile devices, wearable devices, tablets, computers, and so on, and can present user interfaces 102 to users of the user devices 110A-110N. Additionally, the goal optimization system can access, store, maintain, and so on, one or more databases storing graph information 120 associated with one or more electronic goals. In various implementations, the goal optimization system 100 may be implemented via one or more computer system, including computer executable instructions (e.g., modules, engines, etc.), as described herein and below in reference to FIG. 19. As used herein, the term "system" and/or "goal optimization system" may refer to the goal optimization system 100 alone or in combination with one or more other aspects, devices, systems, and/or functionalities of the present disclosure. In some implementations, "system" and/or "goal optimization system" may include a subset of the aspects, devices, systems, and/or functionalities of the goal optimization system 100, alone or in combination with one or more other aspects, devices, systems, and/or functionalities of the present disclosure.

The goal optimization system 100 can store and maintain user account information associated with users of the user devices 110A-110N, for instance the users can access the system 100 and create user accounts. As will be described, for instance with respect to FIG. 7A, users can be invited to participate in completion of an electronic goal, users can cause the initiation of an electronic goal. Each user can indicate a user role he/she is to be assigned during the electronic goal, or the user be assigned the user role from one or more other users, and the goal optimization system 100 can store the assignment. As described above, each user role can be assigned one or more tasks, and user assigned the user role can be constrained in user actions they can perform.

The goal optimization system 100 maintains graph information 120, for instance in one or more databases 120 or one or more storage subsystems, and can utilize the graph information 120 to traverse a graph associated with completion of an electronic goal. The graph information can be maintained as relational information stored in the graph information database 120 (e.g., relational databases), for instance one or more tables describing nodes along with tables indicating relationships between the nodes. Additionally, tables can be utilized to describe, or reference stored locations that indicate, conditions (e.g., logical conditions) that when satisfied, cause the goal optimization system 100 to traverse to a subsequent node via an edge. For instance, the system 100 can determine that conditions associated with a particular node are satisfied (e.g., completion of a task indicated by the particular node, such as a user uploading an executed document for storage by the system 100), and the system 100 can access one or more tables describing relationships between nodes, and identify a subsequent node. However, since the particular node may have edges to two or more nodes, the system 100 can determine a particular one of the two or more nodes to traverse to, for instance based on user actions performed during the particular node. Determining a particular node from two or more nodes to be traversed is described in more detail below, with respect to FIG. 3. Thus, in the relational information case, the system can be required to (1) access tables indicating nodes, and utilize the accessed tables to identify a present task to be performed, (2) monitor progress associated with the present task, and determine completion of the present task, (3 access tables indicating relationships between nodes, and identify one or more nodes connected via edges to a node associated with the present task, and optionally (4) determine which of the identified nodes is to be traversed.

Since maintaining a graph as relational information can be complex, involve complex memory operations (e.g., complex joins, and so on), require greater processing power, and so on, the goal optimization system 100 can optionally utilize a NoSQL database, such as a database that implements a graph data structure. The graph data structure may be represented in the database in various ways, including using adjacency lists (e.g., each node being assigned an identifier, such as an integer, and each edge being represented by a tuple of two node identifiers). The graph data structure can store, and directly access, nodes that represent tasks, with each node indicating one or more of, (1) actions associated with completion of the task, (2) actions that can be performed based on user role (e.g., a particular user role can be constrained in the actions users assigned the particular user can role can perform), and (3) an assignment of the node to a particular user or users assigned a particular user role. Additionally, the graph data structure can store information indicating edges between nodes, with the edges optionally indicating one or more of: (1) a directionality between the nodes, or (2) logical conditions indicating relationships between the nodes. For instance, and as will be described below with respect to at least FIG. 2C, upon completion of a particular node (e.g., completion of a task indicated by the particular node), the goal optimization system 100 can identify a subsequent node according to edges from the particular node and optionally user actions with respect to the particular node or subsequent to completion of the particular node. As an example, subsequent to completion of the particular node, the system 100 can present a particular user with two or more options to proceed, and based on the particular user's selection, the system 100 can traverse to a node associated with the selection. In this way, the graph data structure can simplify representation and access of a graph associated with an electronic goal.

As illustrated in FIG. 1, the graph information database 120 can therefore maintain a graph as graph information 122, such as a graph data structure, relational database information, adjacency, incidence, matrices or lists, and so on. A representation of an example graph 124 is included in FIG. 1, and the example graph 124 includes an initial node 126A associated with a particular task (e.g., 'Task A'), connected via an edge 127A to a subsequent node 126B (e.g., node 126B is associated with 'Task B'). As described above, a particular user, or a particular user role, can be assigned Task A, and the system 100 can monitor user actions of, for instance, the particular user. Upon completion of Task A (e.g., as described above, node 126A can indicate user actions associated with completion of Task A), the system 100 can traverse from node 126A to node 126B, and the system 100 can assign another user, or user role, to Task B. In this way, the system 100 can determine a state associated with progress towards an electronic goal.

Furthermore, particular user actions of users may not cause completion of a task, and instead may cause the system 100 to remain on a particular task. For instance, node 126E (e.g., associated with 'Task E'), includes edges connecting node 126E to subsequent nodes (e.g., associated with 'Task G,' and 'Task F'). As will be described below, for instance with respect to FIG. 3, upon completion of node 126E, the system 100 can determine which edge to traverse. In contrast, edge 127E connects node 126E to itself (a graph with loops in it may be referred to as a pseudograph), and edge 126E can indicate user actions that when performed, do not cause progression towards an electronic goal. For example, a particular user may be assigned Task E, and the task may indicate that the particular user is to provide an executed document to the system 100. The particular user can perform other user actions in addition to provide an executed document, for instance the particular user can provide a comment for viewing by other users (e.g., a comment with respect to the document), the particular user can provide a different document (e.g., a supporting document), and so on. These user actions, optionally known as supportive actions, may result in a loop, and only upon completion of Task E will the system 100 traverse to a subsequent node.

As described above, users of the user devices 110A-110N can interact with the goal optimization system 100 via user actions 112 with respect to user interfaces 102 received from the goal optimization system 100. For example, the goal optimization system 100 can generate interactive documents (e.g., web pages) for presentation on the user devices (e.g., rendered by the user devices), with the interactive documents enabling the users to provide user actions 112, view progress information associated with an electronic goal, generate notifications to be provided to other users, and so on. Additionally, each user device can execute an electronic application (e.g., an 'app' downloaded from an electronic application store), and the executed electronic application can generate user interfaces 102 for presentation. The goal optimization system 100 can receive information from, and provide information to, the electronic applications, and the electronic applications can present information received from the system 100. Example user interfaces 102 are described herein, with respect to FIGS. 2B, 7B-7D, 8, 9A-9G, 10, 11A-11B, 12A-12D, 13, 14A-14D, 14F-14O, 14Q1-14Q2, 14R, 15, 16D, 16F-16G, 17A-17O, 22A-22D, 23A-23H, 25A-25B, and 26A-26B, including user actions with respect to the user interfaces 102. For instance, users can upload documents for storage by the system 100, access documents uploaded by other users, engage in discussions with other users, electronically sign documents (e.g., as illustrated in FIGS. 14C, 14E-14O, 22A-22D, and 23A-23H). As described above, based on a present state associated with progress towards an electronic goal, the system 100 can enforce constrains on user actions. As an example enforcing constraints, the system 100 can modify user interfaces 102 to limit available functionality that can be performed (e.g., the system can limit particular users from uploading or viewing documents, while enabling other users to upload, discuss, and otherwise negotiate documents).

Figure 2A:
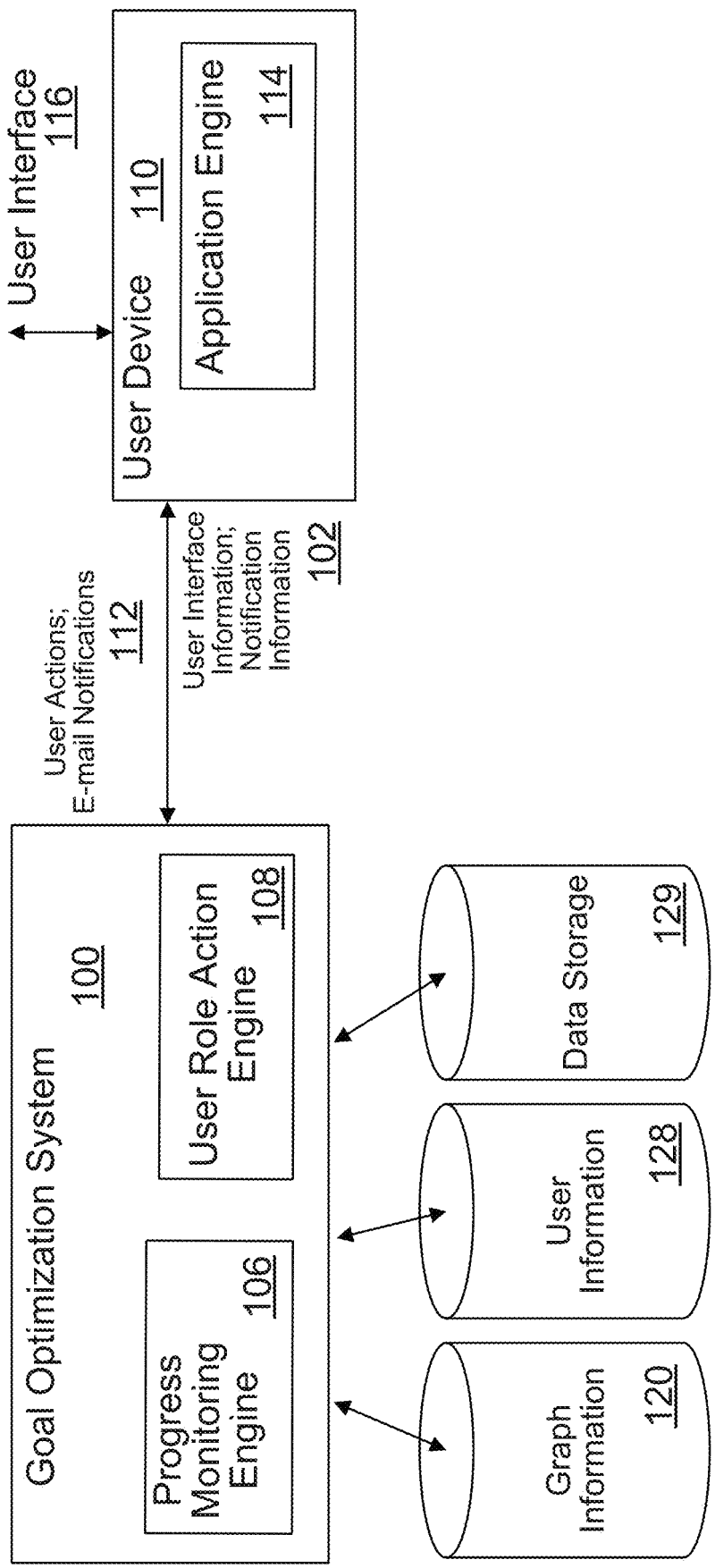
FIG. 2A further illustrates a further example implementation of the system, according to various embodiments of the present disclosure.

FIG. 2A further illustrates an example implementation of goal optimization system 100 (also referred to herein as "the system"). The goal optimization system 100, as described above, can be in communication with one or more user devices (e.g., user device 110), and a user of a user device 110 can view, interact, with user interfaces 116 presented on the user device (e.g., via a display of the user device, such as a touch screen display).

The goal optimization system 100 is in communication with, and optionally maintains, a user information 128 database that stores information associated with users of the system 100. Users can utilize user interfaces 116 to create user accounts with the system 100, such as creating a user name/password, and optionally user profile information such as a name, address, phone number, and so on. As will be described below, with respect to FIG. 7A-7B, users can indicate respective user roles, such as whether they are attorneys, executives, employees, or an arbitrary role, with respect to particular electronic goals. The system 100 can store information identifying available user roles for selection according to a particular electronic goal for which users are trying to complete, and the system 100 can enable selection of one of the available user roles. Optionally, the system 100 can require verification of a user role, such as requiring one or more already registered users to indicate acceptance of a new user and user role, requiring documentation be provided verifying a new user's role, and so on.

Additionally, users of the system 100 can cause the system 100 to cause one or more notifications 102 to be provided to potential users, requesting that the potential users create user accounts with the system 100 to fulfill particular user roles. As an example, and as will be described below with respect to FIG. 9A-9B, the system 100 can present information indicating all present users and associated roles, along with user roles that do not have assigned users, and a user of the system 100 can request that the system 100 generate notifications to a particular email address, phone number, application executing on a particular user device, and so on, requesting that a potential user fulfill an unassigned user role.

The goal optimization system 100 is further in communication with, or optionally maintains, a data storage database 129 that can store documents, images, video, or any arbitrary information that is received from, or is made accessible to, users of the user devices (e.g., user device 110). With respect to an example electronic goal associated with venture capital funding, the system 100 can store revisions of documents, such as contracts, and users of the system 100 can access the documents, electronically execute the documents, and so on.

Data, for example the data included in databases 120-129, can be encrypted and/or permissions can be associated with portions of the data. For example, all access to data included in databases 120-129 can be mediated through a database layer wherein software layers (e.g., user interfaces) invoke the database layer (e.g., through an API) for all database accesses. Data permissioning can be enforced through channels implemented on the database layer. Data related to each transaction (e.g., related to individual goals) can be partitioned, e.g., into documents, and each partition (e.g., each document) can be associated with a set of channels or access permissions. Each channel or access permission may associate one or more partitions with one or more users authorized to access the respective partitions. For example, a user may be granted access to a set of channels based on their user roles in the transaction (e.g., goal). Each user can be granted access to a partition if the access permissions associated with the user comprise at least one access permissions granting access to the partition contain at least one channel associated with that partition. The enforcement of access permission can be implemented at the database layer by matching the list of document channels and user granted channels; advantageously, this may allow conforming layers on top of the database layer to the permissions model implemented by a database layer.

As will be described below, for instance with respect to FIG. 7B-7D, the goal optimization system 100 can enable an initial selection of an electronic goal (e.g., a user interface 116 presented to a user can present one or more electronic goals, and the user can select an electronic goal optionally along with information such as, names of entities involved in the electronic goal, and so on). Based on the initial selection of the electronic goal, the system 100 can access graph information 120 associated with the electronic goal. As described above, graph information 120 can indicate tasks that are to be completed for completion of the electronic goal, and can indicate particular user roles that are to be assigned each task. Based on the selection of the electronic goal, the system 100 can indicate user roles that are required for completion of the electronic goal (e.g., an executive level officer of a company may be required for a venture funding round to be completed).

The goal optimization system 100 includes a user role action engine 108 that can (1) cause assignment of users to particular user roles (e.g., a user role with respect to a particular entity involved in the electronic goal, for instance a venture capital funding firm or a company interested in receiving venture funding, and so on), (2) determine constraints on user actions for enforcement based on a present task, and (3) determine assignments of tasks to particular users or particular user roles. As described above, users of the system 100 can create user accounts (e.g., provide a user name, password), and indicate their user role with respect to the selected electronic goal. The user role action engine 108 can maintain assignment information (e.g., in the user information database 128), and can further cause notifications 102 to be provided to potential users requesting that the potential users create user accounts for the selected electronic goal. As will be described in more detail below, with respect to FIG. 3B, the user role action engine 108 can monitor a present task assigned to a particular user or user role, and can enforce constraints on user actions that can be performed. For instance, a present task may include negotiating a term sheet or contract, and the user role action engine 108 can constrain user actions with respect to executing a final version prior to particular users indicating consent to the negotiated term sheet or contract.

The goal optimization system 100 can generate notifications 102 to be provided to users of the system 100, for example notifications can be automatically generated by the system 100 periodically (e.g., after a threshold amount of time), in response to completion of tasks or particular actions that were performed, and optionally users can subscribe to notifications being received from the system 100 based on specified conditions. As will be described in more detail, notifications can provide summary information describing progression of the selected goal, and can include particular tasks that have been completed (e.g., within a threshold period of time), particular tasks that are to be completed, tasks that are to be completed by a particular user or particular user role, and so on. As an exampling of subscribing to notifications, specified conditions can include updates of particular users, particular user roles, updates associated with a particular entity (e.g., with respect to a venture financing goal, a user can subscribe to updates from an investing company and/or a company receiving venture financing). For instance, a user (e.g., an executive) can subscribe to updates, such as completions of tasks or specific actions (e.g., the user can specify that he/she is interested in receiving updates regarding executions of documents, negotiations, new versions of documents, and so on), and the system 100 can generate and provide notifications (e.g., in substantially real-time, or the system can obtain a threshold number of updates, or wait a threshold amount of time, to provide notifications). The goal optimization system 100 can maintain subscription information, for instance in one or more databases (e.g., the user information database 128), and can associate the subscription information with particular user accounts. Additionally, the system 100 can store, or receive information indicating (e.g., from a particular user or user role), subscription information for all users, a portion of users (e.g., users associated with a same entity as the particular user), a portion of user roles, such that a base-line can established, ensuring that all or particular users associated with a same entity receive update information.

Example Emails

Notifications 102 can include emails generated by the goal optimization system 100 which are provided to email addresses associated with users, with the emails optionally graphically depicting updates. For example, an email generated in response to a particular document being uploaded to the system (e.g., for storage in the data storage database 129) can specify the action (e.g., document uploaded) along with information describing the document, and can graphically depict a state associated with progression of an electronic goal (e.g., a particular task, a particular step, and so on). Additionally, the email can include selectable elements that can be associated with references (e.g., links) to the goal optimization system 100. For instance, a selectable option can be associated with causing a user device presenting the email to navigate to a particular content item (e.g., web page) that presents information related to the notification, or enables user actions related to the notification (e.g., signing a document, uploading and document, making one or more comments visible to other users, and so on).

The system may generate emails based on substituting information into a template, which may be similar in many aspects as discussed herein with reference to contract templates. The user may also be able to respond directly to the notification (e.g., clicking on a link inside an electronic message, responding to an email message, etc.), thus triggering a corresponding action in the system. To securely determine a connection between a response (e.g., a response email from a user, or a request from a user's web browser following a link in an email) and the corresponding user, each email may comprise an identification token, such as a user identifier, which may then be used by the system to find the user associated with the response. For example, a user may be able to perform a variety of actions or tasks by responding to an email from the system, such as sending requests to other users to perform a task, granting permissions to other users to perform a task, sending reminders or follow-ups to other users related to a task, inviting new people to a transactions (e.g., allowing new user accounts to be created), completing a task (e.g., uploading a document or confirming that a certain action, such as a review, has been performed).

Figure 2B:
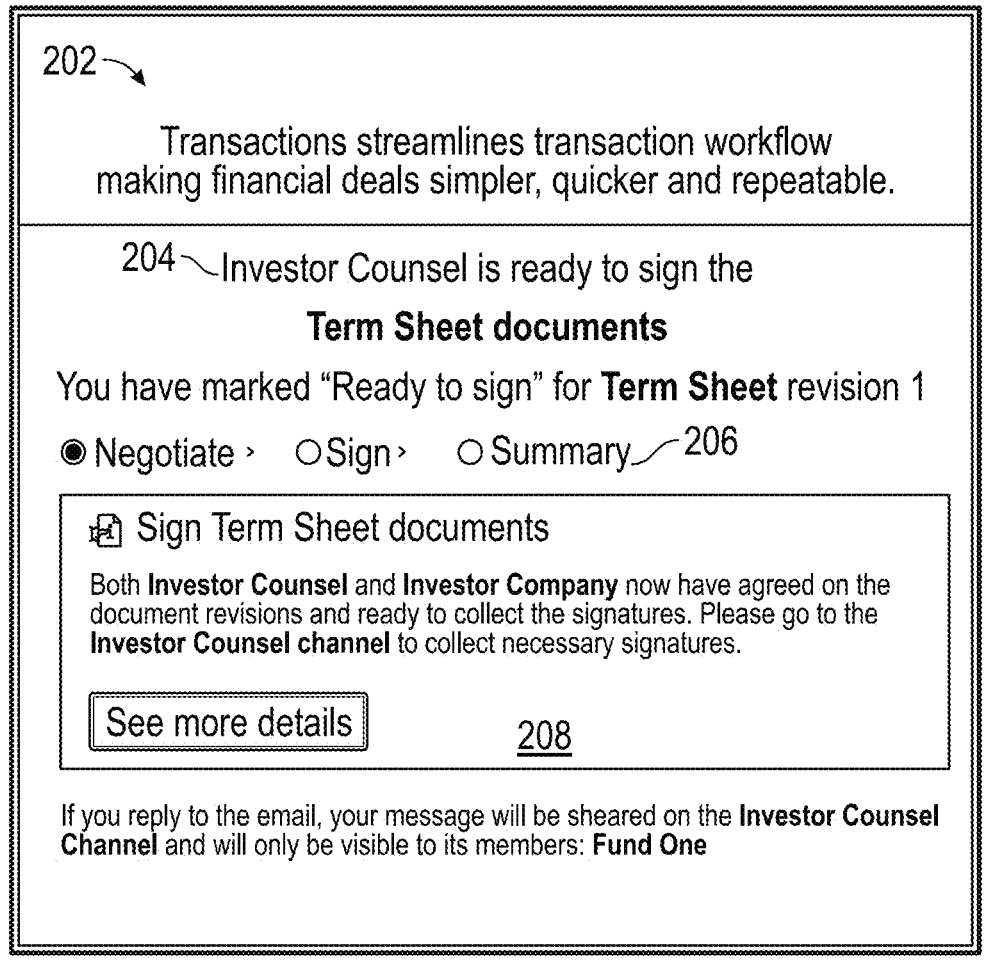
FIG. 2B illustrates an example interactive user interface of the system, according to an embodiment of the present disclosure.

An example notification 202 (e.g., email) is illustrated in FIG. 2B, with the notification 202 providing summary information associated with actions, completions of tasks, and so on. In this example of FIG. 2B, completion of a particular task is indicated 204 (e.g., the notification 202 indicates that a particular user role, investor counsel, is ready to sign term sheet documents) along with the particular task's location within a step (e.g., as will be described below, with respect to FIGS. 8 and 9A-9H, executing an initial term sheet can be a step that includes multiple tasks, such as negotiating the term sheet or contract, signing the term sheet or contract, and so on). As described above, the goal optimization system 100 can access graph information associated with an electronic goal, and utilizing the graph information the system can determine tasks associated with particular tasks. As illustrated, an initial task (e.g., negotiating a term sheet) has been completed (e.g., the email graphically depicts the completion, which in the example includes a solid circle next to a textual descriptor of the initial task), and a next task is to begin (e.g., signing the negotiated term sheets). As described above, this next task (e.g., signing the term sheets) can be assigned to one or more users or user roles, which in the example of FIG. 2B has been assigned to counsels (e.g., 'Investor Counsel,' representing a counsel for an entity that is investing money into a company). The notification 202 further includes a selectable option 208, which upon selection or interaction, can cause a user device presenting the notification 202 to navigate to a content item (e.g., web page) presenting 'more details' as illustrated.

While FIG. 2B describes a notification 202 being an email, it should be understood that notifications 102 can encompass one or more other types of electronic information being provided to users. For example, a notification 102 can include a message (e.g., an SMS, MMS, message) being provided to a user, or a notification 102 can include activation of an application executing on particular user devices and presenting, via the application, information. For instance, the user device 110 can include an application engine 114, with the application engine 114 optionally being an electronic application (e.g., the electronic application can be downloaded from an application store) in communication with the system 100. As an example, the application engine 114 can periodically poll the system 100 for updates (e.g., notifications 102), or the system 100 can provide notifications 102 to the application engine 114 (e.g., as a push).

As described above, the goal optimization system 100 can interact with users of user devices (e.g., user device 110) via user interfaces 116 presented to the users. Optionally, the goal optimization system 100 can further interact with users through emails, with the emails specifying identifiers associated with particular tasks, and with the emails enabling users to provide information to the system 100 which may cause the system 100 to (1) update user interfaces 116, for instance update user interfaces for particular users to specify information received in an email, (2) update particular tasks, (3) cause completion of particular tasks, and so on. As an example, the system 100 may assign a particular task to a user, for instance uploading a particular document, and the user can access user interfaces 116 to upload the particular document. Optionally, the user may utilize his/her email program, app, web interface, and so on, and draft an email that specifies a particular email address associated with the goal optimization system 100, and which includes the particular document attached. The system 100 can receive the email, identify the user, and based on the assignment of the user to a task associated with uploading a document, may determine that the task has been completed. Optionally, the email may include a reference to the task, such as a unique identifier (e.g., a string of characters, numbers, that uniquely identify the task), a textual description of the task (e.g., 'attached is the [name] document—please execute') and the system 100 can parse the textual description to identify the task.

To facilitate collaboration across users and tasks, system 100 may also provide a platform for communication amongst users or groups of users, such as a messaging system or chat. Advantageously, tasks, goals, documents, etc. may be mentioned or embedded in messages sent by a user, and can thus be immediately accessed by a recipient or recipients of the message. For example, where a user mentions an action or goal in a message (e.g., "sign form 14", review document X"), the system may create links or references to those actions, goals, documents, etc. so that they can be quickly accessed or performed. A user may be also able to use the communication platform to contact support; this may include either a human representative, or a chatbot, artificial intelligence, or expert system that interacts with the user in a way similar to human interaction.

In response to receiving an email associated with a particular task from a particular user, the system 100 can update user interfaces 116 presented to the particular user and/or other users. With reference to the example above, the particular user can attach a document to the email, thus completing the user's assigned task, and the system 100 can update user interfaces presented to other users indicating a subsequent task to be performed (e.g., signing the document). In this way, interactions with the system 100 are not constrained solely via interactions with user interfaces 116, and can be expanded. Optionally, users can text (e.g., through SMS, MMS) a particular number associated with the system 100, and the system 100 can similarly parse the text, obtain attachments to the text (e.g., an MMS message may contain an attachment, or the text can include a link to a cloud storage location and download an attachment, and so on).

Optionally, the goal optimizations system 100 can enable persons who have not created user accounts with the system 100 to be assigned user roles, and perform user actions 112. For example, while a user is interacting with the system 100, a particular action, or task, may be required to be performed by a different user (e.g., as described above, constraints on user actions can be enforced by the system 100, such that to perform an action or complete a task, a particular or particular user role can be required), and the user can request that the system 100 generate a notification 102 to be provided to a person who can act as the different user. As an example, the system 100 can indicate to the user that a particular user role (e.g., counsel) is required to perform an action, or to complete a task, and the user can interact with the system 100 to specify one or more of (1) a name of a person who can function as the particular user role (e.g., an attorney), (2) contact information (e.g., email address, and so on. The system 100 can generate a notification 102, and provide the notification 102 to the person. The person can receive the notification 102, and optionally create a user account (e.g., as described above), or optionally perform actions in response to the received notification 102 (e.g., as described above, the person may respond to an email with instructions the system 100 can parse, including attaching a document). With reference to a task associated with providing a document, the system 100 can provide a notification 102 to the person (e.g., an email describing that the person is to provide a document, and further describing an electronic goal, identifications of the entities, and so on), and the person can respond to the notification with an attached document. In this way, the person may not be required to create a user account, and can instead perform a limited function which can reduce a burden on people interacting with the system.

Similar to the above description regarding interactions via emails, in contrast to a person responding to an email requesting the person perform one or more actions, the email can include a selectable object, which upon interaction, can cause a user device utilized by the person to navigate a secure content item (e.g., web page) associated with the system 100. The person can then utilize the secure content item to perform actions, for instance upload a document. That is, the system 100 can create secure sessions, for instance secure web based tokens which can optionally expire after the person performs specified actions, after a threshold amount of time, or any user definable conditions.

Optionally, each task or user action associated with a graph can correspond with a type of event. Each type of event can be associated with a set of email templates, and each email template can be designed for one or more user roles associated with the graph. When a user action is performed, the system can query the email template associated with the user action. Based on the user role associated with each email template, the system can query a list of users being in that role. Those users are the receivers of the emails.

The system can then compose email content for each of the users by querying the state of the transaction and the user's information (e.g., the state associated with a graph is described above). The queried data can be applied to the template to compose a specific email content. Once the email content is ready, the system can provide a request to an email server to send out that email.

Furthermore, each email sent out by the system can indicate an identification token that allows the system to determine the context of the email. When a user replies to a system-sent email, the token can be sent back together with the reply content. Once the system receives an email, the system can identify the token to determine the context of the email (e.g., the intended discussion channels, the corresponding action in the workflow, particular task or step, and so on). Depending on the context of the email, certain actions can be automatically performed by the system, e.g., import the email content to a discussion channel, or upload an attachment to a document sharing channel. In this way, users can interact with the system via emails.

The goal optimization system 100 can optionally analyze and/or parse documents received from users, and can present summary information describing the documents. For instance, and as will be described in more detail below with FIGS. 16A-G, 17A-17O, and 18, the system 100 can utilize ontologies to indicate particular terms (e.g., negotiated terms) and associated values of the particular terms. The system 100 can present information summarizing large complex documents (e.g., contracts), such that important features of the documents can be quickly presented in user interfaces 116 to users. As an example, the system 100 can analyze multitudes of contracts, and based on machine learning techniques (e.g., the system 100 can process a training set of contracts and terms identified in the set of contracts, and can generate rules associated with identifying portions of contracts that include terms) can parse received contracts and rapidly obtain terms. Optionally, the system 100 can store ontology information indicating synonyms for terms, textual language that is associated with each term (e.g., a relevant portion of a contract that identifies a particular term may be a full paragraph long, a portion of a paragraph, and so on), and so on. In this way, the system 100 can identify terms in a contract (e.g., negotiated terms, for instance as described below with respect to FIGS. 8 and 9A-9H), and present summary information to the user indicating values of the terms, and/or present portions of the contract that include the identified terms.

Figure 2C:
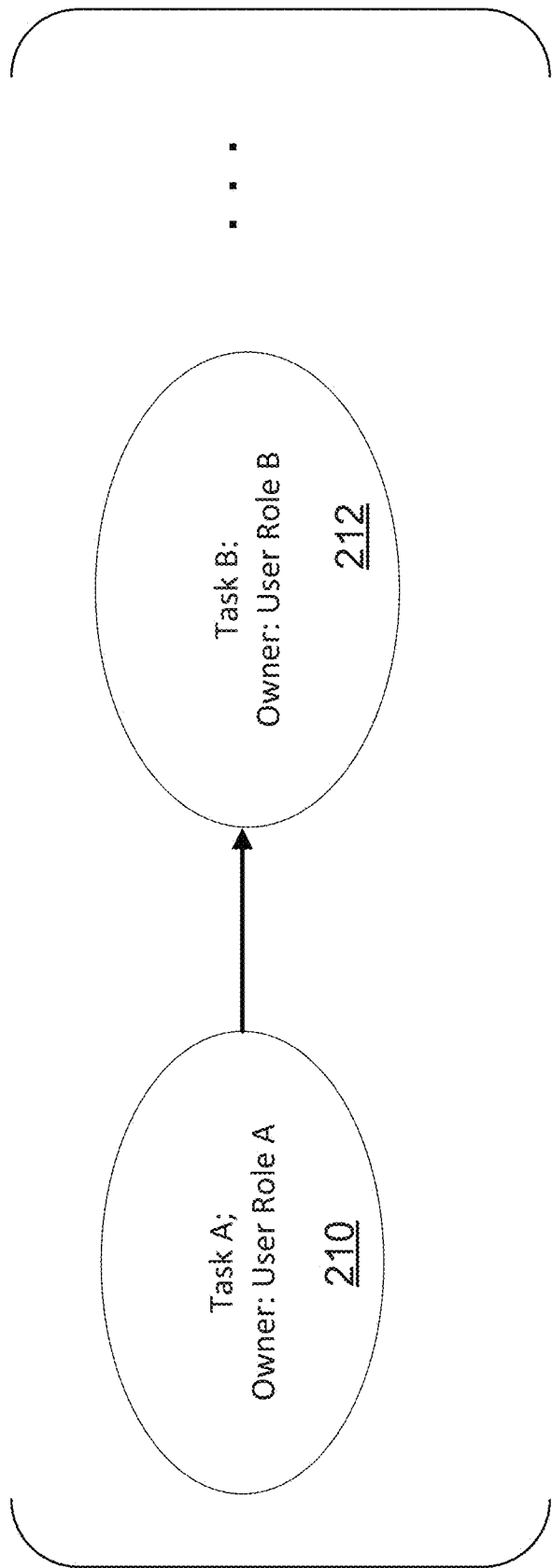
FIG. 2C illustrates example tasks identified in an example graph associated with an electronic goal, according to various embodiments of the present disclosure.

FIG. 2C illustrates example tasks (e.g., Task A 210 and Task B 212) identified in an example graph (e.g., directed graph) associated with an electronic goal. As described above, the goal optimization system 100 can monitor progression through a graph associated with an electronic goal, with an example graph described above and illustrated in FIG. 1. The graph can include nodes associated with tasks, with the nodes connected via edges to one or more other nodes. Each node can assigned to a particular user, or particular user role, and the assigned user, or any user of the assigned user role, can cause completion of an associated task. For instance, a task can be associated obtaining a fully executed version of a document (e.g., contract), and a particular user role (e.g., attorney) can be assigned the task. The attorney can cause completion of the task upon providing a fully executed document (e.g., the document can include signatures from executives, board members, and so on) for storage in the system 100.

As described above, the system 100 can assign a task, for instance Task A 210, to a particular user role (e.g., User Role A) based on information associated with an electronic graph that includes Task A 210. That is, the system 100 can access information indicating assignments of user roles to specific tasks includes an electronic graph, and upon completion of a prior task, the system 100 can assign a subsequent task (e.g., Task A 210) to a particular user role. The assignment information can be generated, or specified, by users of the system 100, for instance using the system 100 the users can create an electronic goal, specify nodes to include in an associated electronic graph (e.g., the users can indicate particular tasks to be completed), and further specify assignments of tasks to particular user roles. As an example, the system 100 can optionally present user interfaces that include functionality for creating tasks (e.g., a user of the system 100 can manipulate user interface elements, such as ovals, circles, and so on, and connect them together to form an electronic graph), defining actions that cause completion of the created tasks (e.g., the user can indicate particular conditions that must be satisfied before a task is to be completed, such as uploading documents, confirming terms, sharing documents with other users or user roles, and so on), optionally defining constraints on user actions of user roles not assigned each created task (e.g., the user can indicate that for a task assigned to counsel, other users may not be able to upload documents, created revisions of documents, and so on). In this way, when traversing through an electronic graph, the system 100 can access information indicating assignments of each traversed node (e.g., assignment of associated tasks) to a particular user role.

As illustrated in FIG. 2C, Task A 210 is assigned User Role A (e.g., User Role A is specified as an owner of Task A). That is, User Role A (e.g., any user assigned User Role A) can cause completion of Task A 210 based upon performance of particular user actions. As will be described below, with reference to at least FIG. 12B, a user assigned User Role A can request that the system 100 present information identifying one or more of, (1) a description of Task A 210, (2) a task owner (e.g., the system 100 can indicate that the user is the owner), (3) user actions that can cause completion of Task A, (4) a location of Task A 210 with respect to an electronic graph (e.g., a step in which Task A 210 is located, a graphical depiction of the electronic graph, such as a depiction hat can be zoomed into and from which the user can view detailed information describing each task), optionally other information including an amount of time the user has spent on the task. In this way, a user assigned User Role A can easily ascertain that they have been assigned Task A, and what particular user actions are required of them to cause completion of Task A.

Upon completion of Task A, the system 100 can identify an edge connecting Task A 210 (e.g., a node associated with Task A) and Task B 212 (e.g., a node associated with Task B). Optionally, there may be more than one edge such that a task different from Task B 212 may also be a potential next task to be completed. As described above, optionally the system 100 can determine which edge to follow based on particular user actions performed during Task A 210. For example, to complete Task A 210, a user assigned User Role A may have to ultimately upload a particular document, however prior to uploading the particular document, the user may have one or more optional user actions. For instance, the user may select a format associated with the particular document, may include particular terms in the particular document, may perform a user action that requires an intermediary task to be performed prior to Task B 212 being assigned (e.g., a particular user role may have to approve inclusion of certain terms, and so on). In this way, the system 100 can traverse from Task A 210 via a particular edge based on the user actions performed. Optionally, information associated with each edge (e.g., maintained in a graph database structure as described above) can indicate conditions for the system 100 to traverse the edge to a subsequent node (e.g., Task B 212).

As illustrated in FIG. 2C, Task B 212 is assigned to a user of User Role B, and upon the assignment, optionally the user can receive a notification indicating the assignment, view user interfaces generated, at least in part, by the system 100 that indicate the assignment along with a description of Task B 212, any required user actions associated with its completion, and so on. The assignment of Task B 212 to User Role B can be determined, as described above, based on maintained information associated with the electronic graph.

Additionally, the assignment of Task B 212 to User Role B can be based, at least in part, on user actions that were previously performed. For example, Task A 210 may have been a task associated with determining terms associated with contract. Depending on the precise terms determined, a different user role may be assigned Task B 212. For instance, the terms may generally be associated with intellectual property concerns, and the system 100 can determine that Task B 212 is to be assigned to an intellectual property counsel role. In contrast, the terms may generally be associated with corporate issues, and the system 100 can determine that Task B 212 is to be assigned to a corporate counsel role. The system 100 can analyze, or obtain information indicating, the determined terms, and assign Task B 212 to a user role that is most (e.g., commonly) associated with the terms.

Optionally, certain tasks may be assignable to more than one user role, and the system 100 can cause the assignment of Task B 212 to a single user role (e.g., the system 100 can select the user role from a multitude of user roles) or assignment of Task B 212 to two or more user roles (e.g., users of either user role can cause completion of the Task B 212). For example, certain tasks, such as obtaining signatures from a multitude of other users, can be assignable to multiple user roles (e.g., counsel, secretary, and so on). The system 100 can access information indicating the multiple assignment, and can select either a counsel (e.g., attorney) or secretary to be assigned Task B 212, or can allow users of either user role to be assigned. Additionally, when selecting a single user role to be assigned Task B 212, the system 100 can obtain information indicating response times, completion times, and other information relevant to a rapidity with which users of a particular user role complete tasks. The system 100 can prefer assignment of Task B 212 to a user role that completes tasks faster. Optionally, the system 100 can access information indicating a frequency with which users of each user role confer with other users, how close in proximity they are, and so on, such that users of a particular user role might be more apt to perform the task (e.g., obtain signatures from other users).

As will be described below, for instance with respect to FIG. 6, the system 100 can, in general, monitor statistical information associated with electronic goals, such as timeliness of particular users (e.g., how quickly each user completes tasks, completes actions assigned to them, and so on). Utilizing the statistical information, the system 100 can indicate users that are moving electronic goals forward, and if there is an option to select multiple users to be assigned a task, the system can prefer 100 assignment of a timely user. For example, as illustrated in FIG. 2C, Task B 212 has been assigned to User Role B. The system 100 can access information identifying users assigned User Role B (e.g., as described above, with respect to FIG. 2A users can be assigned a user role upon creation of their user accounts) and can select a particular user assigned User Role B based on the statistical information. That is, the system can designate a particular user (e.g., 'Jane Doe') be assigned completion of Task B 212, and only the particular user can complete Task B (e.g., other users assigned User Role B may be able to perform user actions for which other user roles are constrained, however only Jane Doe may be able to cause completion of Task B 212).

Figure 2D:
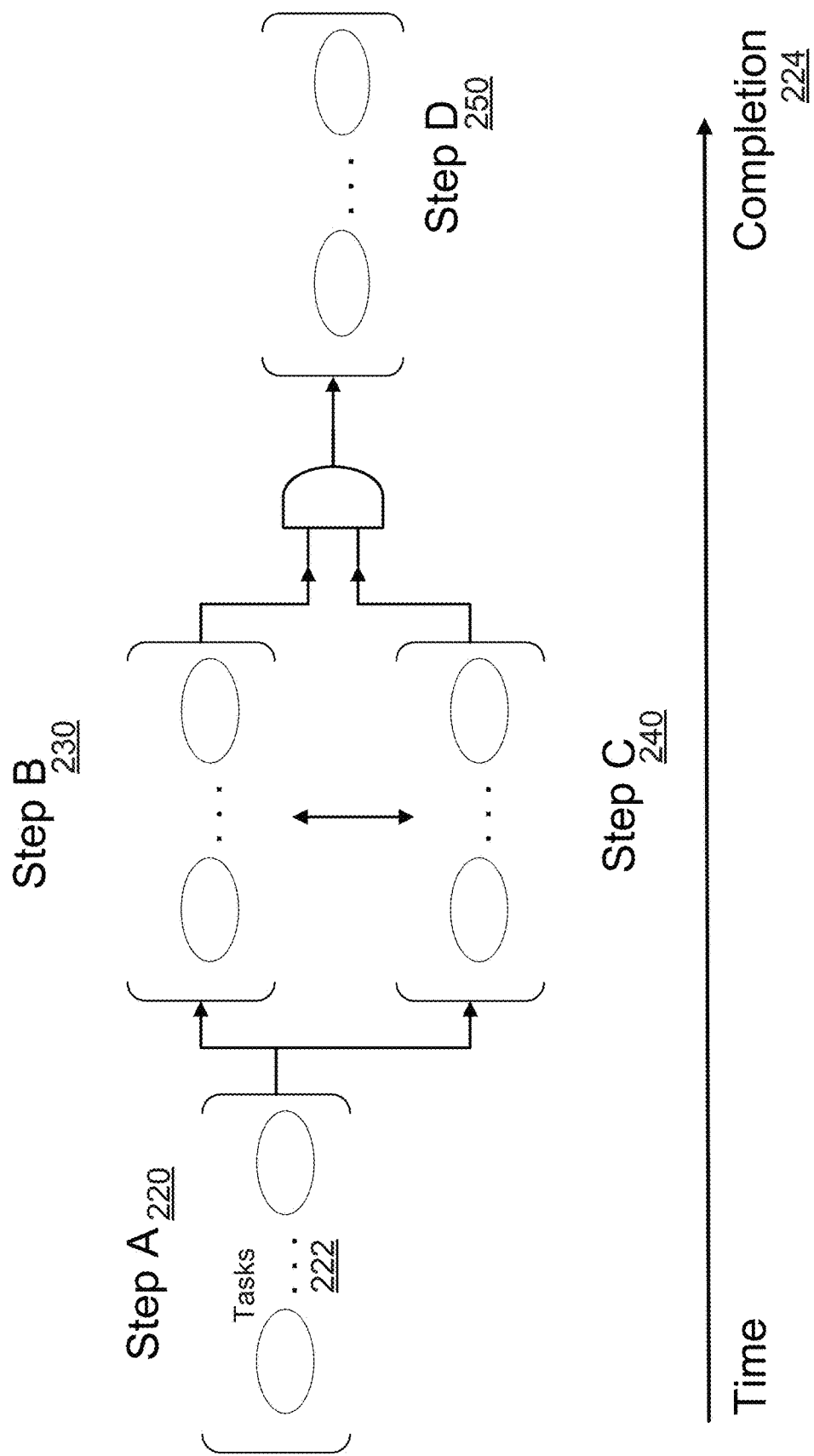
FIG. 2D illustrates tasks separated into example steps, according to various embodiments of the present disclosure.

FIG. 2D illustrates tasks separated into example steps (e.g., Step A-Step D 220-250), which can result in completion 224 of an electronic goal. As described above, a graph (e.g., a directed graph) can be associated with completion of an electronic goal, and optionally the graph can include nodes (e.g., associated with tasks) that are grouped into particular steps. That is, a step can represent a group of nodes, such that discrete steps associated with the electronic goal can be maintained. As will be described below, with reference to FIG. 12B, the system 100 can present information indicating a particular step users are on. Since a particular task may not be readily identifiable to all users, the system 100 can present a description of a step for better ease of understanding, and optionally a graphical depiction of the electronic graph for example as illustrated in FIG. 2D (e.g., tasks grouped in steps, optionally a present step can be highlighted or otherwise identified).

As illustrated, Step A 220 of the graph can be an initial step, and the initial step can include a multitude of tasks 222. Upon completion of Step A, either Step B 230 or Step C 240 can be traversed to, and as will be described below with respect to FIG. 9G, a particular user can indicate which step is to be next completed. That is, upon completion of a final node grouped into Step A 220, the system can 100 can identify two edges connecting the final node to initial nodes of Step B 230 and Step C 240. The system 100 can then traverse one of the edges based on, as described above, a user selection of a next step.

Optionally, the system 100 can enable a subset of users to be assigned tasks within Step B 230, and a different subset to be assigned tasks within Step C 240. That is, if the tasks in Step B 230 are independent from the tasks in Step C 240, then the system 100 can optionally allow the tasks to be performed at a same time. The system can optionally ensure that a same user isn't assigned a task from both Step B 230 and Step C 240 (e.g., such that the same user can focus on one step), or optionally the system 100 can allow assignments from each step (e.g., a particular user, such as a supervisory user, can specify whether this is to be allowed).

Based on a selection of a particular step, for instance Step B 230, the system 100 can optionally constrain user actions associated with Step C 240. That is, the system 100 can grey out user interface elements (e.g., as will be described below with respect to FIG. 3B) associated with Step C 240. For instance, Step B 230 can be associated with performing a due diligence process (e.g., as described below, with respect to FIGS. 10 and 11A-11B), and Step C 240 can be associated with performing a core financing process (e.g., as described below, with respect to FIGS. 12A-12D), and upon selection of Step B 230, the system can limit user actions associated with core financing, such as access to user interfaces describing the core financing processing, reviewing core financing documents, and so on.

As illustrated, Step D 250 requires completion of both Step B 230 and Step C 240, for instance an edge associated with an initial task grouped in Step D 250 can specify conditions, and the conditions can indicate that both (1) Step B 230, and (2) Step C 240, has been completed. In this way, steps can be logically separated, and accessed based on conditions, ensuring that users begin particular steps at appropriate times.

In various implementations, by utilizing an electronic graph (as described herein), the system may advantageously represent and enforce workflows and dependencies. For example, a typical process cycle of a task involving a legal document may include iterative creation by legal drafters, a review process by executives, the distribution to various parties for signing, and the collection of signatures. It may be undesirable to skip steps during this process; for example, it might be desirable to prevent non-reviewed documents from being distributed for signing. Advantageously, by using an electronic graph (e.g., as described herein in reference to various figures), the various permissible transitions may be represented as links, and the non-permissible as an absence of links. Thus, the system may be able to easily represent complex workflows involving multiple tasks, parties, and participants. Various tasks may be aggregated or combined, for example by providing means for batch signing, batch sharing or batch downloading related to tasks.

In various implementations, certain aspects, e.g., documents, may be associated with their own flows or graphs. As mentioned above, such flows or graphs may enable an efficient negotiation that moves the aspect from drafting internally and sharing, to counterparties in iterative cycles. Advantageously, once an iteration finalizes (e.g., through ready-to-sign, sign, and exchange states), in some implementations the flow can be reversed, providing optimal flexibility around negotiation.

Further, in some implementations the system also includes flows or graphs including batch processing of documents for download/upload/sharing/etc. In some implementations, these flows or graphs may be further integrated with editing/redlining and parsing of legal terms (e.g., as described herein).

FIG. 2E illustrates various graphs or graph-like relationships (which may comprise data structures or databases), and various structures that may be used to represent them. Graph 262 is an example of an undirected graph, wherein the numbered fields 0-9 comprise nodes and the lines connecting the nodes represent relationships. Clusters 268 shows example clusters, which may be considered as a set of graphs which may be disjoint. Data structure 266 represents an adjacency list which may be used to represent a graph or cluster, such as graph 262 or cluster 268. Advantageously, adjacency lists, such as data structure 266, allow storing of graphs in memory efficiently, particularly where the graphs are lightly-connected graphs or clusters (e.g., graphs or clusters wherein the number of nodes is high compared to the number of linkages per node). Adjacency lists 266 may also allow for efficient adding and removal of nodes, e.g., as an operation in constant time, as entries related to nodes that are not connected to the added or removed nodes may not need to be accessed. Data structure 264 is an adjacency matrix, which may also be used to represent a graph or cluster, such as graph 262 or cluster 268. Advantageously, adjacency matrices such as data structure 264 may allow for more efficient storage and processing of highly-connected graphs or clusters, e.g., where the number of connections per node is comparable to the number of nodes. Adjacency matrices such as data structure 264 may also allow for more efficient access and processing, particularly vectorized access and processing (e.g., using specialized hardware or processor instructions for matrix math), to the graph or cluster data because each matrix row corresponding to a node may have the same size irrespective of the number of linkages by node. As described here, various data items may be stored, processed, analyzed, etc. via graph-related data structures, which may provide various storage and processing efficiency advantages described. For example, as shown in FIG. 2E, advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use Optimal amount of computer memory, etc.

Figure 3A:
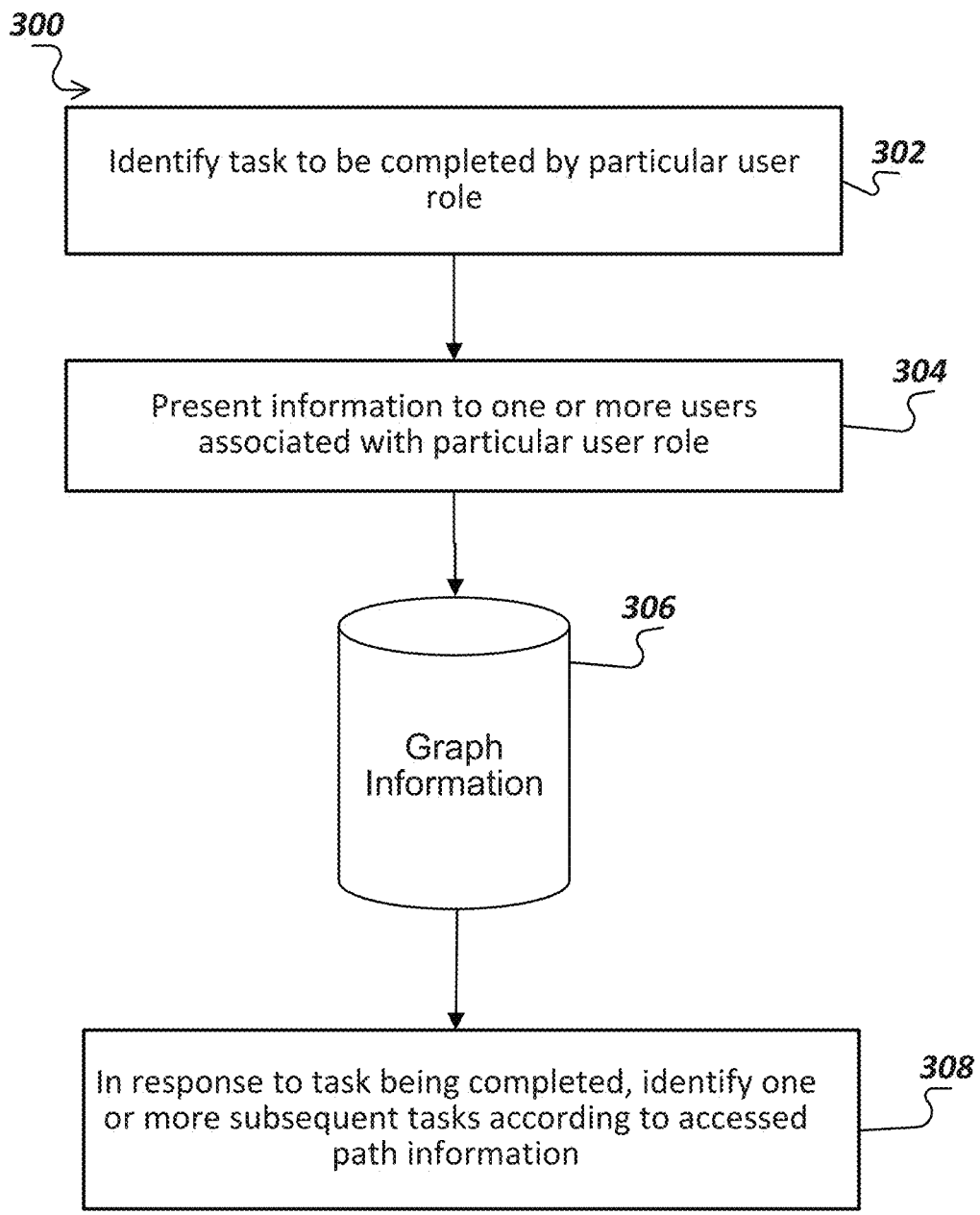
FIG. 3A is a flowchart of an example process of traversing an electronic graph associated with a goal, according to various embodiments of the present disclosure.

FIG. 3A is a flowchart of an example process 300 of traversing an electronic graph associated with a goal. For convenience, the process 300 will be described as being performed by a system of one or more computers (e.g., the goal optimization system 100).

The system identifies a task to be completed by a particular user role (block 302). As described above, the system can access a graph associated with completion of an electronic goal. Users involved in the electronic goal and create user accounts with the system, or optionally as described above can perform actions, complete tasks (e.g., as described above, a task can require performance of one or more actions), and so on, without creating user accounts, and the users can be assigned tasks for completion. In this way, daylight into complex electronic goals can be established, and users can always be aware of who is assigned a present task and what actions the present task entails (e.g., an example user interface illustrating this daylight is described below, with reference to FIG. 12B.) Therefore, the system can identify a present task and a particular user role that is assigned completion of the task.

The system presents information to users associated with the particular user role (block 304). Upon identification of a present task (e.g., as described above, the system can access a graph, and based on traversing edges, can arrive at the present task), the system can present information to users assigned the particular user role the assignment of the identified task.

The system accesses graph information 306, and in response to completion of the present task, identifies one or more subsequent tasks based on the graph information (block 308). The system determines completion of the present task based on actions associated with the present task being performed. As described above, the system traverses the graph and identifies subsequent tasks connected via edges to the present task. The system can determine a particular subsequent task to be assigned based on, for example, user actions performed during the present task. That is, the system can access the graph information (e.g., database 306), and determines whether conditions associated with edges to the subsequent task are satisfied (e.g., a first edge may indicate a condition associated with uploading a particular document, while a second edge may indication a condition associated with uploading a different document).

Figure 3B:
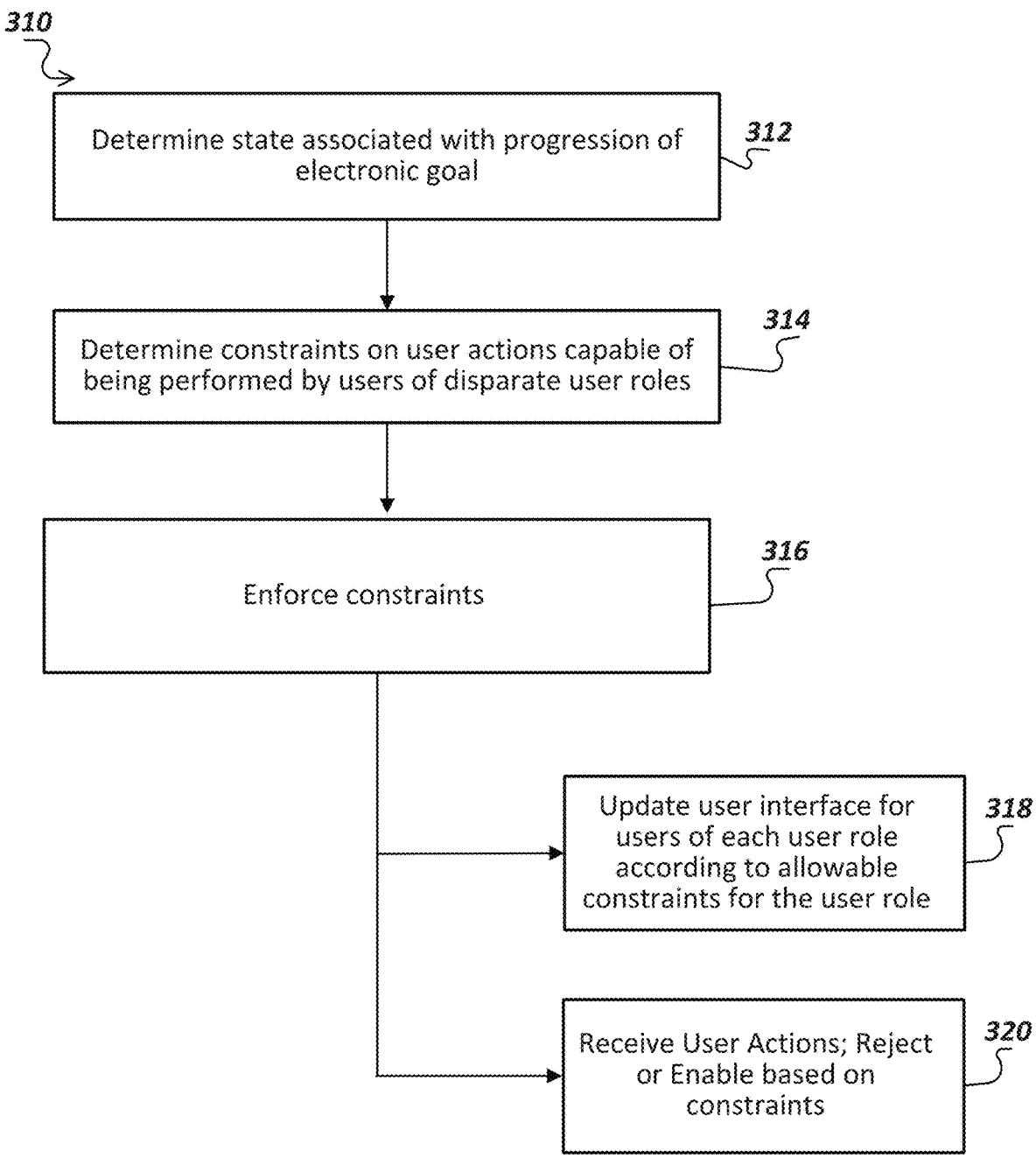
FIG. 3B is a flowchart of an example process for constraining user actions according to user role, according to various embodiments of the present disclosure.

FIG. 3B is a flowchart of an example process 310 for constraining user actions according to user role. For convenience, the process 310 will be described as being performed by a system of one or more computers (e.g., the goal optimization system 100).

As described above, users of the system can interact with the system via user interfaces presented on user devices (e.g., laptops, computers, tablets, mobile devices, wearable devices), with the user devices enabling the users to perform user actions, such as communicating with other users, uploading documents, reviewing documents or other information, generating revisions of documents or other information, electronically executing documents (e.g., described below, with respect to FIGS. 14C, 14J-14P, 20, 21, 22A-22D, and 23A-23H).

The system can enforce constraints on user actions that can be performed based on a state associated with progression of the goal, with the state indicating at least a present task that is assigned and optionally a particular user role associated with the present task. Similar to a role-based security model, in which permissions (e.g., access rights to files, network devices, and so on) can be defined on a role basis, and users assigned particular users, the system can enforce constraints on user actions available for to users based on (1) a present state, and (2) a type of user role of each user. In this way, users can be guided towards completion of a present task, for instance the system can constrain user assigned user roles not relevant to the present task while limiting user actions of users assigned to the present task to user actions relevant to completing the present task. This gentle nudging of users, via constraints on user actions, can enable users to have clear insights into the sorts of actions that are appropriate based on a present state associated with completion of the goal. Furthermore, through a role-based security model, the system can limit an extent to which user roles not relevant to a present task can interfere with progression of the goal. For example, if a present task is associated with determining and uploading (e.g., for negotiation) a term sheet, the system can allow counsel (e.g., attorneys) to upload term sheets (e.g., revisions of term sheets), while constraining other user roles to upload term sheets. In this way, the other user roles can review and approve (e.g., sign) the uploaded term sheet, and/or can provide feedback to counsel regarding specifics of the term sheets which the counsel can implement (e.g., upload a new revision of the term sheet).

The system determines a state associated with progression of electronic goal (block 302). As described above, the system can access graph information, and identify a present task assigned for completion. The determined state can indicate the present task, a particular user or user role assigned the present task, and so on.

The system determines constraints on user actions capable of being performed by users of disparate user roles (block 314). The system can store information indicating user actions that can be performed by (1) users of a user role assigned the present task, and (2) users of user roles not assigned the present task. As an example, the graph information (e.g., as described above, with respect to FIGS. 1 and 2A-2E) can indicate constraints on user actions (e.g., a subset of a total amount of user actions), or specific user actions that are capable of being performed by each user role. Since certain user roles, while not assigned a present task, may have relevance to completion of the present task, these certain user roles can be allowed to perform specific user actions. For example, a present task can be the preparation and uploading of documents, and can be assigned to counsel (e.g., in-house attorneys), with the documents requiring signatures of executives or board members. Therefore, the executives or board members may be capable of viewing the uploaded documents, commenting on the uploaded documents, optionally redlining the uploaded documents, but not be allowed to themselves upload a new version of the documents. Additionally, for a task associated with obtaining signatures of executives or board members, the task may similarly be assigned to counsel, while the executives or board members may be constrained to (1) review the documents, (2) electronically execute the documents, and/or (3) make comments (e.g., a chatroom may be provided).

The system enforces constraints (block 316), which can optionally include updating user interfaces for each user role according to allowable constraints for the user role (block 318). The system can cause user interfaces presented on user devices to be updated in accordance with user actions a user of the user interface is capable of performing. For example, the system can generate content items (e.g., web pages) for presentation on user devices, and the content item can be tailored (e.g., modified from a base) depending on the determined state and determined constraints (e.g., as described above). Similarly, for an application (e.g., electronic application downloaded from an application store) executing on each user's user device, the system can provide information to the application indicating the constraints, and the application can enforce the constraints (e.g., cause portions of a user interface to be hidden, greyed out, and soon).

Similarly, the system can enforce constraints via rejecting or enabling user actions based on the determined constraints (block 320). For instance, the system can receive user actions via user interfaces presented don user devices, for instance a web application executing on the user devices, and can reject (e.g., in substantially real-time) received user actions based on determined constraints. As described above, users can optionally interact with the system via email, or other notifications, for instance users can provide an email that indicates or specifies (e.g., via a unique identifier) a particular task, along with user actions to be performed. Example user interactions can include the user specifying that a particular action has been performed (e.g., 'I spoke with Jane Doe,' 'Jane Doe signed the document', and so on), the user attaching a document to the email, the user making a comment that is to be available for viewing by other users (e.g., in a chatroom, in a workspace associated with an entity or same user role as the user). The system can enable or reject user actions indicated in notifications to be performed based on constraints associated with a person sending the notification. For instance, if the person has an associated user account, the system can access information identifying a user role assignment, and based on the determined constraints, reject or enable user actions. However, if the person does not have a user account (e.g., the person was contacted via a user to perform a particular action, as described above), the system can determine a user role that would be assigned to the person. For example, if the person was contacted by a user to perform a particular action, the system can determine a user role associated with person based on the particular action and optionally the determined state.

Figure 4:
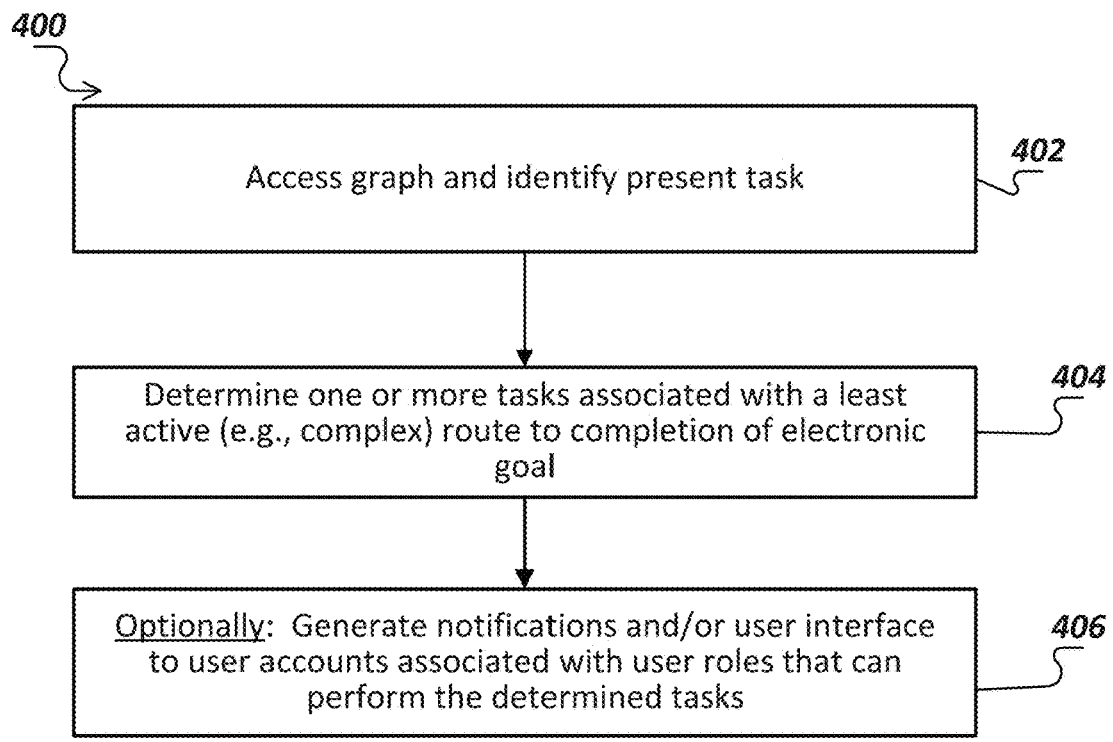
FIG. 4 is a flowchart of an example process for determining a path through an electronic graph associated with a goal, according to various embodiments of the present disclosure 1.

FIG. 4 is a flowchart of an example process 400 for determining a path through an electronic graph associated with a goal. For convenience, the process 400 will be described as being performed by a system of one or more computers (e.g., the goal optimization system 100).

As described above, the system can utilize graph information to inform a recommendation of a path through the graph, with the path indicating particular nodes connected via edges to subsequent nodes. Optionally, the graph can include unique paths from one or more initial nodes (e.g., a starting task associated with completion of the electronic goal) to one or more nodes associated with completion of the electronic goal. For instance, the graph can allow users to traverse the graph in a preferred way (e.g., a preferred way, limited according to edges connecting nodes), and arrive at completion of the electronic goal.

The system can determine a path (e.g., for recommendation to users, such as through a graphical depiction of the determined path, remaining tasks associated with nodes in the determined path, and so on) through the graph, with the path indicated as being a least active route. A least active route can represent a least complex route, such as a route that includes a least quantity of remaining nodes, a route that includes a least measure of central tendency of remaining nodes for each user role (e.g., this route may include a greater quantity of remaining nodes than the least quantity, but may be more easily spread across users lessening an overall burden on the users).

The system accesses graph information, and identifies a present task (block 402). As described above, for instance with respect to FIGS. 1, 2A-2E, and 3A, the system can maintain and access graph information indicating tasks associated with completion of an electronic goal. The system can identify a present task, for instance a present task assigned to a user role, or optionally one or more present tasks assigned to different user roles (e.g., the system can access a graph associated with each user role).

The system determines tasks associated with a least active route to completion of the electronic goal (block 404). The system can determine a path of remaining nodes (e.g., nodes subsequent to a node associated with a present task) that results in a least active route to completion of the electronic goal. The system can optionally receive a request for a least active route from users (e.g., a user associated with a particular user role can request an identification of the path, or an identification of a subsequent task to perform, which can optionally be a path associated with all user roles, or a path associated with tasks assigned to the particular user role), and can determine the least active route in response. As an example, a user interface (e.g., the user interfaces described herein) can include a selectable object associated with the request, and a user can interact with the selectable object to provide the request to the system.

To determine the path, the system can, as described above, identify a path that includes a least quantity of remaining nodes or a least average (e.g., mean, median) quantity for each, or particular (e.g., user selectable, identifiable), user role. Additionally, the system can analyze the actions associated with tasks, and determine a path associated with a least average complexity of tasks, tasks that are expected to take a least amount of time, and so on. Optionally, the system can access information indicating an amount of time tasks are expected to take (e.g., negotiating a document may take longer than uploading a document for signature). The information can optionally be based on historical information for the present electronic goal, for instance the system can monitor times that each action have taken (e.g., average times), and can utilize the monitored times to inform a determination of the path.

The system optionally generates notifications and/or user interfaces to particular users associated with remaining tasks (block 406). Upon determination of the path, the system can present information to particular users, such as a requesting user, to all users that are to be assigned tasks in the path, all users that are to be assigned tasks within a threshold number of nodes (e.g., the system can provide information to users that are to be assigned tasks within the next threshold number of tasks) or within a number of nodes expected to be completed in a threshold time period, and so on.

The system can monitor progress along the graph, and upon any deviation from the graph (e.g., users can perform additional tasks not identified in the graph), the system can determine an updated least active path through the graph. Additionally, while FIG. 4 generally describes determining a least active path through a graph, with the path indicating tasks, optionally the system can determine a path indicating steps (e.g., as described above, with respect to FIG. 2D, tasks can be grouped into steps). For instance, with respect to FIG. 2D described above, upon completing Step A 220, the system can determine a path that indicates the next step should either be Step B 230 or Step C 240. The system can utilize information described above, and further utilize historical information including whether prior users of prior electronic goals that utilized the same, or similar, graph, completed first when they followed Step A with Step B or Step C.

Figure 5:
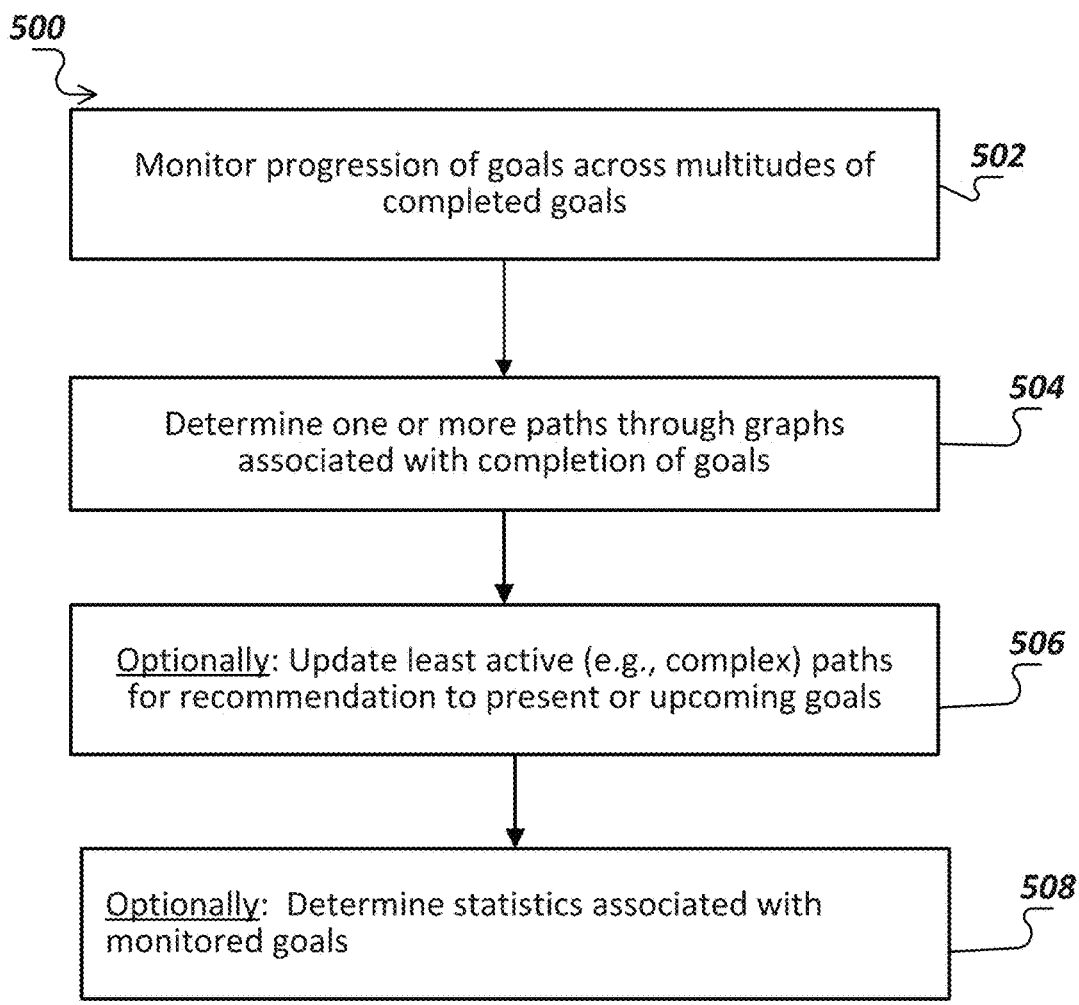
FIG. 5 is a flowchart of an example process for analyzing information associated with completions of goals, according to various embodiments of the present disclosure.

FIG. 5 is a flowchart of an example process for analyzing information associated with completions of goals. For convenience, the process 500 will be described as being performed by a system of one or more computers (e.g., the goal optimization system 100).

The system progression information associated with multitudes of electronic goals (block 502). As described above, the system can monitor progression through electronic goals (e.g., based on determined states through associated graphs), such as an amount of time each electronic goal took to complete, statistical information associated with users and user roles (e.g., times each user took to complete tasks), and so on. Additionally, the system can determine orderings of tasks that each electronic goal took, which as described above, can include a specific series of tasks through graphs associated with the electronic goal.

The system can maintain this information for the multitudes of electronic goals (e.g., for analysis), and as described, can utilize the information to determine paths (e.g., recommended paths) through graphs associated with electronic goals. For all cases in which private or sensitive information is utilized, the information can be anonymized and/or privacy restrictions can be put in place. For instance, users can be required to 'opt-in,' and private details with respect to progression of electronic goals can be removed. In this way, the system can maintain particular progression information, such as tasks that users completed, orderings of tasks, times each user took to complete tasks, and so on.

The system determines paths through graphs associated with electronic goals (block 504). As described above, with respect to FIG. 4, the system can determine least active paths (e.g., for recommendation) such that users can receive an indication of a subsequent task to perform, or additional tasks included in a least active path. As users utilize the system, the system can determine (e.g., learn) optimal (e.g., least active) paths through electronic graphs (block 506). That is, the system can monitor quantities of time that each task takes (e.g., average times), and can determine an ordering of tasks that results in an electronic goal being completed in a least amount of time (e.g., least amount of time, lowest variance from a mean, and so on).

Additionally, through monitoring progression information, the system can utilize the monitored information to inform least active paths for newly created electronic graphs. For example, as described above users can create electronic graphs that include nodes associated with tasks (e.g., the users can further indicate a direction associated with edges connected nodes). Based on similarities of tasks with prior completed electronic goals, or similarities of actions included in tasks, the system can determine a least active path through a newly created graph, and can update the least active path as users complete the associated electronic goal.

The system determines statistics associated with electronic goals (block 508). As described above, the system can monitor progression information across multitudes of electronic goals, and can determine statistics associated with electronic goals. For example, the system can determine an average time to completion of each electronic goal, an indication of a task or step (e.g., group of tasks) that takes a greatest amount of time (e.g., the system can indicate that users prepare for this task in advance), and so on. Additionally, the system can determine statistical information associated with each user, such as one or more of, (1) responsiveness of the user (e.g., how quickly the user completes tasks; how quickly the user responds to emails associated with an electronic goal, for instance as described above users can receive emails or other notifications from the system and can respond, which can cause completion of tasks, update user interfaces, and so on; how often the user accesses the system to determine a present state, for instance the system can present information identifying a current task, assignment of the current task to a user, and so on; how often the user causes notifications to be provided to owners of a current task, for instance as reminders; and so on), (2) quantities of electronic goals in which the user is included (e.g., the system can determine that particular users are utilized more often in electronic goals, indicating that the user is in high-demand, knowledgeable, and so on), (3) deviations from a least active path (e.g., the system can determine that the user deviates from the least active path, for instance through following edges that are not indicated in the least active path; the system can further determine that the user's deviations cause refinements to the determination of the least active path, indicating that the user's deviations result in lesser time to completion of an electronic goal).

Additionally statistics and analytics may include monitoring user actions, paths through graphs, time users spend moving from task to task or step to step, time users are waiting for actions from other users or parties, terms extracted from documents associated ontologies, and so on. Analytics can include detecting time associated with back and forth tasks in the graph, for example jumping between revising term sheets. Analytics can further include correlations between user roles in a graph and their time spent working on tasks, and/or correlations between terms and paths users follow in the graph. To determine one or more of the features described herein, frequent pattern analysis and/or anomaly detection methods can be utilized. Bad actors, for example users that consume too much time otherwise negatively affect progression towards a goal, can be identified by applying noise detection and canceling in the above described analysis and detection methods.

Figure 6:
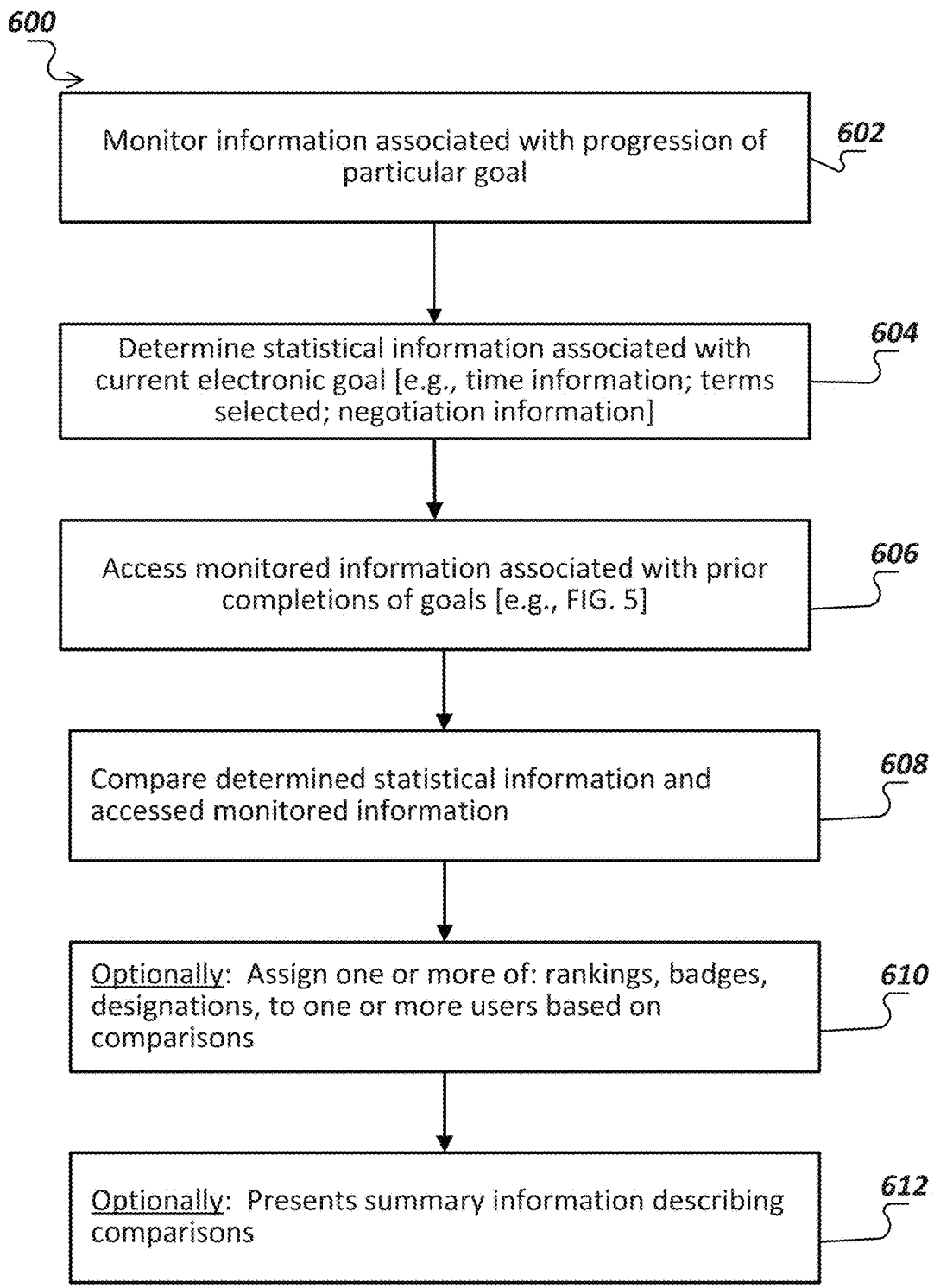
FIG. 6 is a flowchart of an example process for utilizing statistical information, according to various embodiments of the present disclosure.

FIG. 6 is a flowchart of an example process for utilizing statistical information in a current electronic goal. For convenience, the process 600 will be described as being performed by a system of one or more computers (e.g., the goal optimization system 100).

The system monitors progression information associated with multitudes of electronic goals (block 602). As described above, with respect to FIG. 5, the system can monitor electronic goals and determine information describing tasks users completed, quantities of time associated with completion of the tasks, electronic goals, details of particular tasks (e.g., indications of terms selected in documents, such as contracts, and so on).

The system determines statistical information associated with current electronic goal (block 604). As users progress through a current electronic goal, the system can monitor and determine statistical information (e.g., as described above with respect to FIG. 5). The system can then access monitored information associated with prior completed electronic goals (block 606), and compare the determined statistical information with the accessed monitored information (block 608). For example, the system can determine whether users of the current electronic goal are completed the electronic goal in a timely manner (e.g., within a threshold amount of time of prior users, for instance based on a present state associated with the current electronic goal). The system can further compare any of the statistical information described above, and as will be described below with respect to FIGS. 17A-17O and 18, the system can determine commonalities of terms included in documents (e.g., contracts), frequencies of values associated with terms, and so on. In this way, the system can present information indicating how common it is that a value for a particular contractual term is selected (e.g., a less sophistical entity, such as a company being invested in, can gain an understanding as to how common particular values of terms are when compared with multitudes of prior completed electronic goals).

The system optionally assigns rankings, badges, designations, to users based on the comparisons (block 610). The system can identify users in the current task that are performing above average, a baseline, and so on, and can assign rankings to the identified users (e.g., as incentives to continue similarly performing). For example, the system can access information identifying rankings, with the information optionally identifying conditions for each ranking. An example ranking can include a user that responds quickly to notifications, completes tasks quickly, and so on. Additionally, the system can assign rankings to particular entities (e.g., a ranking can indicate that a venture capital firm provides fair terms, for instance based on monitoring terms selected in contracts across multitudes of venture financing; a different ranking can indicate that the venture capital firm completes funding rounds quickly; and so on). These rankings can be presented in user interfaces that identify ranked users. For example, when a task is being assigned to a ranked user, a badge, logo, or other graphical depiction, can be placed adjacent to the ranked user's name or user account name. Optionally, a user viewing the badge, logo, can hold his/her mouse over the badge, logo, and a description of the badge, logo, can appear. Additionally, the user can tap on the badge, logo, and receive the description, or tap with greater than a threshold force, pressure, on a touch screen.

The system presents summary information describing the comparisons (block 612). As users of the current electronic goal progress, the system can present the comparisons (e.g., as determined in block 608), or particular comparisons, to users of the current electronic goal. The presented summary information can include a refinement user interface element, such as a filter, and users can request particular types of comparison information. For example, a user can request how timely his/her completion of tasks has been (e.g., with respect to users completing other tasks, similar tasks, and so on). Additionally, a user can request how timely progression of the current electronic goal is based on a present state associated with the current electronic goal.

Figure 7A:
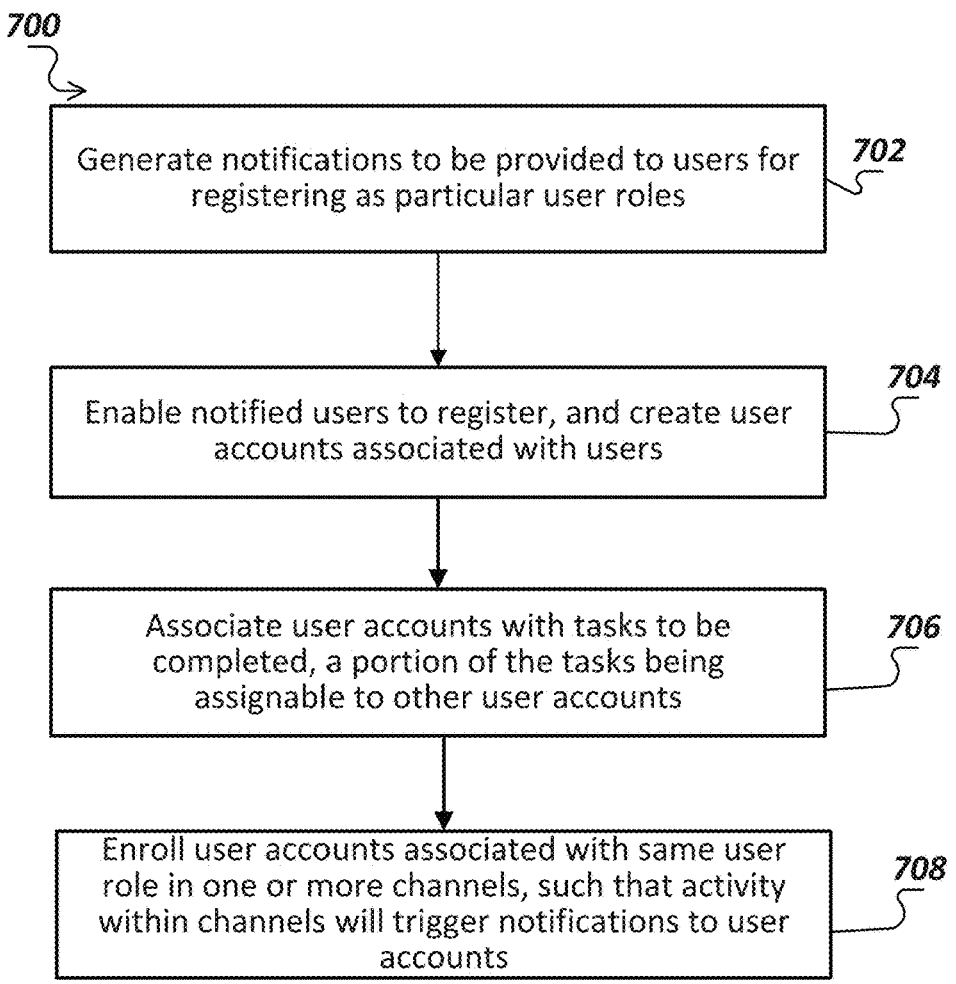
FIG. 7A is a flowchart of an example process for assigning users to user roles, according to various embodiments of the present disclosure.

FIG. 7A is a flowchart of an example process 700 for assigning users to user roles. For convenience, the process 700 will be described as being performed by a system of one or more computers (e.g., the goal optimization system 100).

The system generates notifications to be provided to users for registering as particular user roles (block 702). As described above, for instance with respect to FIG. 2A, users can create user accounts with the system, with the user accounts indicating a user role of an associated user. Furthermore, and as described above, the system can indicate required user roles for completion of electronic goals, and a user of the system can interact with one or more user interface elements to cause the system to generate a notification to be provided to a person associated with a required user role. For example, an electronic goal may require counsel (e.g., attorneys) for each entity (e.g., an attorney for a venture capital funding firm, an attorney for a company being invested in), and a user (e.g., a user associated with a same entity) can request that the system contact (e.g., email, text, activate an application executing on the contact's user device) a person requesting the person function as counsel.

The system enables notified users to register, and create user accounts, with the system (block 704). As illustrated and described below, with respect to FIGS. 9A-9C, users that received notifications can register with the system, create a user account, and so on. Additionally, and as described above, the system can enable people to perform actions, complete tasks, and so on without creating user accounts (e.g., a person can receive an email requesting a particular action, such as providing a signed copy of a document provided in the email, and the person can respond to the email with the signed copy; follow a link in the email to a secure content item, and upload the signed document via the content item).

The system associates users with tasks to be completed (block 706). As described above, the system can identify nodes associated with tasks that are to be assigned to particular user roles. The system can optionally associate each user with tasks they are to complete, and can optionally present (e.g., via user devices of the users, such as through providing information to applications executing on the user devices, updating a presented web application, content item, and so on) describing the assigned tasks. Optionally the system can assign tasks to users as the system traversed an electronic graph and reaches nodes associated with tasks.

The system enrolls users associated with same user roles in one or more channels, such that activity within channel triggers notifications to enrolled users (block 708). As will be described below, users of a same user role, and optionally associated with a same entity, can communicate utilizing a chat room, forum, and so on, with the communications being private from other users. Additionally, a same communication channel can include users of multiple roles (e.g., executives and board members may have a channel specific to them).

Example User Interfaces

FIGS. 2B, 7B-7D, 8, 9A-9G, 10, 11A-11B, 12A-12D, 13, 14A-14D, 14F-14O, 14Q1-14Q2, 14R, 15, 16D, 16F-16G, 17A-17O, 22A-22D, 23A-23H, 25A-25B, and 26A-26B illustrate methods, functionality, and example interactive user interfaces of the system. The example interactive user interfaces of the present disclosure may illustrate steps related to certain electronic goals. Each user interface is an example of an interactive user interface, which can be generated on a user device of a user, and can be presented based on hardware, software, features of the user device. For example, the user interfaces can update, or be modified, depending on whether the user device is a wearable device, laptop, computer, tablet, mobile device, and so on. The user devices can be modified in interactivity according to features of hardware of the user device, for instance while the user interfaces are presented on laptops, users can interact with the user interface via a first input method (e.g., mouse, keyboard), while the user interfaces are presented on tablets, mobile devices, touch screen laptops, users can interact with the user interfaces via a second input method (e.g., touch, speech, and so on). The input methods can cause updates to each user interface, such that user interface elements may be modified accordingly (e.g., a selectable object to perform an action on the first input method may be modified to be a slider on the second input method, and so on).

The user interfaces (e.g., illustrated in FIGS. 2B, 7B-7D, 8, 9A-9G, 10, 11A-11B, 12A-12D, 13, 14A-14D, 14F-14O, 14Q1-14Q2, 14R, 15, 16D, 16F-16G, 17A-17O, 22A-22D, 23A-23H, 25A-25B, and 26A-26B) can, as described above, be generated by user devices presenting the user interfaces, and can optionally be generated, at least in part, by the goal optimization system 100 (e.g., or a presentation system in communication with the system 100). That is, the user devices can execute applications associated with the system 100, and can present the user interfaces as generated by the applications. The user devices can then receive information from the system 100 (e.g., information associated with a current electronic goal) and can update the user interfaces with the information. Additionally, the user devices can present content items received from the system 100, which upon rendering, can depict the user interfaces. Optionally, the system 100 can, in part, control rendering or execution of the content item, for instance the user devices may receive dynamic content items (e.g., dynamic web pages), and/or the user devices may load web applications associated with the system 100.

Additionally, the particular electronic goals and user interface functionality described below are illustrative examples of use of the system 100, and other electronic goals can be similarly presented. For example, an electronic goal associated with creating a complex cloud-based network can be performed, an electronic goal associated with company merger, acquisition, an electronic goal associated with other contracts, deals, network security, and so on, can be performed.

The user interfaces can respond to user actions, or events, via one or more libraries. For example, a particular library can create a component and an observer pattern, such that the user interface can react to events. Optionally, any user action that modifies data or a state of the graph (e.g., traversal through the graph) can be performed server side (e.g., by the system, to ensure security compliance). Optionally, the client can be classified as a 'thick web client,' and it may take care of relaying events created by users to the system. In this way, the client can be quite fast as the system performs a lot of the heavy lifting, and the client can instead focus on constructing events that capture user's intentions (e.g., actions) and then relaying them back to the system. A real time updating mechanism can safely and efficiently provide updates from the system to the client, and these updates may be calculated automatically by the system to only contain pieces that have changed (e.g., a diff on old data). In this way the system can avoid re-sending data that is already at the client, and can thus save bandwidth and processing power associated with the client.

In various embodiments of the example interactive user interfaces described below in reference to the various figures, various aspects of the user interfaces may or may not be included, may appear visually different, and/or may be arranged differently.

Figure 7B:
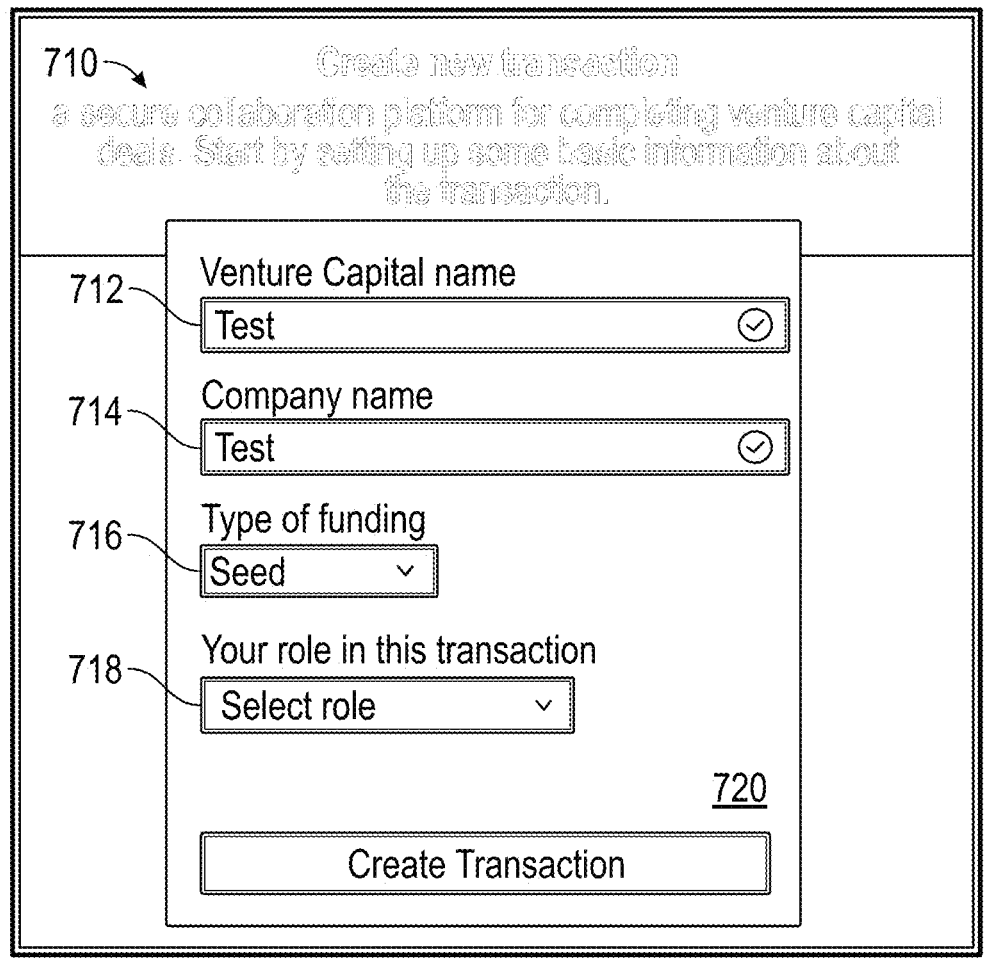
FIGS. 7B-7D illustrate example interactive user interfaces for creating an electronic goal, according to an embodiment of the present disclosure.
Figure 7C:
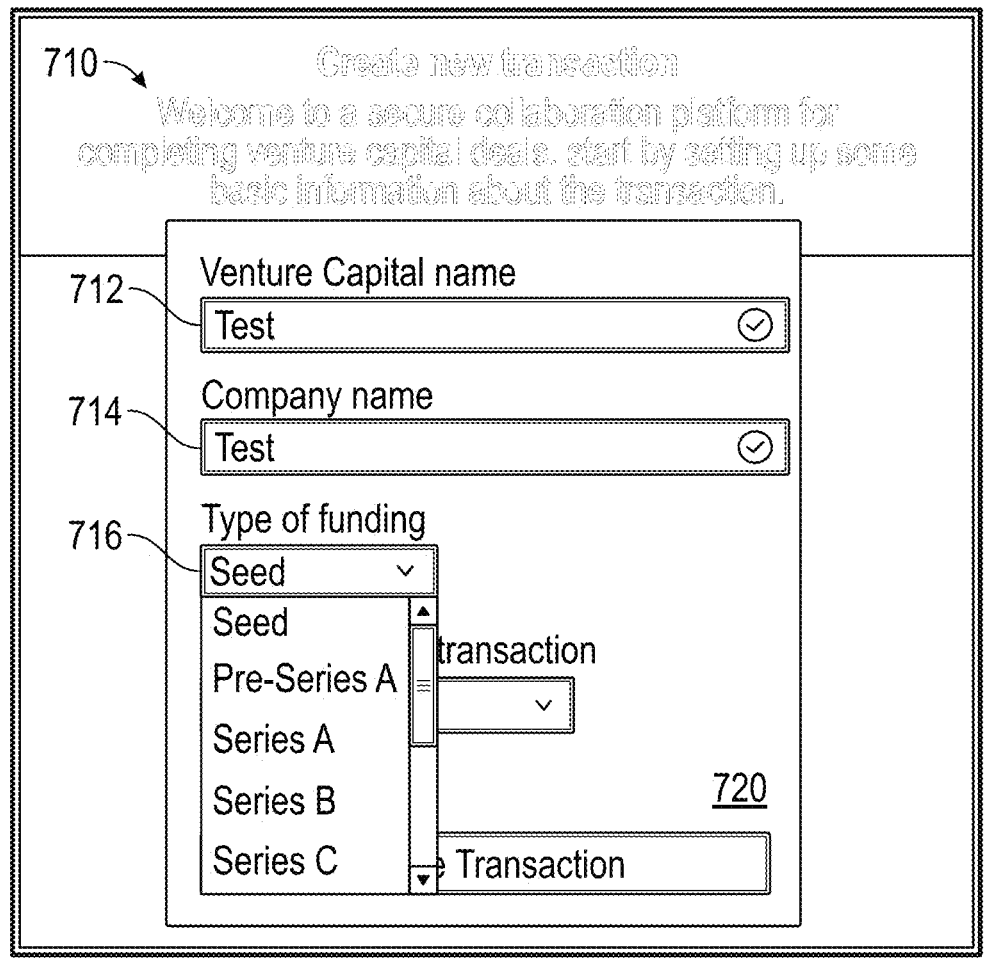
Figure 7D:
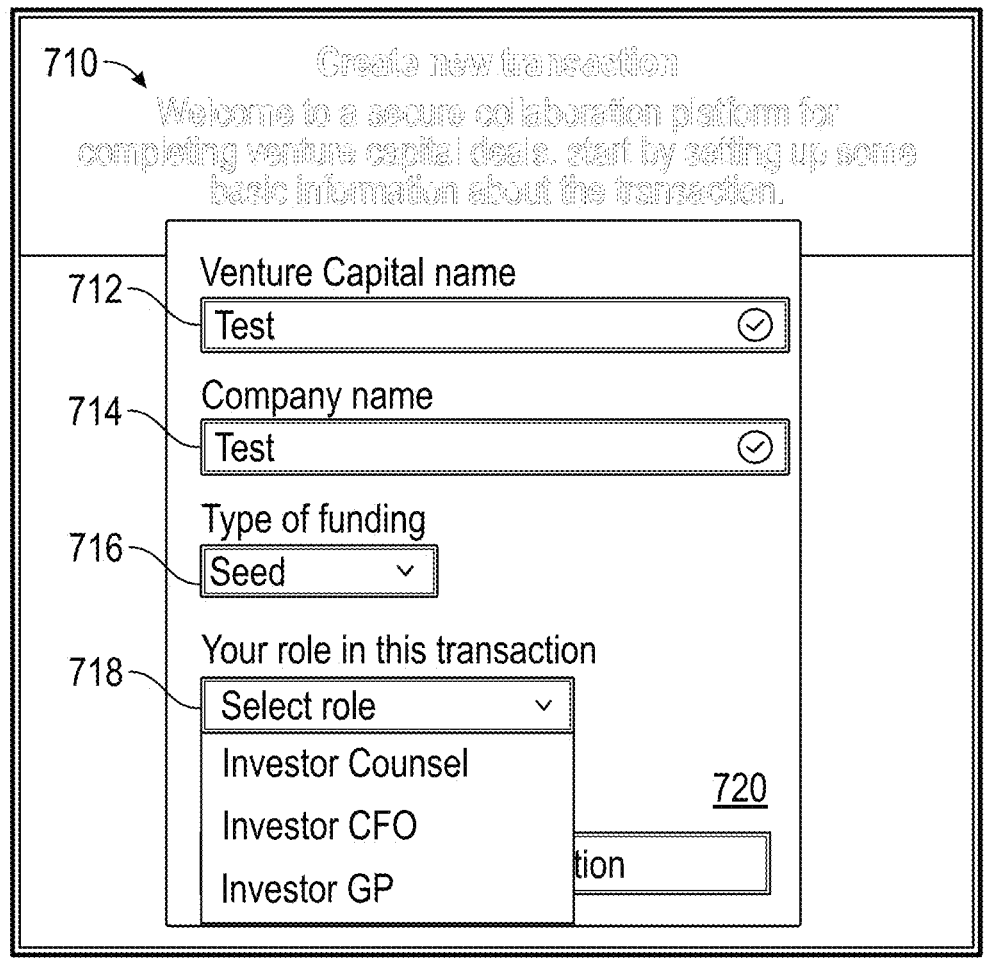

FIG. 7B illustrates an example interactive user interface 710 for creating an electronic goal. The user interface 710 includes user interface elements for assigning a name 712 to each entity included in the electronic goal, which in the example is a venture capital firm and a company 714 being invested in. The user interface 710 further includes a type of funding 712 (e.g., as illustrated in FIG. 7C, type of funding can include options such as Seed, Pre-Series A, Series A, Series B, Series C, or other options), an indication of a role of a user creating the electronic goal (e.g., as illustrated in FIG. 7D, user role can include counsel, chief financial officer, general partner, and so on). Upon interaction with user interface element 720, the electronic goal can be created, and the system 100 can maintain information indicating the electronic goal. Optionally, user interface 710 can include options to select a particular electronic goal, for instance a user of the user interface 710 can select from a list of options, provide a description of an electronic goal (e.g., type in a name, and the system 100 can match the name to a closest electronic goal, verbally describe the goal, and so on).

Figure 8:
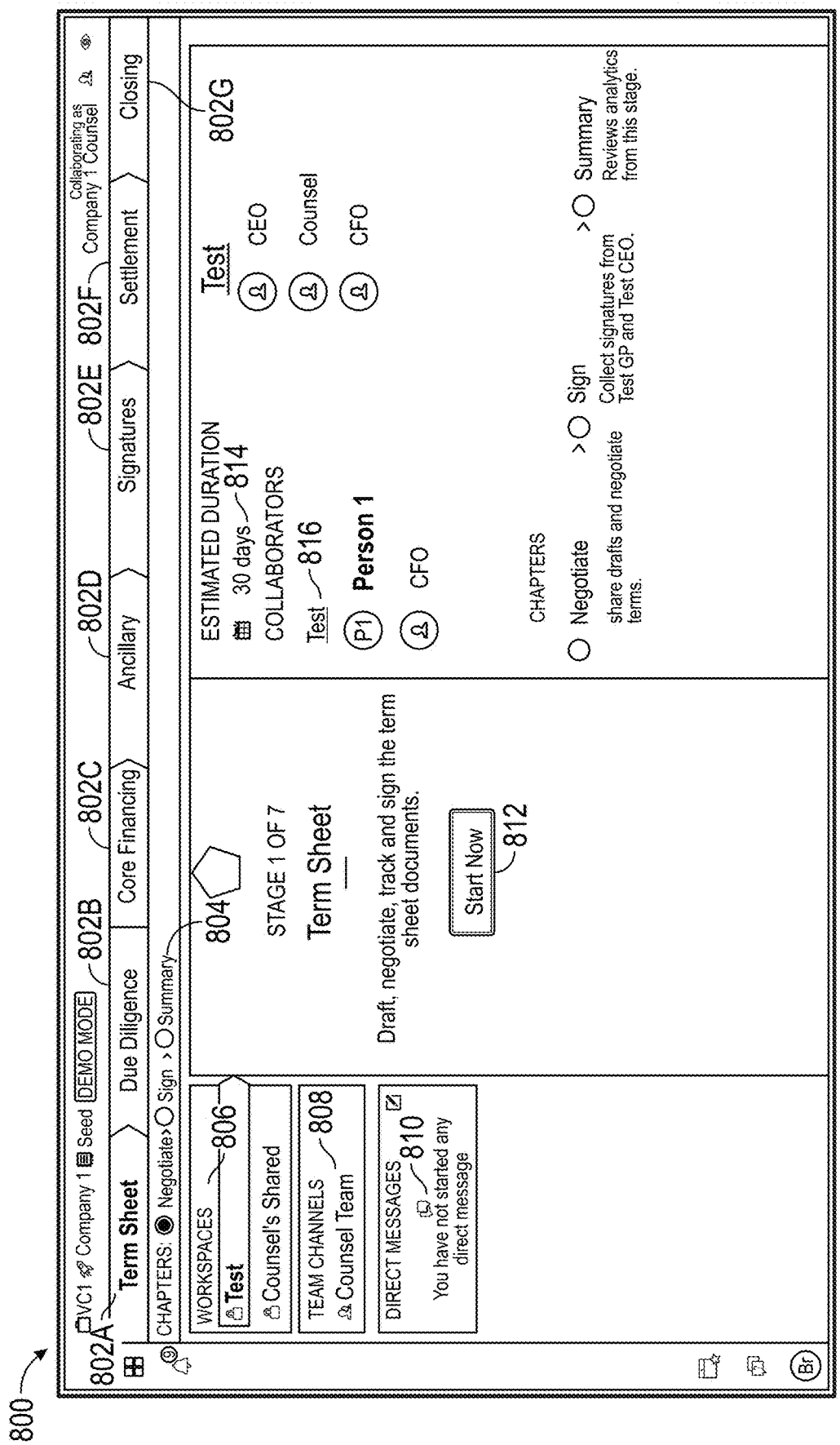
FIG. 8 is an example interactive user interface illustrating a first example step in the electronic goal, according to an embodiment of the present disclosure.

FIG. 8 is an example user interface 800 illustrating a first example step in the electronic goal. As described above, nodes in a graph associated with an electronic goal can be grouped together into steps, for instance to provide an overarching goal or theme associated with grouped nodes.

As illustrated in FIG. 8, the user interface 800 includes a first example step 802A (e.g., determining a term sheet), and further identifies remaining steps that are to be completed (e.g., 802B-802G). The user interface 800 further includes an identification of tasks 804 that are included in the first example step 802A, for instance a first task can include negotiating the term sheet, signing the term sheet, and approving a summary of the term sheet. The user interface 800 can be presented to users of a same entity, such that information can be maintained separately, and viewable separate, between entities. In this way, a venture capital firm can view user interface 800, negotiate information amongst themselves, and the company to be invested in can do similarly. As will be described, each entity can share information to the other entity in a controlled safe manner.

The user interface 800 further includes workspace information 806, such as a workspace for users of a same user role 806 (e.g., the user role can provide drafts of documents only visible to them, generate revisions of documents, amend or otherwise 'red-line' documents, compare documents—for instance as will be described below, the system can present differences in particular terms, values of terms, in easy to view formats). Additionally, the user interface 800 includes a communication channel 808, which here is directed to users of a counsel user role. Users may also direct message 810 each other, for instance to quickly provide information through the secure provided platform.

When users are ready to begin the first example step, a user can interact with user interface element 812 to begin the step (e.g., begin negotiating the term sheet). The user interface 800 includes an identification of an example amount of time 814 that the step is expected to take (e.g., based on historical information), along with required user roles 816 for the (1) electronic goal, and/or (2) completion of the first example step.

Figure 9A:
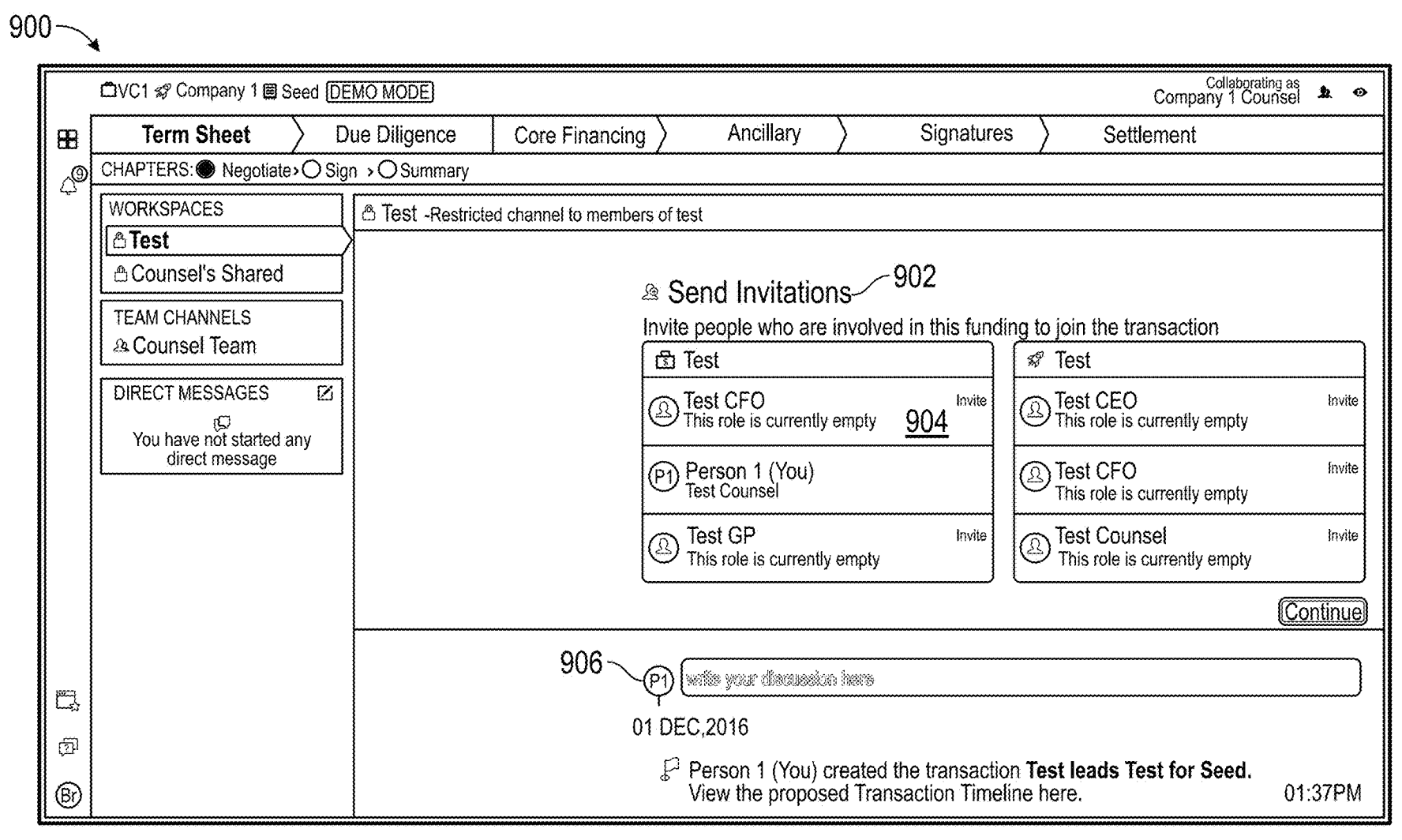

FIG. 9A is an example user interface 900 illustrating inviting users for the first example step. As described above, a user of the system 100 can request that people join an electronic goal, and can indicate an assignment of a user role for each person. As illustrated in FIG. 9, the user interface 900 indicates users that are required for completion of the first example step and/or electronic goal, and a user of the user interface 900 can notify particular people to join (e.g., send notifications 902). For example, the user can request that a person join the electronic goal as a Chief Financial Officer, and can interact with user interface element 904 to cause an invite to be provided to the person. The user interface 900 further includes a timeline 906 illustrating actions that have been performed, tasks that have been completed, assigned, and so on, in the electronic goal or with respect to the first example step. For example, the timeline indicates that the electronic goal has been created on Dec. 1, 2016.

Figure 9B:
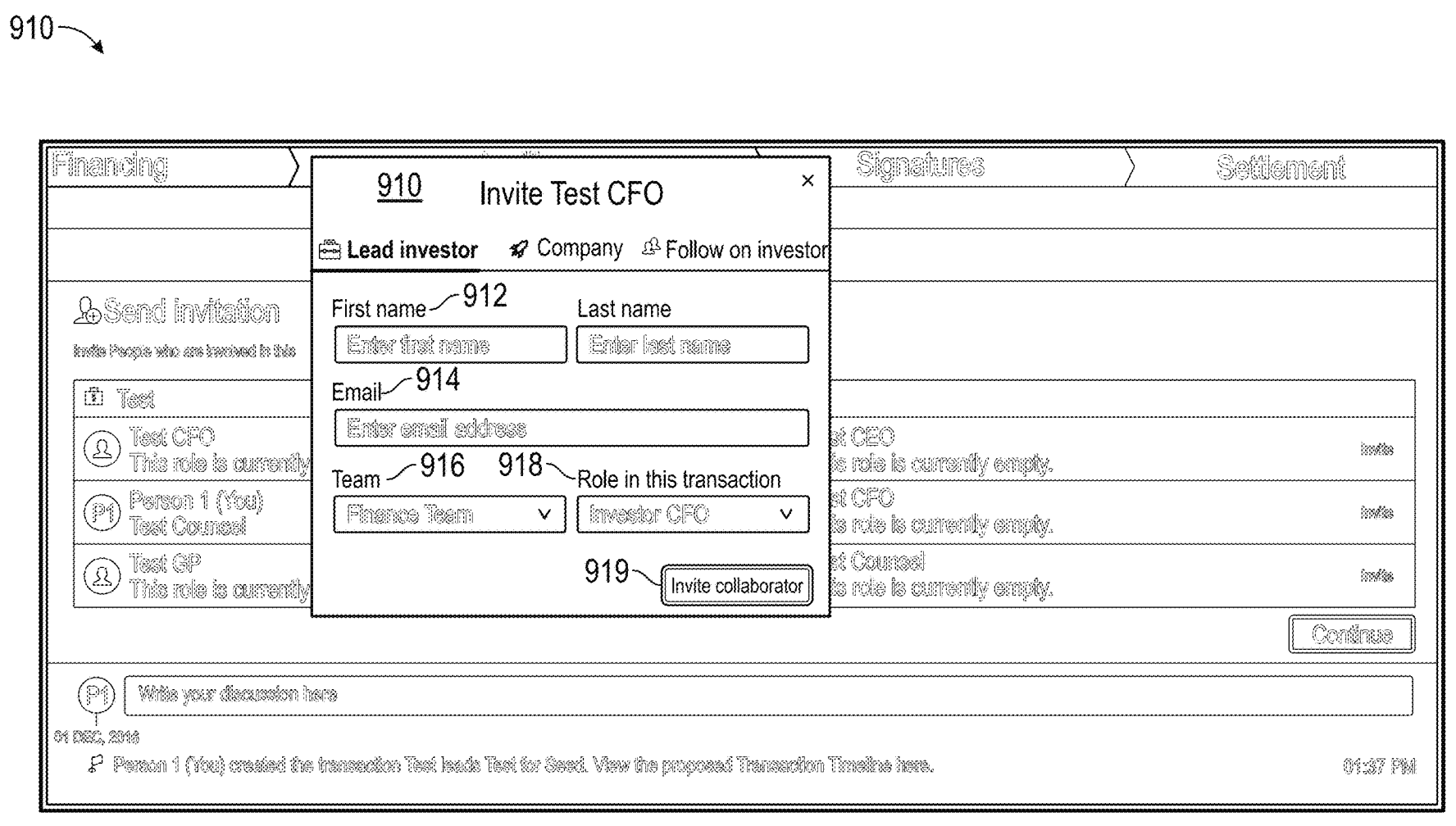

FIG. 9B is an example user interface 910 for requesting a person join an electronic goal. As described above, with respect to FIG. 9A, a user can request that a particular person join the electronic goal and be assigned a particular user role. As illustrated in user interface 910, upon interaction with a request user interface element (e.g., element 904), user interface 910 can be presented, and include options to indicate the person's name 912, email address 914, team 916 (e.g., user roles can be grouped into teams), user role 918 (e.g., as described above, tasks can be assigned based on user role, and user actions can be constrained based on user role), and the user can invite 919 the person to join the electronic goal (e.g., the system can contact the person via the email address, and an email can include links for the person to create a user account).

Figure 9C:
FIG. 9C is an example interactive user interface illustrating user roles for the electronic goal, according to an embodiment of the present disclosure.

FIG. 9C is an example user interface 920 illustrating all user roles for the electronic goal. As described above, user interfaces can indicate require user roles for a present step or for the electronic goal. Additionally, user interface 920 can indicate all available user roles, which may be required for the electronic goal, or which may be possible user roles. In this way, a user can invite any user which can be assigned a user role recognized by the system.

Figure 9D:
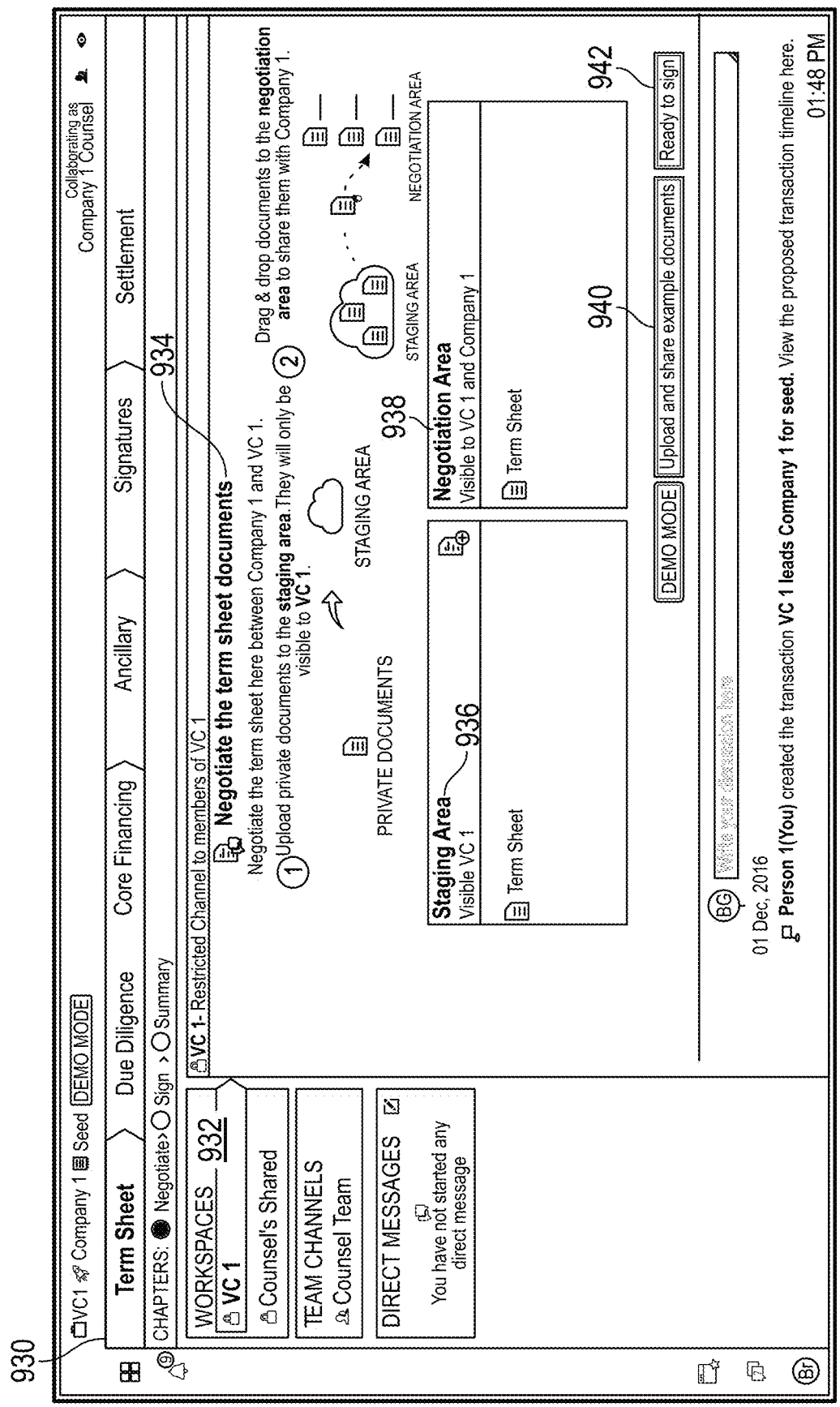
FIG. 9D is an example interactive user interface illustrating a first task in the first example step, according to an embodiment of the present disclosure.

FIG. 9D is an example user interface 930 illustrating a first task in the first example step. As described above, the first example step includes tasks, with the first example task 932 being negotiating a term sheet. To negotiate the term sheet, user interface 930 includes two portions, a first portion 936 indicating documents that are visible only to a same entity as a user of the user interface 930, and a second portion 938 indicating documents that are visible to both the same entity and the other entity in the electronic goal. In this way, documents can be strictly separated, and only documents that are ready for viewing by the other entity can be made visible.

Since documents shared with the other entity can include sensitive information, entities may prefer that only particular user roles be allowed to perform user actions that cause sharing of documents. That is, while multiple user roles may be able to view documents in the first portion 936, only a particular user role (e.g., counsel, chief financial officer) may be able to share documents with the other entity (e.g., other users may be constrained in user actions to move a document from first portion 936 to second portion 938).

As will be described below, with respect to FIGS. 9E-9F, the system can enable quick creation of a term sheet through direct selection of values of terms. The system can optionally create a contract identifying the selected terms and values, which can be created according to preferred formats (e.g., as will be described below, with respect to FIGS. 16A-16G, 17A-17O, and 18, the system can maintain, learn, and so on, formats of contracts, and can parse contracts, generate contracts, and so on). Additionally, the user interface 900 includes an option to upload a document 940, and upon uploading, the system 100 can parse the document (e.g., according to one or more ontologies, as described below) to obtain values of particular terms, and identifications of selected terms. Once the term sheet has been prepared, a user can indicate that the term sheet is ready to sign 942, and a subsequent task to obtain signatures can be initiated (e.g., the system 100 can traverse to a node associated with signing via an edge from the current node associated with negotiations).

FIG. 9E is an example user interface 950 illustrating a term sheet, and FIG. 9F is an example user interface 960 illustrating a summary of selected terms. As described above, a user interface can indicate terms which can be selected for inclusion in the term sheet, along with options to specify values of terms. Upon selection of user interface element 952, the system can present user interface 960 providing summary of the selected terms. For instance, user interface 960 includes each selected term along with an associated value, and provides an easy way for a user of user interface 960 to remove terms (e.g., the user can select the 'X' 968). The user interface 960 includes an option for the system 100 to generate 964 a document espousing the selected terms, for instance in a preferred format (e.g., a format can indicate a particular preferred format of a law firm, such as boiler plate, paragraph spacing, font, language to be utilized, and so on). The user can then cause the term sheet to be shared 966 with other users of the same entity.

As term sheets are created, for instance and shared in the first portion 936 illustrated in FIG. 9D, the system can present differences between each term sheet (e.g., a user interface describing differences can be presented, for instance similar to user interface 960 with values of terms, differences in values, and so on). Additionally, the system can enable users to amend, or otherwise 'red-line', documents (e.g., generated contracts from the term sheets), and view the amendments.

Optionally, only users of a particular user role may be allowed to generate term sheets for inclusion in the first portion 936 illustrated in FIG. 9D. That is, only counsel may be allowed to generate term sheets (e.g., view user interfaces 950, 960), while other users may be allowed merely to view a created term sheet (e.g., a summary of the term sheet). That is, users can be constrained according to their user role, and a user role constrained with respect to creating term sheets, can be allowed to comment on a created term sheet.

Figure 9G:
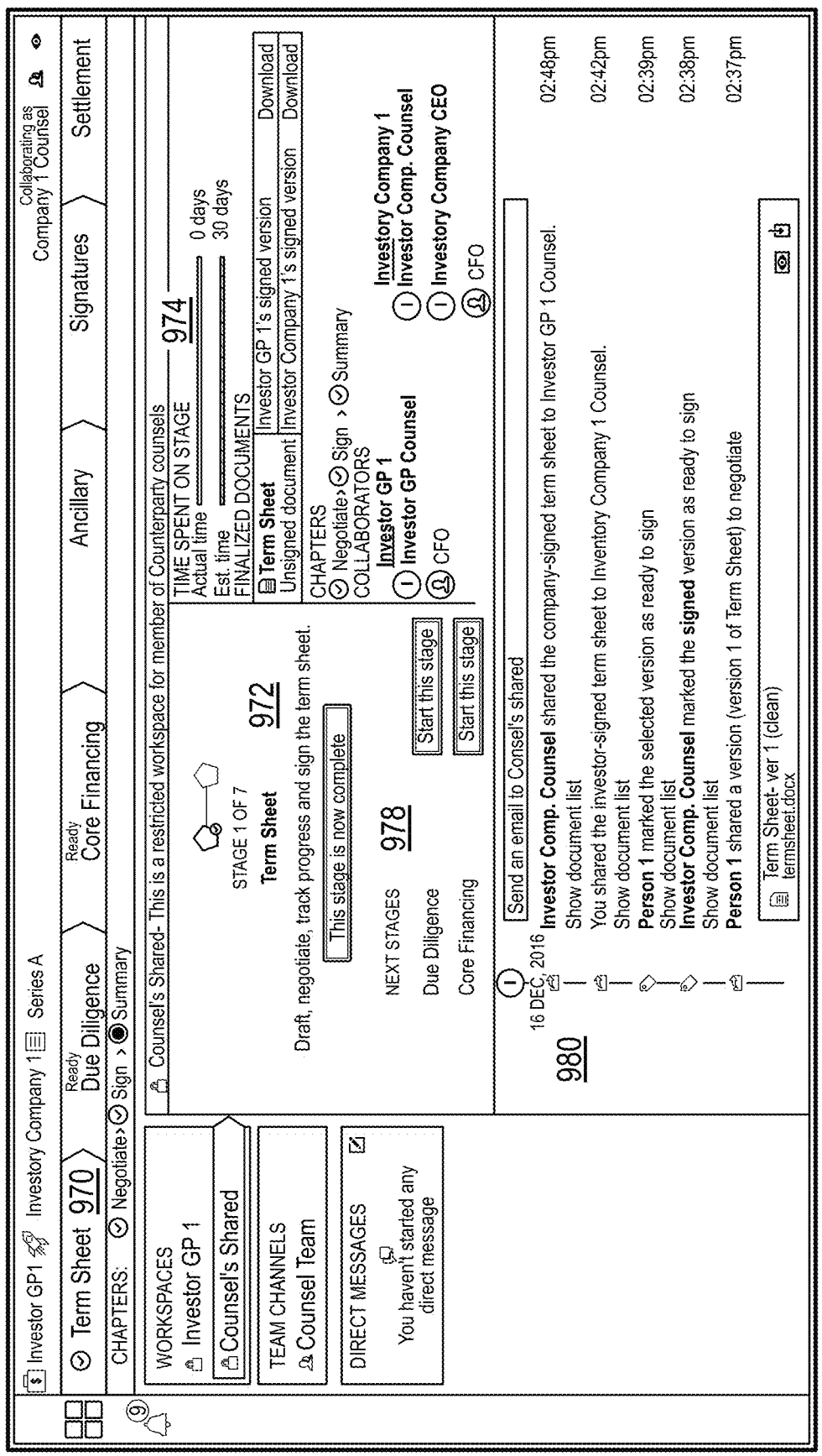
FIG. 9G is an example interactive user interface illustrating completion of a first example step, according to an embodiment of the present disclosure.

FIG. 9G is an example user interface 970 illustrating completion of a first example step. As illustrated in FIG. 9, the users of the electronic goal have completed the (1) negotiating task, (2) signing task, and (3) and are viewing a summary of the first example task. For instance, the user interface 970 includes textual information 972 indicating completion, and includes selectable options associate with a subsequent step to be assigned 978. As described above, with respect to FIG. 2D, users can optionally choose a preferred path through an electronic graph, and user interface 970 provides the users with an option to proceed to a due diligence portion or a core financing portion. A user can optionally interact with the user interface 970, and the user interface 970 can present information identifying a least active path (e.g., the system 100 can determine, for instance based on historical information, a task to perform next that will result in a lowest amount of time for completion of the electronic goal).

The user interface 970 further includes statistical information 974 associated with completion of the first example task, including an estimated time till completion and an actual amount of time. The system 100 can utilize the statistical information to update the estimated time, for instance upon determining that the estimated time is too high (e.g., in greater than a threshold number of completions), the system 100 can reduce the estimated time accordingly and optionally update determinations of times for each task. Users can also interact with the user interface 970 to download signed copies of the term sheets 976, for instance each entity's signed version of the term sheet.

A timeline 980 can be presented, with the timeline providing a snapshot of actions that were performed to cause completion of the first example step. As described above, each task can be include one or more actions that cause completion of the task, and the system 100 can monitor actions that were performed. Since some actions may be superfluous, for instance as illustrate din FIG. 1 some actions may cause a loop of the task (e.g., commenting on a document will not cause completion of a task), users can view all actions regardless of whether they caused completion of tasks. A user of the timeline 980 can scroll through the timeline, and can optionally select a particular action or task and view more detailed information about the action or task. Additionally, the user can provide a message, email, or other notification, to a user that performed the action or task (e.g., to inquire about it).

Figure 9H:
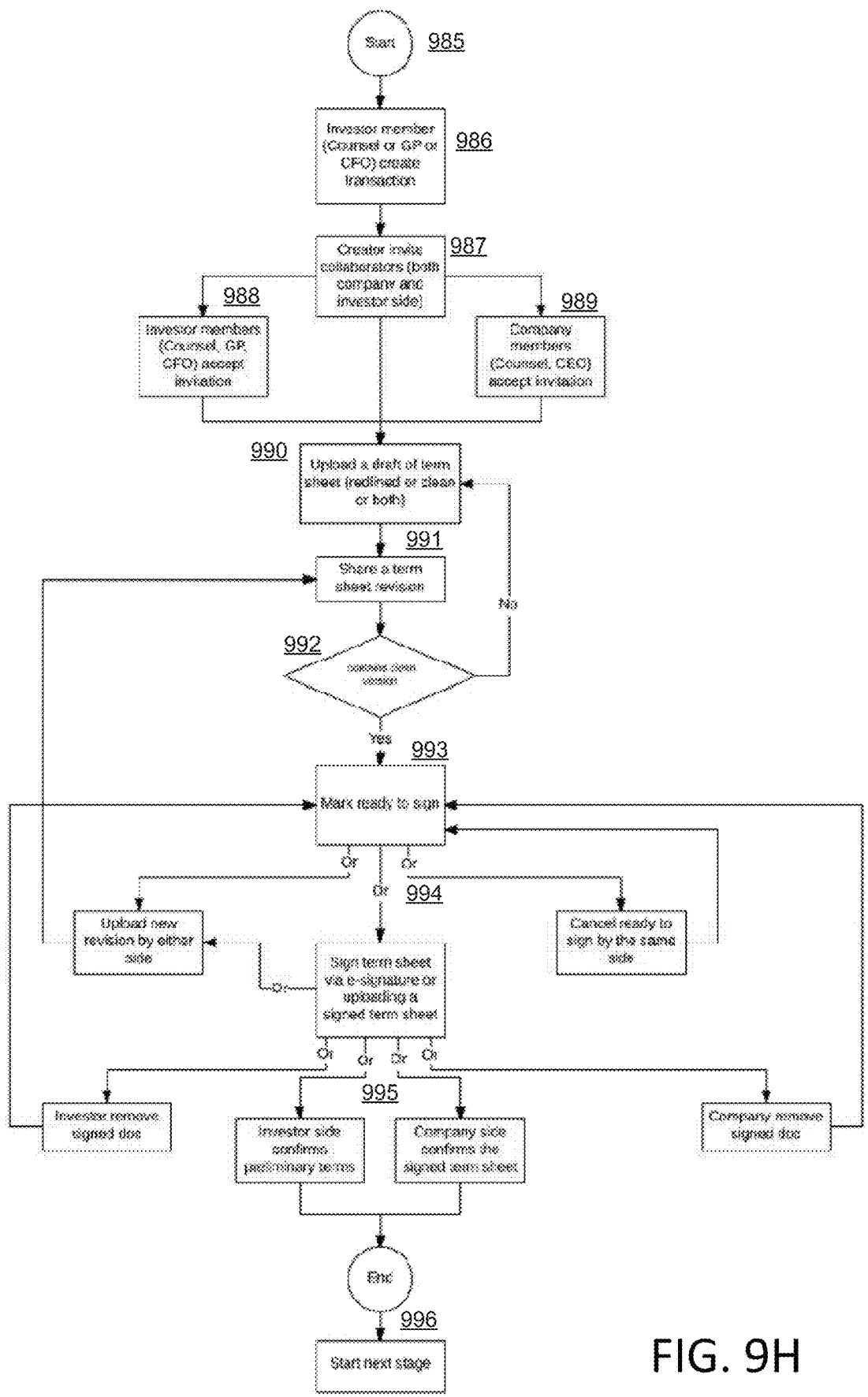
FIG. 9H is an example of a flowchart illustrating completion of a first example step, according to various embodiments of the present disclosure.

FIG. 9H is an example of a flowchart illustrating completion of a first example step (e.g., negotiation of a term sheet). The example flowchart may, in some implementations, be stored as a graph and, as described above, be maintained by the system (e.g., maintained as graph information). Each node of the graph may represent a particular task, and as described above can constrain actions of users according to user role.

The graph includes a first node 985 at which the graph begins, and the system traverses to a second node 986 upon creation of a transaction. For example, as identified particular user roles may create a transaction (e.g., Counsel, GP or CFO), and upon creation, the creator of the transaction can invite collaborators (e.g., node 987). For example, the creator can utilize the user interfaces described above with respect to FIGS. 9B-9C, and invite collaborators. As the creator invites collaborator, the creator can indicate an associated user role for each collaborator. In an implementation in which documents are signed, the system may also include inviting signers and reviewers, and further described herein.

In the example of FIG. 9H, two parties are indicated as being involved in the first example step, an investor and a company. Nodes 988 and 989 indicate that members of each party accept an invitation to complete the first example step. As described above, the first example step can include negotiation of a term sheet, and the graph proceeds to node 990 in which members of either party can update drafts of the term sheet. Node 990 may constrain user actions associated with particular user roles. For example, the uploading of a draft term sheet may be limited to counsel or CFO, and other user roles may be blocked from uploading a draft. As the system traverses to node 990, the system can access the graph information associated with the first example step, and limit actions of the particular user roles (e.g., the system can cause user interface elements associated with uploading a draft term sheet to be inaccessible).

At node 991, a term sheet revision can be made, for example users of particular user roles may revise term sheets (e.g., counsel), and circulate the revisions to members of their party and/or members of the other party. At node 992 a final version of the term sheet is created, such that the term sheet does not include revisions (e.g., the system may monitor and allow for tracked changes of any term sheet, and can determine whether a revised term sheet has been made clean). Subsequently, at node 993 a term sheet is indicated as being ready to sign. For example, a user of a particular user role (e.g., CFO, CEO), may indicate that a term sheet is ready for signature and the term sheet can be provided to the other party.

As illustrated, three nodes 994 are indicated as following node 993, such that the system can traverse to one of the nodes 994 according to user actions. For example, either party may provide a new revision of the term sheet, or a party may indicate that they are not ready to sign the term sheet. If both parties do indeed sign the term sheet, for example via e-signature (e.g., described below with respect to FIGS. 14J-14O, among other figures) or uploading of a signed term sheet, nodes 995 can be traversed to. As above, each party may indicate that they do not wish to proceed with the term sheet, and can remove signed versions. Upon confirmation of the term sheet by each side, a subsequent step 996 can be traversed to, which is described below with respect to FIG. 10.

Figure 10:
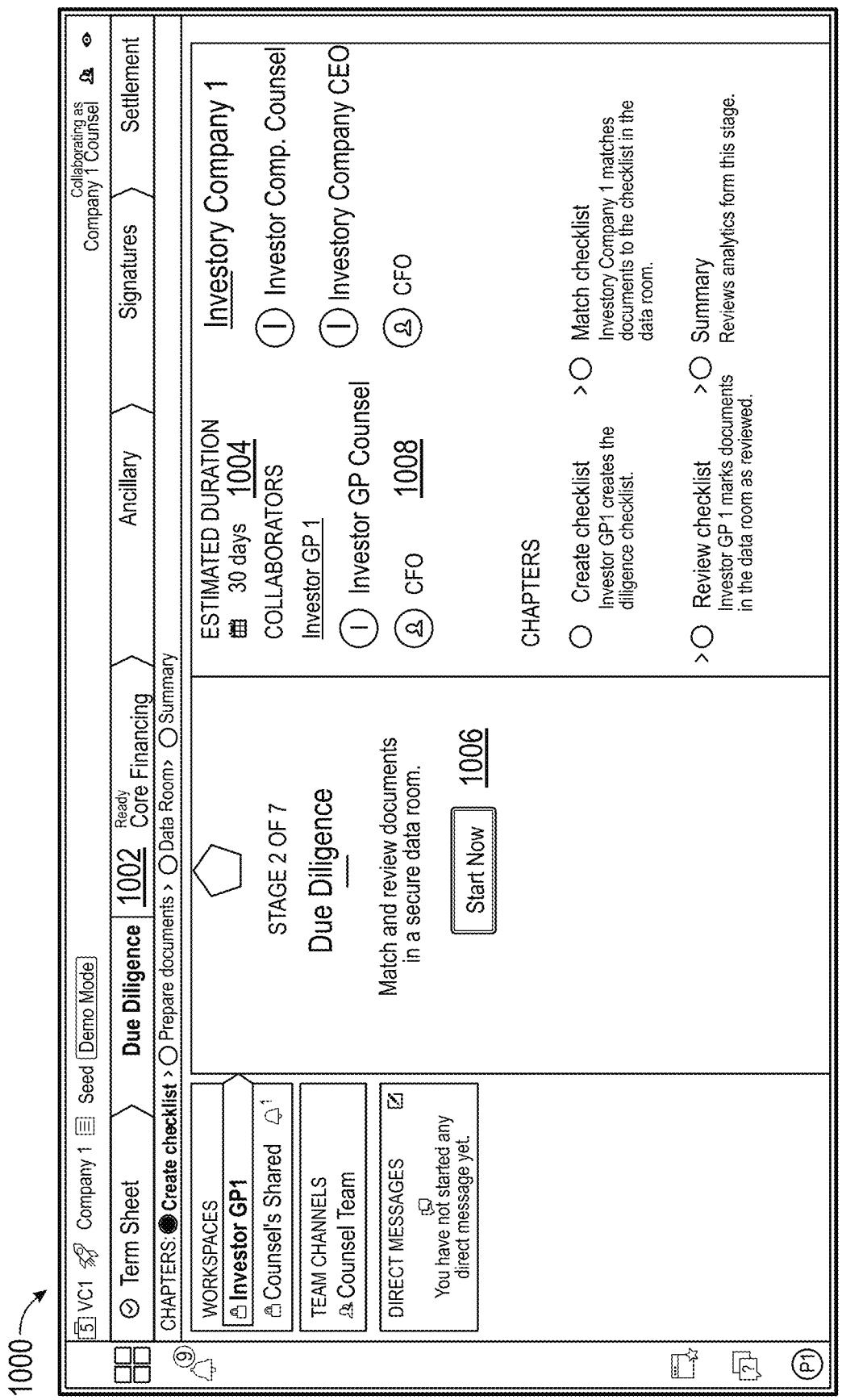
FIG. 10 is an example interactive user interface illustrating a second example step in the electronic goal, according to an embodiment of the present disclosure.

FIG. 10 is an example user interface 1000 illustrating a second example step in the electronic goal. The second example step, in the example of FIG. 10, is performing a due diligence process 1002 in which users can "match and review documents in a secure data room." The user interface 1000 includes an identification of user roles 1004 that are required for the second example step, or electronic goal, along with tasks 1008 that are included in the second example step. For instance, a first task can include a first entity creating due diligence checklist, a second task can include a second entity obtaining documents associated with the checklist (e.g., users can include documents in electronic folders, and as will be described below, documents can be parsed, terms in the documents identified, and summary information describing the documents presented, such as described in FIGS. 16A-16G, 17A-17O, and 18 below), a third task can include the first entity indicating that the documents have been reviewed, and a fourth task can include presentation of a summary of the second example step. A user can interact with user interface element 1006 to begin the second example step.

FIG. 11A is an example user interface 1110 associated with a first task included in the second example step, with the user interface 1100 enabling a user to specify documents to be indicated in a checklist. A created checklist, illustrated in FIG. 11B, can provide a summary of the due diligence documents, which can be provided to the other entity.

Figure 12A:
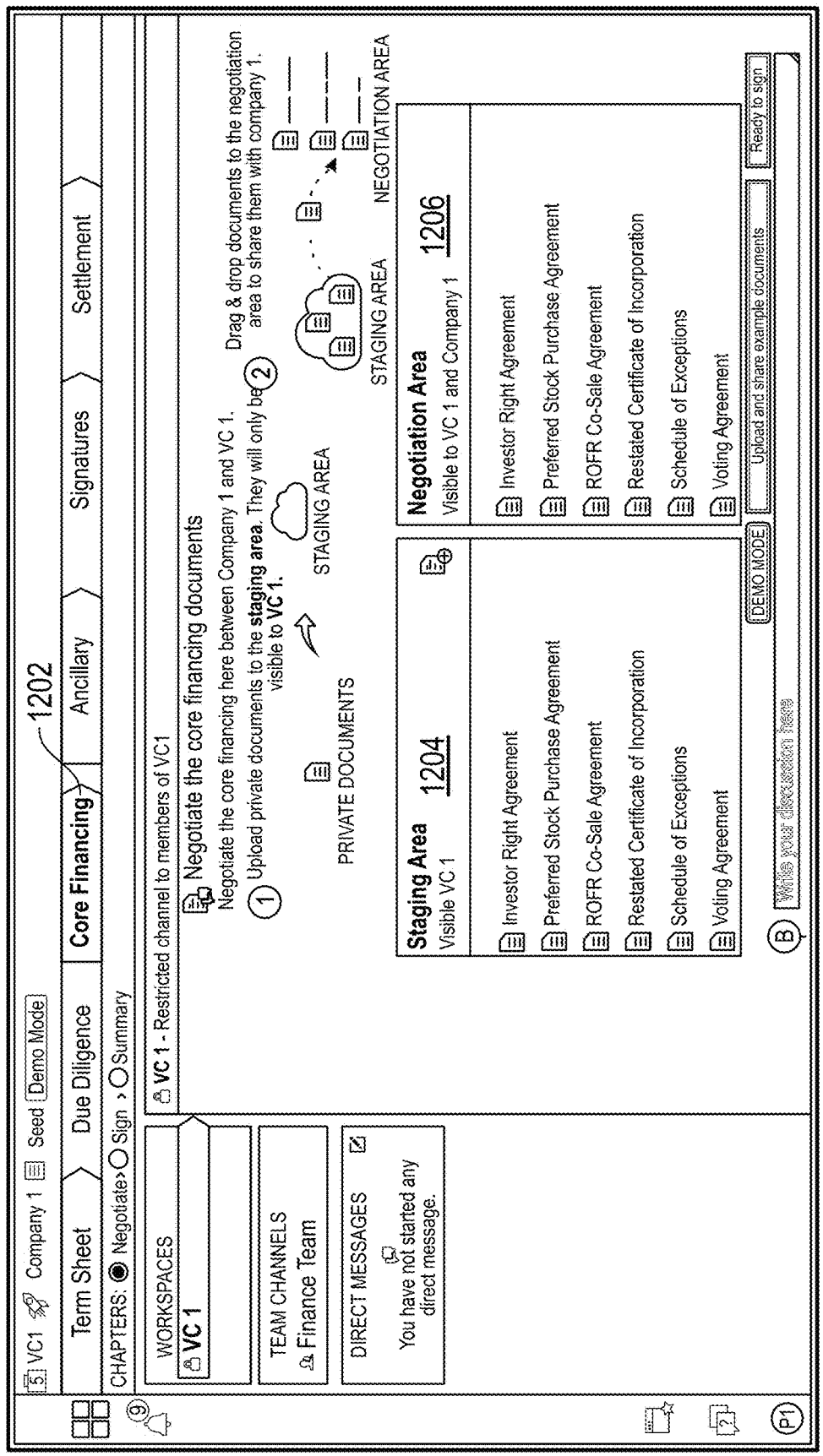
FIG. 12A is an example user interface illustrating a third example step in the electronic goal, according to an embodiment of the present disclosure.
Figure 12B:
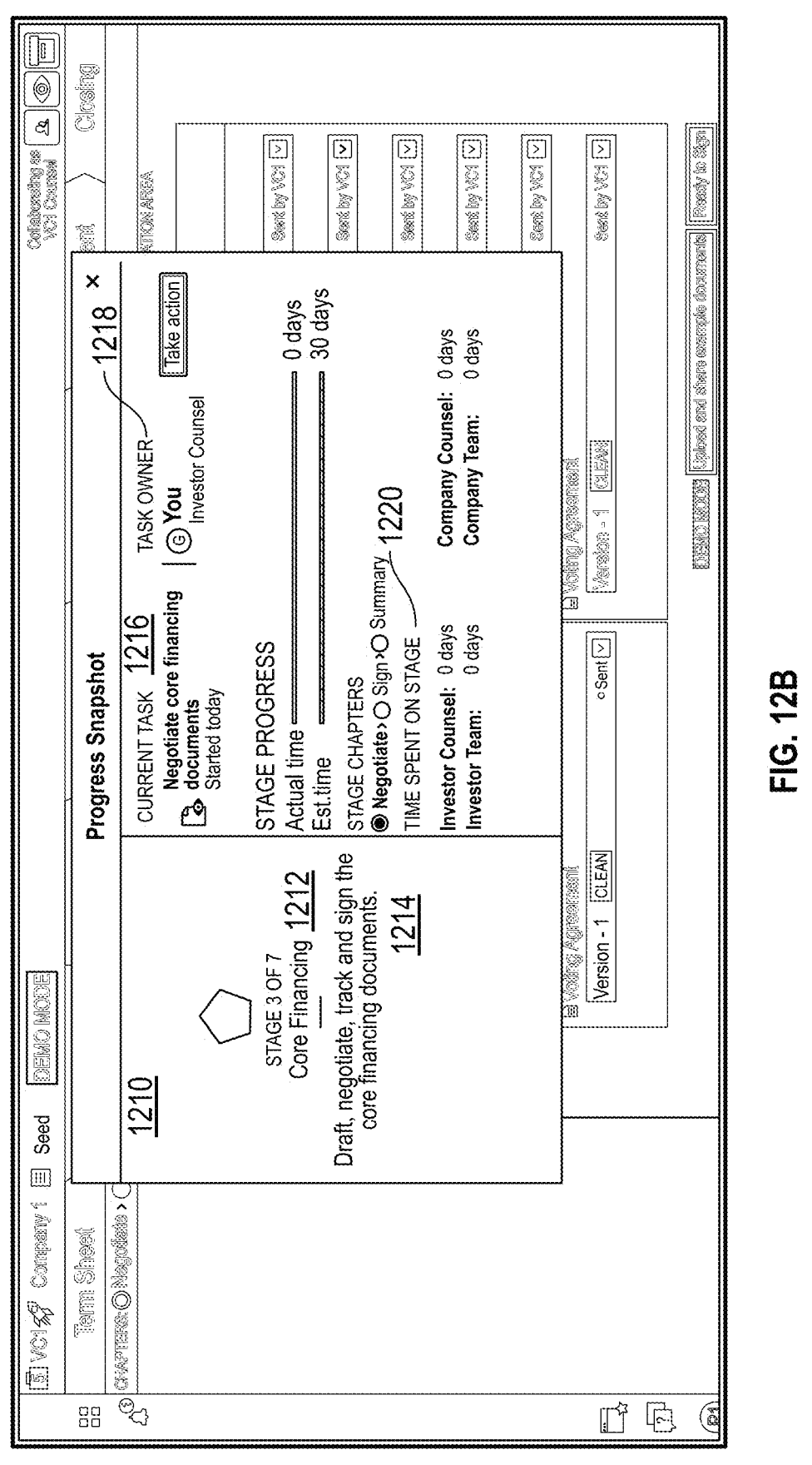

FIG. 12A is an example user interface 1200 illustrating a third example step in the electronic goal, with the third example step being associated with core financing 1202. Similar to the above description of the first example step, user interface 1200 includes a first portion 1204 to include documents visible to users of a same entity and a second portion visible 1206 to include documents visible to both entities. As described above, optionally user actions with respect to user interface 1200 can be constrained, such only users of particular user roles can share documents, create documents or particular types of documents, and so on.

FIG. 12B is an example user interface 1210 for presenting state information associated with an electronic goal. As described above, while completing the electronic goal a user can request that the system 100 determine and present a state associated with the completion. The system 100 can determine a present task being completed, a present step, a particular user or user role assigned the task, time information, and so on. In this way, users can quickly view whether anything is presently expected of them, and the proceeding towards the goal can be more easily maintained.

As illustrated, the user interface 1210 includes an identification of the present step 1212 along with a textual description of the step 1214. Additionally, the user interface 1210 identifies a present task along with an assigned user of the task 1218. A selectable option associated with taking action 1220 (e.g., 'take action') is included, and this selectable option can dynamically change according to the determined state. For instance, upon selection of the option 1220, a user interface associated with the present task can be presented. In this way complexities associated with user interfaces can be reduced, and a user of the system 100 can be directed to user interfaces in which actions associated with the present task's completion can be performed. Optionally, for a user not assigned the present task, the option 1220 can be dynamically modified by the system 100 to be an option for notifying, or reminding, the assigned user about the task. The user interface 1210 further includes time information, such as an expected amount of time for completion of the step and/or present task, along with an amount of time actually spent. Optionally, the user interface 1210 can graphically depict a graph associated with the electronic goal, which the user can zoom into (e.g., pinch to zoom on a touch screen), select nodes, and view information such as associated tasks, assignments of users, and so on.

Figure 12C:
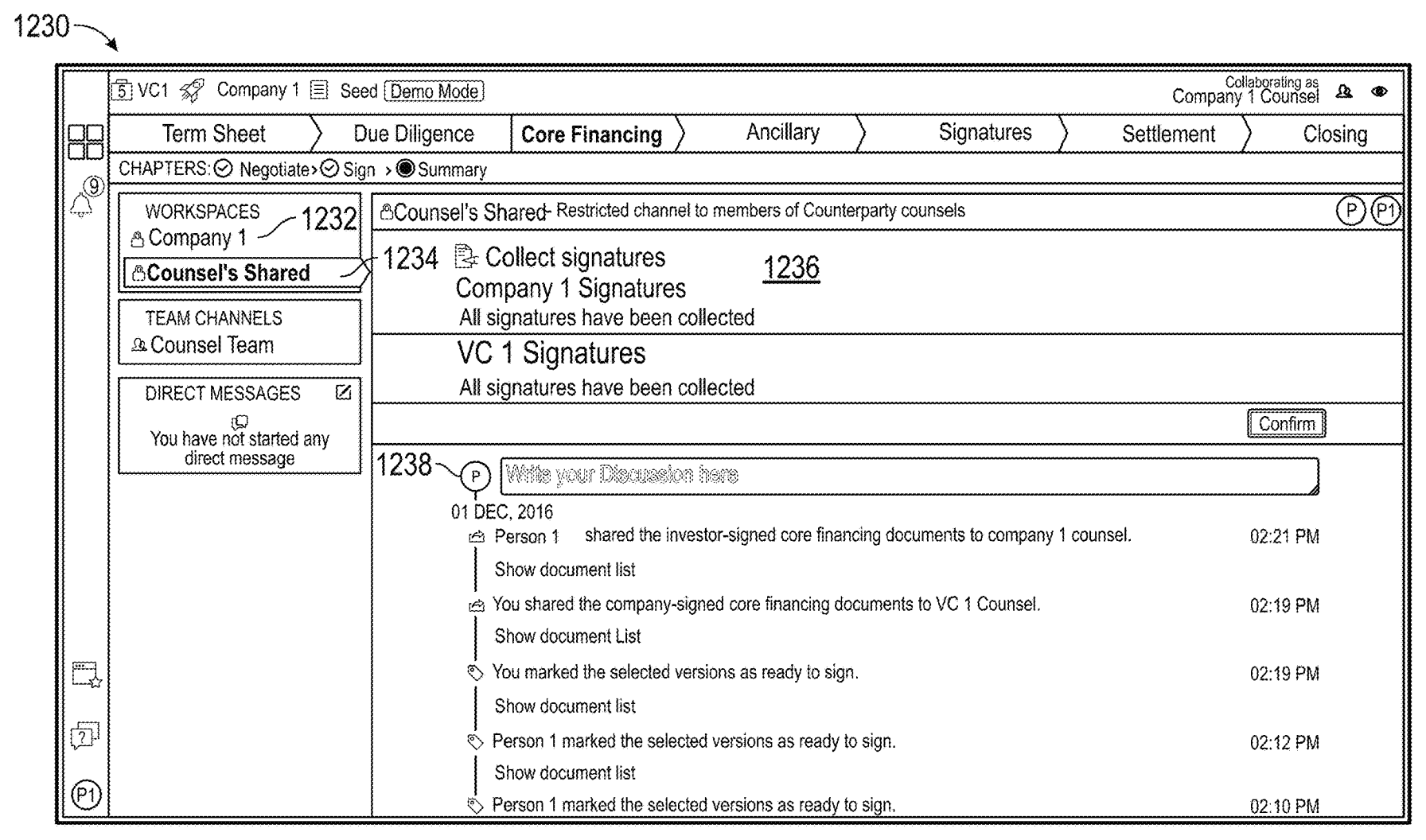

FIG. 12C is an example user interface 1230 illustrating a user role shared channel. As described above, user roles can have access to communication channels, and workspaces in which they can share documents, information, and so on, which can optionally only be visible to users of a same user role. User interface 1230 illustrates a shared workspace 1234 associated with a present task (e.g., signing documents 1232), with the workspace 1234 indicating information associated with the present task, such as a status of the task (e.g., an indication of signatures that have been collected or that need to be collected); timeline information 1238 indicating actions that have been performed with respect to the task, for instance, actions indicating documents are ready to sign, actions indicating sharing of documents for signature, and so on).

FIG. 12D is an example user interface 1240 illustrating completion of the third example step.

Figure 13:
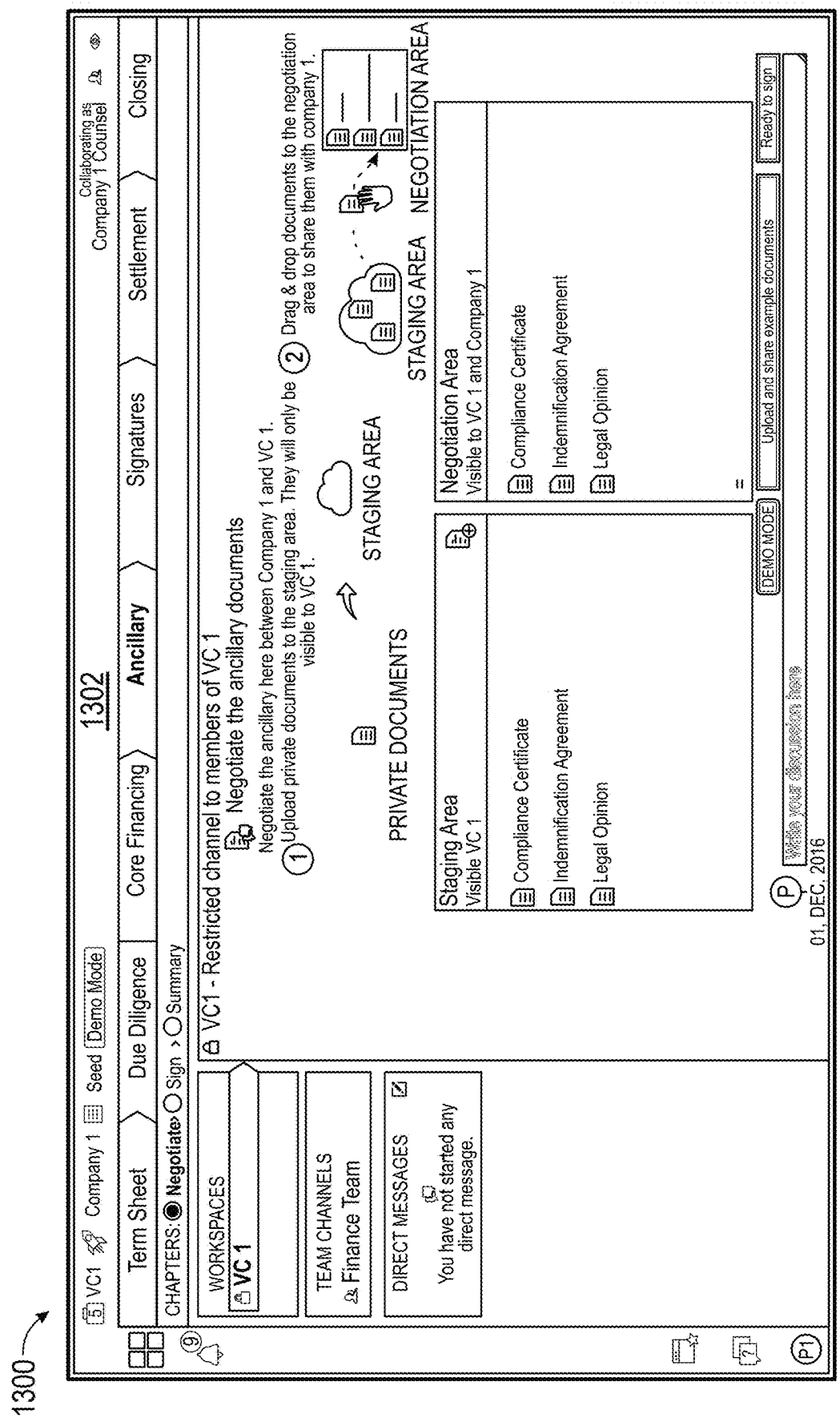
FIG. 13 is an example interactive user interface illustrating a fourth example step.

FIG. 13 is an example user interface 1300 illustrating a fourth example step. User interface indicates that the fourth example step is associated with negotiating and executing ancillary documents 1302, and the user interface 1300 includes a first portion and a second portion as described above with respect to the first and third example steps.

Figure 14A:
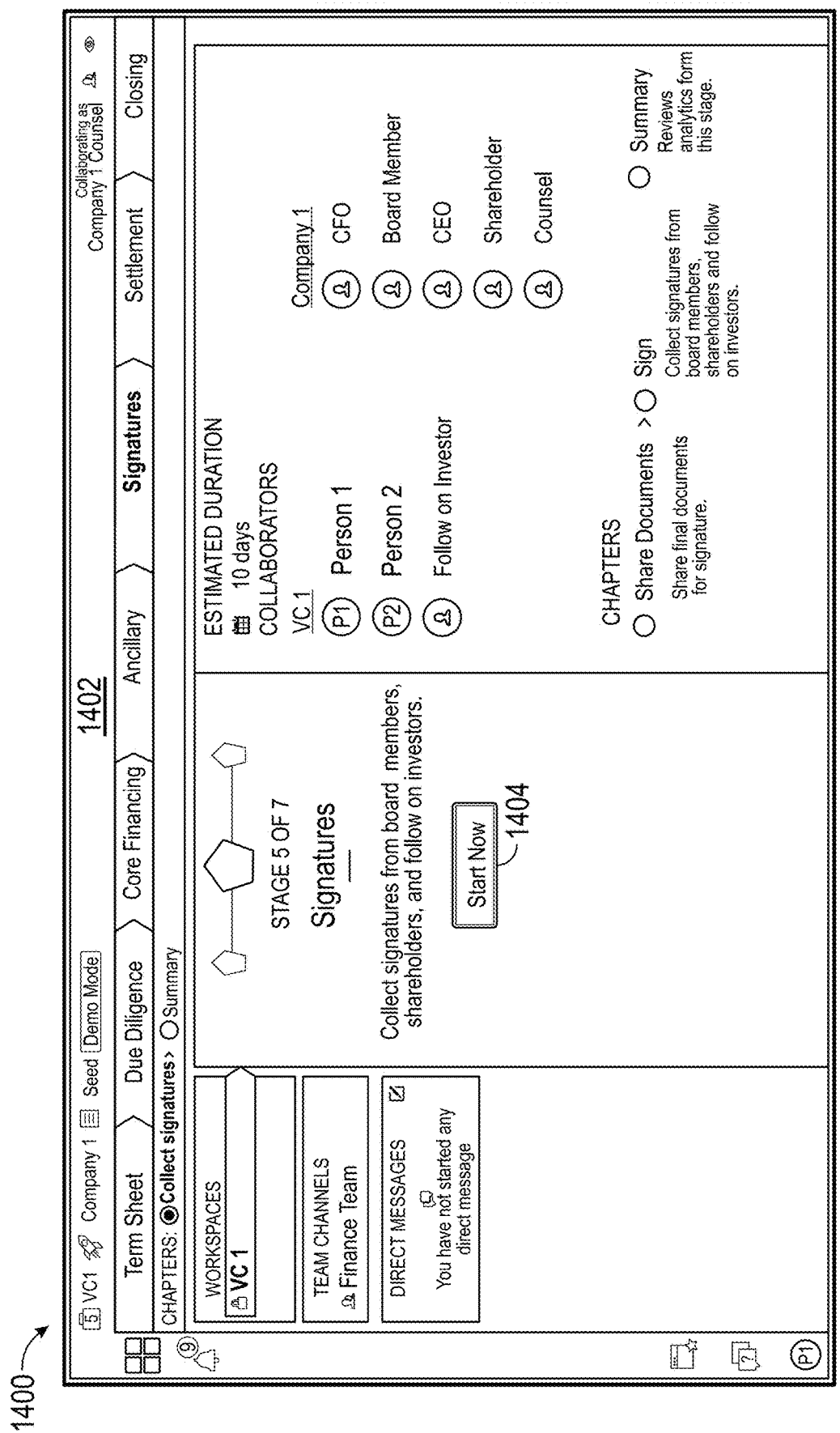
FIGS. 14A-14D are example interactive user interfaces illustrating a final example step in the electronic goal, according to an embodiment of the present disclosure.
Figure 14B:
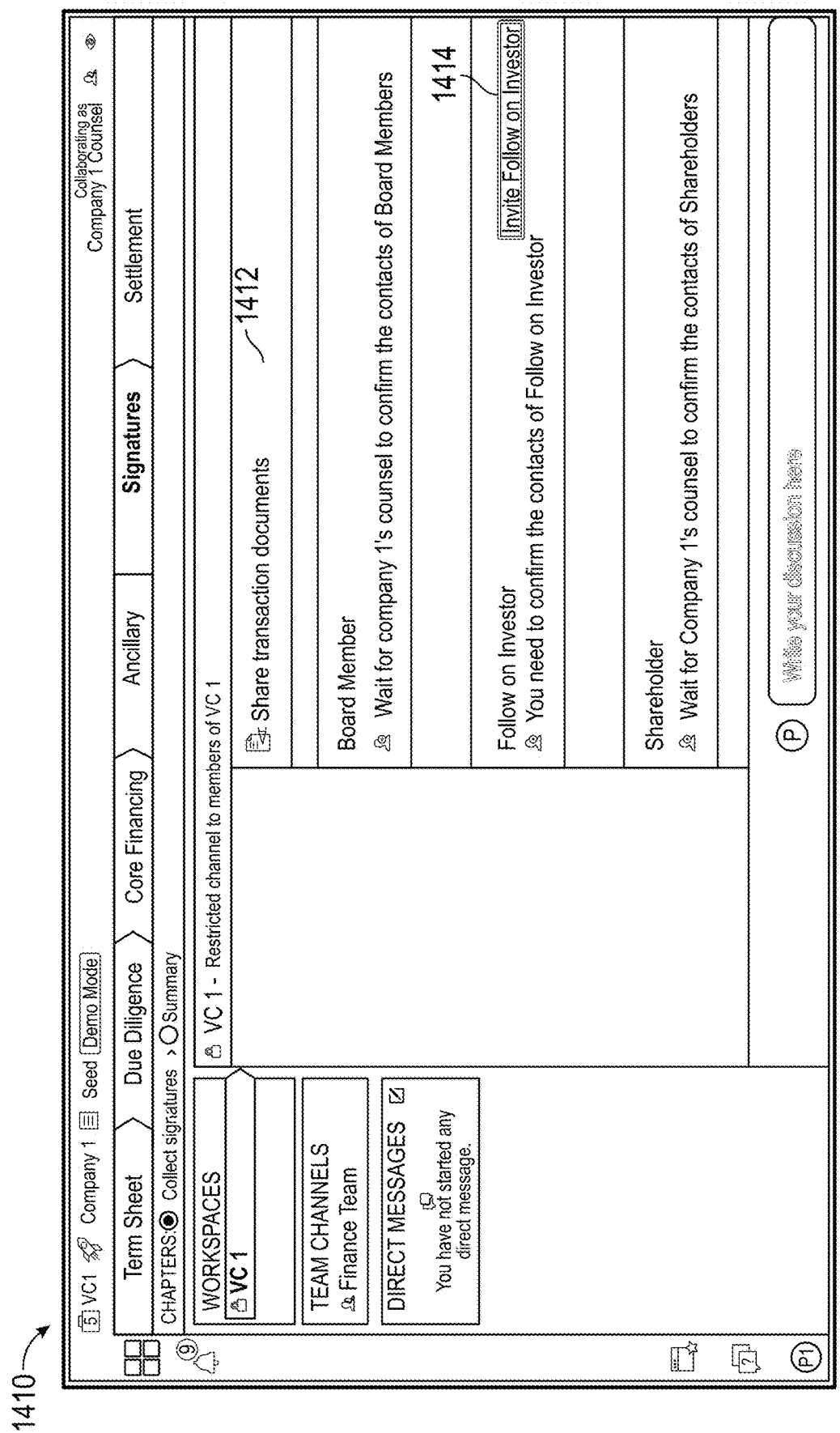

FIGS. 14A-14D are an example user interfaces illustrating a final example step in the electronic goal. User interface 1400 indicates that the final example step is associated with obtaining signatures 1402 on the completed venture financing agreement, and a user can initiate the example step via user interface element 1404. As illustrated in FIG. 14A, a first example task in the final example task is to share final documents for signature, and FIG. 14B illustrates an example user interface 1410 for sharing documents. As illustrated, particular user roles are indicated (e.g., Board Member, Follow on Investor, Shareholder), and an option 1414 to invite a user role who has not yet joined is included (e.g., 'Invite Follow on Investor'). User interface 1410 is a user interface presented on a user device of a user role who is a counsel, and therefore this user is constrained in user actions they can perform. For instance, the user interface 1410 indicates that the user is to wait for counsel to perform actions. For a similar user interface presented to a counsel, the user interface can include options to share documents, and so on.

Figure 14C:
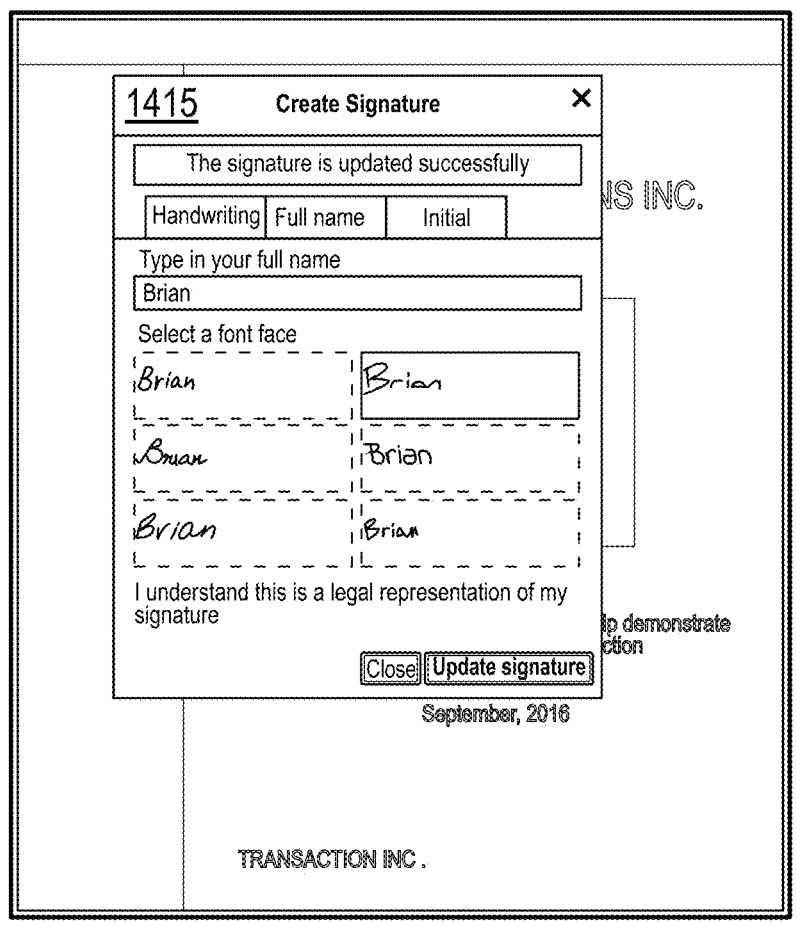
Figure 14D:
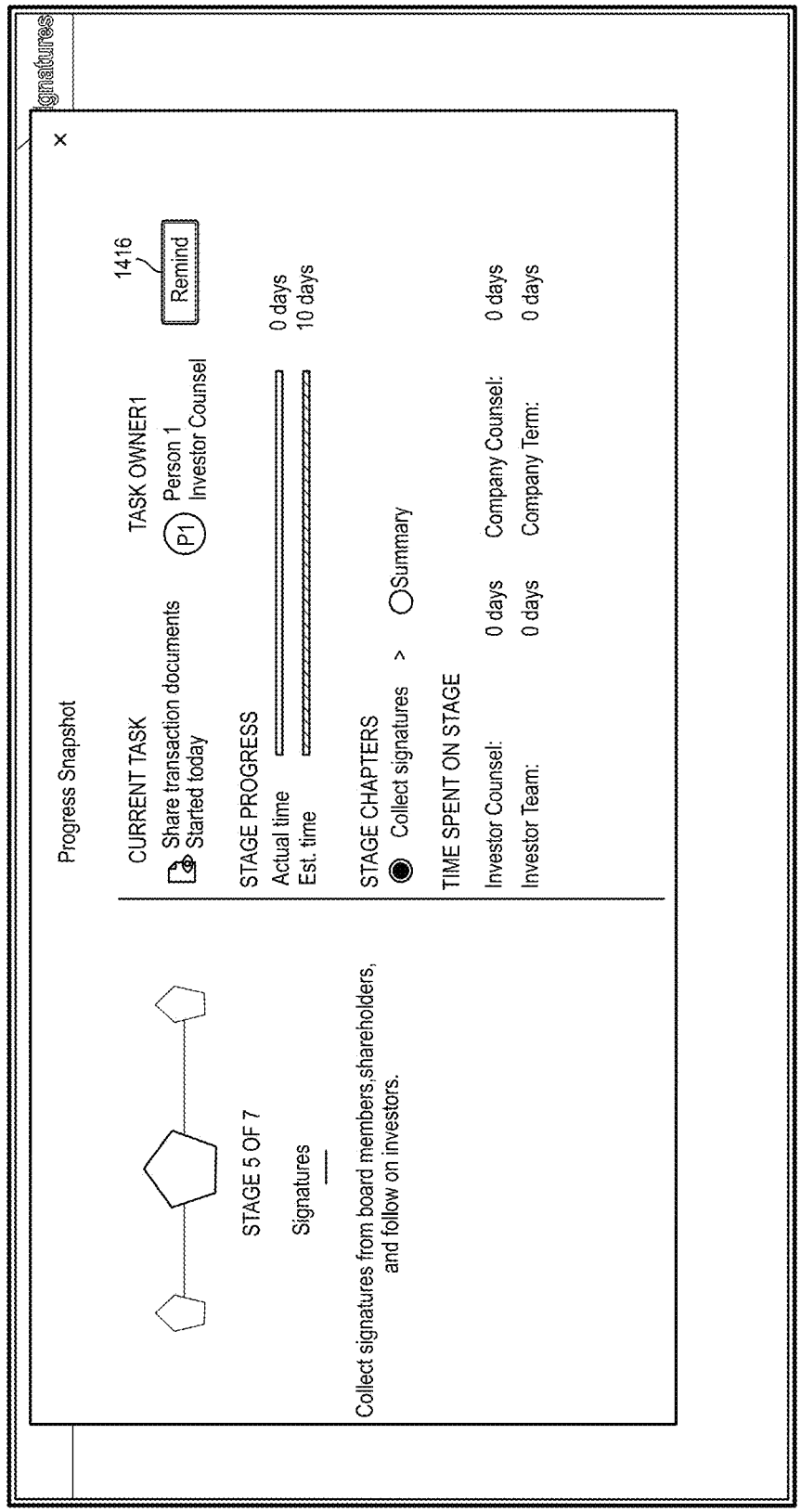

FIG. 14C illustrates an example user interface 1415 for electronically signing documents. For instance, a user of the user interface 1415 can enter his/her name, and a signature (e.g., a stylized signature) can be automatically generated (e.g., an image). The user can then select a particular signature, or using an input device (e.g., mouse, touch screen), can draw a signature, or upload a signature (e.g., an image of their signature). This signature can then be utilized for inclusion on documents as the user's signature, such that all documents can be electronically signed through the platform provided by the system 100. Similar to FIG. 12B, FIG. 14D illustrates a present state associated with completion of the electronic goal, and includes a selectable option 1416 to provide an electronic reminder to a user assigned a present task.

Examples Systems and Methods for Processing Form and Transaction Data

Figure 14E:
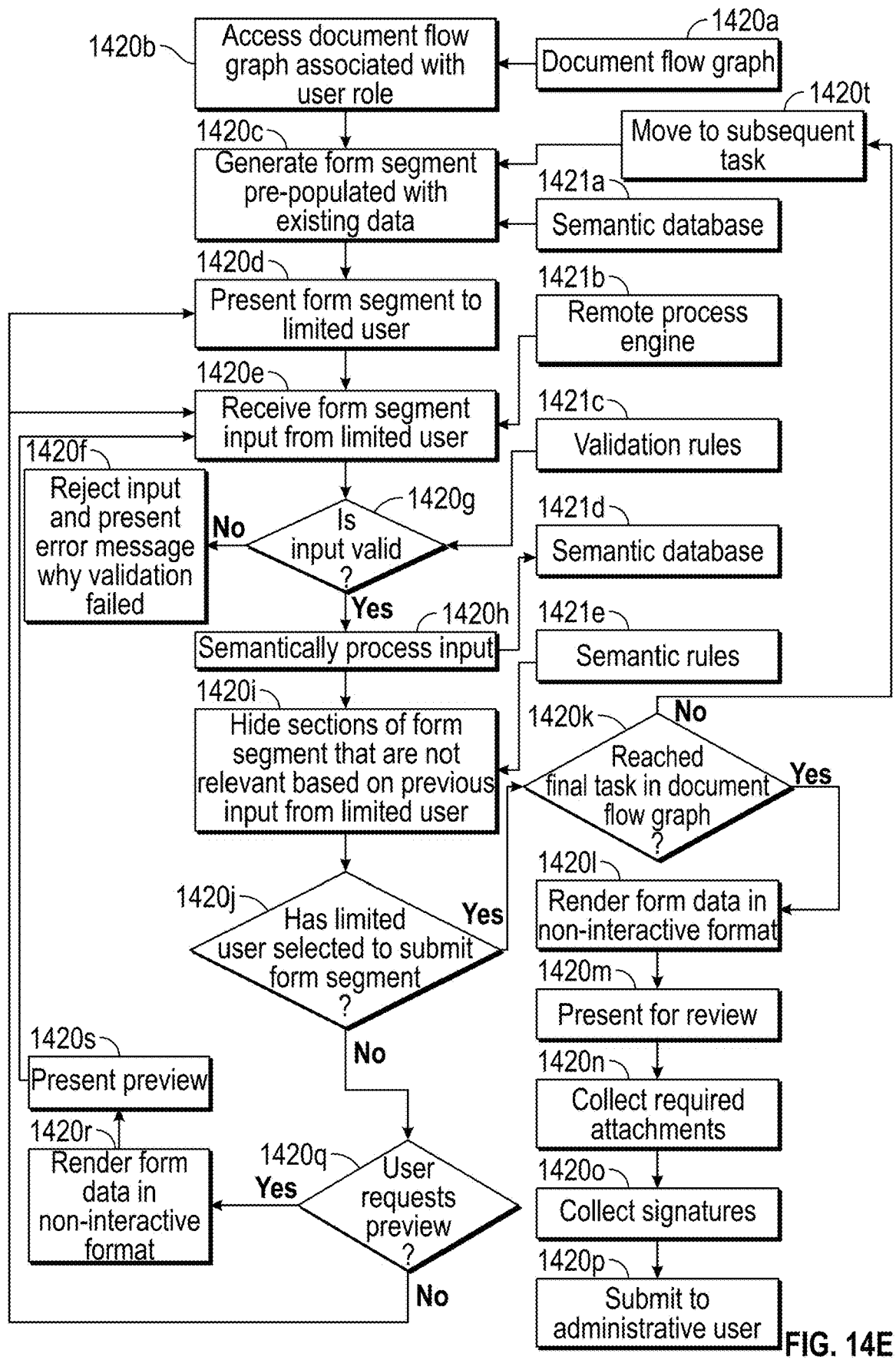
FIG. 14E is a flow chart illustrating an example workflow of a system of the present disclosure, from the perspective of a limited user, according to various embodiments of the present disclosure.

FIG. 14E is a flow chart illustrating an example workflow of a system (which may be referred to herein as "goal optimization system" or simply as "system"), according to various embodiments of the present disclosure. At block 1420b a document flow graph 1420a is accessed. In some embodiments, the document flow graph 1420a may be associated with a given user role (as described herein). The document flow graph 1420a may, for example, correspond to the user's role in a business transaction. For example, in the context of an investment fund, there may be a document flow graph 1420a associated with a user in the role of a prospective limited partner, and a different document flow graph 1420a associated with a user in the role of a general partner. In other embodiments that document flow graph 1420a may be from a single graph associated with completion of a goal (and which may include multiple documents and users) as described herein. The document flow graph 1420a may comprise different tasks, each containing, for example, elements and questions related to various aspects of the transaction and/or the user's role in the transaction. Each task may correspond to a node in document flow graph 1420a and may include, for example, a form or segment of a form comprising questions about the user's identity, background, or other relevant information. Document flow graph 1420a may be a directed graph or pseudograph (e.g., a directed graph wherein nodes can have directed linkages to themselves, as well as to other nodes). Linkages between nodes in document flow graph 1420a may represent possible (e.g., logically valid) transitions between tasks. Advantageously, this may allow the user to interact with the system sequentially, in a way that may be considered an implementation of a wizard, assistant or expert system.

As discussed, various elements of the system, for example nodes in document flow graph 1420a, may depend on information from other elements of the system. For example, document flow graph 1420a may include a node that performs cross-validation between various information entered and only allows a user to proceed once the cross-validation succeeds. Various user interface elements may also change as new or updated information is entered by a user or determined by the system. For example, a user may enter a date that the system determines to be inconsistent with another date that was entered by the user based on a cause-effect relationship between the two dates that is enforced by the system. In this situation, the system may refuse to accept the information until the discrepancy is resolved. The node representing the cross-validation in document flow graph 1420a may need to be informed when the user changes one of the two dates so as to be able to re-determine the result of the cross-validation. In an embodiment, this is performed using periodic recalculation (e.g., the system periodically recalculates its results independent of whether any constituent input data has changed). Advantageously, performance may be increased by recalculating such values and results only where needed. This may be implemented by keeping track of information using the observer-pattern approach. Under the observer-pattern approach, each component of the system (e.g., a user interface element, a node in document flow graph 1420a, or an external input or output provider, such as a file uploading component) provides a mechanism for other components to receive notifications upon a state change. Such other components may be considered listeners or observers. For example, a text field may provide a mechanism wherein another component receives an update whenever the text input in the text field is changed. Advantageously, this allows components to dynamically respond to state changes of other components as appropriate while limiting redundant recalculations. Various additional details related to the document flow graph (e.g., a graph, more generally) are described in other portions of this disclosure.

At block 1420c, a form segment associated with the current task in the document flow graph 1420a is generated and prepopulated with existing data, provided that such data exists. For example, if the form segment to be generated contains a question about the user's name, and the user has previously provided his or her name, the form segment will be prepopulated with the user's name already. Advantageously, this allows the user to quickly review, rather than re-enter, information that was previously provided. The information for prepopulating the form segment with existing data may be retrieved from a sematic database 1421a, such as a database storing graph information 120, as discussed with reference to FIG. 1.

At block 1420d, the form segment is presented to the limited user. This may, for example, be accomplished by showing the form segment in a web interface displayed through the limited user's web browser. As soon as the limited user decides to submit or complete any part of the form segment, the input is transferred to the system and received at block 1420e. This may, for example, be accomplished through a remote process engine 1421b, which allows the system to dynamically receive data as the limited user enters it into the form. For example, remote process engine 1421b may be a JavaScript framework such as Meteor that allows the state of the form to be constantly and dynamically updated and replicated between the system and the user's web browser. Advantageously, remote process engine 1421b may keep track of the state of the user's web browser, and may use means of limiting redundant retransmission of data, such as differential compression. Advantageously, the system may independently verify or cross-check all calculations and results received from a user's web browser to ensure data security and consistency amongst all users, and communicate a verified or canonical result back to the user's web browser. Remote process engine 1421b may be included in the goal optimization system 100 described herein in reference to FIG. 1.

At block 1420g, the system applies a set of validation rules 1421c to determine whether or not the user's input is valid. Validation may be performed by checking if the data entered by the user matches the type of data that is expected by the form, or whether different items of data agree with each other. For example, the form may verify that where a number was expected, a number was indeed entered. The form may also sanitize or cross-validate data entered by the user, such as, for example, verifying that where a causal relationship exists between two events and the user entered dates as to both events, the date given for the effect is not earlier than the date given for the cause.

If validation fails, the system executes step 1420f, wherein the user is presented with an error message indicating the fact that validation failed and instructing the user to collect the error. At block 1420h, which is executed if validation step 1420g succeeds, the user's input is semantically processed by using the relationships and ontologies contained in semantic database 1421d (e.g., databases storing graph information 120). For example, various types of semantic information may be extracted from the user input provided in the form. At block 1420i, a set of semantic rules 1421e is applied to determine which sections of the form segment are not relevant based on the current information known about the user. For example, if the user enters that he or she is an individual, the system may determine based on semantic rules 1421e that as an individual, the user does not need to be asked about its state of incorporation, since a state of incorporation would be an attribute possessed only by non-individual entities. The system may then hide or grey out sections of the form segment related to the state of incorporation. Semantic rules may be any kind of logical relationship or constraint; for example, semantic rules may comprise a statement that a given field A is only to be shown if another field B is blank. As discussed herein in reference to FIG. 1, a logical flow between various tasks, forms, form segments, or information may be established by the use of this graph structure. For example, a condition can be represented in the graph structure and enforced by enforced that user B cannot interact with a document after user A has signed it; this condition can then be enforced by goal optimization system 100.

These semantic rules may be implemented using an ontology, e.g., an ontology represented by an ontology graph. The nodes of the graph may represent different information or section of the form. The edges of the graph may represent relationships between the nodes. When a piece of information is received as form input, the system may identify the next node to traverse in the graph based on the rules and the entered information. The ontology may be created or updated in various ways comprising both manual and automatic processes. The ontology may be visually created through graphical user interfaces. Advantageously, this allows the graph structure to be built by placing, dragging, linking and deleting visual entities on a graphical user interface. The ontology may then be converted to a low-level (i.e. node list) representation. Alternatively, the ontology for an existing document may be created by matching document terms to terms in documents from other existing documents.

At block 1420j, it is determined whether or not the user has selected to submit the current form segment. If the user has not selected to submit the current form segment, the system checks whether or not the user has requested a preview of the current form (block 1420q). If the user has not requested a preview, the system continues to accept user input and returns to block 1420e. If the user has requested a preview, the system proceeds to block 1420r, wherein the form data is rendered in a substantially non-interactive format. At block 1420r, the form data may, for example, be rendered in portable document format (PDF). At block 1420s, the form data, as rendered in a substantially non-interactive format, is presented to the user for review, for example in a PDF viewer in the user's web browser. After closing the preview, the user is returned to blocks 1420d or 1420e, wherein the form is again presented to the user in editable format and inputs are received from the user.

At block 1420j, if the user has selected to submit the form segment, the system proceeds to block 1420k. Block 1420k determines whether or not the final task in the document flow graph 1420a has been reached. If the final task has not yet been reached, the system proceeds to block 1420t, where it determines the subsequent task in the document flow graph to the user, and returns to block 1420c to present this next task to the user. If the final task in the document flow graph has been reached, the system proceeds to block 14201, where it generates a representation of the form data in a substantially non-interactive format, similar to the preview generated at block 1420s. This representation is presented to the user for optional electronic review and downloading (block 1420m).

Advantageously, where an ontology is used to represent the different items in the form, the representation of the form data in a substantially non-interactive format may be generated based on a template, wherein individual placeholders or template elements are specified which are replaced by various elements represented in the ontology. For example, a template may comprise a text field specifying a placeholder "GENERAL USER NAME", which, upon application of the template, causes the system to retrieve the general user's name and substitute the element by it. Advantageously, this allows storage and processing of the substantive data and the formatting templates separately, and automatically combine them as needed before outputting a document to the user.

If the user proceeds, the system then prompts to provide any required attachments at block 1420n. For example, the user may be prompted to upload additional documentation through a web interface presented through the user's web browser at block 1420n. At block 1420o, the user is then prompted to sign the documents. Several documents may be combined in one set of documents that is presented to the user for review simultaneously. Such a set of documents is referred to as a signature package. Once the user has uploaded all necessary documentation and additional forms, the system proceeds to block 1420o, presenting the user with prompting to sign the signature package. The user may sign using a typewritten signature, a handwritten signature that is captured electronically, another signature method, or may choose any combination of such methods. Once the user has signed the signature package, at block 1420p, the signature package is submitted as complete to the administrative user. In an embodiment, the administrative user may receive a notification that the signature package has been submitted.

The various functionality described above with reference to FIG. 14E and other figures of the present disclosure (including the various interactive user interfaces) may be implemented by goal optimization system 100 (as described herein in reference to FIG. 1).

Example User Interfaces for Processing Form and Transaction Data

FIGS. 14F-14I and 24A-24B, among other figures of the present disclosure, illustrate example user interfaces and methods for processing for and transaction data, including implementing and interactive with "smart" or dynamic forms. As an example, multiple documents (also referred to herein as forms or dynamic forms) may be specified in a user interface 1456, and a user may access each form (e.g., described below with respect to FIG. 14J).

Figure 14F:
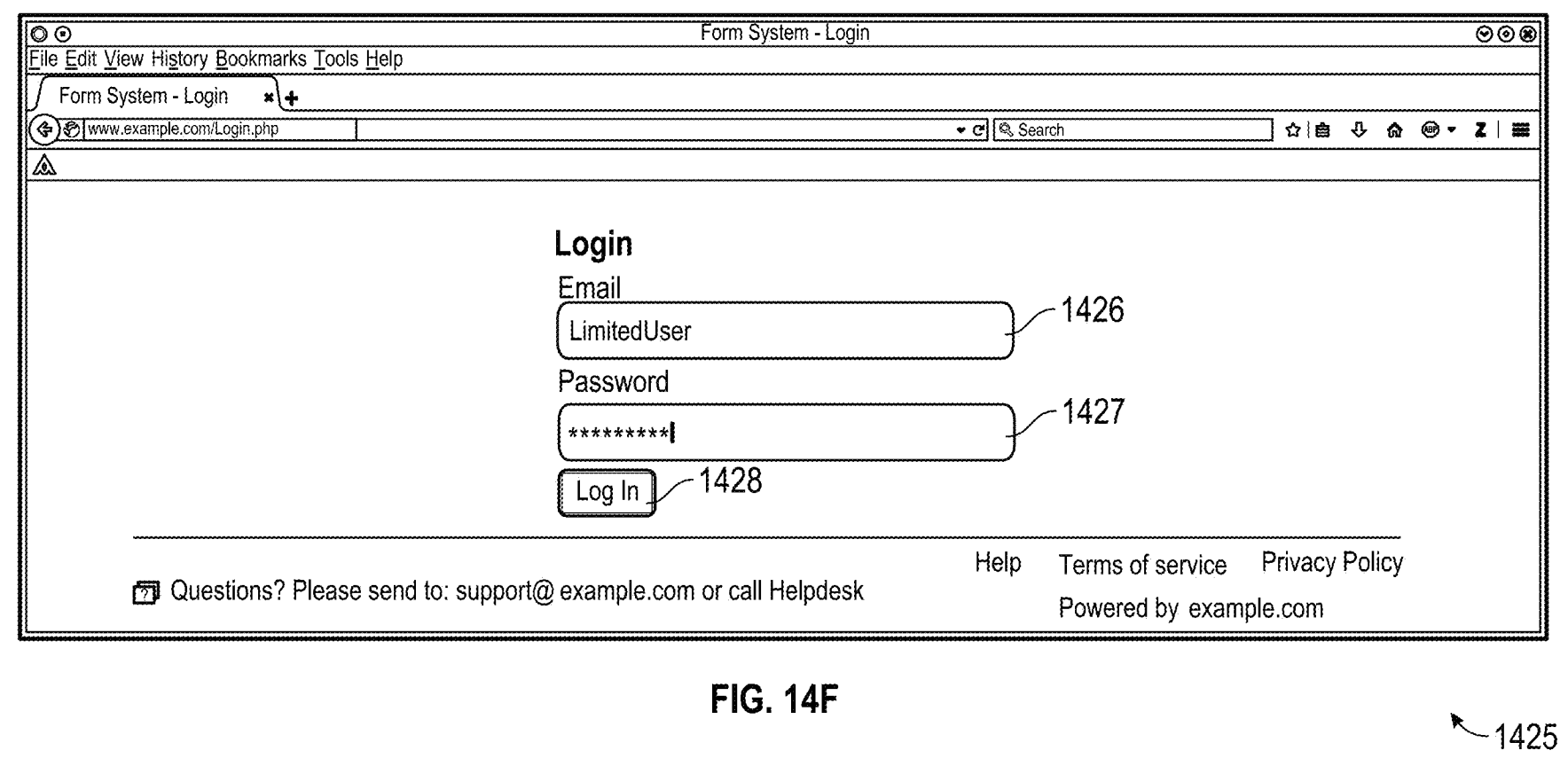

FIG. 14F illustrates a login screen interactive user interface 1425, comprising a username field 1426, a password field 1427 and a login button 1428. When the user selects the login button 1428, the system compares the username entered in username field 1426 against the list of users to determine whether the entered username corresponds to a user in the system. If so, the password 1427 is compared to the password stored for the user corresponding to the username field 1426 to determine whether the correct password was entered. If and only if both conditions are met, the user is then logged into the system and is presented with the appropriate user interface and/or forms for his or her level of access and role.

FIG. 14G illustrates an example interactive user interface 1430a of the system including a dynamic form in which various items of information related to a business enterprise, such as an investment fund, are being requested from a limited user. The user interface 1430a includes a name field 1430b, a capital commitment field 1430c, a signer's name field 1430d, a signer's title field 1430e, a first question box 1430f, a second question box 1430g, a proceed button 1430i, a synchronization indicator 1430j, a table of contents 1430k, and a process flow indicator 14301. The user interface 1430a further includes a render to PDF button 1430m and a status bar. The name field 1430b prompts for the name of the limited user. The capital commitment field 1430c prompts for the desired maximum capital commitment of the limited user. The signer's name 1430d prompts for the name which should appear on the generated legal document. The signer's title field 1430e prompts for the title which should appear on the generated legal document. The first set of radio buttons 1430f prompts for a "yes" or "no" answer as to whether the prospective limited user is a certain type of legal entity. The second set of radio buttons 1430g prompts a "yes" or "no" answer as to whether the prospective limited users' assets are covered under certain regulations. Notably, the space 1430h is empty; the system has deliberately hidden follow-up questions that, based on the user's choice in question box 1430g, need not be answered because they are not applicable. Proceed button 1430i allows the user to proceed to the next part of a multi-part form. If the user has reached the last part of a multi-part form or there is only one part to a form, the submit button 1430i changes into a proceed button that allows the user to proceed to the signing process.

The synchronization indicator 1430j shows whether any changes have been made by the user to the form that have not yet been uploaded and confirmed by the server. Synchronization indicator 1430j, as illustrated, indicates that all changes have been saved, i.e., the user has not currently made any changes that have not been sent to, received and confirmed by the server via remote process engine 1421b. If the user were to make changes, the synchronization indicator 1430j may momentarily change to an indication that shows the user that the remote process engine 1421b currently working on propagating the changes to the server. If the server were to fail responding in a pre-determined time frame, the synchronization indicator 1430j may change to a connection interruption symbol, indicating that the user should stop working on the form because the server cannot be reached and any changes made might be lost. Advantageously, this allows the user to know when he or she can disconnect the internet connection of the computer used to fill in the form without losing progress, and prevents connection interruptions from causing the user to waste time.

The table of contents 1430k shows what parts of the form are available, what parts of the form have already been answered, what parts of the form still remain to be answered, and also allows the user to navigate to different parts of the form by clicking on the section headers displayed. The process flow 14301 shows the user at what step in the document signing process the user currently is. For example, as illustrated, the user is shown that the current stage is the signature package stage, indicating that not all documents contained in the signature package have been signed and thus additional information is required. Once the user has completed all documents in the signature package, he or she can move on to the submit documents step, wherein the documents can be submitted to the administrative user. PDF preview button 14301 allows, when selected, to generate a PDF (portable document format) version of the document as it is currently shown. Advantageously, this allows the user to create a hard copy for printing. User name indicator field 1430*n* shows the user name of the user currently logged in to the system.

Figure 14I:
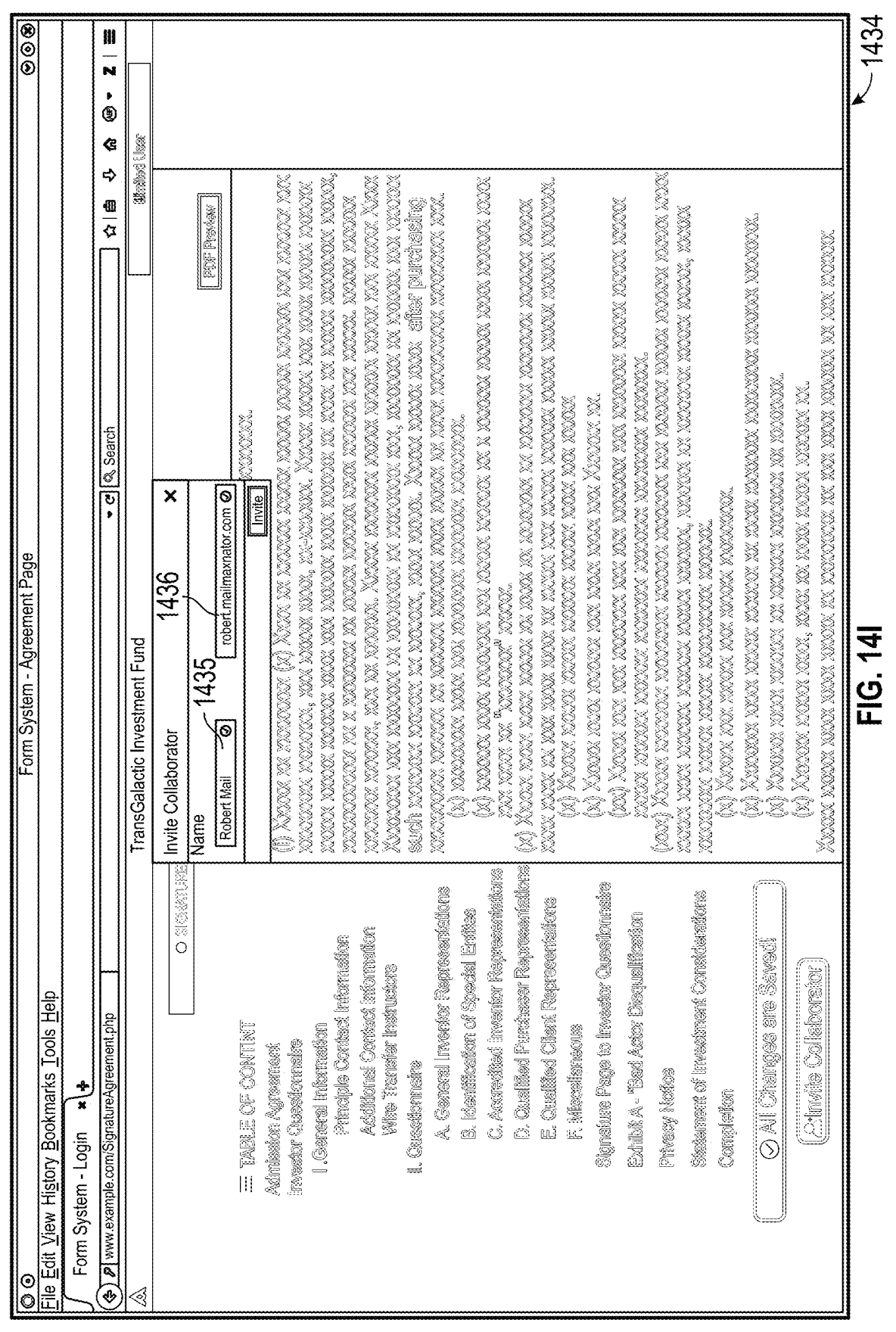

Invite collaborator button 1430*o* allows the user to send out an electronic message containing authorization to access the system, for example to work together with the current user in completing the documents and/or signing the documents; an example of a user interface for inviting a collaborator, as may be invoked by selecting the invite collaborator button, is illustrated in FIG. 14I.

FIG. 14H shows another example of interactive user interface 1430*a*, including a dynamic form, in which the user has chosen to select the other of the two possible answers in question box 1430*g*. Accordingly, the system has determined, based on semantic rules 1421*e*, that follow-up questions are applicable to this user, and has revealed section 1432 to the user. Section 1432 contains a text field 1433 that prompts for additional information related to the question presented in question box 1430*g*.

FIG. 14I illustrates an example interactive user interface 1434 of the system in which a collaborator invitation panel is presented. The name of the prospective collaborator can be entered in name field 1435; the email address of the prospective collaborator can be entered in email address field 1436. By selecting the Invite button (located in the lower right of the collaborator invitation panel), an electronic message is sent out to the email address in email address field 1436, containing a uniquely generated referral link that, upon selection by the recipient, prompts the user to create an account and grants appropriate access permissions to the newly created account so as to allow the collaborator to view and edit the form for which he or she was invited. Collaborators may be invited to particular forms, or to various other documents or user interfaces and described herein in reference to various other figures.

FIGS. 24A-24B illustrate an example backend data structure and/or user definable spreadsheet associated with describing semantic relationships associated with dynamic forms. As discussed herein, dynamic forms may comprise various logical relationships or interdependencies between items and other items. These logical relationships may make the process of filling the form more effective, but may need to be described in a data structure that can be processed by the form system. Additionally, it may be desirable to separate a description of the form data (e.g., the questions, data types associated with the questions, etc.) from the logic describing the interdependencies between them. This may allow an increased degree of automatization for transforming existing forms into smart forms. These data structures may be provided in the form of tables or matrices.

FIG. 24A illustrates a table 2400, associating various question data items associated with each row of table 2400 with additional attributes. The text of each question data item is shown in a question column 2402*b*, with unique handles or identifiers shown in identifier column 2402*a*, data types associated with a data type column 2402*c* and an input type column 2402*d*. Table 2400 may be created from an existing form (e.g., a scan of a paper form) by optical character recognition (OCR), or may be created based on an existing paper or electronic form by a user (e.g., a data entry clerk) transcribing questions and types of answers. Alternatively, table 2400 may be created originally by a user into the form of table 2400 via an interactive user interface of the system. Advantageously, references between table 2400 and table 2410 may be dereferenced if and when they are needed; for example, at the time that a given entry in question column 2402*b* is referenced by an entry in section data item list 2412*d* that is associated with a form that a user is currently interacting with, table 2400 may be queried. This may be referred to as lazy evaluation. Advantageously, this may allow table 2400 to be updated independently of table 2410, and may thus facilitate parallelism between the tasks of creating table 2400 and table 2410.

Data type column 2402*c* comprises a data type associated with the question data item, such as a number (e.g., integer, float, or fraction), a character sequence or string, a dimensioned quantity (e.g., an amount of money), or other data type. Input type column 2402*d* comprises an input type associated with the question data item, such as a character string input (e.g., a text field), a push-button type input (commonly referred to as radio buttons), or a specialized input field for a specified quantity associated with a unit, such as money. Advantageously, table 2400 need not describe relationships between the questions, and may thus be created by a user or an automated system strictly by parsing or duplicating a paper-based form or questionnaire (e.g., by manually copying, or, e.g., via optical character recognition and language parsing, extracting the various question items in the form or questionnaire). FIG. 24B illustrates another table 2410, comprising various sections and defining a dynamic form. Each section may correspond to a row of table 2410 and may be associated with a unique section ID listed in column 2412*a*, a title or description of the section listed in column 2412*b*, a section input type listed in column 2412*c*, and a list of section data items shown in section data item list 2412*d*. Section data item list 2412*d* may reference question data items from table 2400 by their ID. The system may thus match items enumerated in section data item list 2412*d* with the associated value in identifier column 2402*a*. Section data item list 2412*d* may also specify other sections, optionally with branching instructions based on a specific question data item. For example, a question data item (e.g., D6) may be used as a jump condition. If a certain answer is given, the section may include one set of data items, whereas if another answer is given, another set of data items may be included in the section. Advantageously, this allows the system to dynamically hide follow-up questions that may not be necessary or the answer to which can be logically inferred from existing questions. For example, a question asking about a given entity being a natural person may be used as a jump condition, with questions about that entity's date of birth being shown only if the status as a natural person is affirmed. This may reduce the burden on the user to respond to the questionnaire, may prevent inconsistent information being recorded due to clerical errors, and may prevent user fatigue and annoyance due to being presented with irrelevant questions. Additionally, input type column 2402*d* may also comprise references to other sections. Advantageously, this may allow the designer of table 2410 to rearrange sections easily or repeat questions as necessary. References to other sections within input type column 2402*d* may also include a repetition indicator, specifying how many times the other section is to be repeated. For example, input type column 2402*d* may comprise an indicator that section "B" is to be repeated 4 times. This may reduce redundancy within table 2410; for example, if a question requests information from a user related to the user's last three employers, a section "employment" may be created within table 2410 with an indication that the section is to be repeated 3 times. Alternatively, some forms may request information from a user for which the designer of the form may not know how many times a given section will need to be repeated. For example, a form may request information about each of a user's employers in the last 2 years. The user may require none, one or multiple copies of the corresponding section to fully answer the question. The section may thus be associated with a user-determined repetition indicator. When the user is presented with the form, additional user interface elements may be shown to dynamically add and remove sections associated with the question. Advantageously, this may reduce the number of pages used for a form and increase the density of useful information, and the associated burden of filling out, storing, printing and reviewing, copies of forms. In an example embodiment, section title as shown in title column 2412*b* may be shown as a heading in a user interface presenting the questions associated with the given section to a user.

The section data item list 2412*d* may comprise the enumeration of input data items as illustrated in JSON (Javascript Object Notation), XML (extensible markup language), or another markup language that provides machine-readability as well as readability to humans. Advantageously, this may allow a user to review and edit items of section data item list 2412*d* that have been automatically generated by an automated system.

The system may process tables 2400 and 2410 to automatically generate a dynamic form along the lines described in reference, for example, to FIGS. 14G-14H.

Example Signatures Workflows

FIGS. 20, 21, 22A-22D, 23A-23H, 14C (described above), and 14J-14P, among other figures of the present disclosure, illustrate example user interfaces and processes for signing one or more documents, for example a package of documents (herein referred to as a signature package overview). As an example, multiple documents (also referred to herein as forms) may be specified in a user interface 1456, and a user may access each form to sign (e.g., described below with respect to FIG. 14J).

Figure 20:
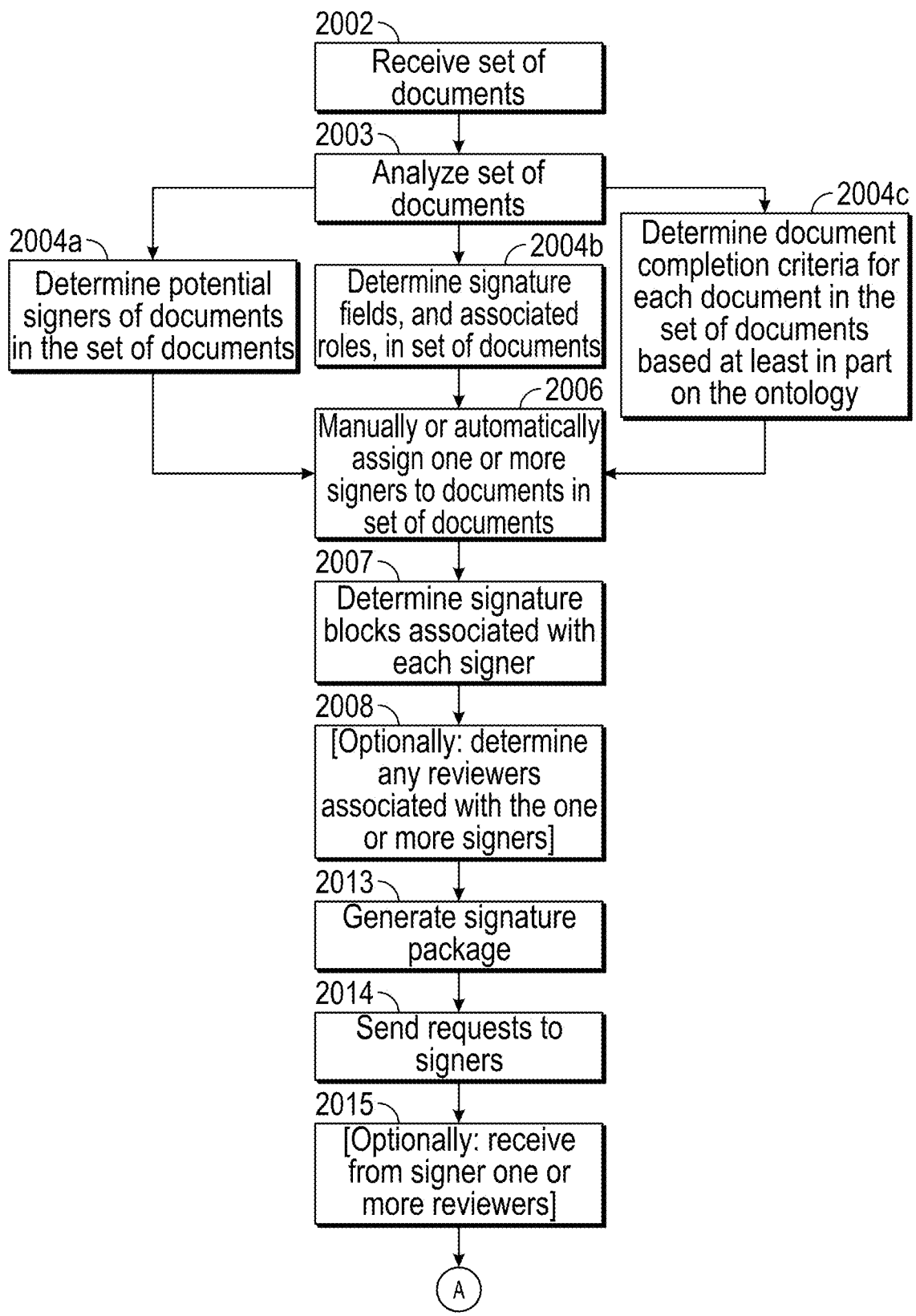
FIG. 20 is a flow chart of an example process including a workflow for generating, analyzing, and signing document packages.
Figure 20:
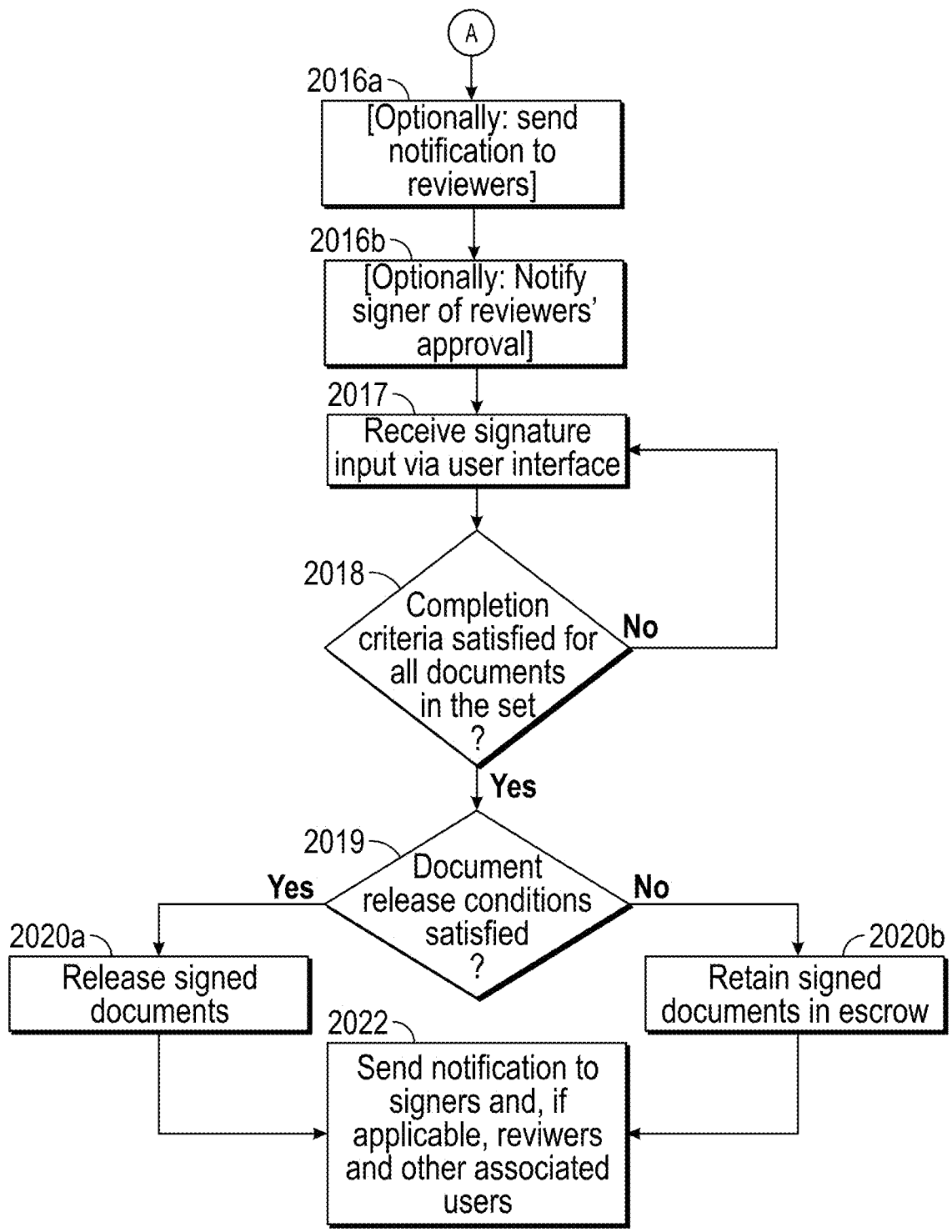

FIG. 20 is a flow chart of an example process including a workflow for generating, analyzing, and signing document packages. In block 2002, a set of documents is received from a user. The set of documents may be uploaded in one or more file formats, including PDF (Portable Document Format), docx (Open Document Format), plain-text, or any other suitable technical format.

In block 2003, the set of document may be analyzed by the system. For each document in the set of documents, text and metadata, such as author, date, and other associated parameters, may be extracted and analyzed. Additionally or alternatively, the text and/or visual structure of the document may be analyzed (e.g., through Optical Character Recognition [OCR]) or by parsing a document in a machine-readable format (e.g., OpenDocument) to extract the text contained within the document. Once the text has been extracted, parsing techniques may be applied, as described elsewhere in the present disclosure, to determine various items of information associated with the document.

In block 2004*a*, one or more potential signers may be determined from the document. The one or more signers may be determined based on metadata in the document (e.g., names contained within a metadata comment field), or by parsing names included in the document, such as on signature fields and/or elsewhere. For example, if a document's signature page contains names of users known to the system, these users may be determined to be potential signers of the document.

In block 2004*b*, one or more signature fields may be determined and located in the document. The determination may be based on, for example, Optical Character Recognition (OCR) techniques identifying shapes of signature blocks or signature lines, or identifying text commonly associated with signature fields. The identified signature fields may be stored, e.g., by document, page, and position within the page. For example, the system may determine that there is a signature field for "Dan Cooper" to sign in the capacity of "Chief Fund Manager" with a certain size and located at a certain position offset on page 3 of the document "Equity Partnership Documents .pdf".

In block 2004*c*, document completion criteria may be determined by parsing terms related to an approval quota; for example, if the document contains references to a "60% approval quorum", the system may extract this reference (e.g., through regular expression matching and/or other parsing techniques as disclosed herein) and determine associated document completion criteria. The completion criteria may then be used for calculating whether the document has been approved, e.g., by associating the data in table 2104 (of FIG. 21, further described below) with the completion criteria. Various completion criteria may be determined including a criterion whether all signers have signed, whether a certain percentage or total number of signers has signed, whether a certain quantity of signers has signed, or whether a weighted quorum (e.g., an aggregate ownership percentage of signer) has signed, and/or the like. A data source or database, such as an ontology, may be updated with the information extracted from the document.

In block 2006, one or more signers may be manually or automatically assigned to the document. Manual assignment of signers may be performed via graphical user interface, such as user interface 2340, as discussed herein with reference to FIG. 23D. Automatic assignment of signers may be performed with or without user confirmation, as discussed herein with reference to FIG. 23B.

In block 2007, signature blocks associated with each signers may be determined. The system may search its set of signature blocks (e.g., as determined in step 2004*b* and/or otherwise provided by users, as further described herein), to find those one or more signature fields associated with each signer assigned in block 2006. This may generate a mapping wherein each signer is associated with one or more signature fields. Advantageously, this may allow the system to verify whether a given signer has signed all pages that they are supposed to sign, and present a signer with all pages that require, but have not yet received, a signature by the specific signer.

In block 2008, one or more reviewers may be determined and associated with each of the one or more signers. Reviewers may be users of the system that are associated with the signature process of a specific document or set of documents by a specific user. They may or may not themselves be signers of the document. Example of reviewers may include other users with specific knowledge or trust relationships with the user (e.g., an advisor, supervisor, assistant, etc.). In various implementations, signers may specify reviewers to be associated with them via interactive user interfaces of the system, and such information may be stored with a profile of the signer.

Reviewers may be determined based on document-specific, signer-specific, or global rules. Document-specific rules may be associated with the specific document uploaded; for example, similar to the determination process of signers in block 2006, a set of reviewers may be automatically determined from metadata in the document. Alternatively or additionally, reviewers may be manually specified by the uploading user. The set of documents may be analyzed similar as discussed with reference to 2004a so as to determine one or more reviewers. For example, reviewers may be determined based on pre-existing relationships between users and reviewers (e.g., one user may be associated with a specified reviewer or group of reviewers), based on relationships between documents and reviewers (e.g., a document or type of document may be associated with a specific reviewer), and specific data in the document (e.g., a document may be associated with a metadata field indicating a specific reviewer).

In block 2013, a signature package may be generated for the user. A given user's signature package may include a set of only those documents that include a signature block for the signer. For example, the set of documents may include a first document "Doc X" to be signed by "User A", "User B", and "User C", and a second document "Doc Y" to be signed by "User A", and "User B", but not "User C". In this instance, User A's and User B's signature packages may include Docs X and Y, which User C's signature package may include only Doc X. In an implementation, the system may generate a personalized, duplicate copy of the set of documents uploaded in 2002 that may allow one signer to add their signature or other markup to their documents without affecting other signer's copies of the documents. In an implementation, a signature package may be identified by a filename specific to the user for which it has been created; for example, one document named "Doc X" to be signed by "User A", "User B" and "User C" may yield three signature packages, entitled "User A Doc X", "User B Doc X", and "User C Doc X", respectively.

In block 2014, signature requests may be sent out to signers, Signature requests may be sent out by email or other form of electronic messaging. Advantageously, signature requests may be transmitted via substantially real-time notifications (e.g., through a mobile app featuring push notifications or other types of real-time updating). The signature request may comprise the documents to be signed (e.g., as an attachment), or may comprise a unique link allowing the user to access, download and/or sign the signature package, e.g., via one of the interactive user interfaces of the system. An example user interface 2360 illustrating the submission of a signature request is discussed with reference to FIG. 23F.

In block 2015, one or more reviewers may optionally be received from the signer of the document. For example, where a reviewer may not have been associated with a signer initially, a signer, prior to or subsequent to receiving a notification regarding a signature package to be signed, may provide the system with an indication of a reviewer to be associated with them. Such information may then be stored by the system (e.g., in a profile of the signer) for future use.

In block 2016a, additional notifications may be sent to the reviewers (e.g., the reviewers specified by the user in block 2008, and the reviewers specified by the signer in block 2015). Similar to the notifications to the signers, the notifications to the reviewers may also comprise the documents to be signed (e.g., as an attachment), or may comprise a unique link allowing the review to access the signature package, e.g., via one of the interactive user interfaces of the system. The capabilities of the reviewer may be restricted compared to the signer; for example, the reviewer may only be able to see (but not modify or sign) the signature package. As discussed with reference to block 2014, reviewer notifications may also be transmitted via substantially real-time notifications.

In block 2016b, the system may automatically notify signers of their associated reviewers' approval of the documents of the signature package. For example, a reviewer may review the documents and then, either via a link in the electronic notification sent to the reviewer, or via an interactive user interface of the system, indicate an approval of the documents in the signature package.

In block 2017, one or more signatures from the signers may be received in a user interface. User interfaces, such as user interface 2220 and user interface 2230, capable of receiving the user's signature are discussed with reference to FIGS. 22C-22D, and FIG. 14C above.

In block 2018, after a signature has been received from a user, a determination of whether the document completion criteria have been met is made or updated in light of the additional signatures received. For example, table 2104 may be updated as discussed with reference to FIG. 21, to determine whether the set of documents should be considered approved. If the completion criteria are satisfied, execution of the flow proceeds to block 2019. If the completion criteria are not yet satisfied, execution returns to block 2017 to wait for additional signers to submit their signatures.

In block 2019, a set of release conditions associated with the document is determined. For example, some documents may be associated with a release condition that specified that the release of the signature package to the counterparty may be contingent on manual approval. Such approval may be given by the initial uploader of the document, for example through a user interface 2330 as discussed with reference to FIG. 23C. Documents may also be associated with a release condition that specifies that the documents are only to be released after a certain amount of time has elapsed from receipt of the last signature, or that a specific signer has signed. If the release conditions are satisfied, execution proceeds to block 2020a. If the release conditions are not satisfied, execution proceeds to block 2020b.

In block 2020a, the signed documents are released to the counterparty. In block 2020b, the signed documents are held in escrow. Regardless of whether block 2020a or 2020b is executed, notifications may be sent to signers and, if applicable, reviewers and other users (e.g., users associated with the document release conditions). The notifications may be sent as discussed herein with reference to block 2014.

FIG. 21 illustrates a table showing example completion criteria. In FIG. 21, an example table 2104 is illustrated as may be used by the system to determine possible signers of a set of documents, as well as to determine one or more completion criteria that may need to be met for the document to be considered approved or executed.

For example, example table 2104 may comprise a column 2108, containing the names and/or roles of possible signers. The system may or may not require each signer specified in column 2108 to execute a document. Each signer is thus associated with its own row in table 2104. To specify one or more completion criteria determining when a document has been signed by a sufficient quorum or quota of people to be considered approved, a column 2112 may associate a weight or influence with each signatory in weight column 2108. For example, the weight of a given signatory may be determined based on the signatories' equity share, voting rights, or other completion criteria associated with the specific document.

Scenario columns 2116*a*, 2116*b* and 2116*c* illustrate the approval state of various documents associated with the signers shown in table 2104. Each field in scenario columns 2116*a*, 2116*b* and 2116*c* is associated with the approval state of the signer associated with the respective column; as illustrated, a checked box represents a signed state or a true Boolean value, whereas a blank box represents an unsigned state or a false Boolean value. For example, scenario column 2116*a* refers to a document that has been signed by the two signatories associated with the top two rows in table 2104, and has not been signed with the remaining signatories. Scenario column 2116*b* is associated with another document that has been signed by a different set of signers.

Advantageously, combining the data in the scenario column associated with a given document, such as scenario columns 2116*a*, 2116*b* and 2116*c*, may allow the system to quickly and automatically determine whether the completion criteria has been met. For example, the completion criteria may be determined by element-wise multiplication (e.g., a dot product) of the respective scenario columns, such as scenario columns 2116*a*, 2116*b*, and 2116*c*, with weight column 2108 to determine a total weight or approval rating. For example, the total weight or approval rating document associated with the document associated with scenario column 2116*a* may be determined by calculating (39%*1)+(26%*1)+(14%*0)+(9%*0)+(9%*0)+(3%*0)=65%. The weight or approval rating may be compared with a threshold weight or threshold approval rating associated with the given document. For example, the document associated with scenario column 2116*a* may be associated with a threshold approval rating of 60%; in this case, the system may determine that the threshold approval rating of 60% is met by the total approval rating of 65% and thus consider the document approved and proceed with the signature flow process, as illustrated with reference to FIG. 21. If, conversely, the document is associated with a threshold approval rating of 70%, the system may determine that the document has not been approved by the required number of signers, and thus wait for additional signatures to be received before proceeding with the signature flow process as illustrated with reference to FIG. 21. The document completion criteria may be associated with the document, and may be, for example, received from the user when the document is uploaded, or may be automatically determined from parsing of terms within the document as discussed herein.

Figures 22A, 22B:
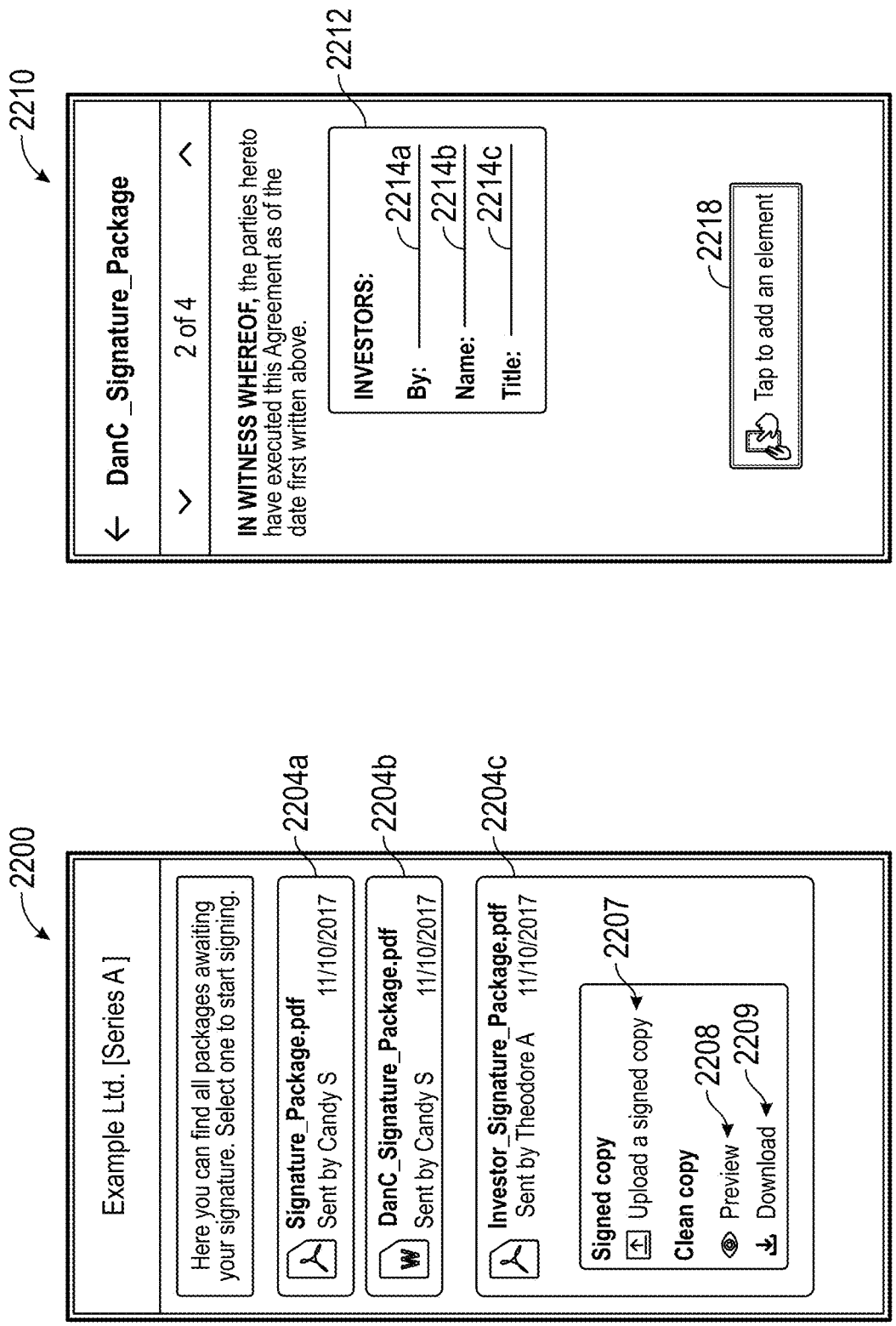
FIGS. 22A-22D illustrate example user interfaces, as may be presented to a user requested to sign a document.

FIG. 22A illustrates an example user interface 2200 as may be present to a possible signer, e.g., a signer identified in column 2108 of table 2104, as discussed with reference to FIG. 21 herein. The user interface 2200 may identify, in signature request fields 2204*a*, 2204*b*, and 2240*c*, various documents for which the user is a potential signer. Each of signature request fields 2204*a*, 2204*b* and 2204*c* may comprise text identifying the name of the document (e.g., a file name), the author or requester of the document, a date associated with the document, and a graphical indication of a file type or format (e.g., Portable Document Format or plain-text).

Upon selection of one of signature request fields 2204*a*, 2204*b*, or 2204*c*, a dialog comprising a document upload field 2207, a document preview field 2208 and a document download field 2209. Upon selection, document upload field 2207 may prompt the user to upload an electronic (e.g., signed and scanned) copy of the document associated with the selected signature request field. Document preview field 2208 may allow the user to preview (e.g., show, edit, and mark-up) an unsigned copy of the document associated with the selected signature request field. Document download field 2209 may allow the user to download to a local filesystem an unsigned copy of the document associated with the selected signature request field. A possible user workflow may be to first select document preview field 2208 to review the document presented for signature; upon concluding the preview, the user may return to user interface 2200 to select document download field 2209 to download a copy of the document to his or her local machine. The user may then either electronically (e.g., through a digital signature, cryptographic device, or by placing a graphical handwritten signature onto the document) sign the file. Alternatively, the user may print, hand-sign, and scan the signed copy of the document. The user may then upload the signed copy of the document using document upload field 2207.

Upon selection of document preview field 2208, the user may be presented with document preview user interface 2210, as shown in FIG. 22B. Document preview user interface 2210 may comprise various elements allowing the user to browse (e.g., navigate, zoom, scroll, search, and other related tasks) and mark-up the document. As illustrated, the preview user interface 2210 is showing a page of the document associated with it that comprises a signature block 2212. Signature block 2212 may further comprise a signee name field 2214*a*, a signee role field 2214*b*, and a signee title field 2214*c*. As discussed herein, the association between signature block 2212 and the corresponding page and position on the page (e.g., the size and shape of signature block 2212), as well as the presence, size and location of sub-fields such as signee name field 2214*a*, a signee role field 2214*b*, and a signee title field 2214*c* may be determined automatically by the system. In an embodiment, automatic character recognition (OCR) may be used at the analysis stage to determine the presence of these elements.

Element insertion button 2218 may allow the user to add additional elements, such as signatures, in the document. Upon selection of element insertion button 2218, the user may be presented with an element insertion user interface, such as element insertion user interface 2220, as discussed herein with reference to FIG. 22C.

Figure 22D:
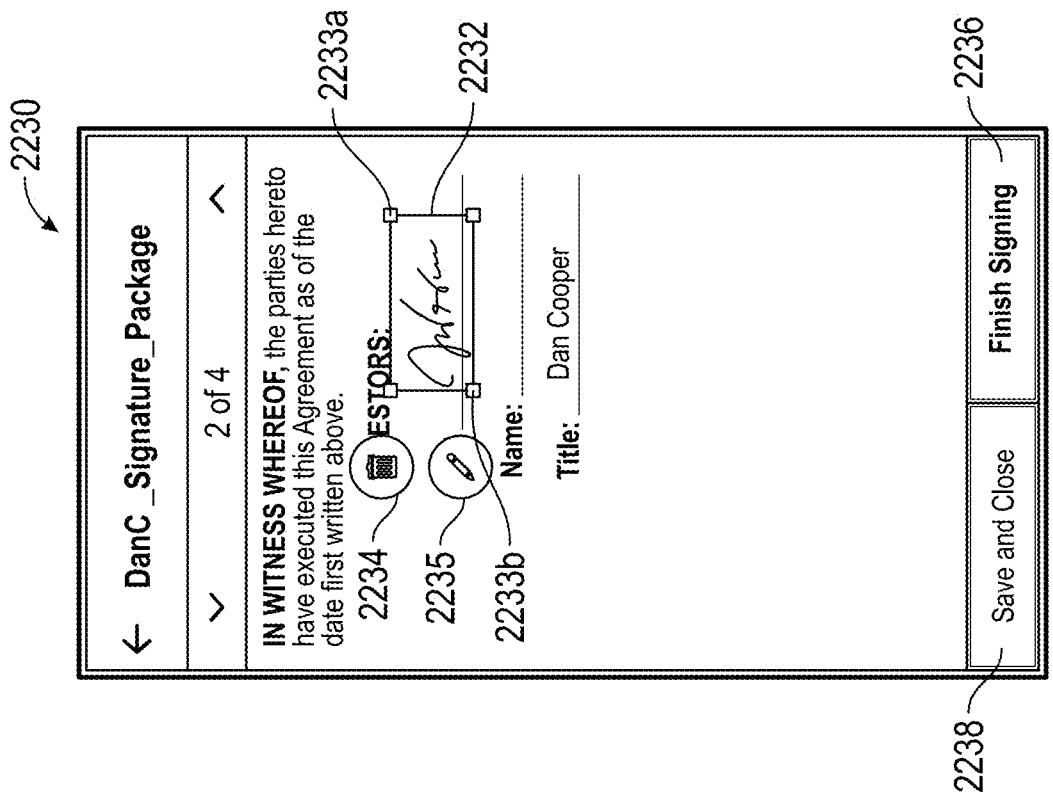
Figure 22C:
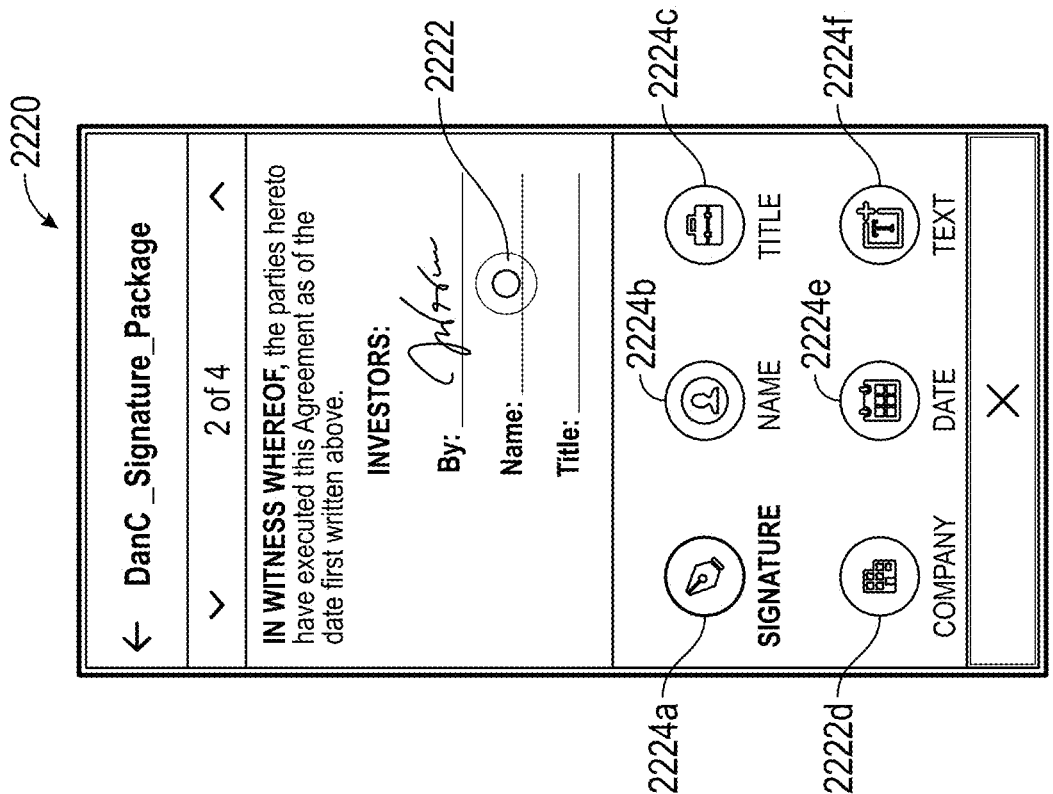

FIG. 22C illustrates an example element insertion user interface 2220. Element inserting user interface 2220 may respond to input events, such as input event 2220; input event 2220 may be, for example, a mouse click, touch input, or pen input. Open receiving an input event, such as input event 2220, a list of buttons corresponding to elements that may be added at the selected location may be presented. The list of elements may include an add signature button 2224*a*, an add name button 2224*b*, an add title button 2224*c*, an add company button 222*d*, an add date button 2224*e*, an add text button 2224*f* and/or other buttons or input elements corresponding to elements that may be added. Upon selection of one of the buttons, the corresponding element may be added at the location of input event 2222.

FIG. 22D illustrates another example user interface 2230, wherein the user has selected an element to be added to the document. User interface 2230 may be invoked by the user selecting, for example, add signature button 2224*a*. The user's signature 2232 may be added into the document at the location specified via input event 2220. Signature 2232 may be retrieved from a previously entered picture of the user's signature, or may be captured using a touch or pen interface or other user interface, such as discussed herein. Signature 2232 may be moved, rotated, and scaled along either or both axes by input events, such as by dragging signature 2232 across user interface 2230 using the mouse or another type of input device, or by selecting handles, such as handle 2233a or handle 2233b, and dragging them across user interface 2230. By selecting replace signature button 2235, the user may replace (e.g., re-capture or re-upload) the signature image currently shown as signature 2232. By selecting erase button 2234, the user may remove signature 2232 from the document. This may allow the user to remove a signature 2232 that has been placed in the document by mistake (e.g., on the wrong page). Once the user is satisfied with placing signature 2232 within the document, the user may select save button 2238 or finish signing button 2236. Save button 2238 may save the position, size and other parameters of the added elements, such as signature 2232, and return the user to user interface 2220. The user may thus be able to add additional elements. Finish signing button 2236 may allow the user to confirm that all the required elements (e.g., signature, title, name, additional remarks) have been placed on the document as required, and may allow the user to send off the document as signed. This may update the fields in table 2104 associated with the user and the respective document, and trigger a redetermination of the document's completion criteria. Upon selection of button 2236, the additional elements (e.g., the user's signature) may be rendered or superimposed onto the document; advantageously, the document may be rasterized, flattened or digitally signed to make more difficult any subsequent alterations, such as retroactive removal of the signature block.

Advantageously, user interfaced 2220, 2210, 2220, and 2230 may be a reactive user interface, e.g., it may adapt to the type, capabilities, size, and application support of the device or platform it is running on. For example, when user interface 2210 is shown on a device that is capable of receiving touch input (e.g., a device with a touch screen, such as a smartphone or tablet, or a workstation with a graphics tablet connected to it), additional functionality may be enabled based that may allow user interface 2210 to receive additional input from the touch capabilities. For example, the touch-based capabilities discussed with reference to FIGS. 22C and 22D may not be exposed, or may be emulated using mouse movements or other inputs, if the respective user interfaces are presented on a device without touch or pen input. A further example of a signature user interface that may similarly be used to sign documents is described above in reference to FIG. 14C.

FIG. 14J illustrates an example signature package overview interactive user interface. The overview user interface comprises an Edit button 1452, an E-Sign button 1454, a paper signature upload section/button ("Upload Signed Document"), a supplemental form upload section 1456, a download button and a submit button 1458. The Edit button 1452 allows the user to return to the previous screen to continue entering data into the form. The E-sign button 1454 brings up a signature screen that allows the user to electronically sign the form; further example signature user interfaces and functionality are illustrated in FIGS. 14K-14O below. The Download button allows the user to download a PDF version of the form. The paper signature upload section allows the user to upload a scan of a signed version of the form. Advantageously, at the user's discretion, the user may choose to sign a form electronically by E-sign button 1454, or may sign on paper and provide a scan to the system by first downloading a PDF version of the form using the Download button, printing, signing on paper, and scanning the form, and uploading the scan using the paper signature upload section. Advantageously, this option may allow the workflow to accommodate users preferring traditional paper-based signatures, without losing the advantage of having direct access to the form data in electronic format.

The supplemental form upload section 1456 allows the user to upload scans of additional forms. This may be advantageous for forms that need to be collected in a specific (e.g., government-mandated) format and thus may need to be collected separately from the form.

Advantageously, when a user uploads a form by using paper signature upload section/button, the uploaded document may be compared against the PDF version of the form to ensure that the user has indeed signed the document (signature presence verification), and to detect if the user attempts to upload a document that is different from the PDF version that was offered to download (document authenticity verification). Document authenticity verification may be made by, for example, including a digital watermark into the PDF file, and checking for presence of the digital watermark after receiving the uploaded document from the user. Alternatively, the document may be verified by performing graphical similarity testing and/or OCR (optical character recognition) in combination with text similarity testing on the uploaded document, and rejecting documents below a certain similarity threshold. Signature presence verification may be performed by graphical similarity testing of the signature areas, and rejecting documents above a certain similarity threshold (indicating that the area has not been signed).

By selecting the submit button 1458, the user can submit the signature package, including the form and any additionally uploaded forms in section 1456. Advantageously, the submit button 1458 may be disabled until all required signatures have been provided and any required additional forms been uploaded in section 1456.

FIG. 14K illustrates a user interface 1460 including a form being presented to a user for signature before the user has provided a signature, comprising a rendered representation 1461 of the form and a signature panel 1465.

Figure 14L:
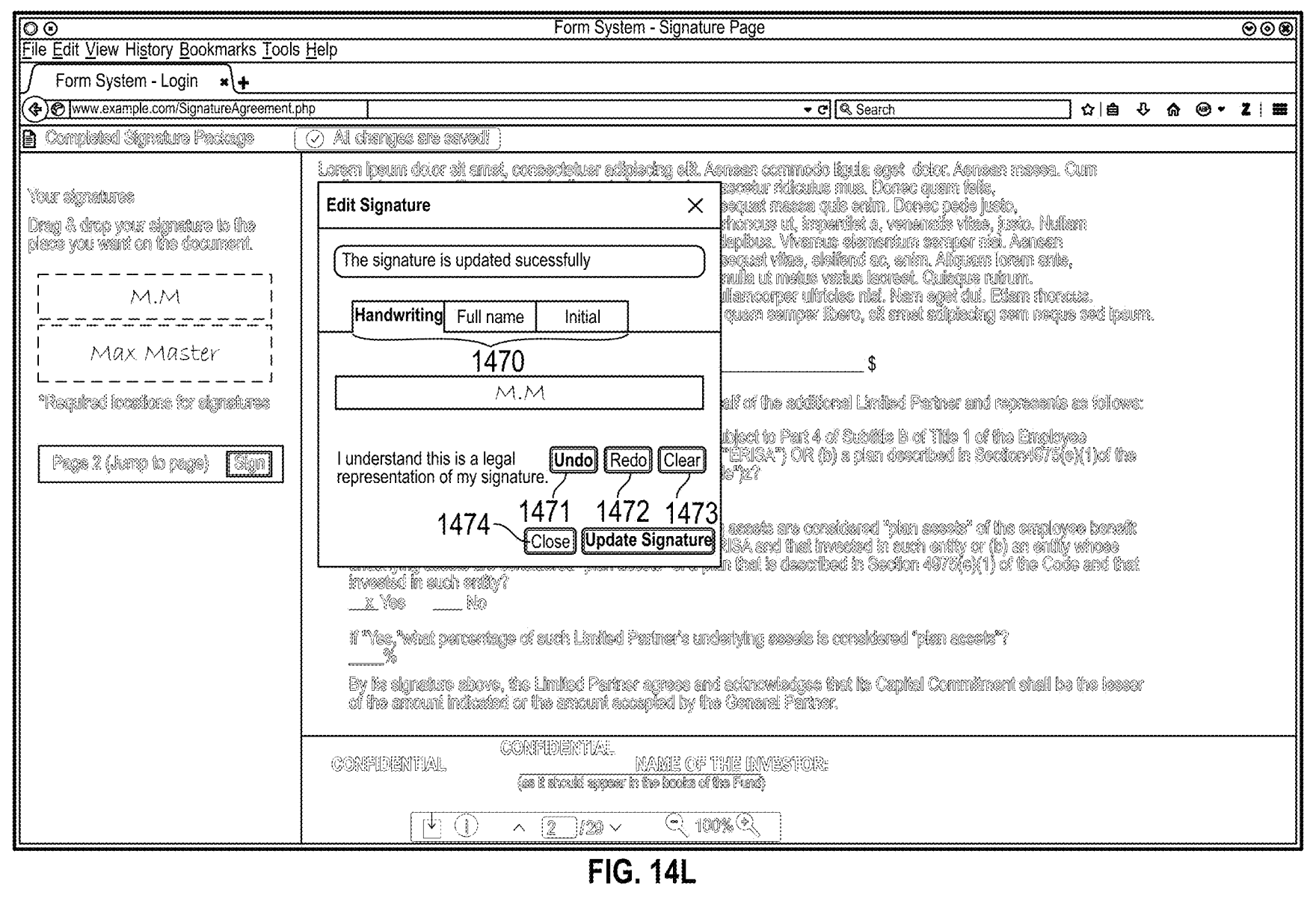

Rendered representation 1461 shows the form rendered into a printable representation. Notably, various elements in rendered representation 1461 may correspond to information that was entered by the user, for example in user interfaces such as those illustrated in the present disclosure. In the signature panel 1462, the user is presented with information about the user's stored signatures and where in the document the user's signatures are required. Stored signature field 1464 contains an image of the user's signature if it is currently stored in the system. By clicking on the stored signature field, a signature screen is brought up that allows the user to add, delete, or modify stored signatures. As illustrated, the user has not yet stored a signature, so stored signature field 1464 appears blank. An example signature screen is illustrated in FIG. 14L. Signature bookmark list 1468 shows the user a list of locations in the document where a signature is required. By selecting the "sign" button, the corresponding page is shown. Signature block 1469 indicates a location in the document where the user's signature is requested. Notably, the user is not prompted to sign in places in the document where another user's signature is required, thus assisting the user in avoiding signing in the wrong place. Advantageously, signature panel 1462 may allow the user to store a signature for use in this or other documents. As such, the user may be permitted to apply the same signature to multiple different signature lines or document, without physically signing such signature lines or documents. Advantageously, this may allow the user to prevent repetitive and unnecessary manual signing and ensures aesthetic consistency between documents.

FIG. 14L illustrates an example interactive user interface including a signature screen, wherein the user is prompted for a handwritten signature. The user may draw in the signature field below buttons 1470, for example by clicking and dragging the mouse, or by using a finger or a pen on a touch-enabled device. The user's input will appear as a black stroke resembling handwriting in signature field below buttons 1470. Undo button 1471 and redo button 1472 allow the user to undo, and redo, respectively, changes in the signature field below buttons 1470. The Close button 1474 discards entered changes, whereas the Update Signature button (located next to the Close button 1474) updates stored signature field 1464 with the new signature information provided in the signature field below buttons 1470. By selecting one of the Close button 1474 or the Update Signature button 1475, the user is returned to the previous screen. The clear button 1473 blanks the signature field below buttons 1470. The user may also make a selection from the signature type tabs 1470 to select a different type of signature input. For example, the user may choose from the signature type tabs 1470 to select either a handwritten signature, as illustrated, a typewritten signature, or a signature with the user's initials. Advantageously, the input in signature field 802 may be captured and stored in a vector format, such as scalable vector graphics (SVG) format to allow for high-quality scaling to different sizes and reduced storage requirement. The signature may be rasterized, or converted to a bitmap format, when it is inserted into a document and output to a user.

It will be appreciated that more or less detailed user interfaces may be presented instead or in addition to the interface illustrated in FIG. 14L. For example, a centralized view may be provided wherein the user is not shown a single document, but an overview of all of a certain group of documents, such as all unsigned documents. The signing interface as illustrated in FIG. 8 may also be embedded in other user interfaces by the system; for example, the system may allow users to embed the signing interface within messages sent to other users.

Figure 14M:
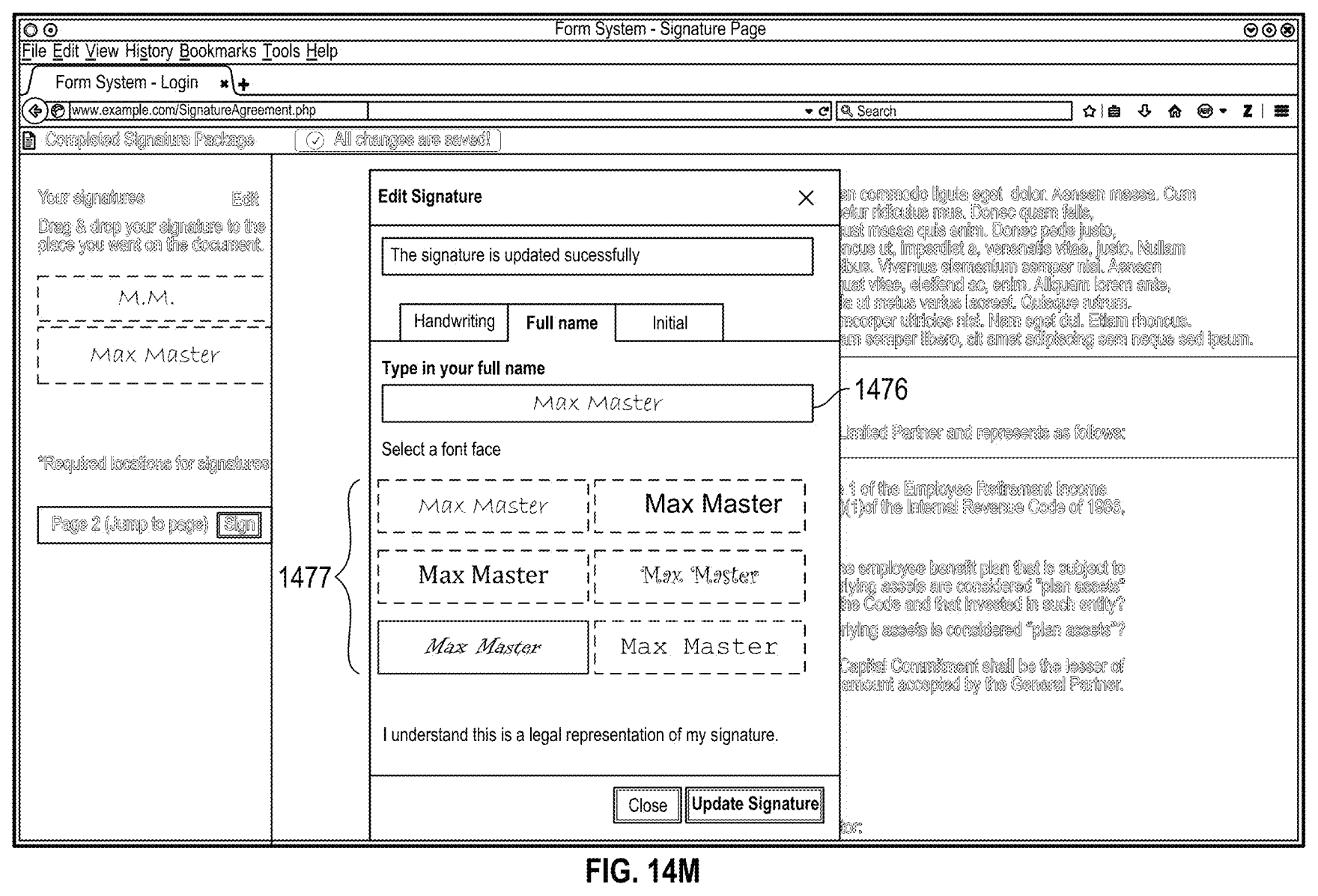

FIG. 14M an example interactive user interface including a signature screen, wherein the user is prompted for a typewritten signature. The user may enter his or her name in the signature field 1476, and may pick a typeface from the list of typefaces 1477.

Figure 14N:
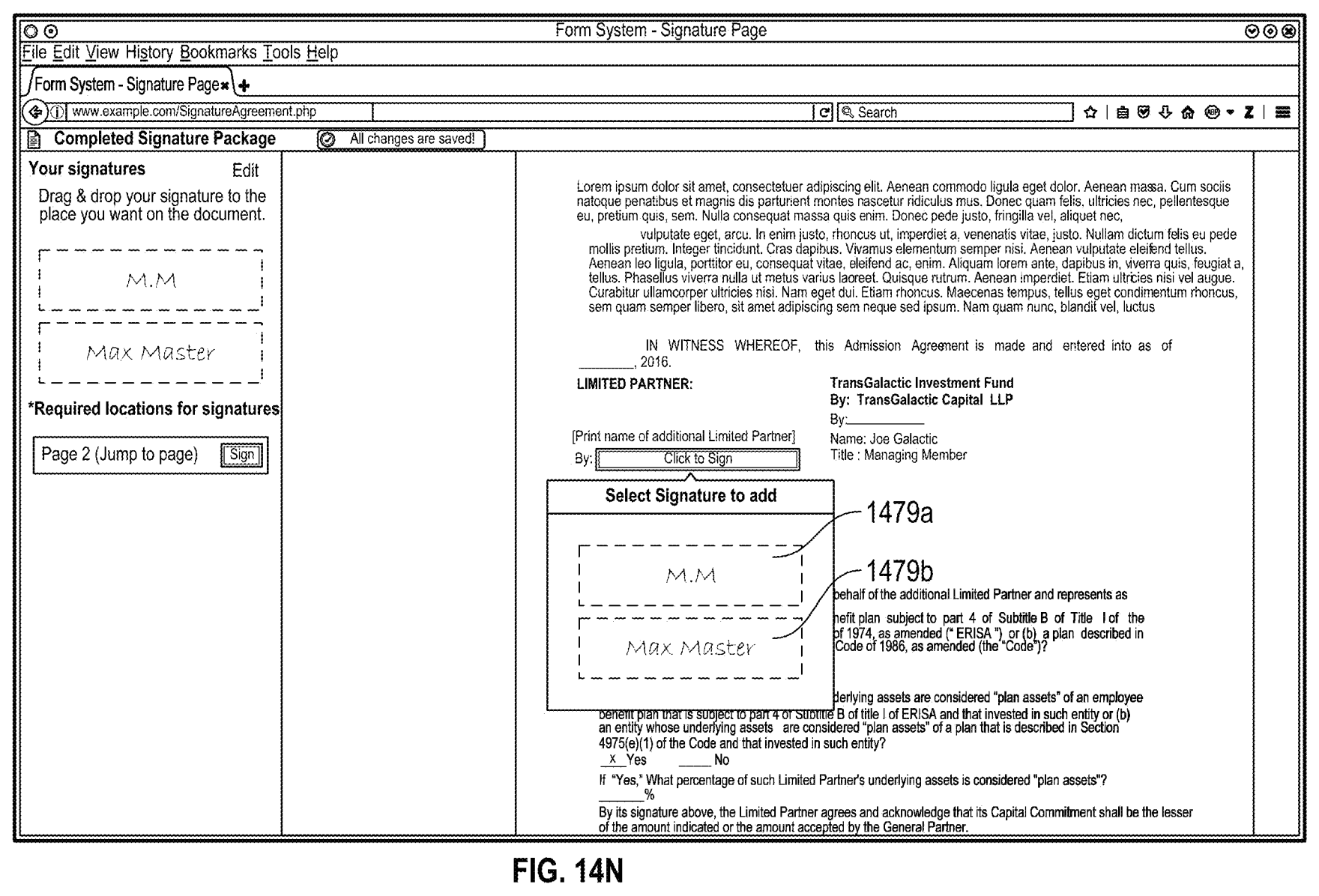

FIG. 14N illustrates an example interactive user interface including a form being presented to a user for signature after the user has provided both a typewritten and a handwritten signature and has selected signature block 1469 (as described in reference to FIG. 14K). The user is presented with signature images 1479a, 1479b of the user's signatures that are stored in the system. By selecting one of signature images 1479a, 1479b, the document is signed by superimposing the selected signature image onto signature block 1469. In an embodiment, the user may, by selecting and dragging the superimposed signature image, determine the scale and position of the superimposed signature image relative to the document.

FIG. 14O illustrates an example interactive user interface including a form after it has been electronically signed by the user, with the signature image 1479a superimposed on signature block 1469. It will also be appreciated that various elements in the rendered representation 1461 correspond to information entered by the user. For example, information in the name blank 1486 corresponds to information entered in a name field of another user interface of the system. Similarly, information entered in the capital commitment blank 1490 corresponds to the information entered in a capital commitment field of another user interface of the system. The answer choice selected in the check box 1494 corresponds to the answer choice selected in a first question box provided in another user interface of the system. Advantageously, the information may be rendered in a non-interactive way, as illustrated by the use of a checkmark in checkbox 1494, to indicate to the user that at this stage, the form is not intended to be changed. The system may utilize a set of rules to replace interactive components by non-interactive components; for example, an interactive text box may be replaced by a non-interactive field, and an interactive push button may be replaced by a non-interactive box that can be either checked or blank. The form may also comprise in its rendered representation sections or questions that were previously hidden from the user; for example, blank 1496 corresponds to information that, the system has, in response to the user's answer choice in a question box of another user interface of the system, chosen not to solicit.

Figure 23A:
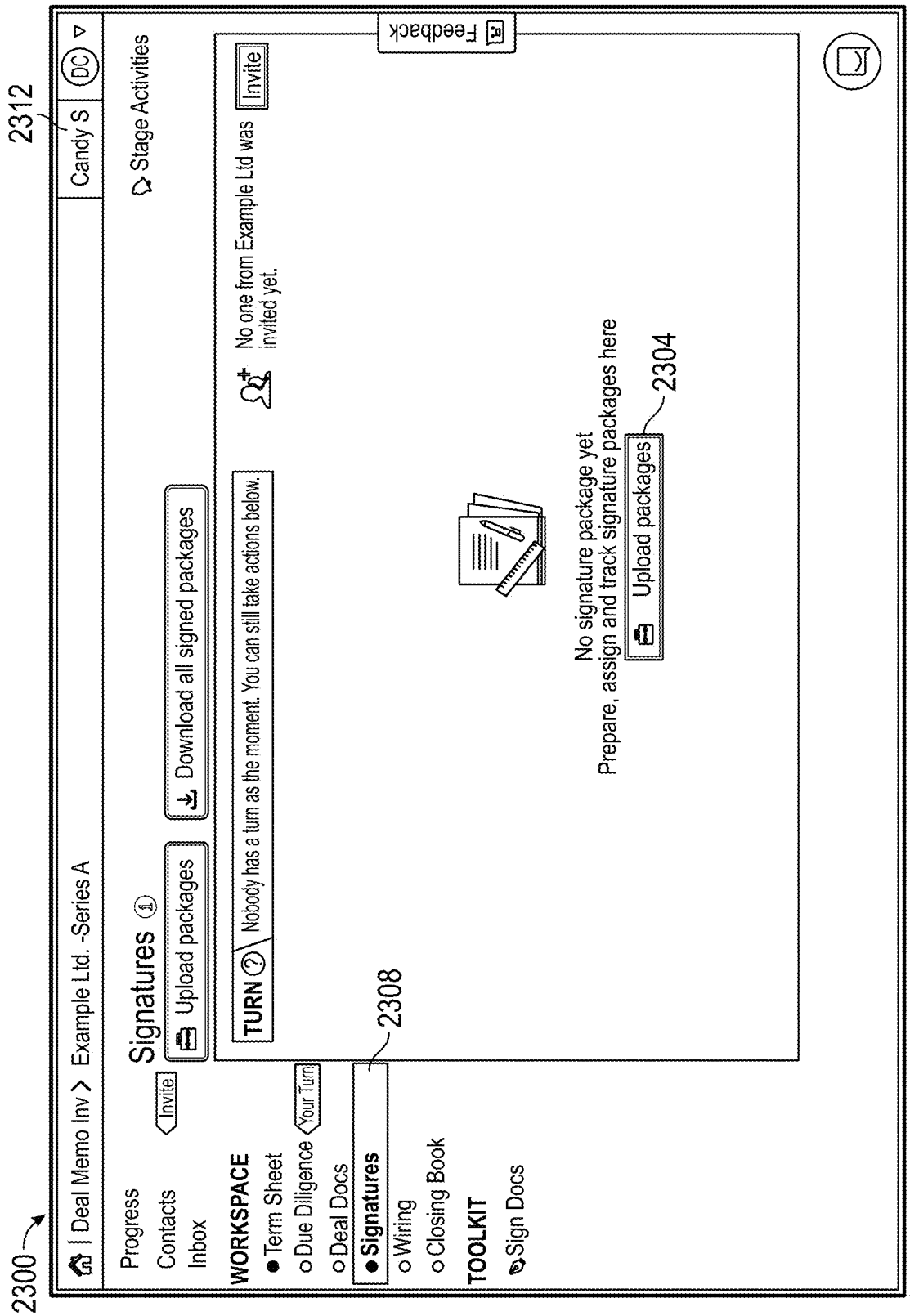

FIG. 23A illustrates another example user interface 2300, showing an example document upload interface. User interface 2300 may indicate the identity of the currently logged in user in label 2312. Task row 2308 indicates that the user interactive with user interface 2300 is currently in a mode to upload new documents for signature. User interface 2300 may thus interact with the same or different users as the signers associated with the documents, and may allow users to become requesters or uploaders for some, and signers for those same or other documents. Upload button 2304 may initiate a new upload of a document package. Upon selection of upload button 2304, the user may be prompted to select one or more documents from a local filesystem and upload them to the system. Once an upload has been received and processed, the user may proceed to the next user interface specifying the desired signers of the uploaded document.

Figure 23B:
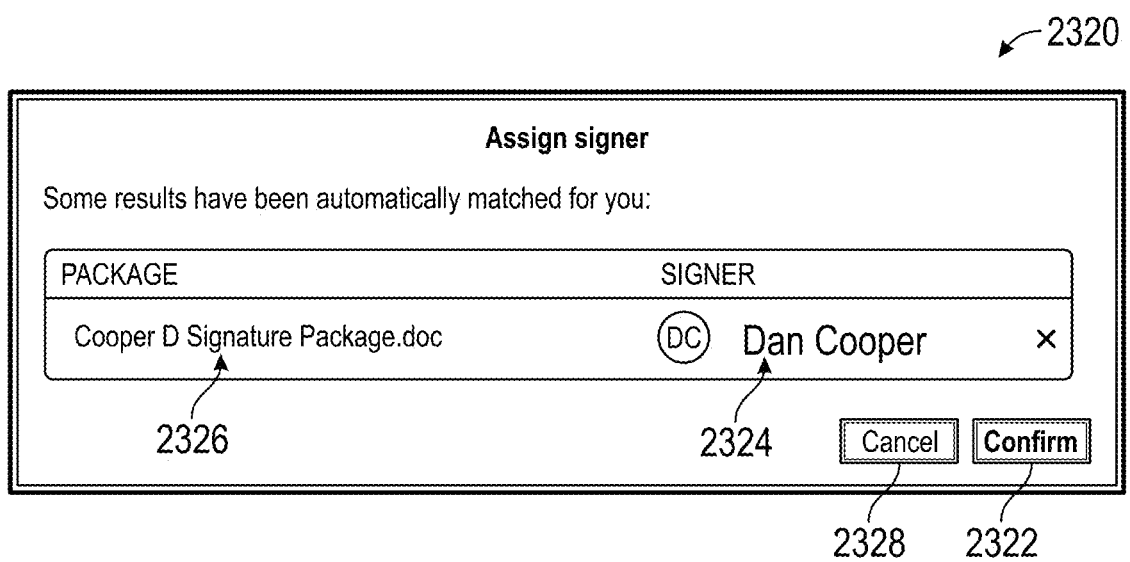

FIG. 23B illustrates a user interface 2320, allowing a user to confirm the names or roles of signers of a newly uploaded document. Advantageously, the system may, upon a document being uploaded, analyze the document to determine one or more prospective signers itself. For example, the document contents (e.g., the text contained in the document) may be extracted using optical character recognition (OCR) or, in the case of a machine-readable format such as OpenDocument or RTF, using text extraction, and pattern matching may be performed on the document as discussed herein to determine the names of one or more prospective signers. For example, a list of prospective signers may be matched against text appearing the document to determine potential signers. Additionally or alternatively, metadata (e.g., document author, filename, or other information) may be matched against a list of potential signers. Proposed signer column 2324 and document name column 2326 illustrate the associated between uploaded document and proposed one or more signers as determined by the automatic analysis. Cancel button 2328 may return the user to the previous interface, such as user interface 2300. Confirm button 2322 may allow the user to proceed with the uploading process.

Figure 23C:
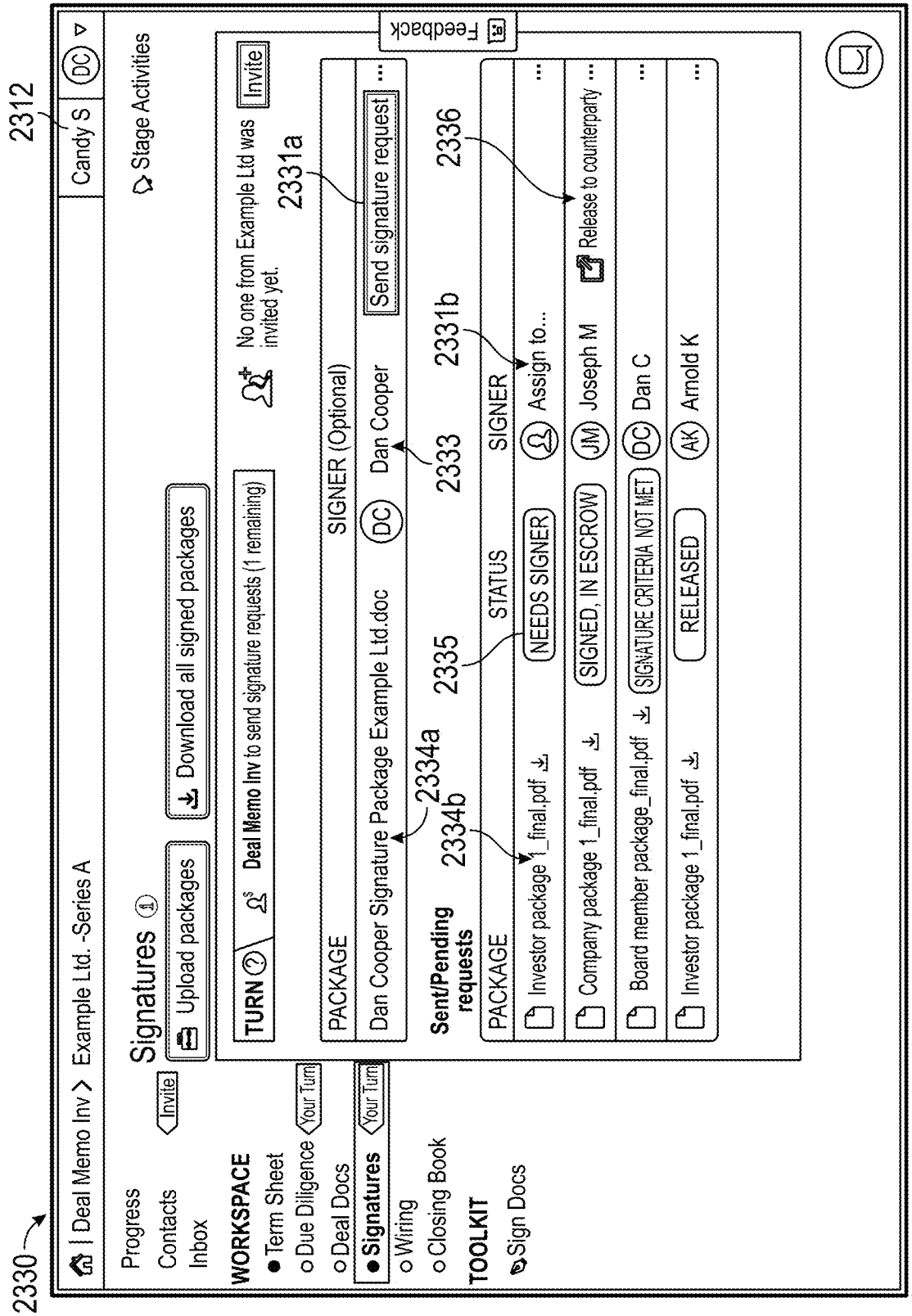

FIGS. 23C and 23E illustrate user interface 2330 and user interface 2350, respectively. User interfaces 2330 and 2350 are in some aspects similar to user interface 2300, but comprise multiple indicators associated with documents which have already been uploaded or are currently mid-way through the uploading workflow. Column 2334a lists documents which have been uploaded, but no signature requests have been sent out yet to any signers. Advantageously, this presents the user with a unified view of documents for which action on the user's part is required to move the signing process of the document forward. Column 2333 lists the signer or signers associated with the documents listed in column 2334a. Button 2336 allows the user to cause a signature request associated with the document to be sent out. Column 2334b lists documents for which requests have been sent out; status column 2335 indicates the current status of the document in the signature process. Action column 2336 may comprise an action button that allows a document to be released to a counterparty associated with the document. Action column 2336 may be empty for documents that have not yet had their approval criteria met; for such documents, the system may thus automatically prevent inadvertent release to the counterparty. Signer column 2331b shows the one or more signers associated with the respective document. Where no signers is assigned to a specific document, signer column 2331b may comprise, in lieu of the name of a signer, an action button, upon the selection of which a user interface dialog allows the user to specify one or more signers to be associated with the document.

Figure 23D:
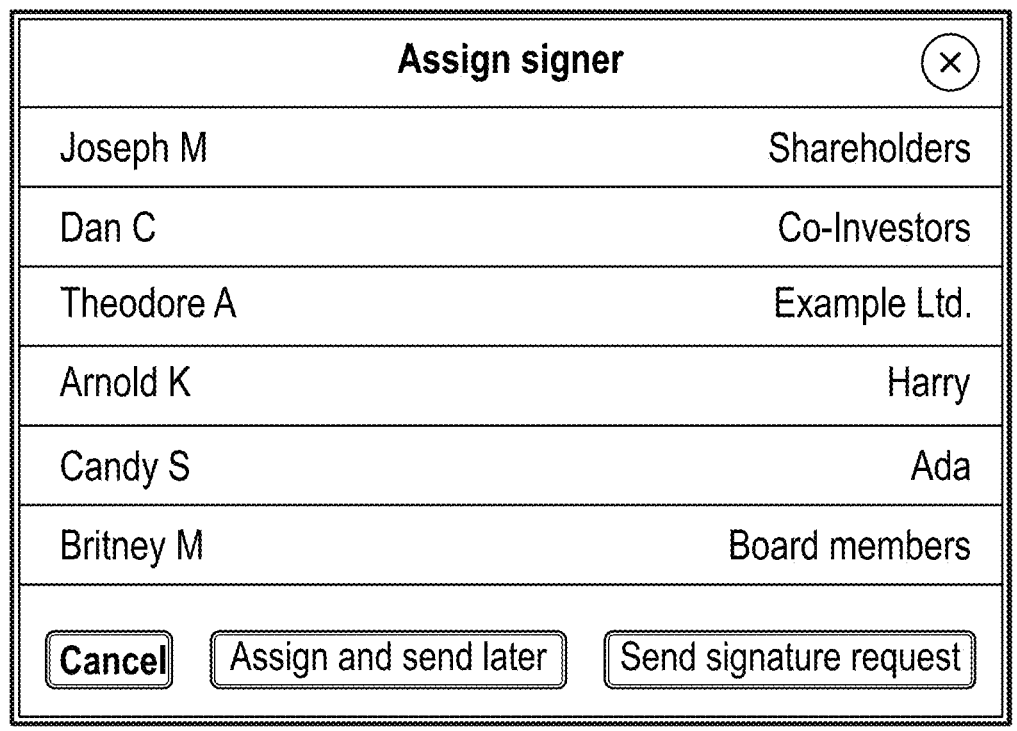

FIG. 23D illustrates a user interface 2340 in which one or more signers may be specified by a user. Advantageously, the names and roles of prospective signers are presented in a table or spreadsheet-like view. Upon selection of one or more of the prospective signers, the prospective signers are associated with the document; additionally, document signature requests may be sent out, table 2104 may be updated, and the document completion criteria may be recalculated in light of the changed number or identity of prospective signees.

Figure 23F:
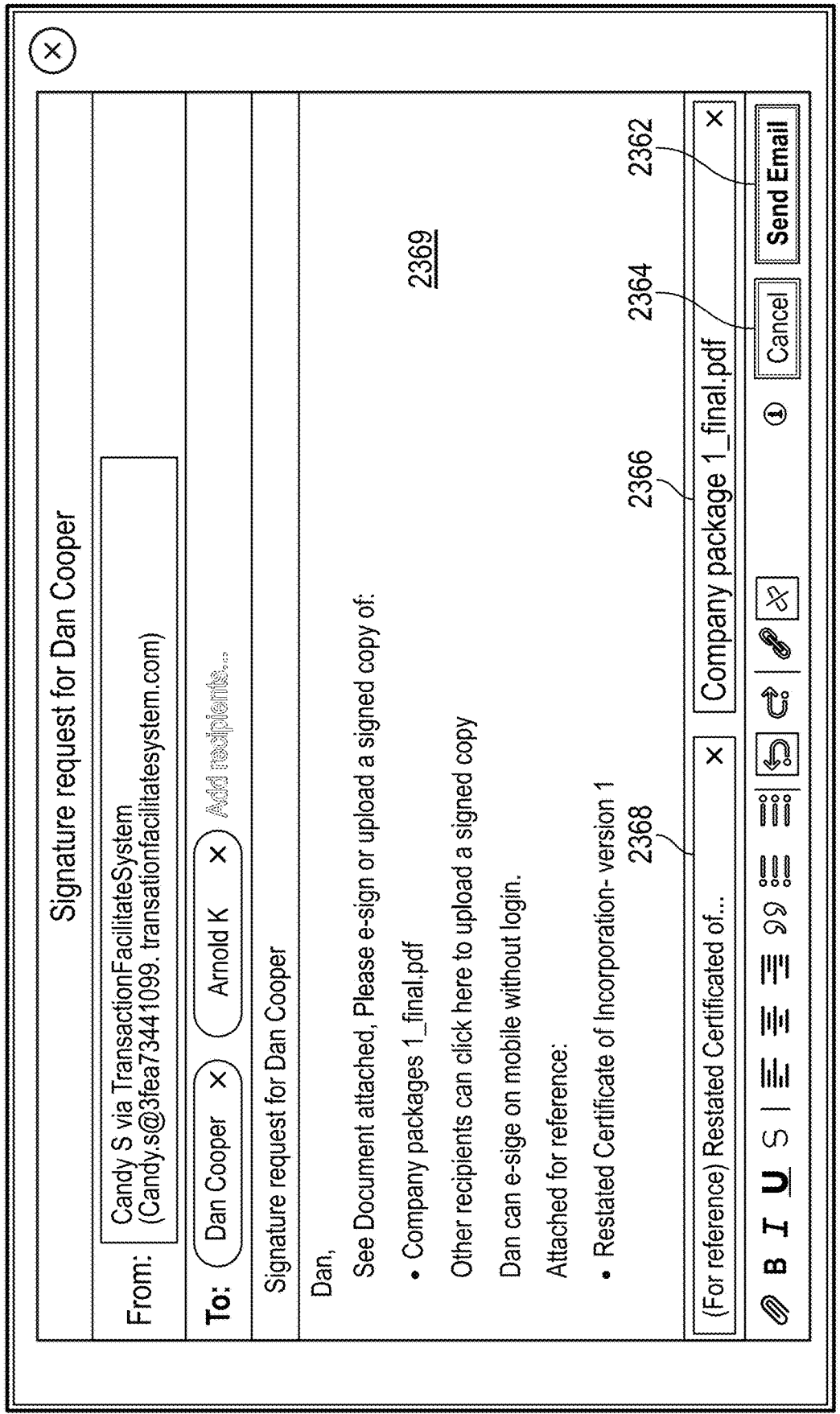

FIG. 23F illustrates a user interface 2360 presenting a signature request dialog. User interface 2360 may in some aspects be similar to an email or webmail interface and may comprise a pre-populated composition area 2369. Composition area 2369 may comprise pre-filled sender, recipient subject and body information based on a template populated with information such as the currently logged in user, the name of the document, the name of the intended signer of the document, and other information associated with the document. Advantageously, a sender email address may be dynamically created specifically for the signature request. For example, a unique identifier (e.g., Globally Unique Identifier) or hash associated with the document may be encoded in the user or domain part of an email address. Advantageously, this may allow the system to track the communication associated with the document request and associate any responses from the recipient with the specific request, while allowing the recipient to use existing and familiar email infrastructure to respond to the request. Attachment indicators 2368 and 2366 may also be prepopulated with information (e.g., the filename or description) of the document which will be attached to the signature request email. Advantageously, attachments may be included that contain both the document to be signed itself (e.g., as shown in attachment indicator 2366), as well as other documents providing context or additional reference to the document (e.g., as shown in attachment indicator 2368). Cancel button 2364 and send button 2362 may be selected by the user, causing the signature request email to be discarded or sent, respectively.

Figure 23G:
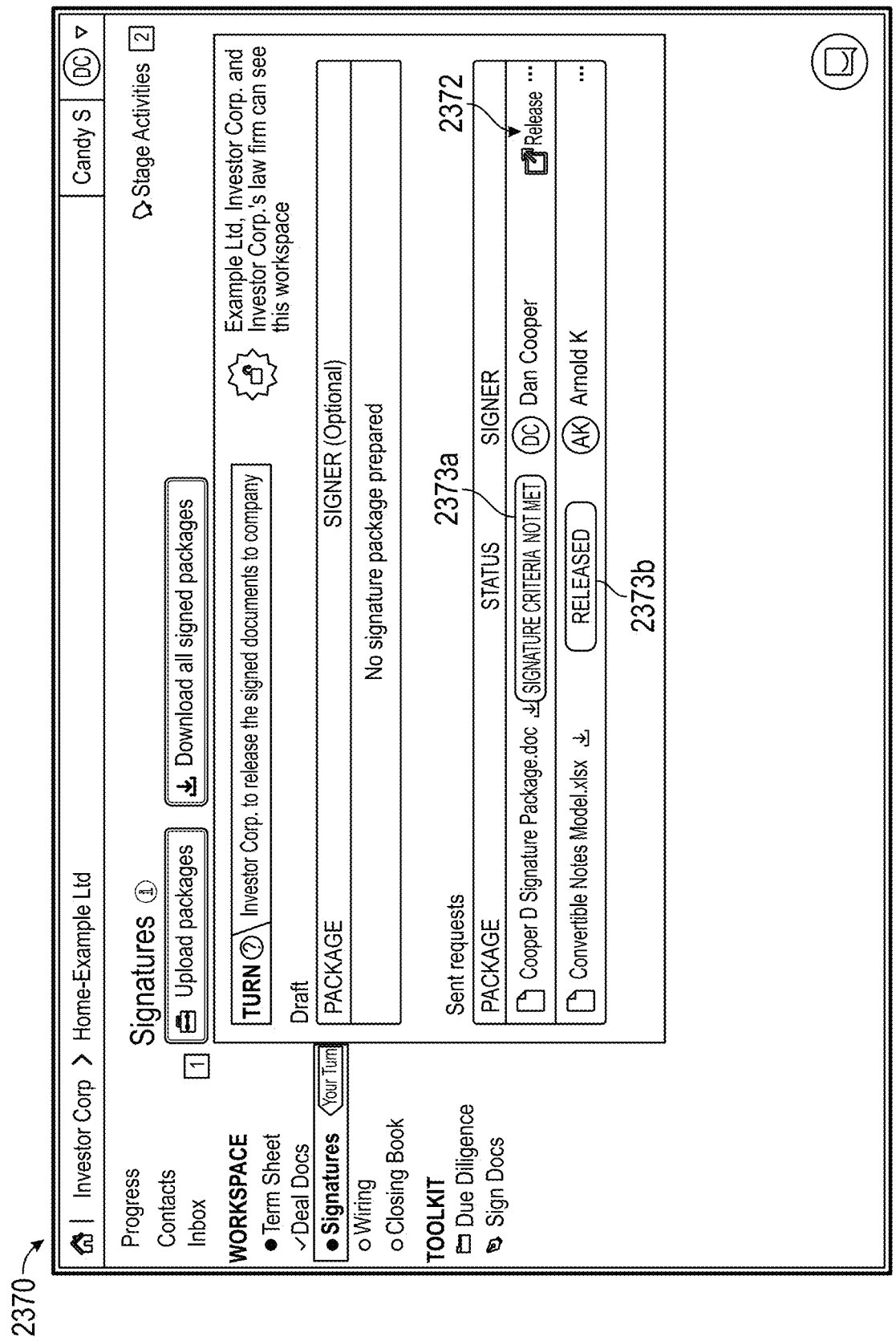
Figure 23H:
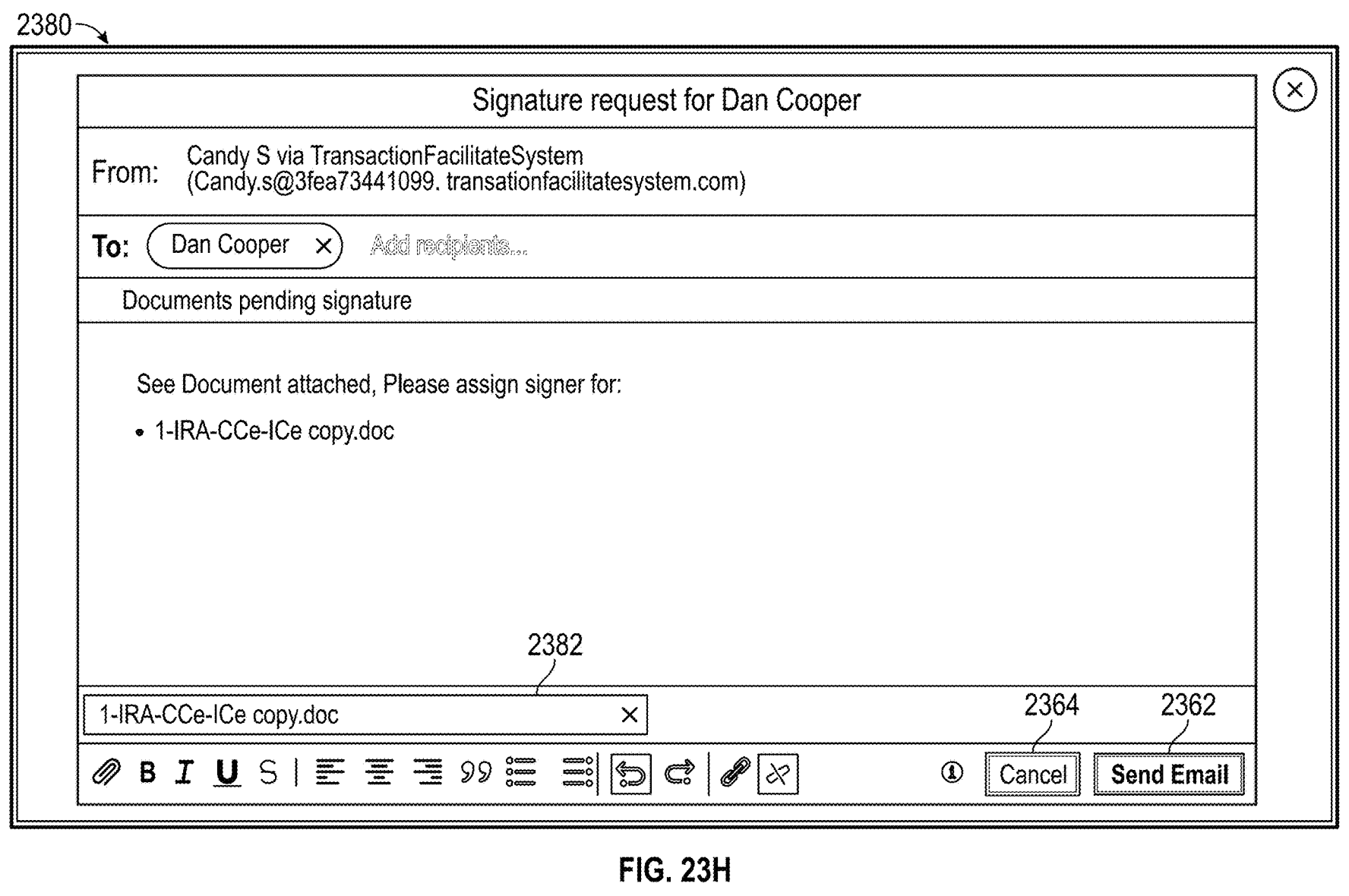

FIGS. 23G and 23H illustrate additional example user interfaces of the system. FIG. 23G illustrates a further example user interface 2370 listing signature package statuses, including 2373a ("signature criteria not met") and 2373b ("released"). The user interface further includes a "release" button 2372 by which the user can manually release the documents of the signature package even though the completion criteria are not yet met. FIG. 23H illustrates and example user interface 2380, similar to the composition user interface shown in FIG. 23F, but with an email prepared to be sent with an attachment 2382. Cancel button 2364 and send button 2362 may be selected by the user, causing the email to be discarded or sent, respectively.

User interface 2370 is another user interface as may be presented to an uploader of a document. The signature package referenced by status indicator 2373b may have progressed further in the signature workflow (e.g. past block 2019 and to block 2020a, as discussed with reference to FIG. 20). In contrast, the signature package referenced by status indicator 2373a may not have its completion criteria satisfied; with reference to FIG. 20, this may correspond to the document package having reached (and potentially looped one or more times at) block 2018.

In an embodiment, a document release indicator 2372 may be shown for the document, as illustrated. This may allow the document to be released to the counterparty despite being in a partially unsigned state. This may correspond to overriding block 2018 and 2019, and manually proceeding at block 2020a, as discussed with reference to FIG. 20. In other embodiments, document release indicator 2372 may be hidden unless and until the document release criteria associated with the respective document are satisfied.

FIG. 23H illustrates an example signer request dialog comprising a user interface 2380 for sending out a notification to another user, requesting assignment of a signer for a document package. As discussed with reference to user interface 2360, user interface 2380 may share some characteristics with an email or webmail interface, including buttons 2364 and 2362, that users may already be familiar with.

User interface 2360 may be shown to a user having uploaded a document package for which no signer was specified (e.g. no signer was specified in block 2006). In this case, the user uploading the document package may send a request to a reviewer or other user, indicating that one or more signers should be specified. User interface 2380 may further comprise an attachment indicator 2382, indicating that a blank or unsigned copy of the document package will be attached to the notification; advantageously, after a signer has been specified, the system may resume the workflow (e.g. at block 2007, as discussed with reference to FIG. 20), and (e.g. in block 2013) generate personalized signature packages for each signer that was specified.

Figure 14P:
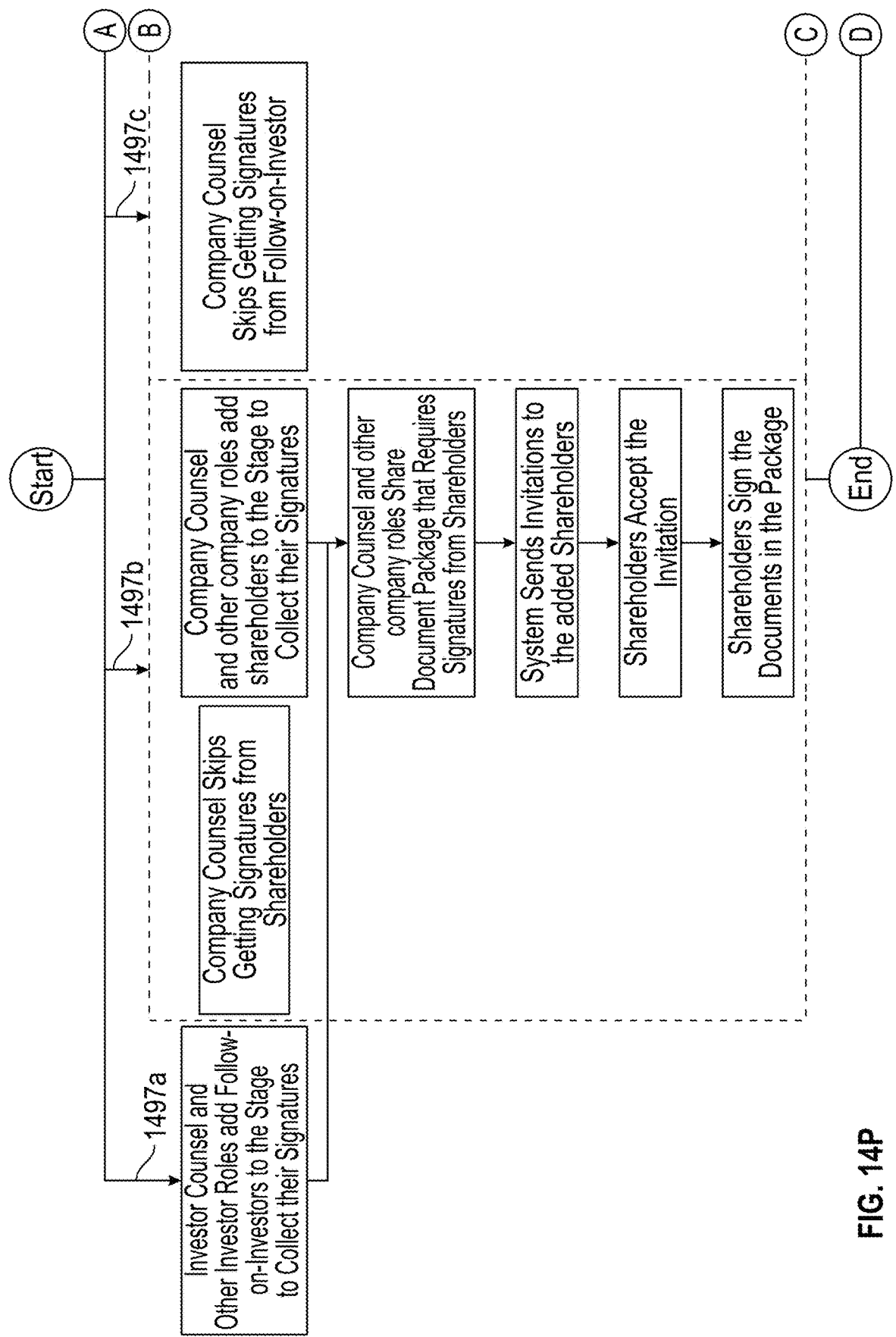
FIG. 14P is a flowchart of an example process for managing obtaining signatures from various users, according to various embodiments of the present disclosure.
Figure 14P:
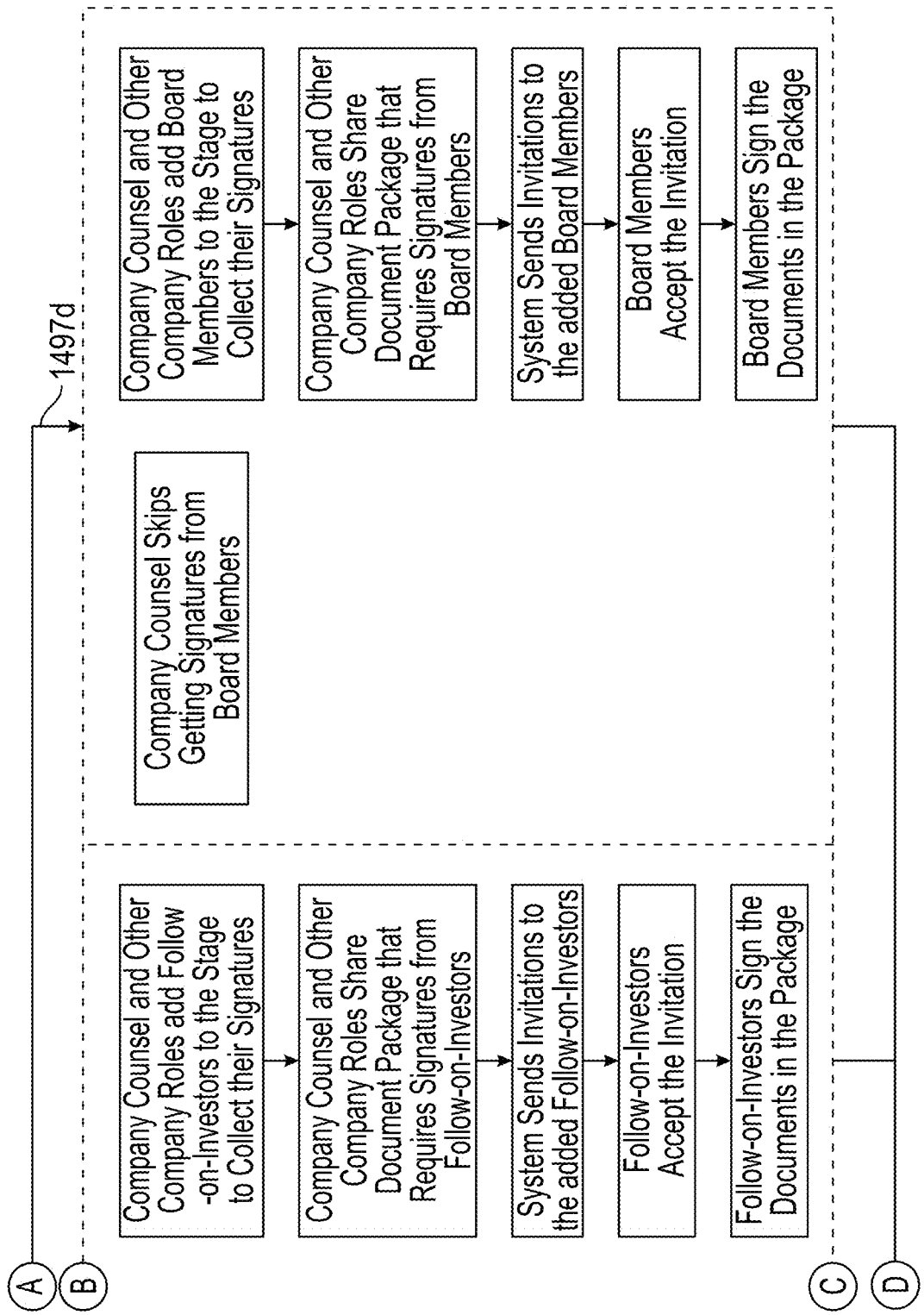

FIG. 14P is a flowchart of an example process for managing obtaining signatures from various users. An overall goal of obtaining signatures on a document from various parties may be separated into various sub-goals or tasks, each associated with a corresponding logical flow represented as nodes in a flow graph. For example, flow 1497a begins with an investor counsel user adding investor users. Flow 1497b begins with a company counsel or other company-affiliated user adding shareholder users, or declining to do so. Flow 1497c begins with a company counsel or other company-affiliated user adding follow-on investor users, or declining to do so. Flow 1497d begins with a company counsel or other company-affiliated user requesting signatures from company board members, or declining to do so. In flows 1497a, 1497b, 1497c, and 1497d, the system then follows the sequential steps in each flow towards completion of the sub-task or goal.

For example, where flow 1497b requires signatures to a document package from shareholders, the system allows the company-affiliated users to share the appropriate document package, sends invitations to the respective shareholders, and receives the appropriate signatures. Similarly, where flow 1497c requires signatures to a document package from follow-on investors, the system allows the company-affiliated users to share the appropriate document package, sends invitations to the respective follow-on investors, and receives the appropriate signatures. Where flow 1497*d* requires signatures to a document package from board members, the system allows the company-affiliated users to share the appropriate document package, sends invitations to the respective board members, and receives the appropriate signatures. Advantageously, if before, or during flow 1497*b*, flow 1497*c* or 1497*d*, additional shareholder users are added by progress in flow 1497*a*, the additional shareholder users may be included in the process as illustrated with flow 1497*b*, flow 1497*c*, or flow 1497*d*.

The goal may be considered accomplished when all flows comprising the goal have concluded. Advantageously, this allows multiple users or flows to progress towards the goal to proceed in parallel or simultaneously, thus reducing deadlocks that may be created if only one serialized flow were to be used. The flows of FIG. 14P are provided for illustrative purposes only, as an example of one implementation or application of the system.

In various implementations, the system may provide flexibility regarding where and how signatures can be requested across multiple user interfaces of the system. For example, the system may provide a centralized view showing all documents. In another example, the system may provide links to individual documents associated with particular goals and/or inside specific discussion channels. Additionally, the system may maintain signatures and/or signed documents in a holding area or secure storage area to be released to counter parties on demand. Examples of these various implementations are described in the present disclosure.

FIGS. 14Q1-14Q2 illustrate an example interactive user interface 1498*a* presenting an activity overview, as may be provided to an administrative user. The activity overview 1498*a* comprises a dashboard 1498*b* comprising a textual overview 1498*c* and a graphical overview 1498*d*, and a user invitation section 1498*f*. Textual overview 1498*c* and graphical overview 1498*d* display to the user about various quantities, including aggregate quantities, calculated by the system, for example by using semantic information acquired through the use of interactive forms, as discussed. For example, graphical overview 1498*d* may display a bar graph 1498*e* that compares total investment commitment made my all limited users in aggregate to a predetermined goal. This may be calculated by the system totaling the investment contribution from each limited user as determined through the forms. Invitation section 1498*f* allows the user, as discussed above with reference to FIG. 14I, enter username and email address of other limited users or administrative users, and thus allow them to create an account in the system with the appropriate access.

FIG. 14R illustrates an example interactive user interface of the system showing an administrative user interface 1499*a* displaying a user overview. User overview 1499*a* comprises a list 1499*b* of limited users and a list 1499*c* of administrative users, each user displayed in a separate row together with the user's status. For example, list 1499*b* may, for each limited user, indicate at what stage in the workflow the limited user has last worked on. For example, if a limited user has been sent an invitation, but has not yet created an account, the user's status may appear as "invitation sent". If the user has created an account, but has not yet submitted all forms required for a particular transaction, the user's status may appear as "in progress". Finally, if the user has completed all requisite forms, the user's status may appear as "joined". Similarly, list 1499*c* indicates information, including the user's name, the user's email address, and the user's invitation date, about each administrative user's name and status. As described below, the system may track and manage each user's progress in completing a series of steps or goals. In various implementations, the user may receive notifications and/or provide inputs via interactive user interfaces, emails, and/or the like.

Figure 15:
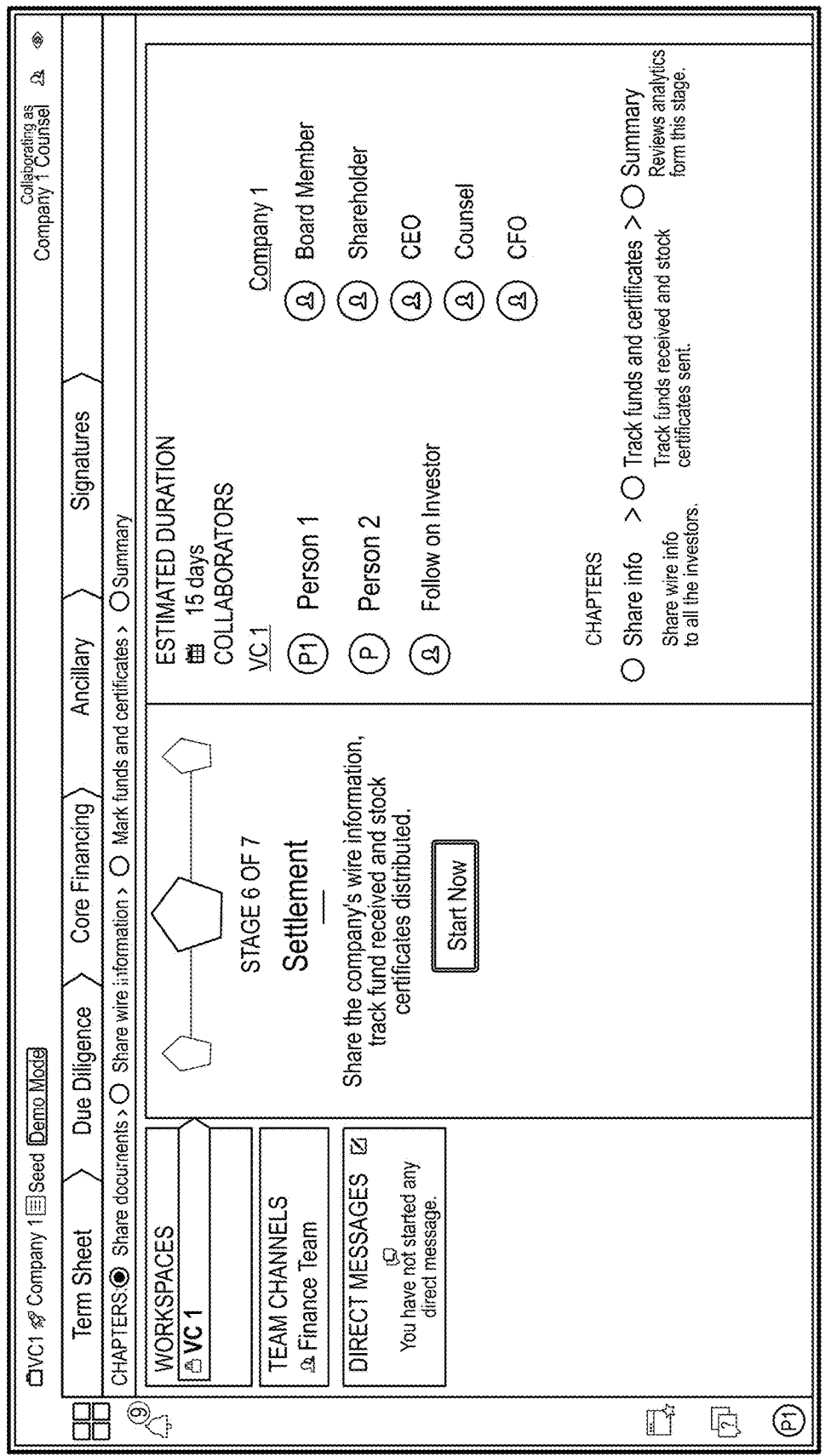
FIG. 15 is another example interactive user interface of the system, according to an embodiment of the present disclosure.

FIG. 15 is an example user interface 1500 for confirming consideration and causing the sharing of consideration to the entities.

Example Ontology

FIGS. 16A-16G describe techniques for automatic parsing of documents, such as contracts, and for automatic extraction of terms and associated values from the documents. Advantageously, the extracted terms and values can be presented to a user as a summary of a document. Thus, users can gain insights into potentially impenetrable contracts through viewing the underlying terms. Indeed, the terms themselves may be presented in easy to understand verbiage, instead of the actual language included in the documents, such that unsophisticated users can rapidly understand the documents. As will be described, a system (e.g., the goal optimization system 100) can extract terms from disparate types of documents. The system can also extract terms from differing forms of a same type of document. For example, a first document source, such as a first law firm or other entity, may prefer a certain format, style, verbiage, and so on, for a particular type of contract. A second documents source, such as a second law firm, may prefer a different format for the particular type of contract. Utilizing the techniques described herein, the system can effectively learn differing formats and styles utilized by document sources. Additionally, the system can receive documents prepared in new formats or styles, for example from a new document source, and using learning techniques can effectively extract terms from these received documents. Thus, the system can enable the rapid importation of documents prepared according to individualistic styles, and regardless of style can present succinct summaries of included terms and associated values.

In addition to parsing prepared documents, FIGS. 16A-16G describe techniques to automatically generate documents. For example, documents may be automatically generated for users based on simple inputting of values for terms selected for inclusion in the documents. As an example, a user can specify a type of document to be prepared, such as a particular type of contract (e.g., sales contract, venture capital funding contract, and so on). Utilizing easy to utilize user interfaces, the user can specify terms to be included in the prepared document. As will be described, the system can store information describing terms that may be included in documents of the specified type, along with information describing the relationships between the terms. For example, the information can specify types of legal issues or questions that arise when preparing documents of the specified type. Terms may therefore be included to address these legal questions or questions. Advantageously, the user can utilize user interfaces to rapidly select terms and any associated values that may be required for the terms to be included (e.g., a length of time, an identification of a person or company, and so on). Certain values or terms may be repeated several times in a document, for example an identification of an amount of consideration. The user may be required to enter a value once, and the system can include the value in appropriate places automatically.

Utilizing machine learning techniques, the system can recommend additional terms that should be included. For example, the system can determine that if example term 'A' is included, then example term 'D' should be included. Without being constrained by theory, the system can analyze previously received documents prepared by document sources and can determine groupings or clusterings of terms that are included in documents of the specified type. For example, the system can assign a probability that term 'D' should be included based on analyzing prior received documents. Additionally, the system can utilize the information describing relationships between terms to identify terms that may be related to a selected term, or terms that are required for inclusion, or terms that contradict a selected term. In this way, the user can select one or more terms, and the system can efficiently help the user to select any remaining terms that may form a common version of the specified document. Thus, through simple user interactions with the system, the system can prepare a document for utilization by a user.

The generated documents may be generated based on a preferred style or format. For example, the user can specify that the resulting generated document be prepared based on a style associated with a certain document source (e.g., a certain law firm, a certain venture capital firm, and so on). As will be described, the system can utilize the document source's preferred language for selected terms. Thus, and as an example, the user can cause the generation of contracts that utilize contractual language for selected terms which has been vetted and commonly utilized by well-known law firms.

As will be described in FIG. 16A below, the system can store ontology information for disparate types of documents. Ontology information can describe relationships between questions or issues (e.g., legal questions or issues) that arise for a type of document. For example, and as illustrated in FIG. 16D, ontology information can be graphically depicted as nodes connected via edges or links. Each node can be associated with a particular term, and the edges or links can indicate relationships between terms. As an example, certain terms may have a hierarchical relationship. Thus, a particular term may be considered as a parent to one or more children terms. These children terms can represent sub-issues or sub-questions that are related to the parent term. Additionally, certain nodes of ontology information may represent major issues or questions, and these nodes may be connected to other nodes indicating different terms utilized to address the major issue or questions. As another example, certain terms may be related to a same topic or subject and therefore links or edges between them may indicate that the terms are grouped together. In this way, even if these certain terms are spread throughout a particular document, the system can utilize the ontology information to identify that they should be grouped together. Therefore, these terms may be presented under a same heading or grouping in summary information. For example, FIG. 17B illustrates an example of presenting summary information.

As described above, each node of an ontology may be associated with a respective term. However, each term may be worded differently according to preferred style or format in different documents. Thus, while the ontology information can describe terms and their relationships, the system can utilize additional information describing different 'options' for the wording or verbiage of each term. As will be described below with respect to parsing documents, the system can utilize information, referred to herein as options tables, which enable the system to extract terms from documents regardless of the wording of the terms. An example options table can include a label or identifier of a particular term, for example as a row of the options table, and textual expressions associated with the particular term. Textual expressions can include specific key-terms that may be indicia of the particular term. Textual expressions can further include specific wording or verbiage for the particular term (e.g., as identified in prior received documents). An options table may thus represent a template that would be utilized by a document source when preparing a document of a particular type. When parsing a document, the system may optionally traverse the nodes included in the ontology information for the type of document. For each term associated with a node, the system may access an options table and identify whether the term can be extracted from the document.

In this way, the system can capture terms included in documents, and present summarized forms of the documents for efficient review by users. As will be described, user interfaces presented to users can be tailored specifically for mobile interfaces. Through these mobile interfaces, users can view succinct versions of received documents instead of attempting to scroll around through the full documents themselves on screens ill-suited for such behavior. Commonly, a user viewing a document on a mobile device will view the document as a '.pdf' file. The user will have to scroll the presented document from left to right as the user reads the document, and similarly scroll the document downwards. This multi-axis scrolling can cause the user to miss potentially important aspects of the document, or cause the user to avoid reading such documents via their mobile device. Due to the techniques described herein, the important or negotiated over terms may automatically be extracted. Thus, at a glance the user can efficiently identify the terms included in the contract, values of particular terms, and so on. As will be described, the user can generate a new version of a summarized document and provide this new version in response. For example, the user can adjust a value of a term. As another example, the user can cause the inclusion of a new term in the document. As another example, the user can cause the deletion of a term from the document. Since the system can utilize ontology information and options tables, the system can ensure that the terms being included are included as high-quality wordings for the terms. Additionally, when deleting the terms, the system can ensure that there are no dependencies of other terms that may rely on the deleted term. For example, if the system identifies that a parent term is being deleted, the system may also recommend deleting child terms.

The system can therefore also draft complex documentation through easy to utilize user interfaces that may significantly enhance efficiency with respect to document preparation software. With respect to mobile interfaces, the document preparation software will limit how efficient and accurate that a drafting user can be. In contrast to document preparation software, the system can enable efficient selection of terms and values through mobile interfaces. Thus, the techniques described herein solve real-world technological problems introduced via mobile-based constraints.

As will be described in FIG. 16A below, the system can parse documents according to ontology information. Ontology information can include nodes associated with terms, and the ontology information can describe relationships between these terms. Optionally, the ontology information may be prepared by one or more users as a graphical depiction of an ontology for a type of document. The users may utilize drafting applications or software, such as VISIO or LUCIDCHART, and graphically create nodes and edges or links between the nodes. A system (e.g., the goal optimization system 100) may ingest or read in the graphical depiction, and then generate machine-readable ontology information. As will be described, rules may be utilized by the system to generate the machine-readable ontology information. For example, a rule can be associated with a shape of a node. As another example, a type of arrow utilized to link two nodes may have a specific meaning. In this way, a user can utilize drafting applications to essentially program or code ontology information that can be directly utilized by the system.

While the description herein focuses on utilizing ontology information (e.g., for information describing structure and relation between legal terms in documents of particular type) and options tables (e.g., information usable to parse documents, such as parsing templates, which may vary according to document source), it should be understood that additional techniques may be utilized to parse documents. For example, several approaches may be utilized, including machine learning approach, or template-based approach (e.g. using options tables), or hybrid-approach that employs both machine learning and template-based approaches. Different learning algorithms and learning framework may be utilized, and for example may be coupled together with huge legal corpora with or without legal annotations. As an example, deep learning techniques may be utilized to identify different wording or verbiage for each of a multitude of legal terms. For example, the deep learning techniques may utilize boiler plate surrounding each legal term, a portion of a document in which the legal term appears, key-words or nouns utilized in the legal term, whether the legal term is associated with a value, and so on. Thus, the system described herein can analyze a document, and using the deep learning techniques, parse the document to identify the included legal terms and any associated values.

Figure 16A:
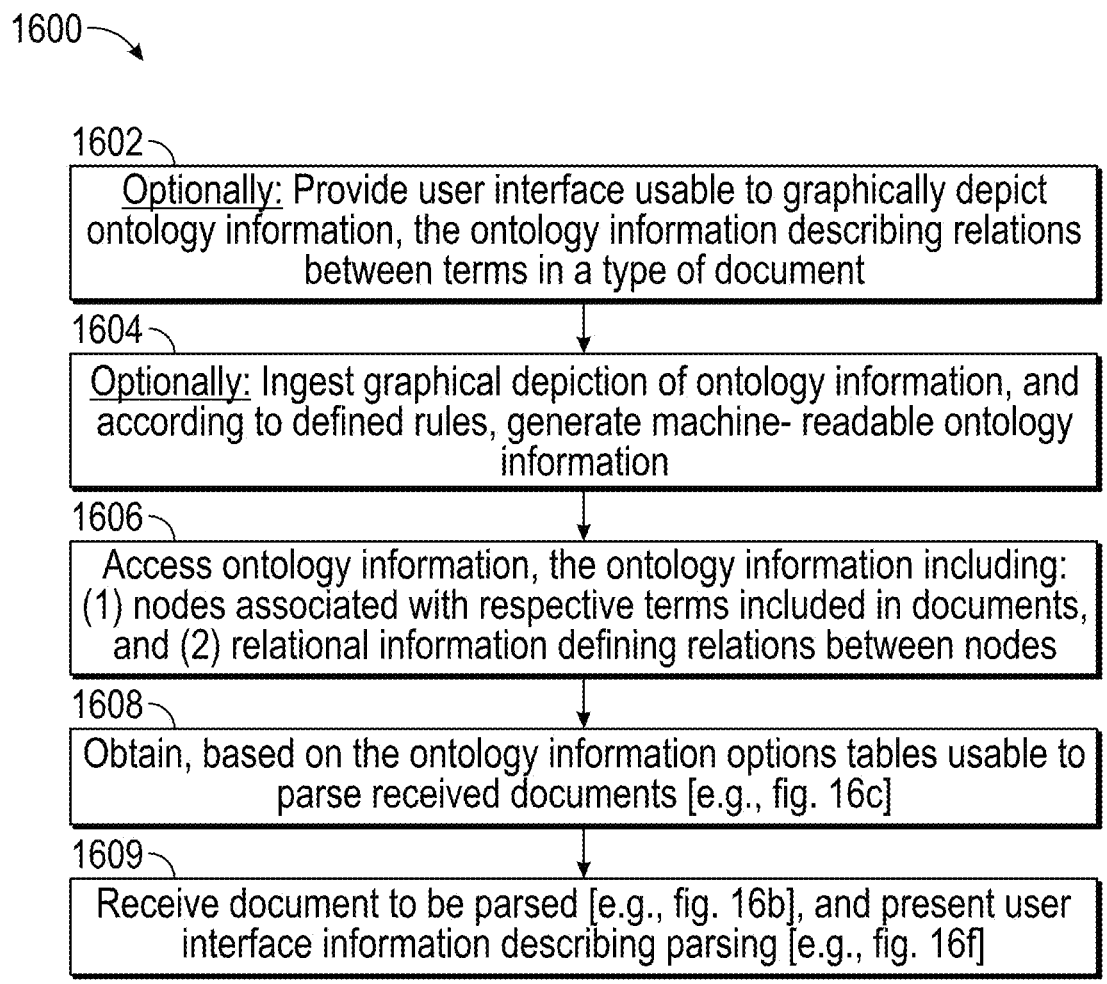
FIG. 16A is a flowchart of an example process for parsing documents based on options tables and/or ontology information.

FIG. 16A is a flowchart of an example process for parsing documents based on options tables and/or ontology information. For convenience, the process 1600 will be described as being performed by a system of one or more computers (e.g., the goal optimization system 100).

The system provides a user interface usable to graphically depict ontology information (block 1602). Ontology information can be specific to a type of document. For example, a type of document can include a Right of First Refusal, a Voting Agreement document, a Certificate of Incorporation document, Investor Rights Agreement document, Stock Purchase Agreement document, and so on. Ontology information can describe terms that address questions or issues which can be, or are commonly, utilized in each type of document. While not all documents of a particular type may include all of the terms, the ontology information can represent a superset of terms utilized in such documents.

As described above, a user of the system can generate ontology information utilizing drawing applications or software. For example, the user can utilize a user interface to graphically depict an ontology. The system can optionally provide such a user interface, for example as a web application to the user via a user device accessible to the user. Additionally, the system can interface with other web applications, and provide drawing functionality provided via the other web applications to the user. Optionally, the user can utilize a third-party drawing application to create a graphical depiction of an ontology, and the system can receive and analyze this graphical depiction.

Reference will now be made to FIG. 16D as an example of ontology information 1640. The ontology information 1640 may relate to, for example, a type of document corresponding to an Investor Rights Agreement (IRA). As illustrated, the ontology information 1640 includes nodes (e.g., node 1642) connected via edges or links (e.g., edge 1644) to other nodes (e.g., 1646). Each node is illustrated as specifying a particular term, for example node 1642 specifies that it is associated with 'Registration Rights'. Thus, a document that is an Investor Rights Agreements may include a portion corresponding to 'Registration Rights'. The node 1642 further indicates a particular code or identifier associated with the 'Registration Rights' term (e.g., 'AAHQ'). As will be described, the system may store codes or identifiers of terms, such that the system can track usage of terms in documents. Additionally, the system can access information indicating different verbiage or wordings for the term and these different verbiage or wordings may be referred by the code or identifier. For example, the accessed information may be an options table as described below. In this example, the options table or ontology information can indicate textual expressions usable to extract occurrences of specific terms.

In FIG. 16D, particular nodes (e.g., node 1642) are of a first type of shape. For example, the first type of shape in the example ontology 1640 is an octagon. Other nodes (e.g., 1648B) are of a second type of shape. For example, the second type of shape is a rectangle. A user can graphically depict these nodes as different shapes to impart differing meanings for the nodes. Nodes of the first type of shape can indicate questions or issues that arise for a type of document, and these nodes can be associated with terms that are included to address the questions or issues. Nodes of the second type of shape can indicate values or options that can be utilized for a particular term. For example, node 1648B indicates one potential value or option utilized for a node 1648A. As illustrated, node 1648B indicates it relates to a percentage of 'Registrable Securities then Outstanding'. This node 1648B is connected via an edge or link to a node that indicates it's directed to a term for a 'Minimum % of Holders that Must Request for Form S-3 Registration.' Therefore, in addition to specifying terms that may be included, the ontology information 1640 can further specify types of values that may be utilized. As will be described, the system can extract these values and associate the values with the terms. For example, a value for node 1648B can be extracted as corresponding to node 1648A.

In addition, a type of edge or link utilized to connect nodes can impart differing meanings to the system. For example, a user can utilize a first type of edge or link (e.g., a solid arrow head) to indicate that a connected node indicates an exclusive value or response for a term. For example, edge 1649A indicates an exclusive value for node 1648A, and the ontology information 1640 specifies 'Y-1'. This can indicate that the issue or question identified in node 1648A is answered in the affirmative (e.g., 'Yes' corresponding to 'Y' in the illustration) by the value identified in node 1648B. A second type of edge or link (e.g., a hollow arrow head) can indicate relationships amongst adjacent terms. For example, the second type can indicate a next subject or grouping of terms. For example, a document may include different subjects to be addressed through usage of terms. The hollow arrow head can indicate to the system that the subject is changing as it traverses the hollow arrow head. Optionally, and as illustrated in FIG. 16D, the edge 1649B specifies 'Next Subject'. The second type of edge or link may further indicate other relationships between nodes. For example, a 'Child' textual designation can indicate a sub-issue or sub-question extending from a parent issue or parent question. A 'Sibling' textual designation can indicate a sibling relationship between nodes, for example that a node is a sibling to a child node and thus also a sub-issue or sub-question extending from a parent issue or parent question. A third type of edge or link (e.g., an open arrow head) can indicate different terms that may be selected to address a particular issue or question. For example, edge 1649C indicates that 'Demand Registration Form S-1' may be utilized to address the question or issue of 'Registration Rights'. Additionally, 'Demand Registration Form S-3' may be similarly utilized. A textual description can be specified in the ontology information 1640 (e.g., 'A Type of Registration Rights' 1649D) to indicate relationship between the connected nodes (e.g., the form S-1 and form S-3 nodes).

Thus, a user can utilize a drawing application to encode specific meanings in the ontology information. That is, the user can follow rules to encode complex relationship information in nodes. As will be described, the system can ingest this graphical depiction and follow the rules to generate machine-readable ontology information which it can utilize.

In implementations in which the system provides a user interface for a drawing application, the system can advantageously reduce required user input to prepare the ontology information 1640. For example, as a user types a summary of a term (e.g., an issue or question addressed by a term), the system can automatically obtain an identifier or code associated with the term. For example, node 1642 is associated with 'Registration Rights'. As the user types in registration rights, the system can automatically populate the node with a code or identifier indicative of Registration Rights. The system can also present nodes 1644 and 1648A as automatically extending from node 1642. For example, the system can access information indicating that nodes 1644 and 1648A are related to node 1642 and can present these nodes for inclusion. Optionally, in certain implementations the system can integrate with third-party drawing applications. For example, the system can obtain user input, such as specified text, from a third-party drawing application (e.g., in substantially real-time). The system can then provide information to the third-party drawing application to be included in the drawing application. For example, nodes may be auto-populated based on this information, or text, codes or identifiers of terms, and so on, may similarly be included.

The system ingests a graphical depiction of the ontology information (block 1604). As described above, a user can create ontology information for a type of document. The resulting ontology information may include graphical information encoding relationships between terms. The system can access this graphical information, and utilizing rules, can decode the ontology information. The system can then maintain machine-readable ontology information. For example, and with respect to FIG. 16D, the system can determine that node 1648A is a child of node 1646. Thus, when parsing a document, the system can determine that node 1648A is associated with node 1646. Additionally, the system can determine that node 1648B indicates a value of the term specified in node 1648A.

The system can utilize this ontology information when presenting summary information. For example, the system can identify that the value specified in node 1648B is to be presented with the term specified in node 1648A. Machine-readable ontology information can further be utilized to provide relational knowledge to users preparing documents. For example, and as will be described below, the system can automatically generate documents. A user can select terms to be included in a document, and the system can generate the document. Optionally the system can present the graphical depiction of the ontology information to the user. In this way, the user can easily ascertain how certain terms affect each other, and the relationships among the terms.

Similarly, as the user selects terms for inclusion in a document, the system can utilize the machine-readable ontology information to suggest terms that are related to a selected term. For example, FIG. 16D illustrates that a particular type of arrow head (e.g., a hollow arrow head) can indicate relationships between terms. In this way, if a user selects a particular term, the system can identify whether the particular term is part of a hierarchy of terms. The system can then suggest child terms, a parent term (e.g., the user may have selected a child term that requires selection of a parent term), and so on. Similarly, another type of arrow head (e.g., an open arrow head) can be utilized to indicate different types of values that may correspond to a term. The user can optionally specify a type of value the user prefers be included in the document, and the system can select a corresponding term that enables inclusion of this type of value.

The machine-readable ontology information can further be utilized to validate a document. For example, the system can ensure, based on the described relationships between terms, that all required terms are included. That is, the system can parse a document and extract terms and values of specific terms. The system can then correlate these terms and values to the ontology information and can validate the document. As described above, the system can suggest terms that should be included based on the relationship information.

Blocks 1602-1604 may be optionally performed. That is, a user may utilize a user interface to graphically depict an ontology, and the system may ingest the ontology and generate machine-readable information. Alternatively, the system may have ontology information stored for disparate types of documents without user generation. For example, front end users may utilize already generated ontology information. In either scenario, the system can parse received documents and extract terms and values from the documents. Blocks 1606-1609 below describe certain techniques to parse documents and extract terms.

The system accesses ontology information (block 1606). As described above, the system can store ontology information. The ontology information may optionally be generated by a user. Optionally, the ontology information may be automatically determined or learned by the system based on analyzing multitudes of documents of a same type. For example, documents may be ingested by the system and analyzed. These documents may include labels corresponding to particular terms included in the documents. The system may therefore learn, based on this labeled training information, relationships between terms. As an example, the system can determine that certain labeled terms are generally grouped together. As another example, the system can determine that certain labeled terms are grouped in a same portion of documents or included under a same heading. As another example, the system can determine that certain terms are not included together in a same document. These terms may represent alternatives of each other or may represent terms that are in contradiction to each other. The system can further identify values associated with terms. For example, based on analyzing multitudes of documents the system can determine textual portions of terms that change in the documents. These textual portions may correspond to specific numerical, or other values, which are negotiated (e.g., negotiated in greater than a threshold percentage of analyzed documents). The system can similarly generate ontology information and utilize the ontology information as described above. Optionally, the system can update the ontology information over time as it receives new documents. Optionally, the system can present a graphical depiction of the ontology information, for example the graphical depiction can conform to the rules described above, and a user can modify or adjust the ontology.

The system obtains options tables usable to parse received documents (block 1608). An options table can represent a particular template of a form or embodiment of a document. An example options table is illustrated in FIG. 16C and will be described in more detail below. Each type of document may be associated with multitudes of options tables, with each options table representing a variant of the type of document. Additionally, the system can store particular options tables for respective document sources (e.g., law firms). Thus, a law firm can have a multitude of parsing templates it utilizes for documents of a certain type. The options table can include textual expressions which can cause extraction of terms and associated values from a document. For example, an options table can include different variants of wording or verbiage for terms. The options table can further indicate locations in a term in which values may appear. As will be described below, with respect to FIG. 16B, the system can parse a document using one or more options tables. For example, the system can utilize regular expressions included in the options table to identify locations in a document at which terms appear.

An options table may therefore include patterns of words which can be utilized to extract terms from received documents. The terms may be surrounded by different and/or specific boilerplate, and the options table may optionally include variants of this boilerplate. In this way, the system can identify portions of a document that is boilerplate, and portions that represent negotiated over terms. Additionally, an options table can indicate a particular structure of a term (e.g., a location of a value in the term) along with a data type associated with a value (e.g., value of data or time, money, and so on). The options table may further indicate relations among terms. For example, a relation can include a term order, or whether particular terms appear inside a different term (e.g., a bigger or parent term).

The options tables may be generated based, at least in part, on the ontology information. For example, the system can analyze received documents and generate options tables based on the documents and ontology information. As will be described below, with respect to FIG. 16E, the system can extract terms from documents and correlate these extracted terms with the ontology information. The system can then generate one or more options tables representing specific forms or embodiments of the document. These generated options tables may be specific to a particular document source, such as a particular law firm. In this way, a law firm can upload multitudes of documents they have prepared, and the system will automatically generate options tables usable to parse new documents prepared by the law firm.

The system receives documents to be parsed and presents user interface information describing the parsing (block 1609). As will be described in FIG. 16B, the system can utilize the ontology information and options tables to parse received documents. Values and terms extracted from parsed documents may then be presented to users. For example, mobile interfaces customized to present extracted values and terms are illustrated in FIGS. 16F-16G and described below.

Figure 16B:
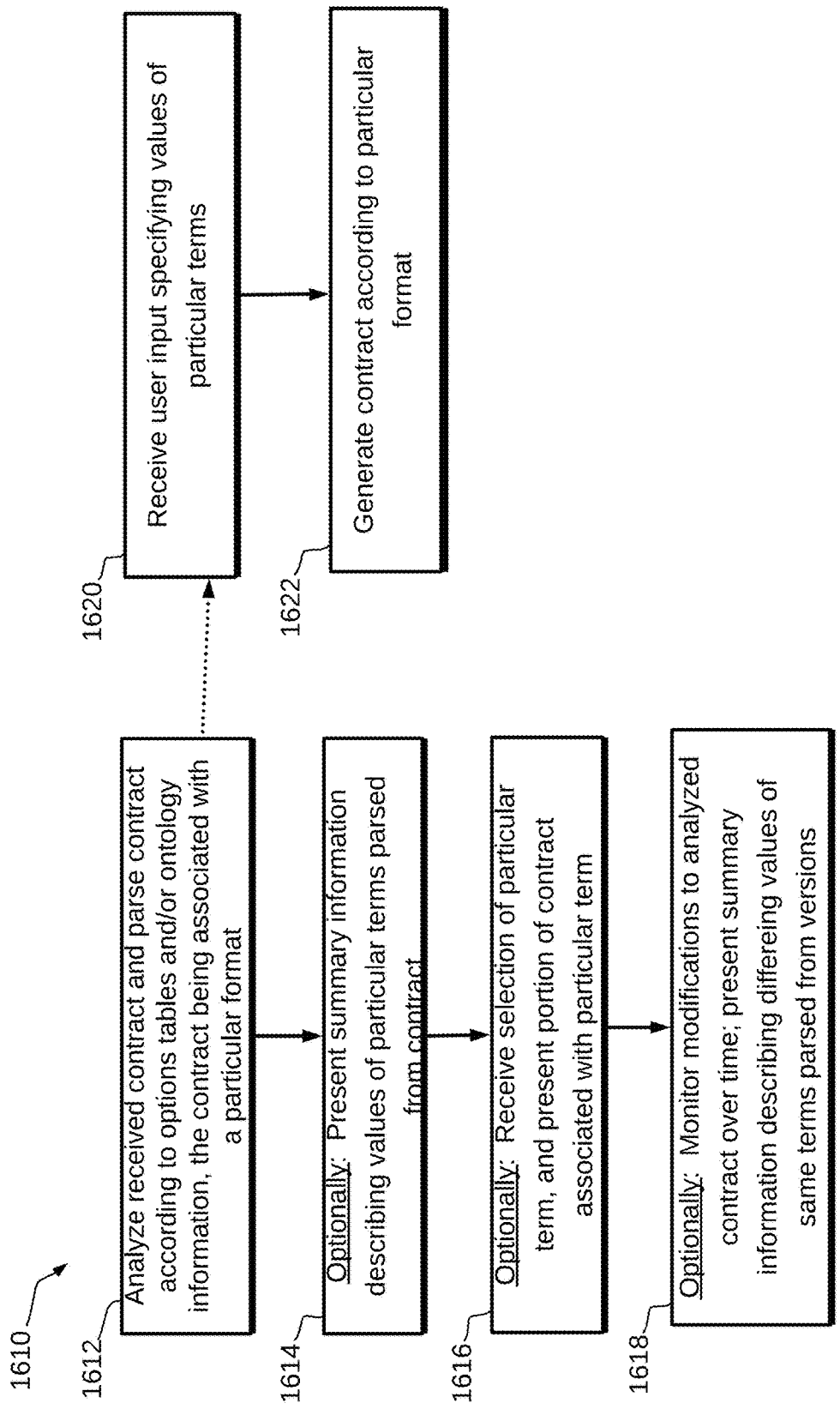
FIG. 16B is a flowchart of an example process for analyzing and generating documents according to particular formats, according to various embodiments of the present disclosure.
Figure 16C:
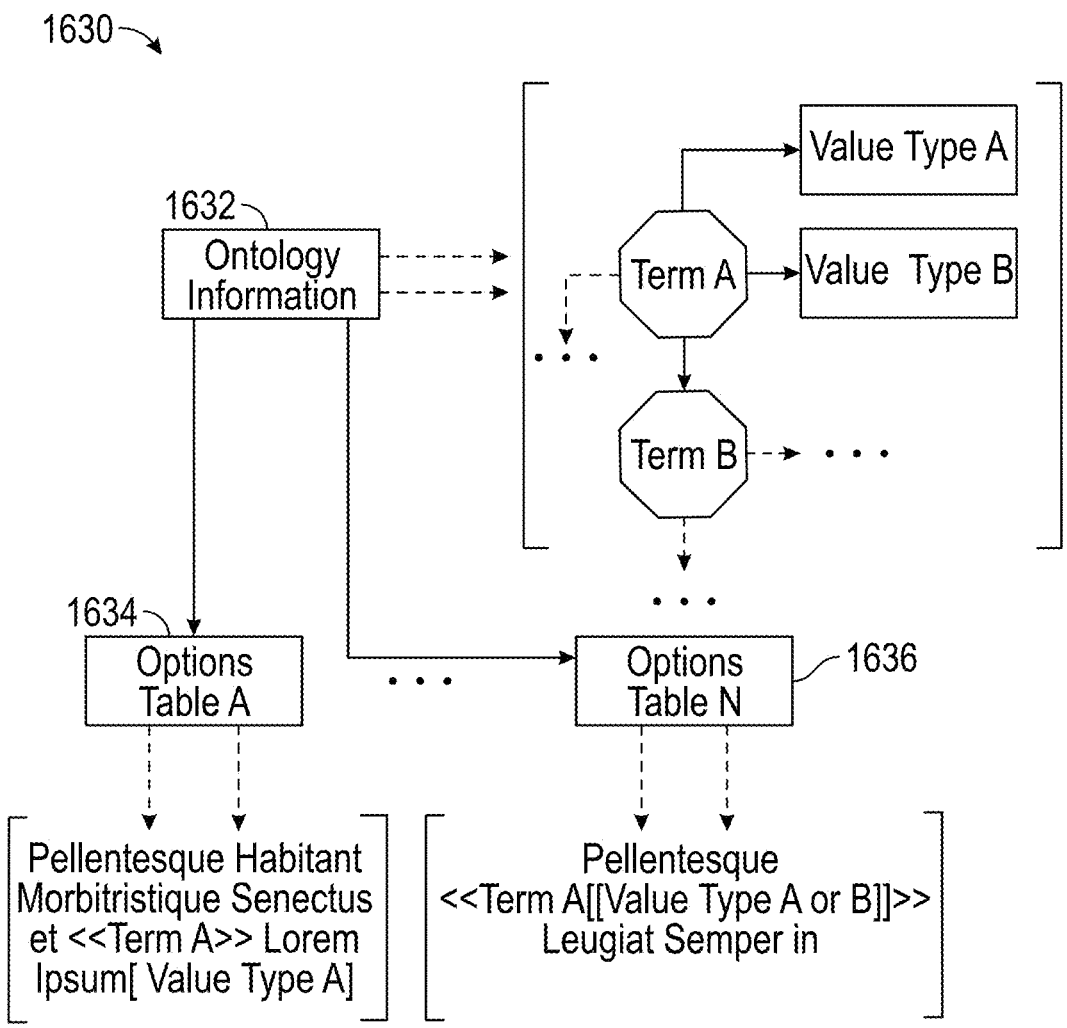
FIG. 16C is a block diagram of an example ontology and example options table based on the example ontology.
Figure 16D:
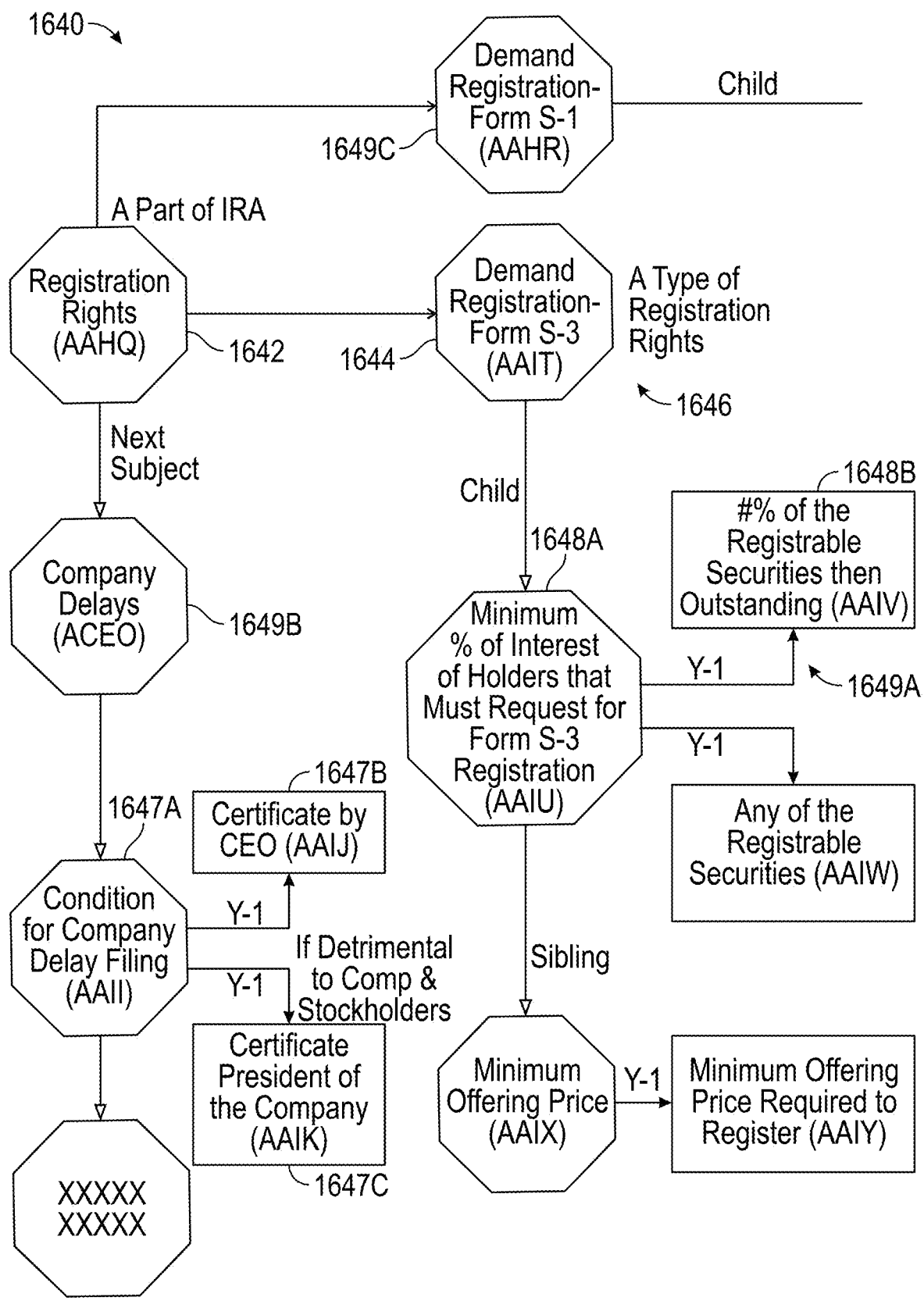
FIG. 16D is an example of a graphical representation of an ontology.

FIG. 16B is a flowchart of an example process 1610 for analyzing and generating documents according to particular formats. For convenience, the process 1610 will be described as being performed by a system of one or more computers (e.g., the goal optimization system 100).

As described above, the system can analyze documents received from users, for instance identifying terms included in the documents, values of the terms, portions of the documents that correspond with the terms, and so on. The system can receive documents according to preferred formats of users, and can similarly generate documents in preferred formats given values and selections of terms (e.g., as described above, with respect to FIGS. 9A-9H).

As described above, the system can maintain ontology information associated with terms, clauses, included in disparate documents. As described above, the system can maintain ontology information including identifications of terms, synonyms of the terms, and so on, with the terms being terms utilized in documents such as contracts. The ontology information can be provided by users (e.g., via drawing applications), or learned over time by the system utilizing one or more machine learning models (e.g., neural networks, deep learning techniques, bag of words modeling, and so on). For instance, these systems can monitor progression of contracts being reviewed and new versions generated, and can identify portions of the contract that change over time. These portions may be likely to correspond to negotiated terms, and the system can identify the portions that correspond with terms. Furthermore, through use of machine learning techniques, the system can import electronic texts related to form contracts, and so on, and identify portions of the form contracts that can be modified.

In some embodiments, it may be advantageous to store the ontology information separately from the information related to contract language, for example to reflect the fact that natural language may have multiple ways of expressing identical logical relationships. The ontology information may be maintained as one or more nodes (e.g., in a relational database management system storing associated tables), and each node may be assigned a unique identifier herein referred to as 'master coding', and stored indexed or referenced by their master codings in a master coding table. The master coding table may then be cross-referenced or linked to one or more options tables comprising mappings between ontological nodes or relationships and contract language elements. As such, the system can have various entries in an options table to relate different ways of expressing the same relationship, assertion, or provision in a contract to the same node in the ontology by referencing its master coding.

For example, with respect to particular contract terms that map to same portions of contracts, the terms (e.g., synonyms of each other) can be identified via a master coding, and the options table can specify mappings of the terms to any of the portions of contracts. In this way, for a given term, the ontology information can specify contract language associated with the term. The contract language can be stored in the options table with labels, ontology references, and data types for terms, and can optionally be maintained in a graph database in a web ontology language.

Ontology information can be stored such that it can be displayed as a chart or graph illustrating the nodes. For example, FIG. 16D illustrates an example graph. Optionally, the ontology information can be maintained as disparate levels of database information. A first level may store the ontology information in a human-readable format, and for example can be presented as a chart to a user for confirmation that the information is accurate. A second layer can be maintained in a machine-readable format. A web ontology language can be utilized along with a resource description framework to represent the ontology information, including groupings of terms, contract language, relations between nodes, and so on. The ontology information can therefore provide insights into the ontology, and can provide an easy route for updating of any information. For an update of information, for example a mapping between a term and contract language, a user can modify the first layer, and the second layer can be automatically updated by the system.

The ontology information can be determined, at least in part, according to clustering of documents. That is, documents can be clustered (e.g., grouped) according to subject matter, purpose, and so on, and common terms can be extracted. The common terms can indicate respective contract language, and mappings can be maintained between each common term, or a synonym, and contract language. As new documents are received, they can be similarly clustered, and any new contract language can be included in the mappings. Additionally, the system can compare contract language, and can recognize synonyms of terms based on similarities (e.g., a similarity score) between new contract language and contract language associated with a mapping.

Documents, for example, templates (e.g., term sheets, form contracts, etc.), can be received from law firms, venture capital firms, contract books, and so on, and the terms can optionally be automatically parsed, or manually parsed. Advantageously, automatic or manual processing, or a combination of both, may be used to provide for an accurate and cost-efficient way of introducing new terminology to the system. In an embodiment, the system may be set up by using sample documents and parsing the structure of the document and the location of key terms. Key terms may be identified manually, e.g., by a person with legal understanding reading through the documents and highlighting the position of terms that appear characteristic for the provision in question. Alternatively, key terms may be parsed automatically by using various computer-linguistic measures, such as identification of key terms based on identifying characteristic n-grams (e.g., 2-grams, 3-grams), or using statistical measures to determine characteristic terms. After key terms have been identified, an options table may be created or updated to reference nodes in the ontology with the term, storing both the term (e.g., as a string of characters), the document and position in which it appears, and the master coding of the ontology node to which the term refers. The options table can then be used to automatically extract and process key terms from similar documents, as discussed herein.

Advantageously, by using automated matching of terms, including legal terms, to well-defined meanings and relationships using an ontology, the understanding of legal documents by non-legally trained users can be facilitated. For example, nodes in the ontology may be referenced with a simple, plain-English description of their significance, and may be referenced to complex legal terminology ("legalese") using the options table. This may allow more efficient processing of legal documents, and may allow organizations using the system to store or aggregate legal knowledge by constructing an appropriate ontology, which can then be applied to new documents and accessed as a knowledge base.

Advantageously, different data formats, data structures, and data storage may be used to store the options tables and the ontology. In an embodiment, the ontology may be used in a markup format, such as Web Ontology Language (OWL). Advantageously, the use of a custom markup format, such as OWL may allow the ontology to be queried using an ontology-specific query language, such as SPARQL (SPARQL protocol and RDF query language). The options table may be stored in a different markup format, such as XML, facilitating the storage of various natural language terms and expressions.

The system analyzes a received document and parses the document (block 1612). The system can receive a document, for instance as an upload from a user during an electronic goal (e.g., the user can upload a contract, term sheet, and so on as described above and illustrated in FIGS. 8, 9A-9H, 10, 11A-11B, 12A-12D, 13, 14A-14P, 14Q1-14Q2, 14R, and 15). The system can utilize the ontology information to determine particular terms that appear in the received document, for instance the system can match appearances of terms, or synonyms of terms, that are identified in the ontology information in the received document. Optionally, the system can select particular ontology information to utilize based on information received from the user. For example, the user can specify a type of the document being uploaded. As another example, the system can analyze the received document, and determine one or more measures of similarity between text of the received document and textual expressions identified in different ontology information. For example, the system can obtain textual expressions, such as wordings or verbiage, associated with terms included in different types of ontology information. The system can then determine a type of the document based on measures of similarity between the received document and the textual expressions associated with terms included in ontology information. An example measure can include identifying topic nouns, or proper nouns, and comparing these nouns to nouns utilized in the ontology information. In this way, the system can determine a likely type of the document. The system can then present information to the user identifying the determined type, and the user can confirm or adjust the type.

The system can further utilize one or more rules (e.g., user generated rules, generated according to deep learning techniques) that specify likely locations of terms, values, and so on, which appear in the received document. For example, a rule can indicate that a number likely corresponds with a value of a term (e.g., the system can further remove appearances of phone numbers, addresses, and so on, so that the numbers remaining are likely values for terms). Similarly, a different rule can indicate that a number which is both (1) numerically identified, and (2) textually identified (e.g., 1,000 'ONE-THOUSAND') corresponds to a value of a term. In this way, the system can identify locations of terms, and utilizing the ontology information, can determine to which term the value corresponds. As the document is parsed, and terms are extracted, the system stores the terms and maintains mappings between the terms and positions in the document. In this way, and as will be described below, the system can enable a user to easily view extracted terms and then view portions of the document from which they are located.

The received document can be compared with documents, such as templates of documents, maintained in the ontology information. As described above, a template can correspond with an options table indicating a particular embodiment or variant of a document. A best matched template can be determined based on a text difference between the received document and the templates. For example, the system can determine which options table or template extracts a greatest quantity of terms. Subsequently, utilizing the options table described above, master coding can be accessed for the terms that appear in the received document. The master coding can indicate nodes for the terms, and as described above, mappings between the terms and contract language can be determined.

Based on determining a textual difference between the received document and templates, optionally a confidence score associated with accuracy can be determined. The confidence score can be a similarity between the document and the best matched template. The score can represent a minimal number of transformations of the text from the template to the document (e.g., via inserting or deleting words). The system can also compute the confidence score based on grouping the received document with respect to existing clusterings of documents.

After a confidence score is determined, a comparison between those words of one term which appear in both the document and the best matched template can be performed, and the system can determine a local confidence score for this term. By combining both global score for the whole document, and the local confidence score for each term, a final confidence score for each term can be determined. As will be described below, with respect to FIG. 18, for terms below a threshold, users can ensure their accuracy and/or be incentivized to review the term.

The system optionally presents summary information describing values of terms parsed from the document (block 1614). As described in FIGS. 9A-9H, the system can present an easy to view user interface indicating values of terms included in the document, for instance FIG. 9F described above and FIG. 17B described below.

An example term extracted from a document can include a term associated with document completion criteria. For example, a document may be considered completed, or fully executed, based on signatures from certain individuals or a certain number of individuals of a particular type. The term can therefore indicate what it takes for a document to be considered fully executed. This term may be associated with a particular code or identifier. As described above, with respect to signatures, the system can automatically parse a document and obtain a value for this term. The value can, as described above, indicate individuals required to execute a document, or particular logical constraints that have to occur, for the document to be considered executed. The system can optionally attempt to identify this term in documents and can utilize a value for the term to automatically determine (e.g., without, or with limited, user input) when a document is executed. This term may optionally be included in the summary information for ease of viewing. Further examples of document completion criteria that may be extracted from a document and/or otherwise received by the system are further described in the present disclosure.

The system optionally receives a selection of a particular term and presents a portion of a contract associated with the particular term (block 1616). As will be described below with respect to FIGS. 17C-17D, the system can present portions of the document that are associated with each term. In this way, a non-attorney user can quickly view where each term is included in large documents, and can further view how changes to the term affect the document itself.

The system optionally monitors modifications to the document over time, and presents summary information describing differences (block 1618). As described above, the system can allow users to provide documents, generate revisions of documents, amend or otherwise 'red-line' documents, and so on. To reduce complexities associated with review, the system can present easy to understand differences between versions of the document, or between two or more different documents. For instance, as described below with respect to FIG. 17E, values of terms from a first version of a document can be compared next to values of terms from a second version of the document.

In addition to presenting summary information, such as specific terms and/or values parsed from a document, a portion of a document corresponding to an extracted term, statistical information associated with the extracted terms and values (e.g., illustrated in FIGS. 17F-O below), and differences between versions of the document, the system can further generate documents based on receiving selections of terms and associated values from a user. For example, the system can generate (1) a new document based on selection of terms and/or values, or (2) update an existing document, for example to create a new version of the existing document. Blocks 1620-1622 describe example features to generate documents.

The system receives values of particular terms and generates a document associated with a same format as the received document (blocks 1620-1622).

With respect to generating an updated document, the system can present user interfaces to the user enabling the user to review a parsed document (e.g., as described in block 1612), and also to modify values of the document. Upon modification, for example by a user assigned a user role that is not constrained in modifying values, the system can, for instance in real-time, update the document. For example, as the user enters new values, the system can in real-time update the document, The system can then, in real-time, present the updating of the document to the user. As the document is updated, the system can optionally create a new version of the document, which can be shared (e.g., in a shared workspace) with other users for review.

Additionally, as described above users can edit uploaded documents (e.g., a first user can edit a document uploaded by the first user, or by other users such as users of a same user role). Optionally, when editing, or when creating a document, users can select from terms presented by the system (e.g., the system can provide textual descriptions of the terms, frequency of inclusion of the terms in similar documents from prior electronic goals), and indicate values of the presented terms. In this way, users can easily include terms relevant to a document being drafted.

As described above, the system can generate a new document of particular type based on minimal user input. Thus, and with respect to a mobile device, the user can prepare a full document with great efficiency and speed in contrast to utilizing document or typewriter software. For example, the user can specify a type of document to be prepared by the system. The user can then optionally indicate a preferred version or embodiment of the type of document. As an example, the user can specify that the created document is to utilize a template by a particular document source. As described above, a template can correspond to an options table, and thus the system can select a template based on the user specification.

The user can then be presented, for example in an interactive user interface, with terms commonly included in documents of the type. For example, these terms may be obtained from the selected template. The user can select from among the terms, or can select a default set of terms commonly utilized or commonly utilized by the particular document source (e.g., the system can analyze other templates associated with the particular document source). Additionally, the user can request additional terms be included. For example, the user can view statistical information related to the type of document. The statistical information may indicate that particular terms are commonly (e.g., at greater than a threshold) included in document of the type. The user can then select from among these terms. For any terms that require values, the system can request values. Based on the received information, the system can generate a document based on the options tables (e.g., the selected template). For example, the system can include values in appropriate places of an options table, and can prepare a full document through simple user input. The options table, as described above and in FIG. 16C below, may include boiler plate, wording or verbiage of each term, and locations at which to include values. Thus, the system can generate the new document. The system can also access the ontology information and/or master coding to obtain different wording or verbiage for terms. The user can select preferred wording for each, and optionally the system can indicate a frequency with which each wording is utilized in documents utilized by the particular document source, or other document sources.

Optionally, the system can utilize previously received or prepared documents, and then based on options tables applied to these previously received documents, can prepare a new document. For example, the system can replace values of these previously received documents. As another example, the system can remove particular terms, or include new terms, according to the user input. Since the options tables can specify wordings or verbiage of the new terms, the system can include these new terms. Additionally, since the ontology information describes relationships between terms, the system can include these new terms in appropriate places based on the relationship information.

FIG. 16C is a block diagram 1630 of an example ontology 1632 and example options tables 1634, 1636, based on the example ontology 1632. The example ontology information 1632 includes nodes associated with terms (e.g., Term A and Term B) connected via edges or links. For example, the ontology information 1632 can be prepared according to rules as described in FIG. 16A above. Additionally, the information 1632 includes nodes associated with values (e.g., Value Type A and Value Type B).

Example options tables 1634, 1636, are further included in the block diagram 1630. As described above, an options table can represent a particular template of an embodiment or variant of a document. As described above, the options table may additionally represent a parsing engine which can utilize machine-learning alone, or in combination with, a template. For example, the options table can include information sufficient to extract particular terms and/or values from a received document. As an example, options table 1634 includes particular words or boilerplate that may surround a term. That is, options table 1634 states, 'Pellentesque Habitant Morbitristique Senectus et <<Term A>>'. When parsing a document, the system can identify the commonly utilized words prior to '<<Term A>>', and based on the identification can extract the words subsequent to 'Senectus et'. The extracted words can then be indicates as corresponding to Term A. As an additional example, an options table may include '(a) holders of shares of Common Stock, <<Term A>> shall elect . . . ". The system can identify language in a document imitating with '(a) holders of shares of Common Stock', and can extract Term A as following this language. For example, Term A may include the language 'voting together as a separate class', and the system can therefore obtain information for a term associated with a manner of voting with common stock. As another example, a value may be specified in this options table. For example, the options tables can include, "(a) holders of shares of Common Stock, <<Term A>> shall elect [[Value A]] members. The system can therefore extract a numerical value for Value A.

With respect to the block diagram 1630, options table N 1636 includes a hierarchy associated with terms and values. For example, the options table 1636 indicates that Term A will be followed with either a value of Value Type A or B. This hierarchy may correspond to the relational information prepared in ontology information. For example, node 1647A illustrated in FIG. 16D is connected via edges or links to value nodes 1647B and 1647C. These value nodes are each associated with a different type of value. The options table 1636 can therefore include (e.g., encode) this relational information, which is based on ontology information as described in FIG. 16A.

The system can apply an options table to a received document, and terms may and values may be extracted. However, the options table may further indicate variants of language that may be included. For example, variants of boiler plate may be specified. Additionally, rules may be followed to indicate that certain terms may be skipped when parsing, such as 'the', 'and', and otherwise non-essential terms. The options table may further indicate a sufficient number of words, or their synonyms, which when existent in a document within a threshold proximity of each other, may indicate the presence of a term. Based on a type of value expected for the term, the system can extract the value. For example, if the value expected is a number, the system can identify a number and extract it.

The system can select a particular one of the options tables 1634, 1636, to utilize in parsing a document based on application of both options tables. For example, the system can determine which options table' parses the most terms and values, and can select the determined options table. In this way, the system can utilize a closest version or embodiment of a document to a received document. Optionally, the system can utilize two or more options tables to parse a document. For example, the system can use two options tables and identify a number of terms and/or values extracted from the document. Based on the ontology information, the system can determine which terms extracted using different options tables are distinct. The system can store these distinct terms, and can present them in summary information.

Optionally, the system can utilize an options table and determine whether any terms are likely to have been included in a document which were unable to be extracted. For example, the system may extract a term which, based on ontology information, is indicated as being a child term. If there is no parent term, the system can utilize the ontology information for the parent term to attempt to identify its locations in the document. For example, the ontology information may be associated with different wording or verbiage for the parent term, and the system can parse the document for these different wordings. As an example, the system can obtain a code or identifier associated with the parent term, and based on a master coding table or options tables, can identify different wording options that this parent term may take.

Figure 16E:
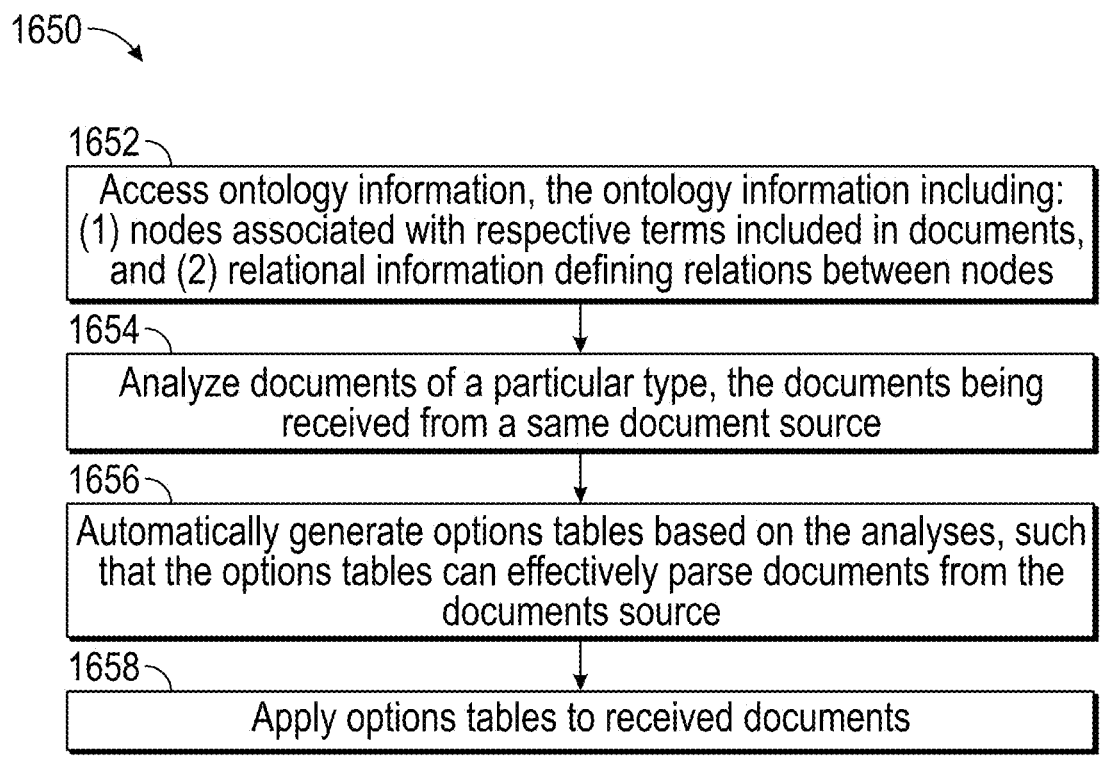
FIG. 16E is a flowchart of an example process for generating an options table based on ontology information.
Figure 16F:
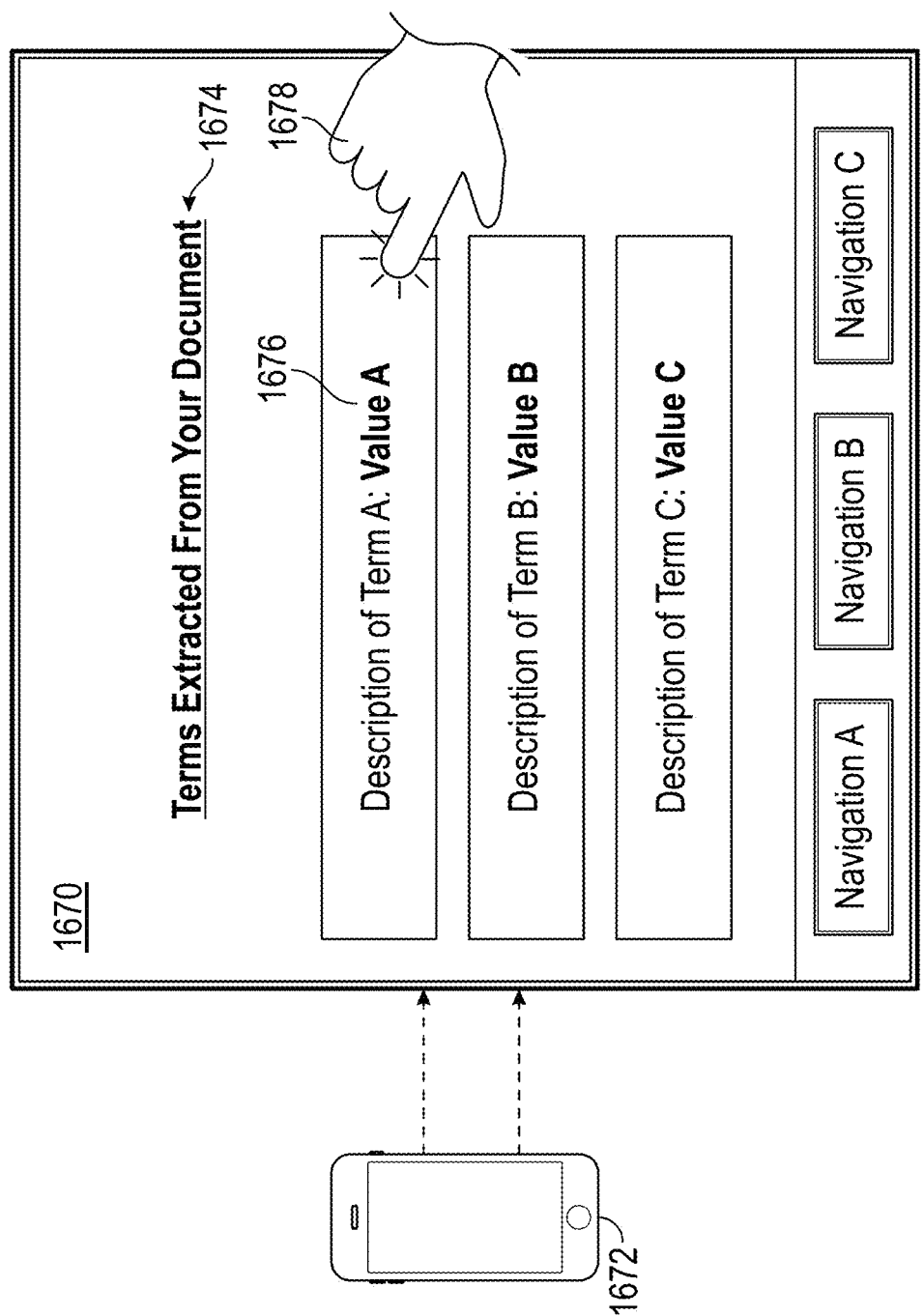
FIGS. 16F-16G illustrate an example of a mobile interface according to the techniques described herein.
Figure 16G:
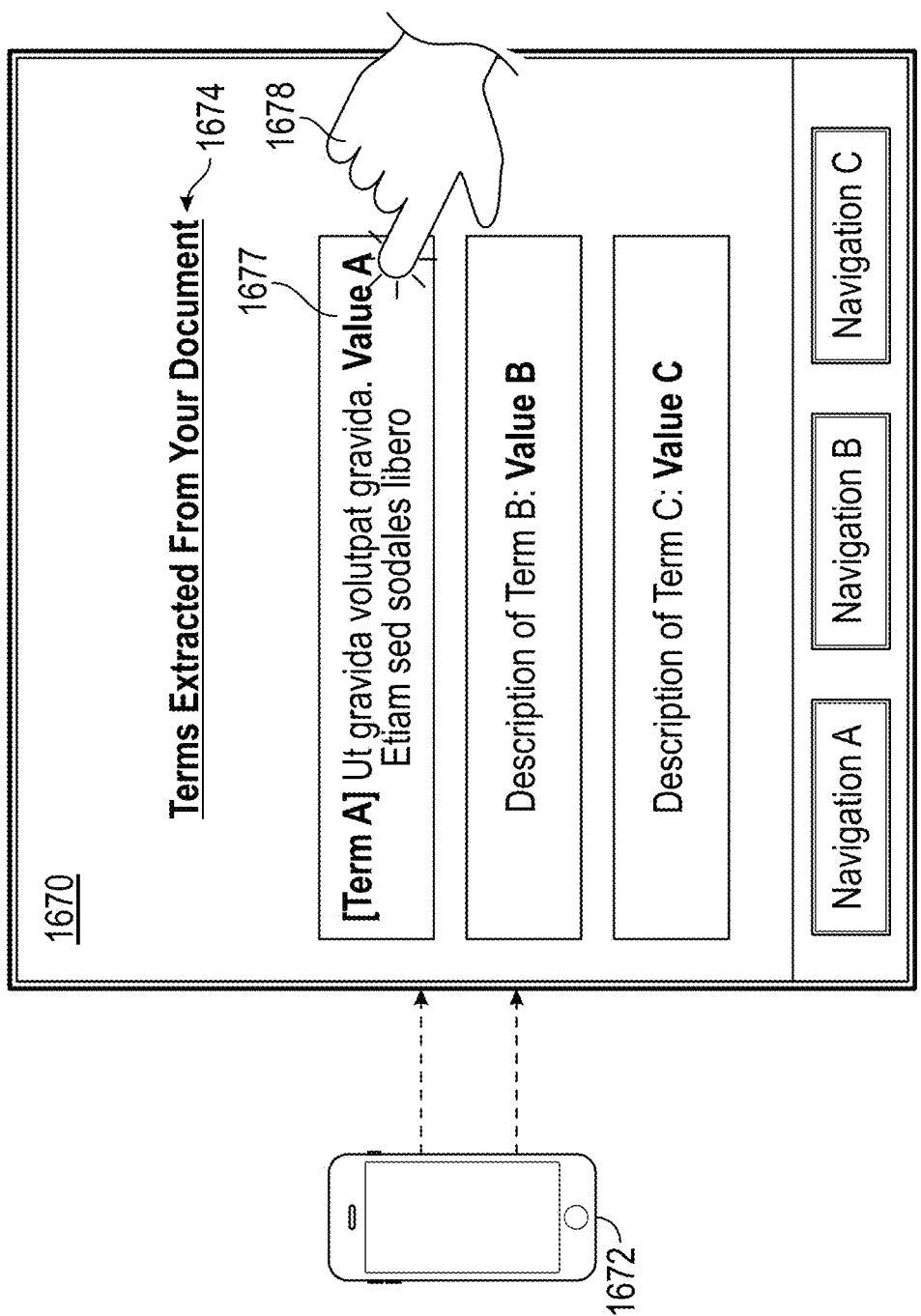

FIG. 16E is a flowchart of an example process 1650 for generating an options table based on ontology information. For convenience, the process 1650 will be described as being performed by a system of one or more computers (e.g., the goal optimization system 100).

As described above, the system can automatically generate an options table, or template, which is usable to extract values and terms from documents. For example, the system can generate an options table which represents a preferred embodiment or version of a type of document utilized by a user or document source (e.g., law firm, corporation, venture capital company, and so on).

While the description herein, with respect to FIG. 16E, describes automatic generation of an options table, it should be understood that an options table may, at least in part, be manually generated. For example, a user may analyze documents of a particular type, and may manually specify textual expressions, or words usable, to extract legal terms and/or values from documents. Optionally, the user may provide documents to one or more professionals, for example legal professionals, who may generate an options table for the user.

Furthermore, while FIG. 16E describes generating an options table based on ontology information, it should be understood that different schemes or techniques may be utilized.

The system accesses ontology information for a type of document (block 1652). As described above, the system can maintain ontology information for different types of documents. The system accesses ontology information for the type of document being analyzed.

The system analyzes documents of a particular type (block 1654). The system can receive a multitude of documents of a same type. Optionally, these documents may be received from a same document source (e.g., a same law firm). Thus, these documents may represent different versions or embodiments of the type of document.

The system automatically generates one or more options tables based on the analyses (block 1656). The system may analyze a first document, and identify locations in the document at which specific terms appear. For example, the system can utilize the ontology information to identify a particular term that may be included in the first document. The system can then access information indicating different wordings or verbiage utilized to express the particular term. As an example, the accessed information may be stored in previously received or determined options tables. Optionally, the system may determine a likelihood that a particular textual portion included in the first document corresponds to the particular term. For example, based on the ontology information the system may obtain a short textual description of the term. The system may identify words included in the short textual description, or synonyms of these words, within the document. The system may then optionally present a particular textual portion to a user and request that the user indicate whether the textual portion corresponds to the term. Upon a positive indication, the system can store the textual portion as an option for the term (e.g., for later use).

The system can traverse the nodes of the ontology information and determine whether the associated terms are included in the document. Advantageously, certain terms may contradict each other, or may otherwise be exclusive (e.g., mutually exclusive). If the system identifies a particular term, it may ignore trying to identify these contradicted terms—conserving processing power.

Thus, the system can identify locations in the received documents at which terms and/or values of terms are located. The system can then prepare one or more options tables that are usable to extract these identified terms and/or values. For example, the system can determine (e.g., optimize) a number of options tables being created. To constrain a number of options tables being created, the system can determine a minimum set of words that can be utilized to extract each term. For example, the minimum set of words may represent a textual expression (e.g., a regular expression) which can be applied to the analyzed documents to extract a term. The lesser the number of words utilized to extract each term may advantageously result in a greater number of different documents being able to be parsed by a same options table. Additionally, particular documents may include different terms from each other. For example, a first document may include a first subset of the terms identified in the ontology information. In this example, a second document may include a second subset of the terms identified in the ontology information. The system may therefore generate options tables for these different variants.

Since a same document source, such as a same law firm, may be likely to re-use documents of a same type when preparing a new document of the same type, the created options tables may be very accurate in extracting terms. As the system receives new documents from the document source, it can augment or adjust the created options tables. For example, the system may identify that different boiler plate is being utilized to surround particular terms. The system can therefore optionally generate a new options table identifying this different boiler plate. The system may instead adjust an already created options table to encompass both the different and prior boiler plates. For example, the system can determine that the particular terms can be extracted regardless of whether the different or prior boiler plates are utilized. Additionally, the system can ensure that other terms are not mistakenly extracted with the adjusted or augmented options table.

The system applies options table to received documents (block 1658). As described above, the system can apply the created options tables to received documents, and can optionally adjust the options tables to improve their accuracy over time.

FIGS. 16F-16G illustrate an example of a mobile interface according to the techniques described herein. As described in FIG. 16B, the system can present summary information for analyzed documents. For example, the summary information can include indications of extracted terms, and indications of any extracted values. To ensure that a document can be easily understood with on a limited display, for example a mobile device display, the system can customize the presentation according to the limited display size.

As illustrated in FIG. 16F, a mobile device 1672 (e.g., a smart phone, a tablet, a wearable device), can present a user interface 1670 to a user. For example, the user can utilize the mobile device 1672 to provide a document for analysis to the system 100. In response, the user interface 1670 can present summary information for extracted terms. In this way, the user can easily digest the complex document information in a manner optimized for the mobile device. For example, the user interface 1670 presents a description 1674, and then identifies three extracted terms from a document. Optionally, the user interface 1670 may respond to user input, and the user may scroll down such that additional terms may be presented.

The initial terms presented to the user (e.g., 'above-the-fold') may represent terms indicated as being the most important, or most frequently altered or argued over during negotiation. For example, the system can monitor versions of documents being transmitted between negotiating parties. Based on this monitoring, the system can identify or flag terms that appear to be important based on their routine change. Optionally, the system can utilize natural language understanding techniques to analyze comments presented in versions, or comments provided between users of a same negotiating entity. The system can therefore determine which terms appear to be most at issue and can optionally present these terms first. Additionally, a user of the user interface 1670 can specify preferences regarding an ordering. Additionally, a user can re-arrange the terms in the user interface 1670. For example, the user can long-press on a specific term or press with greater than a threshold amount of pressure or force, and drag the specific term to a new location. This new arrangement may be stored (e.g., by the system 100 or by the device 1672) and utilized when presenting documents of a same type.

The user can interact with the user interface 1670 to obtain more detailed information for a particular extracted term. For example, the user can utilize touch input 1678 to press on a touch-sensitive display of the mobile device 1672. Optionally, the user can press for greater than a threshold amount of time, or press with greater than a threshold amount of force or pressure. In response, the user interface 1670 can update to present more detailed information. Optionally, the user can provide voice commands to the mobile device 1672 and the user interface 1670 can similarly update. An example voice command may be, 'show me more detailed information for Term A'. Optionally, the mobile device 1672 may be a smart speaker associated with an intelligent personal assistant. For example, the device 1672 may have no display. In this embodiment, the user can cause the uploading of a document, and the device 1672 may verbalize identifications of particular terms and any associated values. The user can then request more detailed information for a particular term.

Figure 17C:
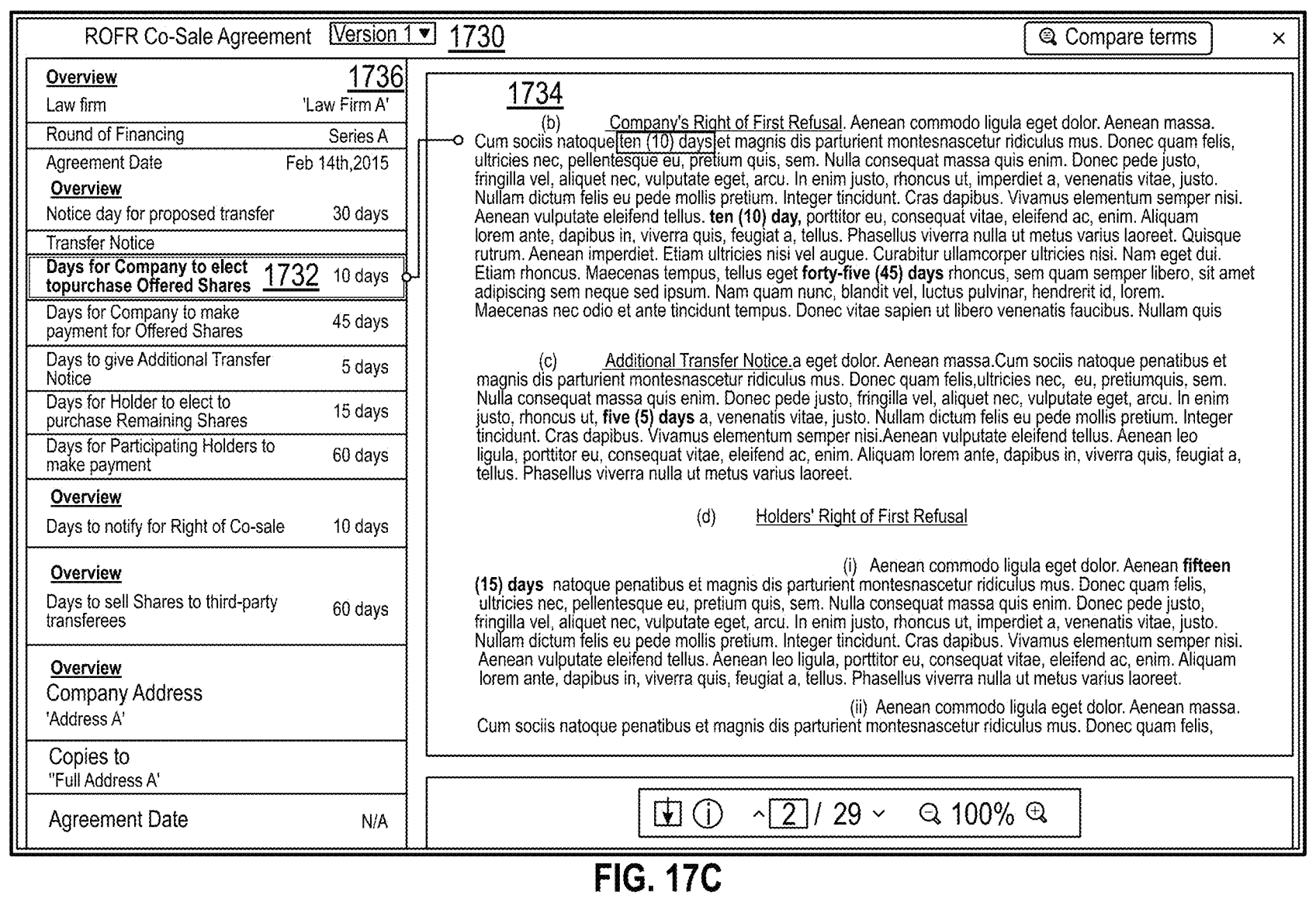
Figure 17D:
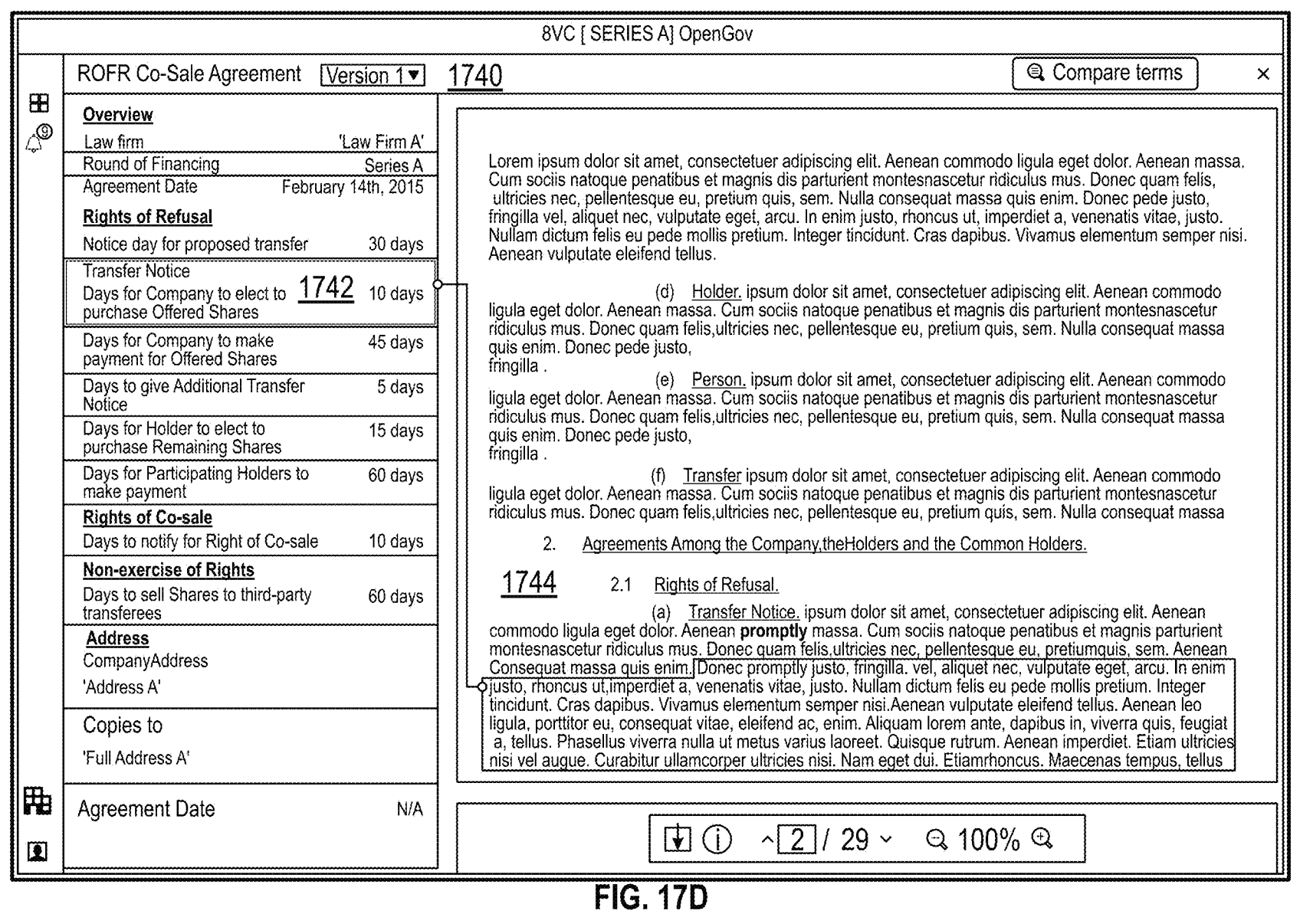
Figure 17F:
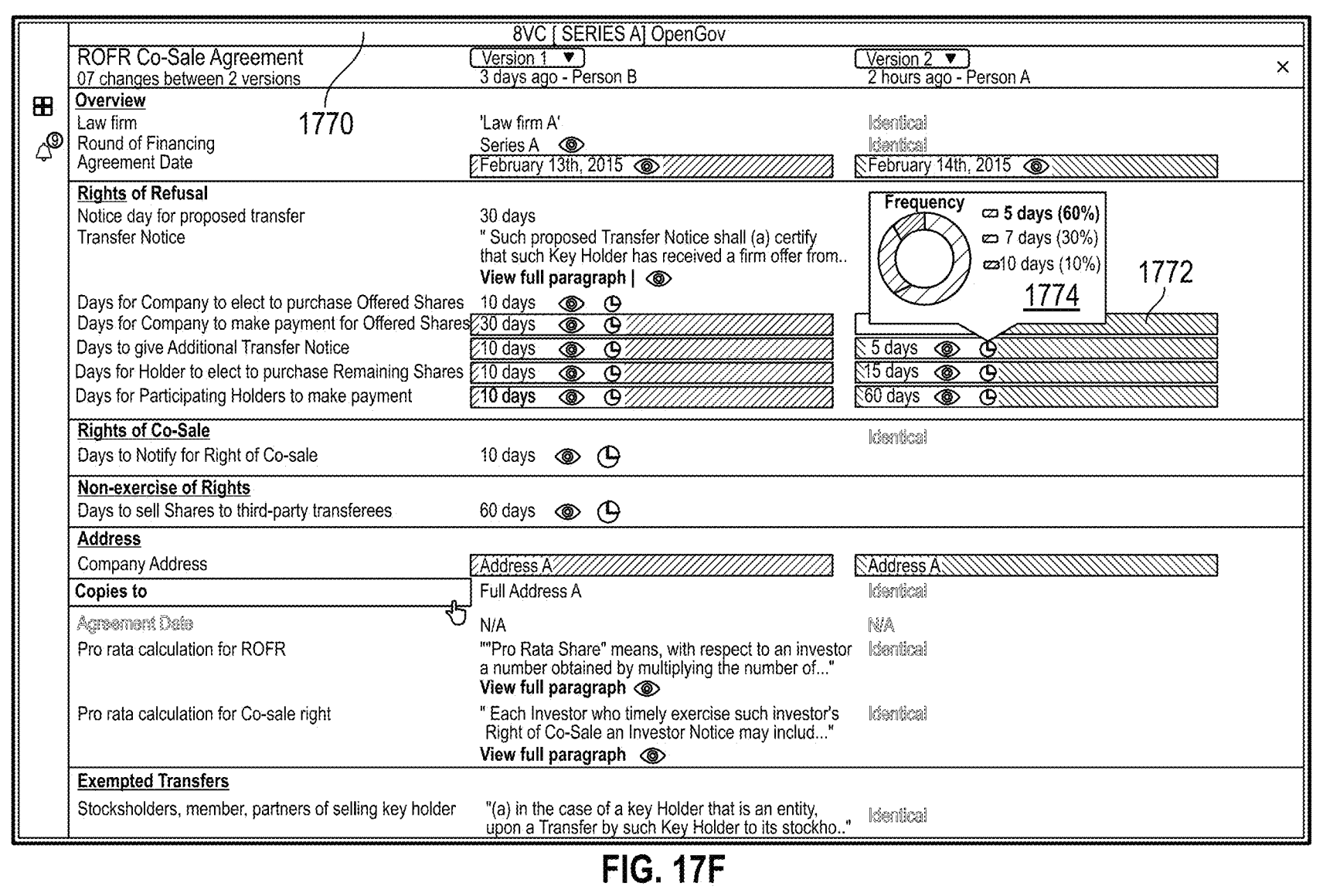
Figure 17J:
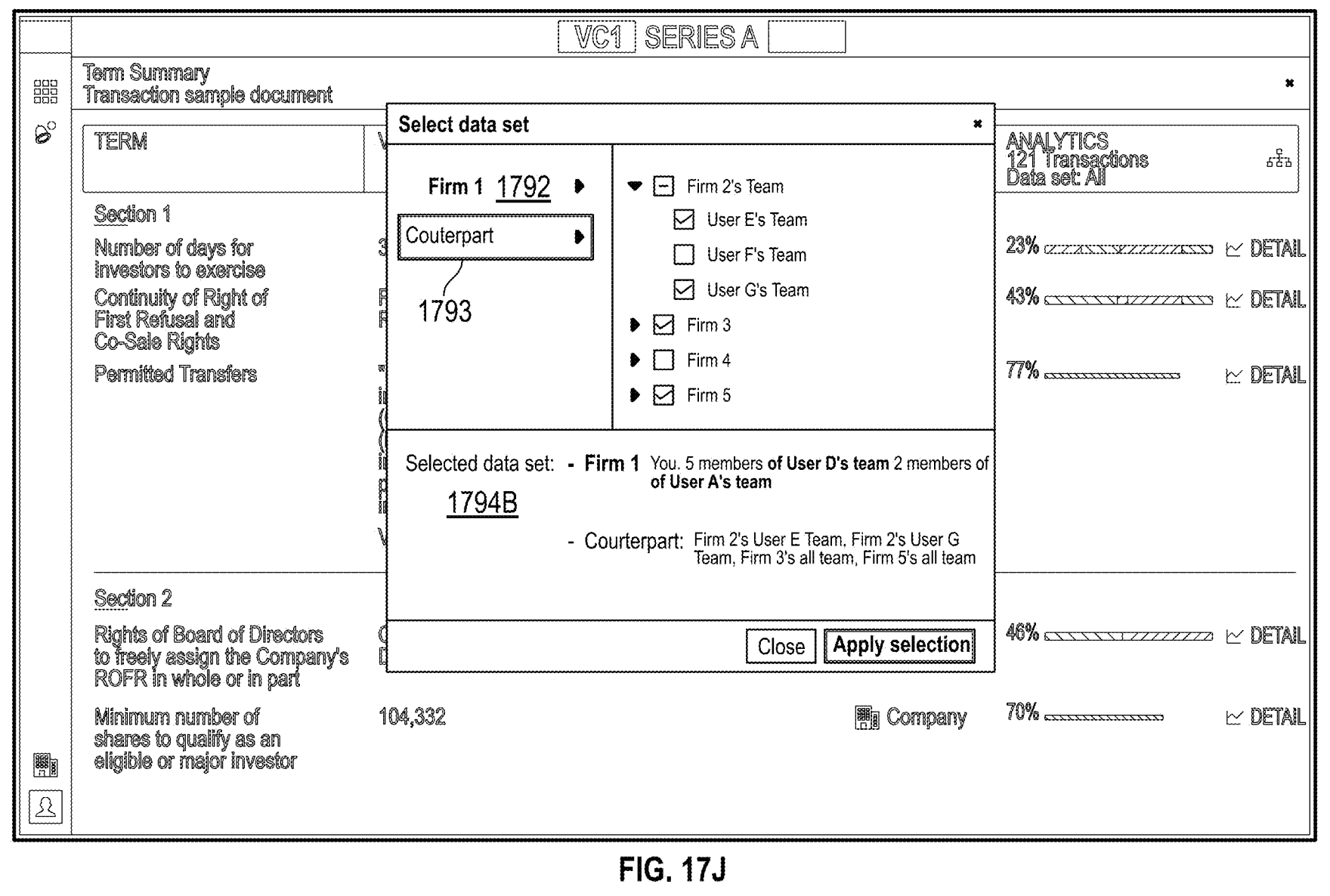
Figure 17L:
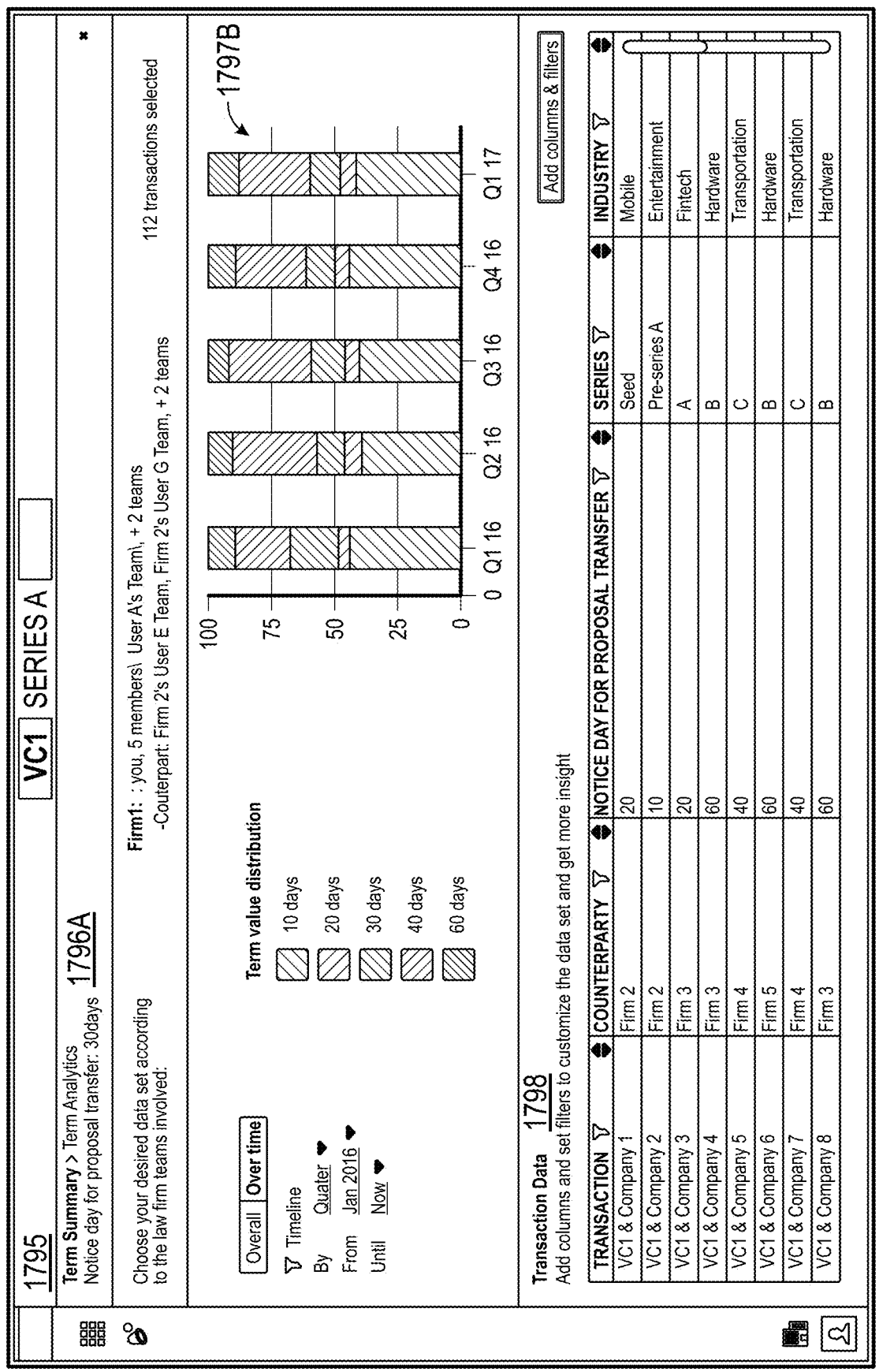

FIG. 16G illustrates the user interface 1670 presenting more detailed information. In FIG. 16F, the user interacted with a user interface element 1676 associated with Term A. In response, the user interface 1670 has updated to present the actual textual portion 1677 of a document corresponding to Term A. Alternatively, the more detailed information can reflect statistical information associated with Term A or its value. For example, the user interface 1670 can indicate a frequency of the term's inclusion in documents (e.g., as illustrated in FIG. 17F). As another example, the user interface 1670 can indicate the statistical information presented in FIGS. 17G-17O (e.g., a chart illustrating the term's utilization, and so on as described herein).

FIGS. 17A-17O described below are user interfaces presenting information to users. The user interfaces can provide various analyses and information to the user, such as statistical information, summary information, comparison of versions, and so on. The user interfaces may be provided by the system for presentation on devices of users. For example, the system may execute a web application and the devices can present user interfaces from the web application (e.g., in a browser). Additionally, the system may execute a web application, and the devices may communicate with the web application via an application (e.g., an 'app' downloaded from an electronic application store) executing on the devices.

FIG. 17A is an example user interface 1700 illustrating documents in a third example step of an electronic goal. The user interface 1700 illustrates documents that are to be negotiated and signed by both entities in the electronic goal, and is associated with core financing 1702 (e.g., as further described above, with respect to FIGS. 12A-12D). As illustrated, the user interface 1700 is presenting documents that are shared with both entities 1704, and includes the documents required for signature in the core financing step. A status 1706 of the documents, for instance a number of documents in negotiation, number that are ready to sign, and number that have been signed. As described above, the documents can be electronically signed, such that the system 100 can allow an entire completion of the electronic goal via the system 100. Button 1708 ("add new version") may be selected by a user to create and/or upload a new version of the associated document.

Utilizing the user interface 1700, a user can view each document, such as a clean version of a most recent version 1710, a redlined version 1712 (e.g., the redline option 1712 can allow the user to create amendments, or to view a version redlined with respect to a previous the user viewed, for instance the system can monitor versions viewed by the user and provide comparisons from his/her previously seen version). Additionally, the user interface 1700 includes a selectable option to provide a new version 1712 of a document.

A user of user interface 1700 can request a summary of each document, and the system 100 can parse the document (e.g., the system can parse documents immediately upon, or within a threshold time of, receipt of a document, and access the parsed information) for presentation to the user.

FIG. 17B is an example user interface 1720 illustration summary information of a parsed document. The user interface 1720 includes options to select a particular version 1722 of the document, and the system 100 can maintain all versions for ease of reference and use by the users. Optionally, depending on a user role and/or entity of the user viewing user interface 1720, particular versions may be included, or not included. For instance, working copy versions of documents shared only with users of a particular entity may not be visible to users of another entity. User interface 1720 further includes selectable options 1724 to export the summary or document (e.g., export to '.pdf'), compare terms (e.g., compare different versions of the document), download the document, and so on.

As illustrated in FIG. 17B, the summary of terms 1726 includes terms parsed from the document and associated values (e.g., textual values, numerical values). User interface element 1728 is included adjacent to each value, and upon selection of the element 1728, a portion of the document associated with the term can be presented. Additionally, for particular values that include greater than a threshold amount of text (e.g., the threshold can be based on a screen size, resolution, pixels per inch, and so on, of a user device), the user interface 1720 can include an option to "view full paragraph" 1730.

FIGS. 17C-17D are example user interfaces illustrating parsed terms from a document and associated portions of the document. As described above, the system can present summary information associated with documents, and optionally present a portion of each document that a term is included in. As illustrated in user interface 1730, a particular term 1732 has been selected by a user, and a portion 1734 associated with the particular term 1732 is identified in the document (e.g., the value of the particular term 1732 is highlighted). The user can request a particular version 1736 of the document be shown, and the user interface 1730 can update to reflect changes in the terms and/or values. Similarly, in FIG. 17D, a particular term 1742 is selected, and an associated portion 1744 of the document is presented.

FIG. 17E is an example user interface 1750 illustrating comparisons between two documents. As described above, the system 100 can present summary information associated with documents, and a user can request that a comparison between two documents, such as two versions of a same document, be performed. As illustrated, the system 100 has compared version 1 1752 and version 2 1754 of a same document, has updated user interface 1750 with terms and associated values. For instance, the summary 1756 includes a first column of values of terms from version 1 1752, and a second column of values of terms from version 2 1754. For terms that have not been modified, the user interface 1750 provides the value, and then, as an example, indicates that the value is 'identical' 1758. For terms that have been modified, the user interface 1750 provides the value from each version 1760. Additionally, the user interface 1750 includes options to view the portion of each document that each term is associated with. Advantageously, the user may easily compare the substantive changes in the terms of the document (between the two version) without resorting to reviewing all the legalese associated with the changed term. This is facilitated by, for example, the term parsing and analysis described here. Advantageously, the system may also the use to drill down into a specific changed term to view more detailed information about the specific language that is changed between the two version of the term.

FIG. 17F is an example user interface 1770 presenting statistical information associated with terms. In addition to presenting comparisons between documents, the system 100 can present a frequency with which (1) terms are included, and/or (2) values are utilized, in prior electronic goals. For example, as illustrated in user interface 1770, a particular term 1772 and value is identified, along with information identifying 1774 how common values for the particular term 1772 are. That is, the information 1774 indicates that '5 days' is more common than the '10 days' included in version 1 of the document. In this way, users unaware of values can ascertain whether the values selected by the other entity are common, or can request that the system provide them common values for inclusion in documents. As described above, advantageously the system can monitor progression of all prior electronic goals, and can learn values of terms over time. These values can optionally be modified according to particulars of electronic goals. For instance, the system can learn that electronic goals with particular features utilize a value in greater proportion than electronic goals with different features (e.g., features may include quantities of money, funding stage, number of employees, complexity of assets, and so on). Thus, the system can optimize the negotiation process as each side can receive an understanding of how common values are upon completion of electronic goals.

FIGS. 17G-17H illustrate other interactive user interfaces 1780 presenting statistical information associated with terms. In the user interface 1780, extracted terms and values are presented. In addition, the extracted terms are grouped according to a section in which they appear (e.g., Section 1 1781, Section 2 1782). The terms are presented as being summarized in an easy to read form. For example, the actual document from which these terms were extracted may include a complex legal textual portion for the extracted term summarized by "Number of days for Investors to exercise." However, since each term is associated with a code or identifier, the system can utilize a short description associated with the code or identifier in lieu of the actual text. In addition, the user interface 1780 indicates whether the term is standard 1783 or non-standard 1784. For example, standard can indicate whether the text corresponding to a term is commonly utilized, or whether it has been adjusted and is now non-standard. This can indicate to the user that the contractual language may need to be examined in more detail. Additionally, standard can indicate whether the term is common for a particular type of document, or whether it is not commonly included. Standard and non-standard can be based on selected datasets, for example the datasets can be associated with particular document sources (e.g., specific law firms, venture capital firms, and so on).

The user interface 1780 includes an analytics portion, for which a percentage 1785A is identified for each term. This percentage 1785A can indicate how common it is for this term to appear in documents of this type. The user can provide user input to the user interface 1780, for example hovering a mouse over the percentage 1785A or using touch input, and the user interface 1780 can indicate how common a particular value 1785B is for a term. For example, FIG. 17H illustrates that the value '30 days' appears in 23% of documents.

The user interface 1780 can enable a user to specify datasets from which to determine analytics. For example, the system can select a dataset corresponding to the user's preferred document source, or from the user's entity. As an example, if the user is part of a venture capital firm, the system can select the dataset as corresponding to the venture capital firm. In this way, the user can identify how common certain values of terms are across all their prior transactions. The user can select other document sources, such as other law firms or venture capital firms, to determine how commonly these other document sources utilize terms. Optionally, authorization and privacy constraints may be in place, such that the user is required to receive authorization to view analytical information for these other document sources.

FIG. 17I-J are example interactive user interfaces 1790 for selecting datasets to be utilized in determining statistical information. As illustrated in FIG. 17I, a user can select datasets for use in determining analytical or statistical information. For example, 'Firm 1' 1792 indicates the user's entity. The user can select documents drafted, uploaded, or otherwise associated with, users at Firm 1 1792. For example, the user has selected documents from User A, User C, User D, himself or herself (e.g., User D) and the user's team (e.g., User D's team). The full identification of the selected datasets is illustrated for the user in portion 1794A.

FIG. 17J illustrates the user selecting datasets from different firms 1793. Similar to the above, the full identification of the datasets is presented to the user in portion 1794B. As described above, optionally the user may be required to receive authorization to select these datasets from the respective firms.

FIG. 17K-O are example interactive user interfaces 1795 presenting statistical information associated with terms based on selected datasets. FIG. 17K illustrates a pie graph 1797A associated with a value for a particular term 1796A (e.g., 'Notice day for proposal transfer: 30 days'). The pie graph 1797A indicates a distribution of values across documents utilized by different contracting entities. For example, the transaction data indicating selected datasets is illustrated in portion 1798. The user can interact with the user interface 1705 to adjust the 'Counterparties' included in the transaction data 1798. For example, the user can select particular firms to be utilized (e.g., the user can exclude 'Firm 3' from the pie graph 1797A). Additionally, the user can adjust the Series or Industry associated with the documents, or adjust a time frame from which the documents are being pulled from. In response to the adjustments, the user interface 1795 can be updated to reflect statistical information. For example, a user can remove a particular Industry, or select a single Industry, to gain insights into statistical information across Industries.

Figure 17M:
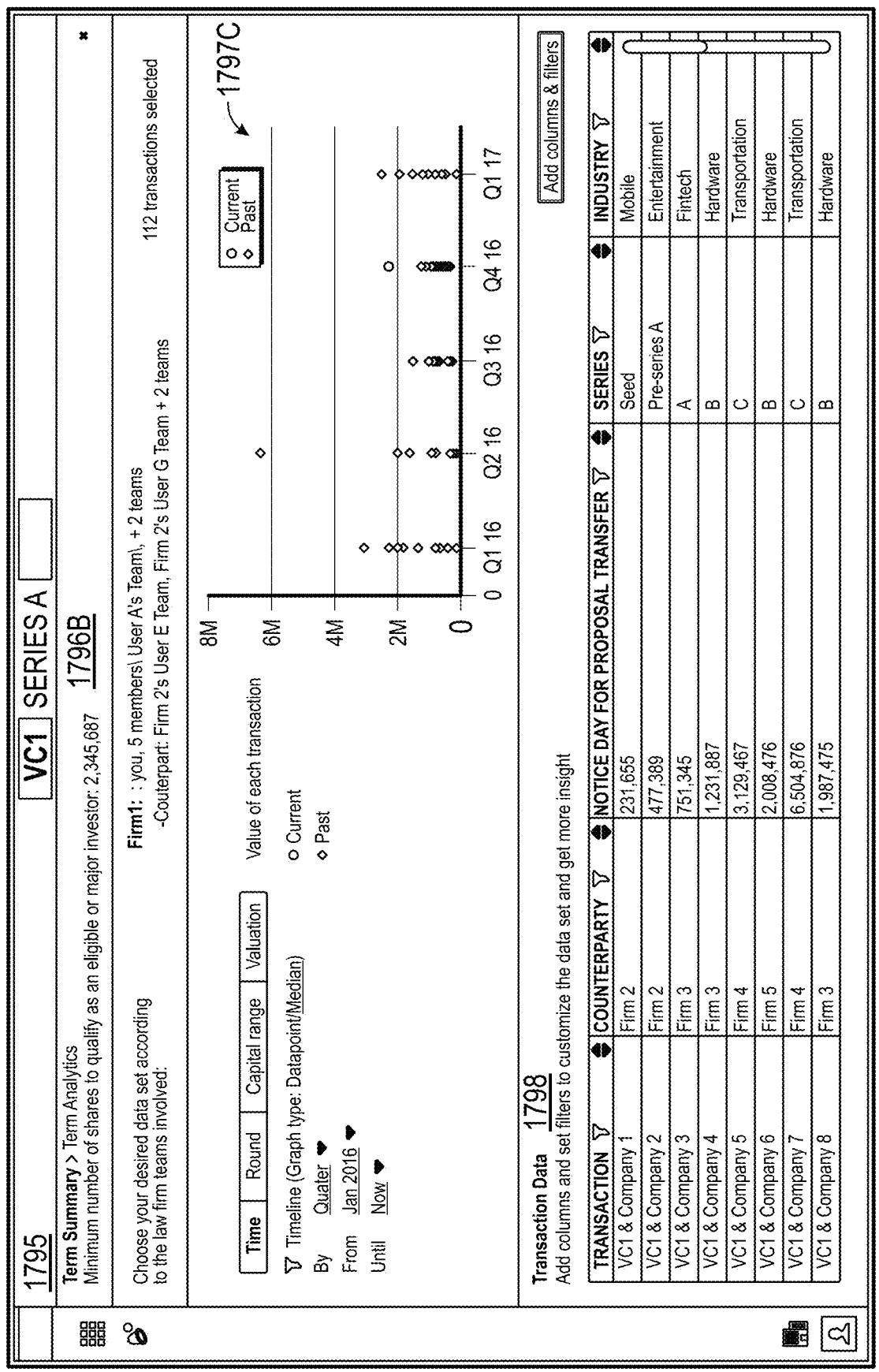
Figure 17N:
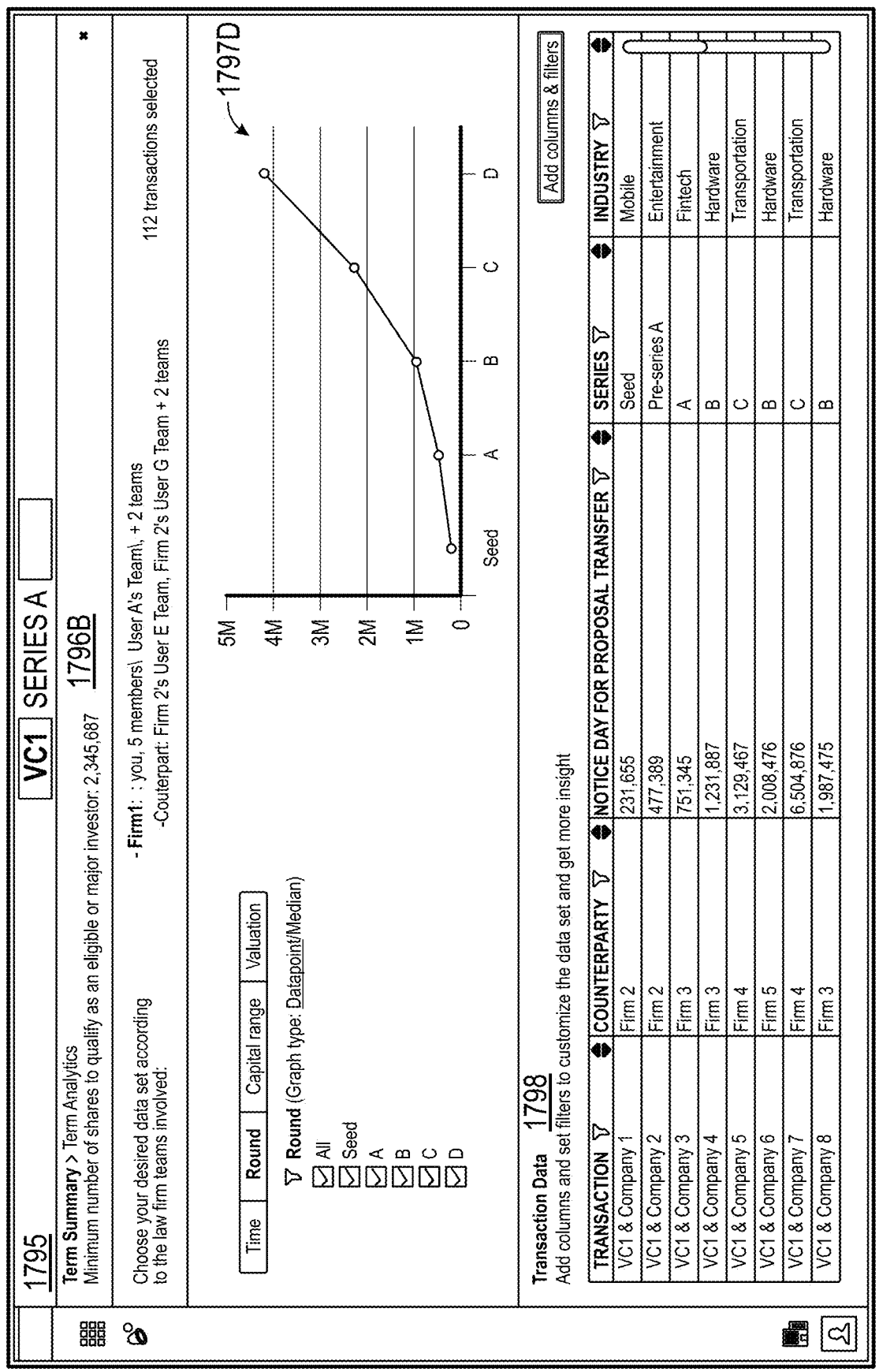

FIG. 17L illustrates a bar graph 1797B describing a distribution of a value for the term 1796A across different time periods. For example, the time periods are separated according to quarter. The user can adjust the time period and the bar graph 1797B can be updated accordingly. FIG. 17M illustrates a distribution 1797C for values of a particular term 1796B. FIG. 17N illustrates a line graph 1797D indicating distribution of values for different rounds of financing. That is, in contrast to the statistical or analytical information being based on time, the line graph 1797D indicates dependencies of the value based on different criteria (e.g., a round of financing). Additionally, the line graph 1797D is a representation of median values. In contrast, the distribution 1797C of FIG. 17M indicates a distribution of values. In this way, the line graph 1797D can present the normal value selected, while the distribution 1797C can indicate a range of values selected.

FIG. 17O illustrates different options 1799A for a particular term 1796C. For example, the particular term 1796C may be a parent term representing a major issue or question. The specific options 1799A may represent an embodiment of the parent term (e.g., a child term). The user interface 1795 illustrates the different options 1799A, along with their frequency of use 1799B, and whether an option appears in a current document 1799C.

Figure 18:
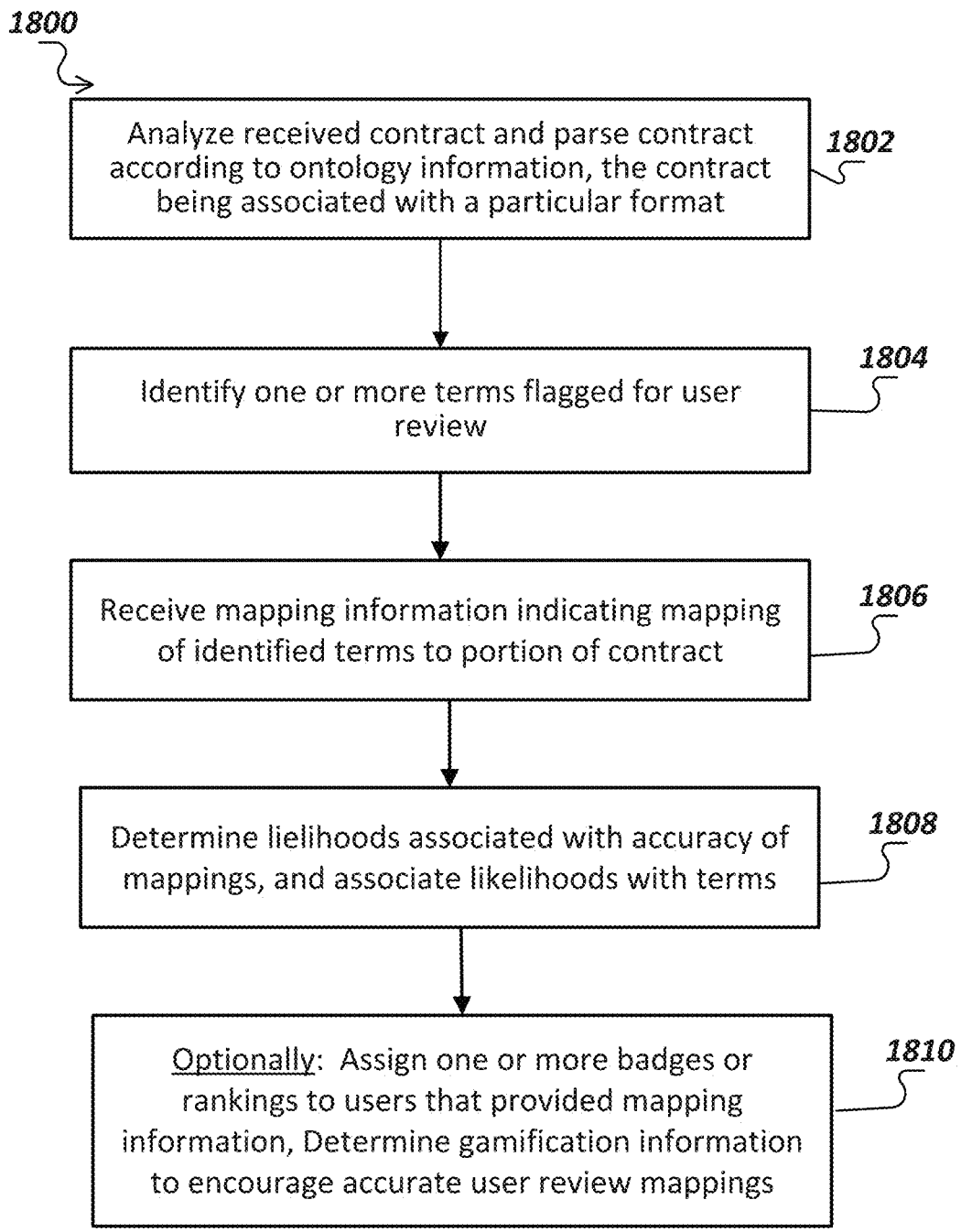
FIG. 18 is a flowchart of an example process for increasing technical accuracy of parsed documents, according to various embodiments of the present disclosure.

FIG. 18 is a flowchart of an example process 1800 for increasing technical accuracy of parsed documents. For convenience, the process 1800 will be described as being performed by a system of one or more computers (e.g., the goal optimization system 100).

The system parses a document (block 1802), for instance as described above with respect to FIG. 16, and identifies one or more terms identified (e.g., flagged) for user review (block 1804). The system can identify terms that are likely (e.g., based on one or more rules, machine learning models, for instance a likelihood greater than a threshold) to be terms, but that the system cannot identify. For example, the system may parse the document and determine that a number appears, but not be able to identify a term associated with the number. As another example, the system may parse the document, identify a term, and be unable to determine boundaries associated with text included in the document. That is, the system may not have stored information, or be unable to determine (e.g., via comparisons with synonymous terms), a portion of text that is associated with the term. The system can then identify this portion of the document for later review.

The system receives mapping information if the identified terms to portions of the document (block 1806). A particular user, such as an attorney, can review the identified terms and document, and utilizing a user interface can cause the mapping between them. For instance, with respect to FIG. 17D, the system can present the document along with unidentified terms. The user can select an unidentified term, and highlight (e.g., with an input device, such as a mouse, touch screen, and so on) a portion of the document associated with the term. The system can then store the mapping, update the above-described ontology information and/or machine learning techniques, thus improving effectiveness and technical accuracy of parsing.

The system determines likelihoods associated with accuracy of the mapping (block 1808). For example, as described above in reference to blocks 1602-1604 of FIG. 16, documents and specific terms may be analyzed to determine matches and confidences in matches.

The system optionally assigns rankings, badges, to users that provide mapping information (block 1810). To encourage completion of mappings, so that users unfamiliar with contractual language can understand received documents, the system can assign badges, rankings, to users that map terms. These badges, rankings, can be presented next to the user's name on user interfaces, encouraging selection and use of these users in further electronic goals.

Turns Framework

As described above, the system (e.g., goal optimization system 100) can monitor progression through a goal (e.g., represented by a graph as described above), and determine a present state. Based on the present state, the system can determine a user whose turn it is to take an action. For example, FIG. 3 describes the system monitoring state information and identifying users required to perform actions. FIG. 12B illustrates an identification of a user whose turn it is to take an action (e.g., a 'Task Owner' 1218 is identified). The system can identify a user according to the progression through the goal.

FIGS. 25A-25B and 26A-26B illustrate example emails that may be presented to users. The emails may instead be presented as notifications via applications on user devices, or may be presented as web pages presented on browsers.

Figure 25B:
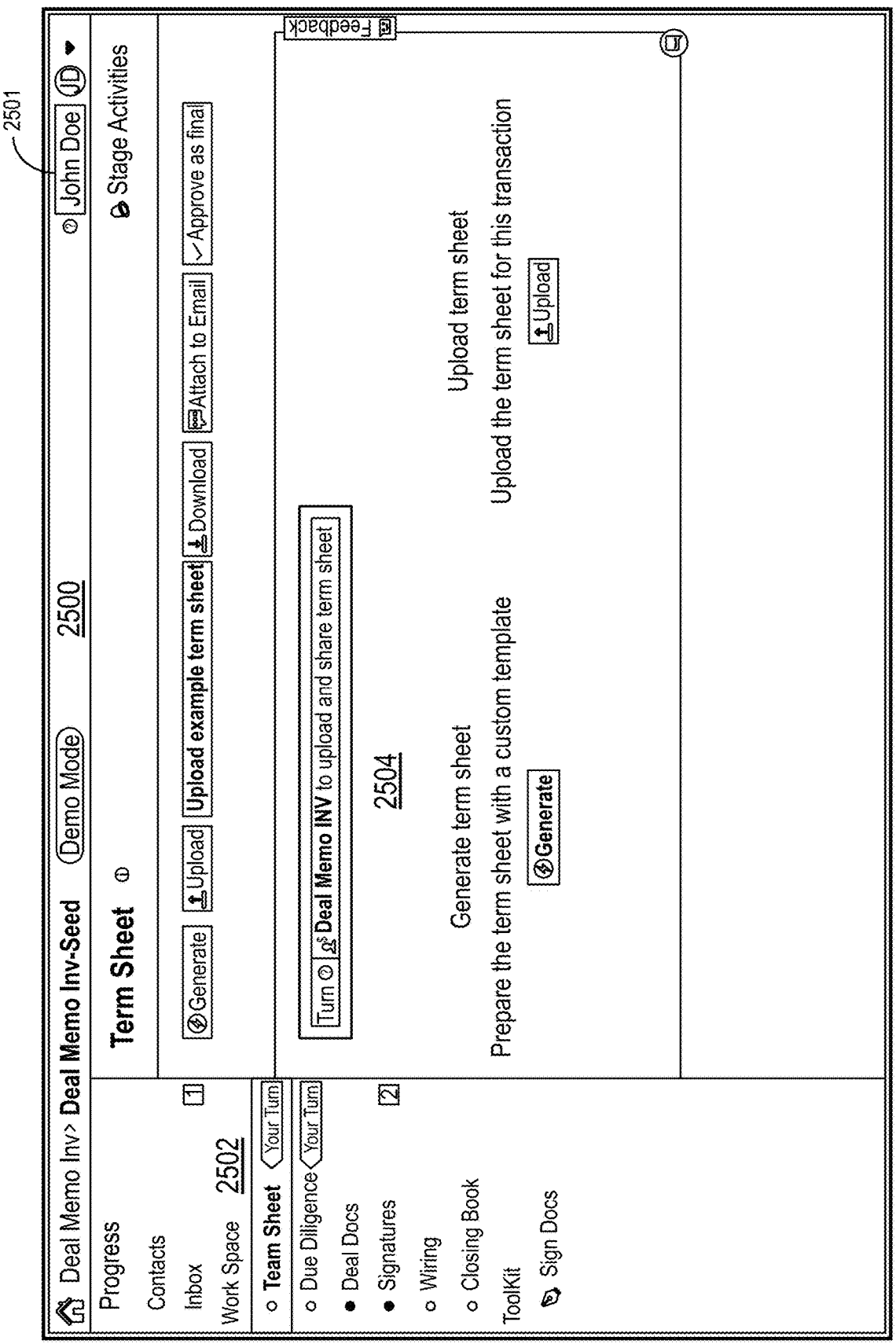

FIGS. 25A-25B illustrate example user interfaces 2500 specifying user turns. A particular user 2501 (e.g., 'John Doe') is illustrated as using user interface 2500. In the user interface 2500, actions required to be performed, or which may be performed, by the user 2501 are illustrated. For example, the user interface 2500 indicates that it's the user's 2501 turn to work on a 'Term Sheet' and 'Due Diligence'. The user interface 2500 further indicates summary information associated with turns. For example, the user interface 2500 includes a column 2504 identifying a turn for each stage of the goal. As described above, the system can monitor progression towards the goal through traversal of nodes indicating steps or tasks required to complete stages of the goal. Thus, the system can ensure that users are aware of whose turn it is to next perform an action or task. FIG. 25B illustrates the user 2501 having selecting 'Term Sheet' from portion 2502. The user interface 2500 can then update to indicate the specific action or task 2504 requiring completion.

FIGS. 26A-26B illustrate example notification emails. As described above, notifications can be provided to users informing the users of state or status information. For example, FIG. 2B illustrates an example email 202 provided to a user which indicates a next task or action 204. FIG. 26A illustrates an example email 2600 specifying an identification of a user whose turn it is to perform an action (e.g., User A 2602). The email 2600 may be provided to User A 2602, or provided to other users (e.g., users working on a same entity or negotiating side as User A 2602, all users involved in the goal, and so on). The email 2600 further indicates an amount of time 2604 that the action or task has been pending. Via the email 2600, User A 2602 can select a hyperlink 2606 to complete the action or task. For example, the hyperlink may cause presentation of a user interface to complete the task. Email 2608 similarly indicates completion of a task or action, and indicates that it is Company A's turn to complete the next action or task.

FIG. 26B illustrates an example email 2610 describing a weekly digest 2612. The email indicates an expected date 2614 at which the goal is to be completed. As described above, the system can monitor multitudes of progressions through different goals and can determine statistical information. The system can therefore determine a total amount of time that each goal takes (e.g., a measure of central tendency). As the current goal progresses, the system can augment this average time according to empirically measured times that the current goal has taken to complete particular tasks or actions. Thus, the time 2614 can be adjusted from the average time. The email 2610 further includes an identification 2616 of the major tasks or steps that are to be completed, and indicates whether they are on task for completion and optionally an estimated end date. The estimated end date can be determined according to previously monitored goals. The email 2610 further includes an identification of a turn 2618. As illustrated, the email indicates that it is Company A's turn to perform the next task or action.

Additional Implementation Details and Embodiments

In some embodiments, the alerts and/or notifications (e.g., the various notifications that may be sent by the system as described here) are automatically transmitted to a device operated by, e.g., the user associated with a corresponding notifications. The alerts and/or notifications can be transmitted at the time that the alerts and/or notifications are generated or at some determined time after generation of the alerts and/or notifications. When received by the device, an alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a dedicated application associated with the systems described herein), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

As described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

In an implementation, the systems described herein (e.g., goal optimization system 1500 and/or other aspects of the present disclosure) may comprise a "virtual computing environment". As used herein, the term "virtual computing environment" should be construed broadly to include, for example, computer readable program instructions executed by one or more processors (e.g., as described below in the example of FIG. 19) to implement one or more aspects of the modules, engines, and/or functionality described herein (e.g., the functionality described in references to various flowcharts, blocks, user interfaces, and/or the like). Further, in this implementation, one or more modules/engines/etc. (e.g., progress monitoring engine 1606, user role action engine 1608, etc.) of the system may be understood as comprising one or more rules engines of the virtual computing environment that, in response to inputs received by the virtual computing environment, execute rules and/or other program instructions to modify operation of the virtual computing environment. For example, inputs and outputs provided via interactive user interfaces of the system (e.g., as presented on user devices) may be understood as modifying operation of the virtual computing environment to cause the system, e.g., to execute the graph, track user roles and goals/tasks, parse documents, generate documents, etc. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system and/or responses received and analyzed by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 19:
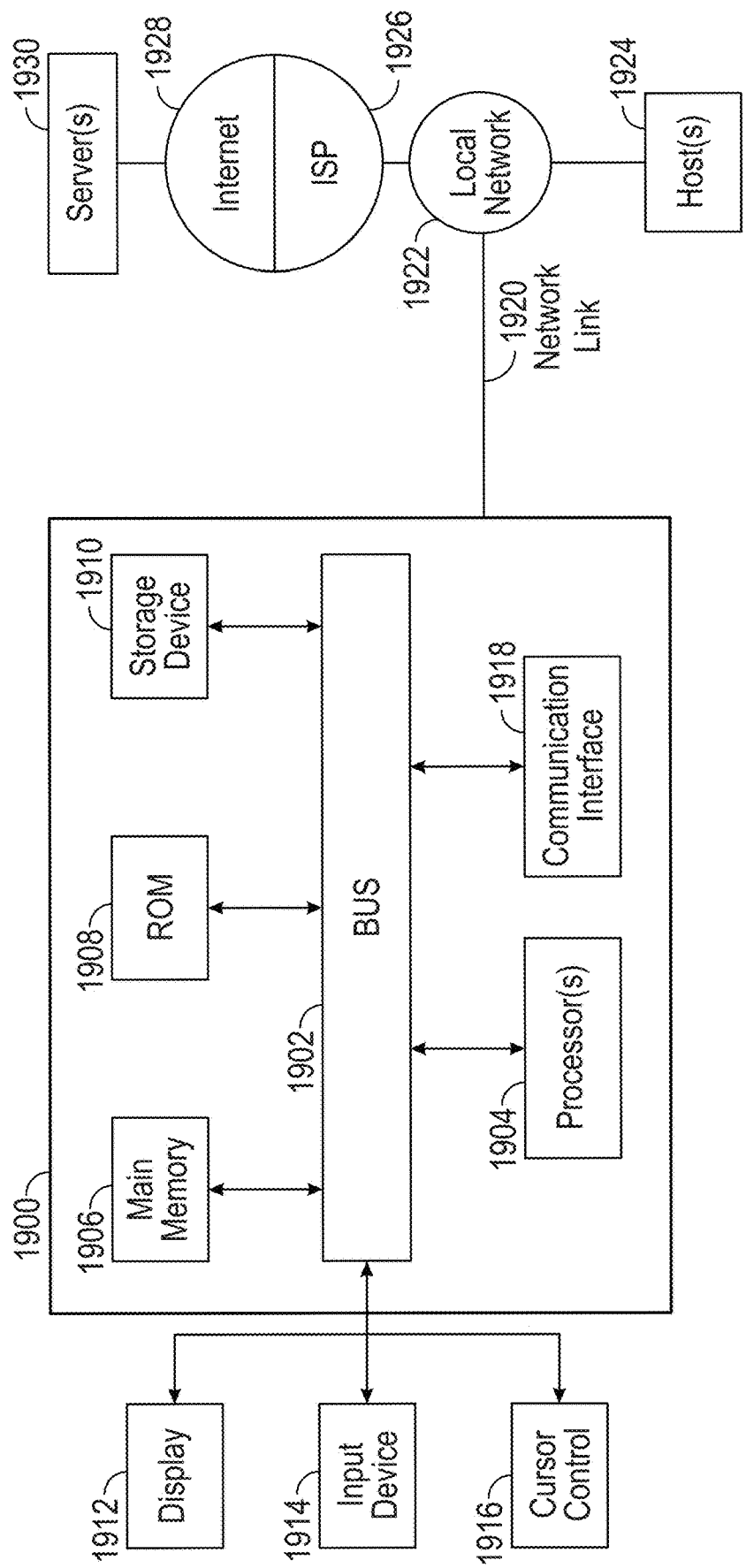
FIG. 19 illustrates a computer system with which certain methods discussed herein may be implemented.

For example, FIG. 19 is a block diagram that illustrates a computer system 1900 upon which various embodiments may be implemented (e.g., goal optimization system 100 and/or various other aspects of the present disclosure). Computer system 1900 includes a bus 1902 or other communication mechanism for communicating information, and a hardware processor, or multiple processors, 1904 coupled with bus 1902 for processing information. Hardware processor(s) 1904 may be, for example, one or more general purpose microprocessors.

Computer system 1900 also includes a main memory 1906, such as a random access memory (RAM), cache and/or other dynamic storage devices, coupled to bus 1902 for storing information and instructions to be executed by processor 1904. Main memory 1906 also may be used for storing temporary variables or other intermediate information during execution of instructions to be executed by processor 1904. Such instructions, when stored in storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk, optical disk, or USB thumb drive (Flash drive), etc., is provided and coupled to bus 1902 for storing information and instructions.

Computer system 1900 may be coupled via bus 1902 to a display 1912, such as a cathode ray tube (CRT) or LCD display (or touch screen), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1900 may include a user interface module to implement a GUI that may be stored in a mass storage device as computer executable program instructions that are executed by the computing device(s). Computer system 1900 may further, as described below, implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor(s) 1904 executing one or more sequences of one or more computer readable program instructions contained in main memory 1906. Such instructions may be read into main memory 1906 from another storage medium, such as storage device 1910. Execution of the sequences of instructions contained in main memory 1906 causes processor(s) 1904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1904 for execution. For example, the instructions may initially be carried on a magnetic disk or solid state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN (or WAN component to communicate with a WAN).

Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of extracting succinct information for mobile presentation, the method being performed by a server system of one or more computers, and the method comprising:
   obtaining, via a user accessible user interface, a request for uploaded textual information to be analyzed, wherein the textual information is included in a document, and wherein the request indicates a type of the document;
   accessing, based on the indicated type associated with the textual information, ontology information for the type, the ontology information representing a graphical depiction of a plurality of nodes and relational information between the nodes, wherein the graphical depiction is analyzed to determine:
      the nodes, the nodes being associated with respective triggers that cause the server system to extract values for textual expressions defined by the nodes,
      wherein a subset of the nodes are associated with a first shape in the graphical depiction, wherein the first shape indicates that an associated node is usable to extract a value associated with a textual expression defined by the associated node,
      and wherein at least one of the nodes is associated with a second shape, the second shape indicating that the at least one of the nodes is associated with a plurality of types of values, and wherein the at least one of the nodes is connected via respective edges to particular nodes of the subset of the nodes, each of the particular nodes being usable to extract a particular type of value, and
      the relational information between the nodes, wherein relational information indicates links between textual expressions, wherein a subset of the edges is associated with a third shape in the graphical depiction;
   parsing the textual information based on the ontology information, the parsing causing traversal of the nodes and extraction of values, via the nodes, from one or more textual expressions based on the textual information,
   wherein parsing the textual information based on the ontology information comprises:
      for individual nodes associated with the first shape which are included in the traversal of the nodes, accessing a plurality of options table, wherein each options table represents a respective embodiment of the type of textual information, the embodiment including a respective portion of the nodes, and selecting, for the individual node, a particular options table usable to extract a value associated with a textual expression defined by the individual node;
   obtaining, based on the parsing, a plurality of values for presentation, the values being utilized as summary information associated with the textual information; and
   providing, for presentation on a user device via an interactive user interface, at least a first value of the plurality of values, the first value being extracted from a first textual expression, wherein a second value of the plurality of values was extracted from a second textual expression, wherein respective nodes associated with the first textual expression and the second textual expression were connected via an edge associated with the third shape in the graphical depiction,
   and wherein based on receipt of user input selecting the first value, the interactive user interface is configured to present the second value.

2. The method of claim 1, further comprising:
   determining the type of the textual information based on measures of similarity between textual expressions included in the textual information and textual expressions specified in ontology information for disparate types of textual information; and
   selecting the type based on the measures of similarity.

3. The method of claim 1, wherein parsing the textual information comprises:
   initiating traversal at a first node specified in the ontology information, and for the first node, parsing the textual information to identify the textual expression defined by the initial node;
   causing extraction, from the textual information, of one or more values from the textual expression; and
   traversing, based on the relational information, from the initial node to a subsequent node.

4. The method of claim 1, wherein relational information indicates links between nodes, and wherein for a first node, the relational information indicates a hierarchy associated with the first node and one or more second nodes, the second nodes being child nodes of the first node.

5. The method of claim 4, wherein the first textual expression and second textual expression are separated, in the textual information, via one or more textual expressions unrelated to first textual expression and second textual expression.

6. The method of claim 1, wherein each node defines one or more textual expressions, and wherein the server system applies respective regular expressions to extract values associated with the textual expressions.

7. The method of claim 1, wherein selecting is based on comparisons of textual expressions included in the textual information with textual expressions defined by nodes of each options table.

8. The method of claim 1, wherein each node included in an options table is represented as a respective row of the options table, and wherein a particular row indicates (1) a section of textual information in which a textual expression is included and (2) the textual expression.

9. The method of claim 8, wherein the particular row indicates one or more alternate textual expressions.

10. The method of claim 8, wherein parsing the textual information comprises:
    selecting the particular options table;
    obtaining, from an initial row of the particular options table, one or more textual expressions; and applying the textual expressions to a section of the textual information, and extracting values associated with the textual expressions, wherein a value comprises a numerical value or text from the textual information.

11. The method of claim 10, wherein a first obtained textual expression causes extraction of particular text, and wherein a second obtained textual expression causes extraction of a particular value, and wherein the particular value is included in the particular text.

12. The method of claim 1, wherein providing, for presentation on a user device, one or more of the values and associated textual expressions comprises:
   causing presentation of the values and descriptions of the values as a summary of the textual information.

13. The method of claim 12, wherein the server system maintains different versions of the textual information, and wherein the method further comprises:
   determining differences between extracted values included in the different versions; and
   presenting, for at least one of the extracted values, information describing the determined difference.

14. The method of claim 12, wherein an interactive user interface is provided for presentation on the user device, and wherein the interactive user interface:
   presents, in a first region of the interactive user interface, one or more of the values and descriptions of the values;
   presents, in a second region, at least a portion of the textual information;
   responds to interaction with a particular value presented in the first region; and
   in response, updates the second region to specify text included in the textual information that is associated with the particular value.

15. The method of claim 1, wherein a particular options table of the plurality of options table indicates a relation among a plurality of textual expressions, wherein the relation indicates an order associated with the textual expressions.

16. The method of claim 1, wherein a particular options table of the plurality of options table indicates a relation among a plurality of textual expression, wherein the relation indicates whether a first textual expression is included inside a second textual expression.

17. A system comprising one or more computer systems and computer storage media storing instructions that, when executed by the one or more computers, cause the computers to perform operations comprising:
   obtaining, via a user accessible user interface, a request for uploaded textual information to be analyzed, wherein the textual information is included in a document, and wherein the request indicates a type of the document;
   accessing, based on the indicated type associated with the textual information, ontology information for the type, the ontology information representing a graphical depiction of a plurality of nodes and relational information between the nodes, wherein the graphical depiction is analyzed to determine:
      the nodes, the nodes being associated with respective triggers that cause the server system to extract values for textual expressions defined by the nodes, wherein a shape associated with each node is indicative of a user-definable rule which is interpretable by the system to analyze the graphical depiction, wherein a particular shape indicates that nodes are associated with a plurality of types of values, and wherein an individual node associated with the particular shape is connected via respective edges to other nodes usable to extract respective types of values, and
      relational information between the nodes, wherein relational information indicates links between textual expressions, and wherein a subset of the edges is associated with a different shape in the graphical depiction;
   accessing a plurality of options tables, each options table representing a respective embodiment of the type of textual information and including a respective subset of the nodes;
   parsing the textual information based on the ontology information, the parsing causing traversal of the and extraction of values, via the nodes, from one or more textual expressions based on the textual information, wherein parsing the textual information based on the ontology information comprises:
      for individual nodes included in the traversal of the nodes, accessing the plurality of options table, and
      selecting, for the individual node, a particular options table usable to extract a value associated with a textual expression defined by the individual node;
   obtaining, based on the parsing, a plurality of values for presentation, the values being utilized as summary information associated with the textual information; and
   providing, for presentation on a user device via an interactive user interface, at least a first value of the plurality of values, the first value being extracted from a first textual expression, wherein a second value of the plurality of values was extracted from a second textual expression, wherein respective nodes associated with the first textual expression and the second textual expression were connected via an edge associated with the different shape in the graphical depiction,
   and wherein based on receipt of user input selecting the first value, the interactive user interface is configured to present the second value.

18. The system of claim 17, wherein selecting is based on comparisons of textual expressions included in the textual information with textual expressions defined by nodes of each options table.

19. The system of claim 17, wherein each node included in an options table is represented as a respective row of the options table, and wherein a particular row indicates (1) a section of textual information in which a textual expression is included and (2) the textual expression.

20. The system of claim 19, wherein the particular row indicates one or more alternate textual expressions.

21. The system of claim 19, wherein parsing the textual information comprises:
   obtaining, from an initial row of the particular options table, one or more textual expressions; and
   applying the textual expressions to a section of the textual information, and extracting values associated with the textual expressions, wherein a value comprises a numerical value or text from the textual information.

22. The system of claim 17, wherein providing, for presentation on a user device, one or more of the values and associated textual expressions comprises:
   causing presentation of the values and descriptions of the values as a summary of the textual information.

23. The system of claim 22, wherein the server system maintains different versions of the textual information, and wherein the operations further comprise:

determining differences between extracted values included in the different versions; and presenting, for at least one of the extracted values, information describing the determined difference.

24. The system of claim 22, wherein an interactive user interface is provided for presentation on the user device, and wherein the interactive user interface:

presents, in a first region of the interactive user interface, one or more of the values and descriptions of the values;

presents, in a second region, at least a portion of the textual information;

responds to interaction with a particular value presented in the first region; and in response, updates the second region to specify text included in the textual information that is associated with the particular value.

25. The system of claim 22, wherein the operations further comprise:

accessing information indicating average values extracted from textual information of the same type of textual information; and causing presentation of the average values, such that a user can compare the average values to the extracted values.

26. A method performed by a system of one or more computers comprising:

obtaining, from a user, a first document of a particular type of document;

accessing, based on the particular type of document, ontology information for the particular type, the ontology information specifying:

nodes, the nodes being associated with respective triggers that cause the server system to extract values for textual expressions defined by the nodes, wherein a subset of the nodes are associated with a first shape in a graphical depiction associated with the ontology information, wherein the first shape indicates that an associated node is usable to extract a value associated with a textual expression defined by the associated node, and wherein at least one of the nodes is associated with a second shape, the second shape indicating that the at least one of the nodes is associated with a plurality of types of values, and wherein the at least one of the nodes is connected via respective edges to particular nodes of the subset of the nodes, each of the particular nodes being usable to extract a particular type of value and relational information between the nodes, wherein relational information indicates links between textual expressions, wherein a subset of the edges is associated with a third shape in the graphical depiction, and wherein the third shape indicates that respective values extracted from a first node which is connected to a second node via the third shape are to be presented as being associated;

accessing a plurality of options tables, each options table representing a respective embodiment of the particular type of document and including a respective portion of the nodes; and parsing, using ontology information, the first document, the parsing causing traversal of the nodes and extraction of values, via the nodes, from one or more textual expressions based on the textual information, wherein parsing the textual information comprises:

for individual nodes associated with the first shape which are included in the traversal of the nodes, accessing the plurality of options table, and selecting, for the individual node, a particular options table usable to extract a value associated with a textual expression defined by the individual; and presenting information describing the extracted values.

27. The method of claim 26, wherein selecting a particular options table for a particular node comprises:

accessing an identifier associated with a textual expression defined by the particular node;

identifying, based on the plurality of options tables, that the particular node is configured to extract a value associated with the textual expression defined by the particular node.

28. The method of claim 26, wherein the options table comprises a plurality of rows, and wherein each row identifies at least one textual expression associated with at least one term.

29. The method of claim 28, wherein a particular row identifies a first textual expression associated with a first term and a second textual expression associated with a second term, wherein the first textual expression causes extraction of text describing the first term, and wherein the second textual expression causes extraction of a numerical value to be included in the extracted text.

* * * * *